US011326103B2

(12) United States Patent
Hasebe et al.

(10) Patent No.: US 11,326,103 B2
(45) Date of Patent: May 10, 2022

(54) LIQUID CRYSTAL DISPLAY DEVICE

(71) Applicant: DIC Corporation, Tokyo (JP)

(72) Inventors: Hiroshi Hasebe, Kitaadachi-gun (JP); Toru Fujisawa, Kitaadachi-gun (JP); Yoshinori Iwashita, Kitaadachi-gun (JP); Fumiaki Kodera, Kitaadachi-gun (JP); Keisuke Fujisawa, Kitaadachi-gun (JP); Kenji Nakamura, Kitaadachi-gun (JP); Yuichi Satokawa, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 417 days.

(21) Appl. No.: 16/468,388

(22) PCT Filed: Dec. 12, 2017

(86) PCT No.: PCT/JP2017/044512

§ 371 (c)(1),
(2) Date: Jul. 20, 2020

(87) PCT Pub. No.: WO2018/110531

PCT Pub. Date: Jun. 21, 2018

(65) Prior Publication Data

US 2020/0354633 A1 Nov. 12, 2020

(30) Foreign Application Priority Data

Dec. 15, 2016 (JP) ............................ JP2016-243259

(51) Int. Cl.
*G02F 1/1334* (2006.01)
*C09K 19/54* (2006.01)
(Continued)

(52) U.S. Cl.
CPC ........ *C09K 19/542* (2013.01); *C09K 19/3003* (2013.01); *C09K 19/3066* (2013.01);
(Continued)

(58) Field of Classification Search
CPC . G02F 1/1334; G02F 1/13345; C09K 19/542; C09K 19/3003; C09K 19/3066; C09K 19/3405
(Continued)

(56) References Cited

U.S. PATENT DOCUMENTS 8,940,375 B2 1/2015 Bremer et al.
10,133,109 B2 11/2018 Fujisawa et al.
(Continued)

FOREIGN PATENT DOCUMENTS

JP 4175826 B2 11/2008
JP 5020203 B2 9/2012
(Continued)

OTHER PUBLICATIONS

International Search Report dated Mar. 20, 2018, issued in counterpart application No. PCT/JP2017/044512 (1 page).

*Primary Examiner* — Christopher M Raabe
(74) *Attorney, Agent, or Firm* — Westerman, Hattori, Daniels & Adrian, LLP

(57) ABSTRACT

To provide a liquid crystal display device that has a high off-response speed and a good balance between drive voltage and transmittance, is stable over time, and also has a high voltage holding ratio. A liquid crystal display device in which a liquid crystal layer containing a polymer network (A) and a liquid crystal composition (B) is disposed between two substrates having an electrode on at least one side thereof and having transparent properties on at least one side thereof, and the loss factor (tan δ) (loss modulus/storage modulus) of the liquid crystal layer calculated from the storage modulus (Pa) and the loss modulus (Pa) in a sinusoidal vibration measured with a rheometer at 25° C. and at a measurement frequency of 1 Hz ranges from 0.1 to 1.

15 Claims, 14 Drawing Sheets

(51) Int. Cl.
*C09K 19/30* (2006.01)
*C09K 19/34* (2006.01)
*C09K 19/04* (2006.01)

(52) U.S. Cl.
CPC ........ *C09K 19/3405* (2013.01); *G02F 1/1334* (2013.01); *C09K 2019/0448* (2013.01); *C09K 2019/301* (2013.01); *C09K 2019/3004* (2013.01); *C09K 2019/3009* (2013.01); *C09K 2019/3016* (2013.01); *C09K 2019/3408* (2013.01); *C09K 2019/546* (2013.01); *G02F 1/13345* (2021.01)

(58) Field of Classification Search
USPC ............................................................ 349/88
See application file for complete search history.

(56) References Cited

U.S. PATENT DOCUMENTS

| | | | | |
|---|---|---|---|---|
| 10,690,952 | B2 * | 6/2020 | Fujisawa | G02F 1/1334 |
| 2005/0116200 | A1 | 6/2005 | Nakanishi et al. | |
| 2008/0090026 | A1 | 4/2008 | Bernatz et al. | |
| 2009/0109392 | A1 | 4/2009 | Hsieh et al. | |
| 2021/0200024 | A1 * | 7/2021 | Matsushima | G02F 1/133526 |

FOREIGN PATENT DOCUMENTS

| | | | | |
|---|---|---|---|---|
| JP | 5383994 B2 | | 1/2014 | |
| WO | 2015/122457 A1 | | 8/2015 | |
| WO | WO-2019097960 A1 | * | 5/2019 | G02B 5/30 |

* cited by examiner

LIQUID CRYSTAL DISPLAY DEVICE

TECHNICAL FIELD

The present invention relates to a liquid crystal display device.

BACKGROUND ART

In recent years, with an increase in travel speed of an object to be displayed moving on a screen due to an increase in size of liquid crystal televisions, liquid crystals have been required to have an improved response speed. Thus, for example, polymer-stabilized (PS) or polymer-sustained alignment (PSA) displays are widely utilized to increase the display speed (see Patent Literature 1 to Patent Literature 5). These displays mainly employ the vertical alignment mode to provide a liquid crystal material with a tilt angle, thereby increasing the speed of turn-on response (on-response) when a voltage is applied.

More specifically, in such PS or PSA displays, 0.3% or more by mass and less than 1% by mass polymerizable compound is added to a liquid crystal medium, and an electric field is applied to an upper electrode and a lower electrode to tilt liquid crystal molecules in one direction. In this state, the polymerizable compound is polymerized by UV radiation to form a polymer layer on an alignment film. The polymer layer fixes the alignment state of the tilted liquid crystals and thereby increases the speed of turn-on response (on-response) when a voltage is applied.

In recent years, however, with a further increase in travel speed of an object to be displayed moving on a screen due to a further increase in size of liquid crystal televisions, liquid crystals have been required to have a further improved response speed.

Thus, to increase the response speed, an attempt has been made to increase not only the speed of turn-on response (on-response) when a voltage is applied but also the speed of response when the voltage application is stopped (switching off). For example, Patent Literature 5 discloses a liquid crystal display device in which a liquid crystal material in a liquid crystal display cell contains a liquid crystal composition and 1% or more by mass and less than 40% by mass polymer component. In such a liquid crystal display device that contains a predetermined amount of polymer in a liquid crystal material, the attractive interaction between the polymer and liquid crystal molecules is utilized to facilitate the relaxation to the initial alignment state during the switching off response (hereinafter abbreviated to "off-response") and thereby increase the off-response speed.

In such a liquid crystal display device having a liquid crystal layer containing 1% or more by mass and less than 40% by mass polymer component in a liquid crystal material, however, due to a higher concentration of the polymer component than in PS or PSA, the device characteristics, such as off-response, drive voltage, and transmittance, tend to vary with the concentration, chemical structure, and production process of the polymer component.

Thus, the production of a liquid crystal display device with a good characteristic balance needs to quickly assess the balance between off-response, drive voltage, and transmittance measurements to optimize the polymer concentration, the chemical structure of a polymer or liquid crystal, and the production process.

However, the assessment of the characteristic balance involves many experiments and measurements under different conditions to examine the effects of each factor on the off-response, drive voltage, and transmittance, and determine the antinomic relationship therebetween. Thus, it takes an extended period to determine the optimum conditions, and the procedures are complicated.

(Patent Literature 5) discloses a method for producing a liquid crystal display device, for example, a method for putting a composition containing a liquid crystal composition and a monomer into a liquid crystal cell and then producing a polymer by ultraviolet radiation in the liquid crystal cell. If the amount of ultraviolet radiation is insufficient for the monomer to form a polymer, the characteristics change over time. If the amount of ultraviolet radiation is sufficient, the characteristics (off-response, drive voltage, transmittance) are maintained without changes over time. However, an excessive amount of ultraviolet radiation may cause chemical degradation of the liquid crystal material and result in a decrease in voltage holding ratio, which is an important reliability indicator of liquid crystal display devices. Thus, the amount of ultraviolet radiation also has an influence on temporal changes and the voltage holding ratio, and it is very important to appropriately set the amount of ultraviolet radiation. However, it is difficult to optimize the amount of ultraviolet radiation. Consequently, it is difficult to industrially consistently produce a liquid crystal display device with a good characteristic balance, with little temporal changes, and with a high voltage holding ratio.

Furthermore, in recent years, curved liquid crystal displays, instead of planar liquid crystal displays, have attracted attention as immersive displays. Such displays are produced by curving a planar display by an external force. Curving may disturb the liquid crystal alignment.

Furthermore, in recent years, a liquid crystal display has often been placed on a touch panel. In such a case, a pressing force may disturb the alignment in liquid crystal displays.

CITATION LIST

Patent Literature

PTL 1: Japanese Patent No. 4175826
PTL 2: Japanese Patent No. 5020203
PTL 3: Japanese Patent No. 5383994
PTL 4: U.S. Pat. No. 8,940,375
PTL 5: WO 2015/122457

SUMMARY OF INVENTION

Technical Problem

Accordingly, it is an object of the present invention to provide a liquid crystal display device that has a high off-response speed and a good balance between drive voltage and transmittance, is stable over time, and also has a high voltage holding ratio. It is another object of the present invention to provide a liquid crystal display device that has increased resistance to curving of the display and to external forces, such as a pressing force, on the display.

Solution to Problem

As a result of extensive studies to achieve the objects, the present inventors have completed the present invention in a liquid crystal display device containing a polymer component in a liquid crystal material by focusing on the dynamic viscoelasticity (hereinafter referred to simply as "viscoelasticity") of the entire system of the liquid crystal material containing the polymer when the liquid crystal display device has fast off-response and has a good balance between drive voltage and transmittance and by finding that a liquid crystal display device with a good balance can be obtained when viscoelastic properties, particularly the dynamic loss tangent (tan δ), are 1 or less.

Accordingly, the present invention relates to a liquid crystal display device in which a liquid crystal layer containing a polymer is disposed between two substrates having an electrode on at least one side thereof and having transparent properties on at least one side thereof, and the liquid crystal layer has a loss tangent in the range of 0.1 to 1 at a measurement frequency of 1 Hz.

Advantageous Effects of Invention

The present invention can provide a liquid crystal display device that has a high off-response speed and a good balance between drive voltage and transmittance, is stable over time, and also has a high voltage holding ratio.

DESCRIPTION OF EMBODIMENTS

Figure 1:
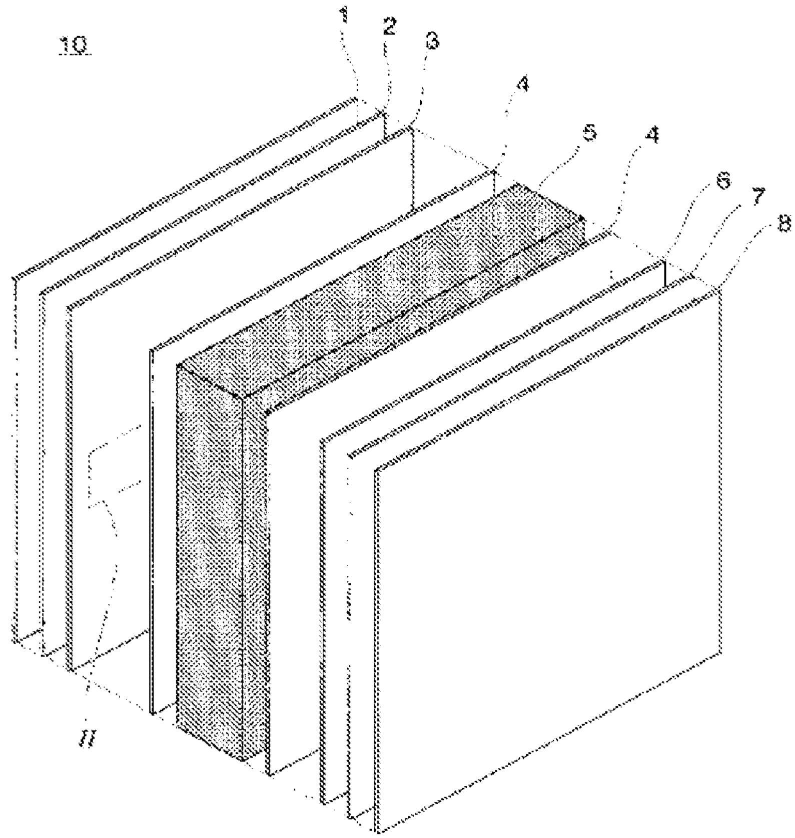
FIG. 1 is a schematic view of a liquid crystal display device according to the present invention.

As described above, in a liquid crystal display device according to the present invention, a liquid crystal layer containing a polymer network (A) and a liquid crystal composition (B) is disposed between two substrates having an electrode on at least one side thereof and having transparent properties on at least one side thereof, and the loss factor (tan δ) (loss modulus/storage modulus) of the liquid crystal layer calculated from storage modulus (Pa) and loss modulus (Pa) in a sinusoidal vibration measured with a rheometer at 25° C. and at a measurement frequency of 1 Hz ranges from 0.1 to 1. Like a liquid crystal display device according to the present invention, in a system including a polymer in a liquid crystal layer, although extremely high elasticity or solidity of the liquid crystal layer itself results in a high off-response speed from the voltage application state to the field-free state (OFF state), it requires a high voltage when a voltage is applied to change the alignment of the liquid crystal material, thus resulting in an increased drive voltage or a decreased transmittance. On the other hand, extremely high viscosity of the liquid crystal layer does not cause an increase in drive voltage or a decrease in transmittance but results in a low off-response speed. Despite of such an antinomic relationship, the present invention can improve the off-response speed by setting the loss factor (tan δ) (loss modulus/storage modulus) in the range of 0.1 to 1 without causing an increase in drive voltage or a decrease in transmittance.

The loss tangent (tan δ) (loss modulus/storage modulus) can be measured with a viscoelastometer and can be calculated as a ratio of loss modulus (Pa) to storage modulus (Pa) (loss modulus/storage modulus (tan δ)) in a sinusoidal vibration at 25° C. and at a measurement frequency of 1 Hz. The measurement with a rheometer can be performed with a commercially available rheometer measuring instrument, for example, a rheometer "MCR" series manufactured by Anton Paar. The measurement can be performed at 25° C., and the strain to cause a stress in the measurement preferably ranges from 20% to 70%, more preferably 30% to 60%, particularly preferably 40% to 55%, of the cell gap. A small strain tends to result in measured values with low precision, and a large strain may cause destruction of an internally formed polymer by the measurement, making it difficult to obtain true values. The stress is preferably caused by sinusoidal vibration.

The measurement frequency preferably ranges from 0.5 to 5 Hz. For example, for a liquid crystal material without a polymer network, the loss tangent is approximately 2 at 1 Hz and ranges from 4 to 8 at 5 Hz. In contrast, a liquid crystal layer in a liquid crystal display device according to the present invention has a loss tangent with low frequency dependency, has higher solidity than common liquid crystal layers, and has a high off-response speed and a good balance between drive voltage and transmittance.

More specifically, a liquid crystal layer in a liquid crystal display device according to the present invention preferably has a loss tangent in the range of 0.1 to 1 at 1 Hz and in the range of 0.11 to 1 at a measurement frequency of 4.6 Hz. In particular, the difference between the loss tangents at measurement frequencies of 1 Hz and 4.6 Hz is preferably 0.2 or less, particularly preferably 0.1 or less. The loss tangent at 1 Hz in the present invention is preferably 0.8 or less, particularly preferably 0.7 or less, particularly in terms of off-response speed.

A liquid crystal layer in a liquid crystal display device according to the present invention is supported by a polymer to improve the stability of liquid crystal alignment and is therefore easily applied to 3D shapes or curved surfaces. From this point of view, a lower loss tangent and higher solidity are desirable. However, extremely high solidity results in the destruction of the polymer structure due to bending stress, and the destruction tends to cause variations in alignment. Thus, in the present invention, the loss tangent at 1 Hz preferably ranges from 0.1 to 1, particularly preferably 0.15 to 0.8, particularly preferably 0.2 to 0.7, to reduce the variations when a liquid crystal device is bent.

A liquid crystal layer in a liquid crystal display device according to the present invention has high liquid crystal alignment stability and can reduce alignment variation when a liquid crystal device is locally pressed. Also regarding such performance, however, extremely high solidity results in the destruction of the polymer structure due to stress caused by pressing, and the destruction tends to fix variations in alignment. From this point of view, the loss tangent at 1 Hz preferably ranges from 0.15 to 0.8, particularly preferably 0.2 to 0.7.

[Liquid Crystal Layer]

Next, a liquid crystal layer in a liquid crystal display device, for example, a liquid crystal layer 5 in FIG. 1, is characterized by including the polymer network (A) and the liquid crystal composition (B), as described above.

(Polymer Network (A))

The polymer network (A) constituting such a liquid crystal layer preferably has uniaxial optical anisotropy, uniaxial refractive index anisotropy, or a uniaxial easy alignment axis direction and is more preferably formed such that the optical axis or the easy alignment axis of the polymer network is almost identical with the easy alignment axis of low-molecular-weight liquid crystals constituting the liquid crystal composition (B). The polymer network includes a polymer binder in which a plurality of polymer networks are combined to form a polymer thin film. The polymer binder has uniaxial refractive index anisotropy and is characterized in that low-molecular-weight liquid crystals are dispersed in the thin film, and the uniaxial optical axis of the thin film is almost identical with the optical axis of the low-molecular-weight liquid crystals.

Thus, unlike polymer dispersed liquid crystals or polymer network liquid crystals, which are light scattering liquid crystals, high-contrast display without light scattering can be achieved in a liquid crystal display device utilizing polarization, and a shorter turn-off time improves the responsiveness of the liquid crystal device. Furthermore, in a liquid crystal layer constituting a liquid crystal display device according to the present invention, the polymer network layer is formed in the whole liquid crystal display device, and it can be distinguished from a polymer-sustained alignment (PSA) liquid crystal composition, in which a polymer thin film layer is formed on a liquid crystal device substrate to induce pretilt.

Such a liquid crystal layer can be produced by polymerizing a polymerizable liquid crystal composition containing a polymerizable monomer component (a) and the liquid crystal composition (B) as essential components, for example. More specifically, while the polymerizable liquid crystal composition has a liquid crystal phase, the polymerizable monomer component (a) (hereinafter sometimes abbreviated simply to "monomer (a)") in the polymerizable liquid crystal composition can be polymerized to increase the molecular weight and thereby cause phase separation between the liquid crystal composition (B) and the polymer (or copolymer), thereby forming the liquid crystal layer.

The two-phase separation form depends on the type of the liquid crystal composition (B) and the type of the monomer. For example, the phase separation structure may be formed by binodal decomposition in which an infinite number of monomer phases are formed and grown as island-shaped nuclei in the liquid crystal composition (B) or by spinodal decomposition in which phase separation occurs due to fluctuations in the concentration of a monomer phase in the liquid crystal composition (B). In the formation of a polymer network by binodal decomposition, a compound with a high monomer reaction rate is preferably used to form and linearly connect an infinite number of monomer nuclei with a size smaller than the visible light wavelength, thereby forming a nano-order phase separation structure. Consequently, polymerization in the monomer phases forms a polymer network with space distances shorter than the visible light wavelength depending on the phase separation structure. The space in the polymer network is formed by the phase separation of the liquid crystal composition (B) phase. The space is particularly preferably smaller than the visible light wavelength because the liquid crystal display device has no light scattering, has high contrast, and has a short turn-off time and high-speed response due to the strong effects of an anchoring force from the polymer network. The nucleation of the monomer phases in binodal decomposition varies with compatibility depending on the type or combination of compounds, with the reaction rate, with the temperature, and with another parameter, and is preferably appropriately controlled as required. For the reaction rate in ultraviolet polymerization, the ultraviolet radiation conditions are appropriately adjusted to enhance the reactivity with respect to the type and amount of monomer functional group or polymerization initiator or with respect to ultraviolet radiation intensity. An ultraviolet radiation intensity of at least 2 $mW/cm^2$ is preferred. On the other hand, spinodal decomposition is preferred because it forms a phase separation microstructure due to fluctuations in the concentration of periodic two phases and easily provides uniform space distances smaller than the visible light wavelength.

In both cases, a polymer network can be formed while an alignment state similar to the alignment state of the liquid crystal composition (B) is maintained.

The polymerizable liquid crystal composition contains the polymerizable monomer component (a), the liquid crystal composition (B), and an optional polymerization initiator. The polymerizable monomer component (a) preferably constitutes 0.5% to 20% by mass, more preferably 1% to 10% by mass, in the polymerizable liquid crystal composition, in terms of the ease of the phase separation of the liquid crystal composition (B) phase and the formation of a polymer network. Thus, in the liquid phase layer in the present invention, the polymer network (A) preferably constitutes 0.5% to 20% by mass, particularly preferably 1% to 10% by mass, of the total mass of the polymer network (A) and the liquid crystal composition (B).

As described above, the polymer network (A) in the present invention preferably has optical anisotropy following the alignment of the liquid crystal composition (B). The structure of the liquid crystal layer in the polymer network (A) may be a structure in which the liquid crystal composition (B) forms a continuous layer in the three-dimensional network structure of the polymer, a structure in which droplets of the liquid crystal composition (B) are dispersed in the polymer, a combination of these structures, or a structure in which a polymer network layer is present with both substrate faces being starting points and only a liquid crystal layer is present near the center of opposing substrates. In any of these structures, there is preferably a pretilt angle in the range of 0 to 90 degrees with the liquid crystal device substrate interface by the action of the polymer network. Among the structures, the structure in which the liquid crystal composition (B) forms a continuous layer in the three-dimensional network structure of the polymer is particularly preferred in terms of the stability of the pretilt of the liquid crystal molecules. The polymer network constituting the liquid phase layer preferably has a function of aligning the coexisting liquid crystal composition (B) in the alignment direction of the alignment film of the liquid crystal cell and also preferably has a function of stabilizing low-molecular-weight liquid crystals pretilted in the polymer interface direction. Introducing a monomer for stabilizing the pretilt of the low-molecular-weight liquid crystals with respect to the polymer interface is useful in improving transmittance or lowering the drive voltage of the liquid crystal device. The polymer network (A) may have refractive index anisotropy, and the function of aligning low-molecular-weight liquid crystals in the alignment direction can be achieved by using a monomer with a mesogenic group.

From this point of view, the polymerizable monomer component (a) preferably includes a liquid crystalline monomer. Thus, to increase the off-response speed, a liquid crystal display device according to the present invention preferably has a structure in which a polymer network layer is formed in a liquid crystal phase over the entire surface of the liquid crystal display device and the liquid crystal phase is continuous, the easy alignment axis of a polymer network or the uniaxial optical axis is preferably almost identical with the easy alignment axis of low-molecular-weight liquid crystals, and the polymer network is preferably formed to induce the pretilt angle of low-molecular-weight liquid crystals. Thus, a polymerizable monomer constituting the polymerizable monomer component (a) is preferably a liquid crystalline monomer having a mesogenic structure in its molecular structure. In the polymer network layer in a liquid crystal display device according to the present invention, the average space distance of the polymer network is preferably smaller than the visible light wavelength, that is, 450 nm or less, to prevent light scattering.

To achieve a response turn-off time shorter than the response time of low-molecular-weight liquid crystals alone by the interaction effect (anchoring force) between a polymer network and low-molecular-weight liquid crystals, the average space distance preferably ranges from 50 to 450 nm. To achieve almost the same turn-off time for a large cell thickness as the turn-off time for a small cell thickness due to a reduction in the effects of the cell thickness of liquid crystals, the average space distance preferably ranges from 200 to 450 nm. To suppress an increase in drive voltage to 25 V or less to decrease the turn-off response time, the average space distance preferably ranges from 250 to 450 nm. To suppress an increase in drive voltage to approximately 5 V or less, the average space distance preferably ranges from 300 to 450 nm. On the other hand, to increase the drive voltage to 30 V or more, the average space distance ranges from 50 to 250 nm. To achieve a turn-off time of 0.5 msec or less, the average space distance preferably ranges from 50 to 200 nm.

In contrast to the average space distance, the average diameter of the polymer network preferably ranges from 20 to 700 nm. The average diameter tends to increase with the monomer content. An increase in reactivity to increase the polymerization phase separation rate results in an increased density of the polymer network and a decreased average diameter of the polymer network. Thus, the phase separation conditions are adjusted as required. At a monomer content of 10% or less, the average diameter preferably ranges from 20 to 160 nm. At an average space distance in the range of 200 to 450 nm, the average diameter preferably ranges from 40 to 160 nm. At a monomer content of more than 10%, the average diameter preferably ranges from 50 to 700 nm, more preferably 50 to 400 nm.

More specifically, such a liquid crystalline monomer is represented by the following general formula (P1).

[Chem. 1]

$$(R^{P11}-Sp^{P11})_{mp11}-(M^{P11})_{mp12}-(L^{P11}-M^{P12})_{mp13}-(L^{P12}-M^{P13})_{mp14}-(Z^{P11})_{mp15} \qquad (P1)$$

$Z^{P11}$ denotes a fluorine atom, a cyano group, a hydrogen atom, an alkyl group having 1 to 15 carbon atoms in which a hydrogen atom is optionally substituted with a halogen atom, an alkoxy group having 1 to 15 carbon atoms in which a hydrogen atom is optionally substituted with a halogen atom, an alkenyl group having 1 to 15 carbon atoms in which a hydrogen atom is optionally substituted with a halogen atom, an alkenyloxy group having 1 to 15 carbon atoms in which a hydrogen atom is optionally substituted with a halogen atom, or $-Sp^{P12}-R^{P12}$. Among these, $Z^{P11}$ preferably denotes a fluorine atom or an alkyl group having 1 to 15 carbon atoms in which an fluorine atom or an hydrogen atom is optionally substituted with a halogen atom, to increase the voltage holding ratio of a liquid crystal display device, and preferably denotes $-Sp^{P12}-R^{P12}$ in terms of the stability of tilt.

$R^{P11}$ and $R^{P12}$ independently denote one of the following formulae (RP11-1) to (PP11-8) (wherein * denotes a bonding site). In the formulae (RP11-1) to (RP11-8), $R^{P111}$ and $R^{P112}$ independently denote a hydrogen atom or an alkyl group having 1 to 5 carbon atoms, and $t^{M11}$ denotes 0, 1, or 2.

[Chem. 2]

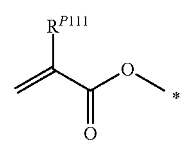

(RP11-1)

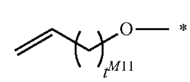

(RP11-2)

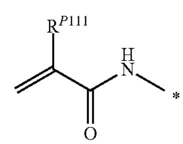

(RP11-3)

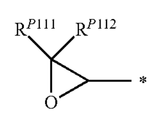

(RP11-4)

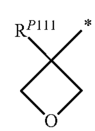

(RP11-5)

-continued (RP11-6)

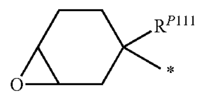

(RP11-7)

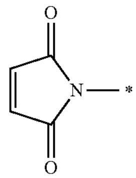

(RP11-8)

HS— *

Among these, a (meth)acryloyl group represented by the formula (RP11-1) wherein RP111 denotes a hydrogen atom or a methyl group is particularly preferred because this can decrease the amount of ultraviolet radiation in the polymerization of a monomer in the production of a liquid crystal display device, ensure a minimum necessary amount of ultraviolet radiation to a liquid crystal material, and can prevent degradation of a liquid crystal material and a liquid crystal display device.

Among the formulae (RP11-1) to (PP11-8) of $R^{p11}$ and $R^{p12}$, the following formulae (RP11-1) to (RP11-4) are preferred in terms of reactivity, and the formula (RP11-1) is particularly preferred.

[Chem. 3]

(RP11-1)

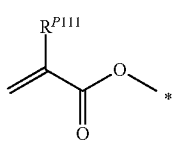

(RP11-2)

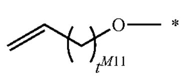

(RP11-3)

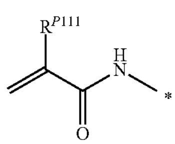

(RP11-4)

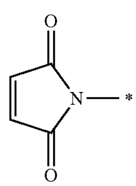

$Sp^{p11}$ and $Sp^{p12}$ independently denote a single bond, a linear or branched alkylene group having 1 to 12 carbon atoms, or a structural moiety with a chemical structure in which a carbon atom in the linear or branched alkylene structure is substituted with an oxygen atom or a carbonyl group provided that the carbon atom is not adjacent to an oxygen atom. Among these, in particular, a linear or branched alkylene group having 1 to 12 carbon atoms is preferred because it improves compatibility with the liquid crystal composition (B), and a linear or branched alkylene group having 1 to 6 carbon atoms, which are similar to those of an alkyl group of liquid crystal molecules, is particularly preferred.

If $Sp^{p11}$ and $Sp^{p12}$ are linear or branched alkylene groups having 1 to 12 carbon atoms, $Sp^{p11}$ and $Sp^{p12}$ are preferably the same because this facilitates the production of the monomer and because the ratio of compounds with different alkylene chain lengths to be used can be easily adjusted to control physical properties. If $Sp^{p11}$ and $Sp^{p12}$ are single bonds, the monomer is likely to be localized on the substrate face and tends to form a thin film on a vertical alignment film surface rather than form a polymer network. This enhances the effects of providing and fixing pretilt on an alignment film rather than increasing the response speed due to the formation of a polymer network.

When the polymerizable monomer component (a) content of a polymerizable liquid crystal composition ranges from 0.5% to 20% by mass, $Sp^{p11}$ and $Sp^{p12}$ are preferably linear or branched alkylene groups having 1 to 12 carbon atoms because this facilitates the formation of a polymer network to increase the off-response speed. In particular, the polymerizable monomer component (a) content preferably ranges from 1% to 10% by mass in terms of the off-response speed and a low drive voltage. The number of carbon atoms of the linear or branched alkylene group preferably ranges from 2 to 8, more preferably 2 to 6. A carbon atom of the alkylene group is preferably substituted with an oxygen atom or a carbonyl group, provided that the carbon atom is not adjacent to an oxygen atom. In particular, introducing an oxygen atom such that the oxygen atom is bonded to $M^{p11}$ or $M^{P13}$ is preferred because this can increase the liquid crystal upper limit temperature of the whole liquid crystal material and increase the ultraviolet sensitivity during polymerization.

Next, in the general formula (P1), providing a monomer with high liquid crystallinity is preferred from the perspective of reducing variations in alignment in a liquid crystal display device. From such a point of view, $L^{p11}$ and $L^{p12}$ are preferably independently selected from a single bond, $—C_2H_4—$, —COO—, —OCO—, $—CH{=}CR^{P113}—OCO—$, $—OCO—CR^{P113}{=}CH—$, $—(CH_2)_{tm12}—C({=}O)—O—$, $—(CH_2)_{tm12}—O—(C{=}O)—$, $—O—(C{=}O)—(CH_2)_{tm12}—$, $—(C{=}O)—O—(CH_2)_{tm12}—$, —CH=CH—, —CF=CF—, —CF=CH—, —CH=CF—, $—CF_2O—$, $—OCF_2—$, $—CF_2CH_2—$, $—CH_2CF_2—$, $—CF_2CF_2—$, —C≡C—, —N=N—, and —C=N—N=C—, $R^{P113}$ is preferably a hydrogen atom, and tm12 is preferably 2. $M^{p11}$, $M^{p12}$, and $M^{P13}$ are preferably independently selected from a 1,4-phenylene group, a 1,4-cyclohexylene group, a 1,4-cyclohexenylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a fluorene-2,6-diyl group, a fluorene-1,4-diyl group, a phenanthrene-2,7-diyl group, an anthracene-2,6-diyl group, a 1,2,3,4-tetrahydronaphthalene-2,6-diyl group, and a 1,3-dioxane-2,5-diyl group.

From the perspective of ensuring the cold storage capability in a liquid crystal material as a monomer, $L^{p11}$ and $L^{p12}$ are preferably selected from —O—, —S—, $—CH_2—$, —CO—, $—C_2H_4—$, $—OCOOCH_2—$, $—CH_2OCOO—$, $—OCH_2CH_2O—$, $—CO—NR^{P113}—$, $—NR^{P113}—CO—$, $—CH{=}CR^{P113}—COO—$, $—CH{=}CR^{P113}—OCO—$, $—COO—CR^{P113}{=}CH—$, $—OCO—CR^{P113}{=}CH—$, $—COO—CR^{P113}{=}CH—COO—$, $—COO—CR^{P113}{=}CH—OCO—$, $—OCO—CR^{P113}{=}CH—COO—$, $—OCO—CR^{P113}{=}CH—OCO—$, $—(CH_2)_{tm12}—C({=}O)—O—$, $—(CH_2)_{tm12}—O—(C{=}O)—$, —O—

(C═O)—$(CH_2)_{tm12}$—, —(C═O)—O—$(CH_2)_{tm12}$—, —$CF_2$—, —$CF_2CH_2$—, —$CH_2CF_2$—, and —$CF_2CF_2$—, $R^{P113}$ is preferably an alkyl group having 1 to 4 carbon atoms, and tm12 is preferably an integer in the range of 2 to 4.

Among these, in particular, from the perspective of increasing the liquid crystallinity of the polymerizable monomer component (a) and reducing variations in alignment in a liquid crystal display device, a single bond, —$C_2H_4$—, —COO—, —OCO—, —CH═CH—COO—, —OCO—CH═CH—, —$(CH_2)_2$—C(═O)—O—, —$(CH_2)_2$ —O—(C═O)—, —O—(C═O)—$(CH_2)_2$—, —(C═O)—O—$(CH_2)_2$—, —CH═CH—, —CF═CF—, —CF═CH—, —CH═CF—, —$CF_2O$—, —$OCF_2$—, —$CF_2CH_2$—, —$CH_2CF_2$—, —$CF_2CF_2$—, —C≡C—, —N═N—, or —C═N—N═C— is preferred.

To provide a monomer with a photoisomerization function to utilize an optical alignment function due to the Weigert effect, —CH═CH—, —CF═CF—, —CF═CH—, —CH═CF—, or —N═N— is preferred, and —CH═CH— or —N═N—, particularly —N═N—, is preferred. To improve the alignment of a polymer network, —N═N— is particularly preferred.

Next, $M^{P11}$, $M^{P12}$, and $M^{P13}$ in the general formula (P1) independently denote a 1,4-phenylene group, a 1,3-phenylene group, a 1,2-phenylene group, a 1,4-cyclohexylene group, a 1,3-cyclohexylene group, a 1,2-cyclohexylene group, a 1,4-cyclohexenylene group, a 1,3-cyclohexenylene group, a 1,2-cyclohexenylene group, an anthracene-2,6-diyl group, a phenanthrene-2,7-diyl group, a pyridine-2,5-diyl group, a pyrimidine-2,5-diyl group, a naphthalene-2,6-diyl group, a naphthalene-1,4-diyl group, an indan-2,5-diyl group, a fluorene-2,6-diyl group, a fluorene-1,4-diyl group, a phenanthrene-2,7-diyl group, an anthracene-2,6-diyl group, an anthracene-1,4-diyl group, a 1,2,3,4-tetrahydronaphthalene-2,6-diyl group, or a 1,3-dioxane-2,5-diyl group, or a structure in which a hydrogen atom on one of these aromatic nuclei is substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, or a nitro group.

$M^{P11}$, $M^{P12}$, and $M^{P13}$ is preferably a structure in which a hydrogen atom on one of the aromatic nuclei of these structures is substituted with -$Sp^{P11}$-$R^{P11}$ because this provides a reactive radical polymerizable monomer. In this case, $R^{P11}$ is preferably represented by the formula (RP11-1) and is preferably a (meth)acryloyl group wherein $R^{P111}$ denotes a hydrogen atom or a methyl group.

Among these, in particular, a 1,4-phenylene group, a 1,4-cyclohexylene group, a 1,4-cyclohexenylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a fluorene-2,6-diyl group, a fluorene-1,4-diyl group, a phenanthrene-2,7-diyl group, an anthracene-2,6-diyl group, a 1,2,3,4-tetrahydronaphthalene-2,6-diyl group, a 1,3-dioxane-2,5-diyl group, a 2,3-difluoro-1,4-phenylene group, and a 2-fluoro-1,4-phenylene group are preferred in terms of compatibility with liquid crystals.

In the general formula (P1), mp12 denotes 1 or 2, mp13 and mp14 independently denote 0, 1, 2, or 3, and mp11 and mp15 independently denote 1, 2, or 3. If there are a plurality of $Z^{P11}$ s, they may be the same or different, if there are a plurality of $R^{P11}$s, they may be the same or different, if there are a plurality of $R^{P12}$s, they may be the same or different, if there are a plurality of $Sp^{P11}$ s, they may be the same or different, if there are a plurality of $Sp^{P12}$s, they may be the same or different, if there are a plurality of $L^{P11}$s, they may be the same or different, if there are a plurality of $L^{P12}$s, they may be the same or different, if there are a plurality of $M^{P12}$s, they may be the same or different, and if there are a plurality of $M^{P13}$s, they may be the same or different. One or two or more of the materials are preferably contained.

The total of $m^{P12}$ to $m^{P14}$ is preferably in the range of 1 to 6, more preferably 2 to 4, particularly preferably 2. When two or more monomers are used, the average calculated from the concentration of the monomers in all the monomers multiplied by the total of $m^{P12}$ to $m^{P14}$ is preferably set in the range of 1.6 to 2.8, more preferably 1.7 to 2.4, particularly preferably 1.8 to 2.2.

The total of $m^{P11}$ and $m^{P15}$ is preferably in the range of 1 to 6, more preferably 2 to 4, particularly preferably 2. When two or more monomers are used, the average calculated from the concentration of the monomers in all the monomers multiplied by the total of $m^{P11}$ and $m^{P15}$ is preferably set in the range of 1.6 to 2.8, more preferably 1.7 to 2.4, particularly preferably 1.8 to 2.2. An average close to 1 tends to result in a decreased drive voltage of a liquid crystal display device, and a high average tends to result in a high off-response speed.

A fluorine atom substitution in $M^{P11}$, $M^{P12}$, and $M^{P13}$ is preferred because this enables the interaction and solubility between a liquid crystal material and a polymer or copolymer to be controlled without decreasing the voltage holding ratio of a liquid crystal display device. The substitution number preferably ranges from 1 to 4.

In the formula (P1) described above in detail, the use of the compounds represented by the following formulae (P2-1) to (P2-11) is effective in reducing changes in tilt angle over time.

[Chem. 4]

(P2-1)

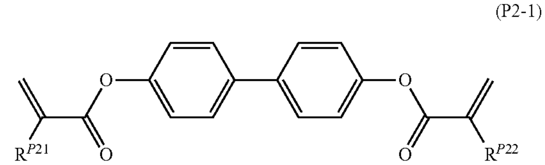

(P2-2)

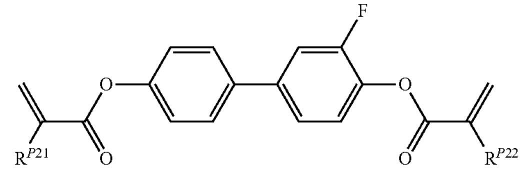

(P2-3)

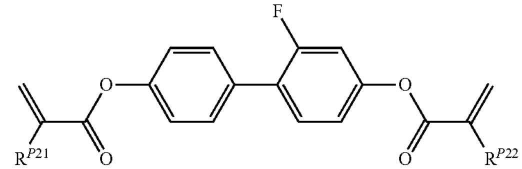

-continued (P2-4)

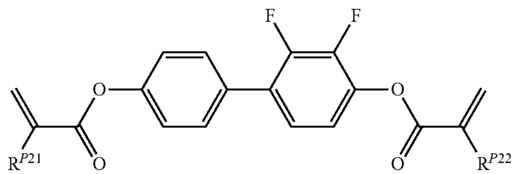

(P2-5)

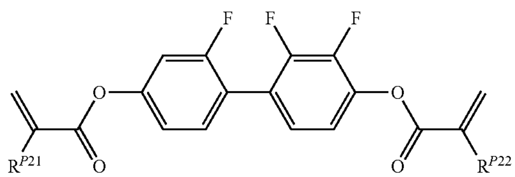

(P2-6)

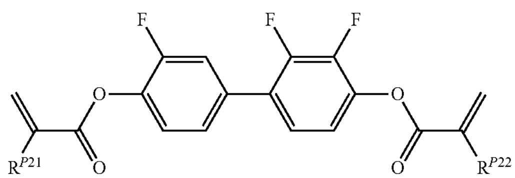

(2-7)

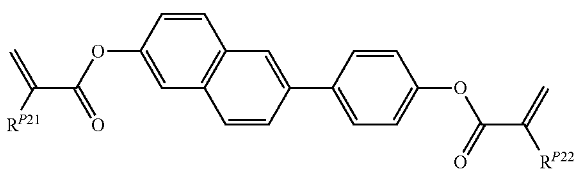

(P2-8)

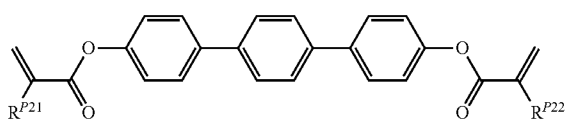

-continued (P2-9)

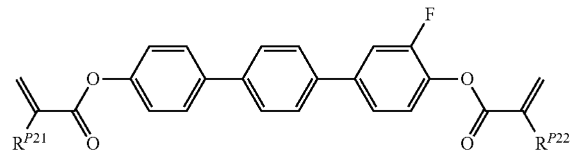

(P2-10)

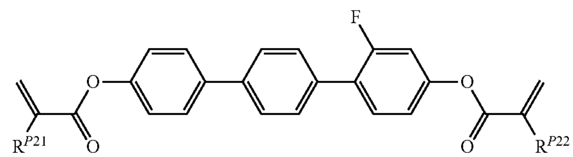

(P2-11)

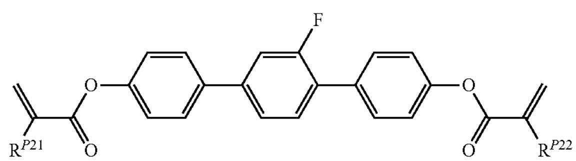

(wherein $R^{P21}$ and $R^{P22}$ independently denote a hydrogen atom or a methyl group) Although such a compound is useful, the compound may have low solubility in a liquid crystal material. Thus, such a compound preferably constitutes 90% or less by mass, more preferably 70% or less by mass, particularly preferably 50% or less by mass, in all the monomers to be used.

In the formula (P1), the use of the compounds represented by the following formulae (P3-1) to (P3-14) is preferred because this can reduce changes in tilt angle over time and ensures solubility in a liquid crystal material.

[Chem. 5]

(P3-1)

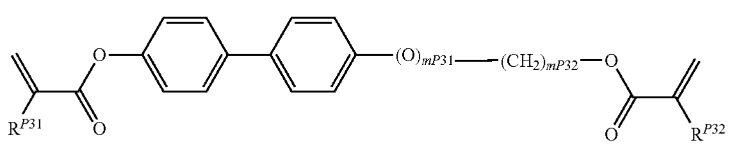

(P3-2)

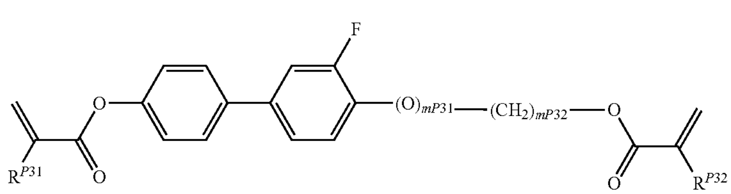

(P3-3)

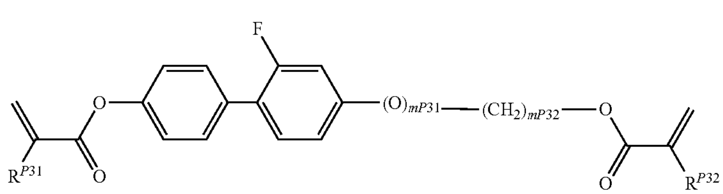

-continued
(P3-4)
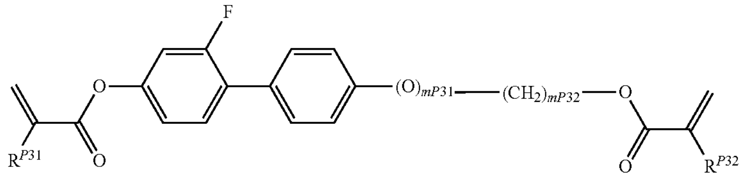
(P3-5)
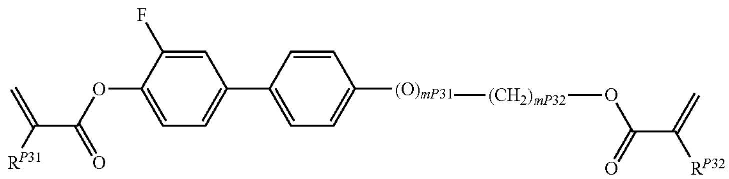
(P3-6)
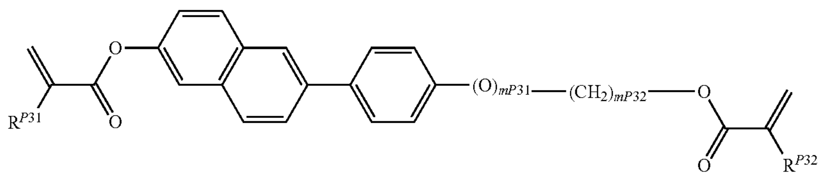
(P3-7)
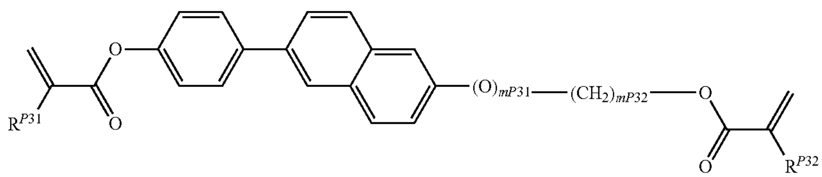
(P3-8)
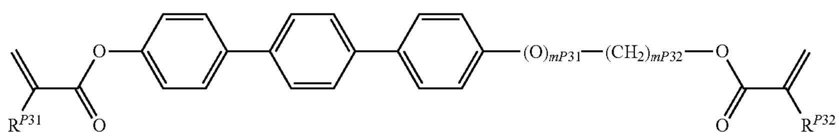
(P3-9)
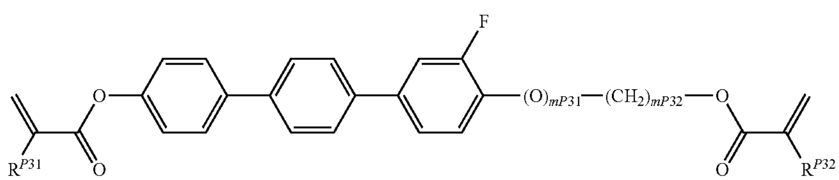
(P3-10)
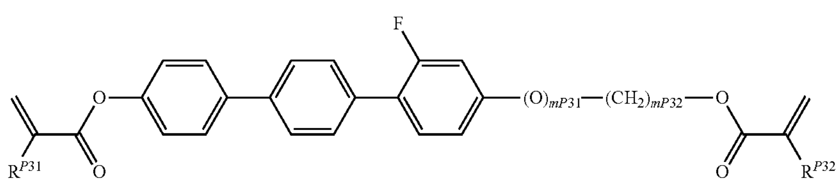
(P3-11)
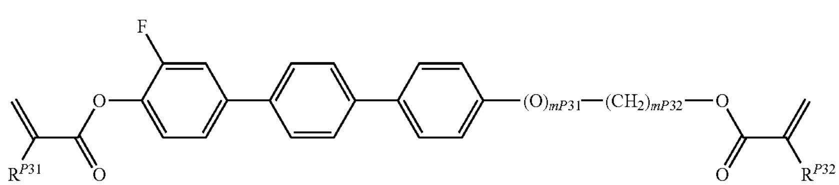
(P3-12)
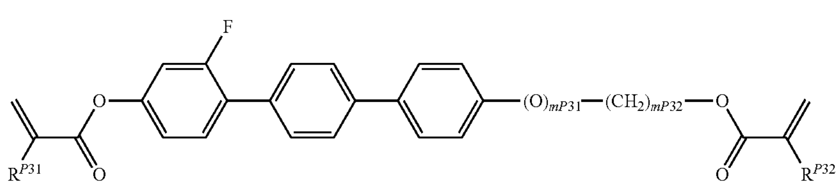

-continued (P3-13)

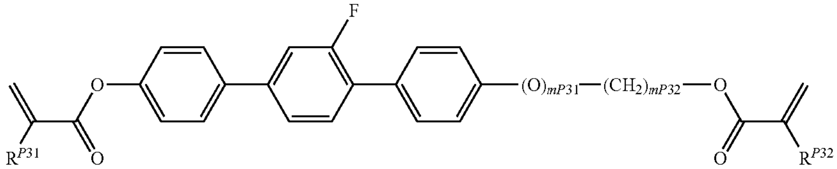

(P3-14)

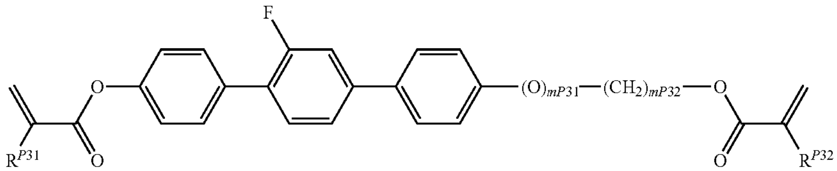

(wherein $R^{P31}$ and $R^{P32}$ independently denote a hydrogen atom or a methyl group, mP31 denotes an integer of 0 or 1, if mP31 denotes 0, then mP32 denotes an integer in the range of 1 to 6, and if mP31 denotes 1, then mP32 denotes an integer in the range of 2 to 6)

In the formula (P1), the use of the compounds represented by the following formulae (P4-1) to (P4-11) is preferred to effectively improve off-response.

[Chem. 6]

(P4-1)

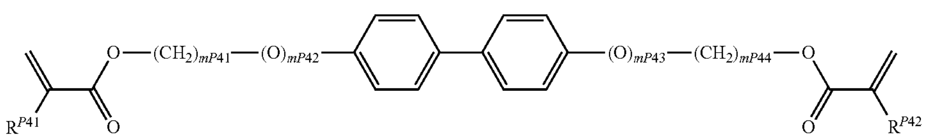

(P4-2)

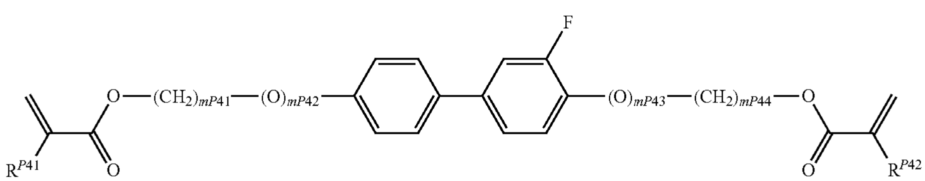

(P4-3)

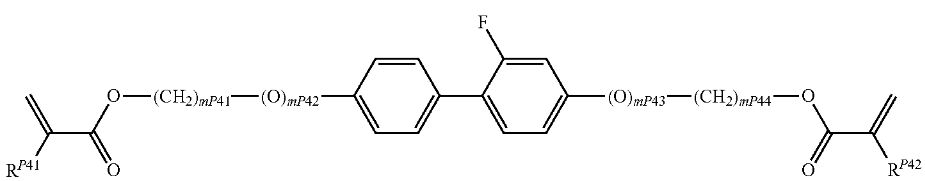

(P4-4)

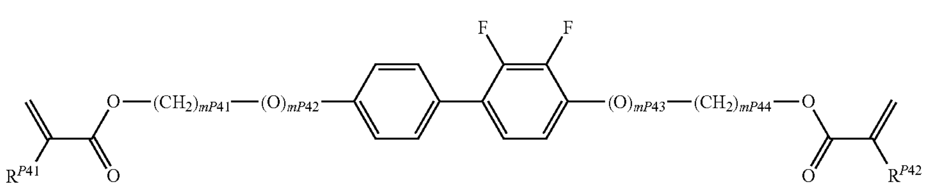

(P4-5)

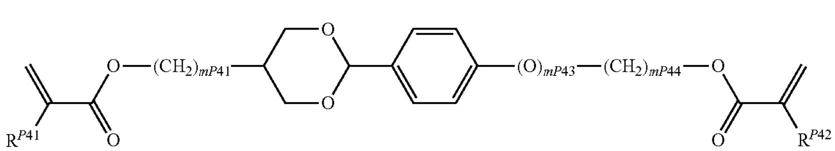

-continued (P4-6)

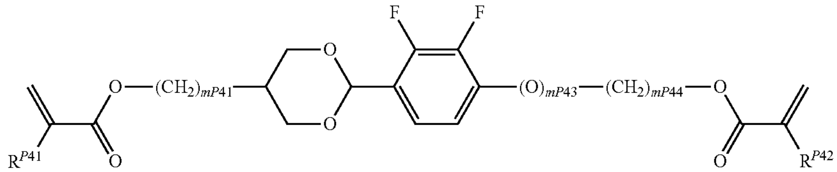

(P4-7)

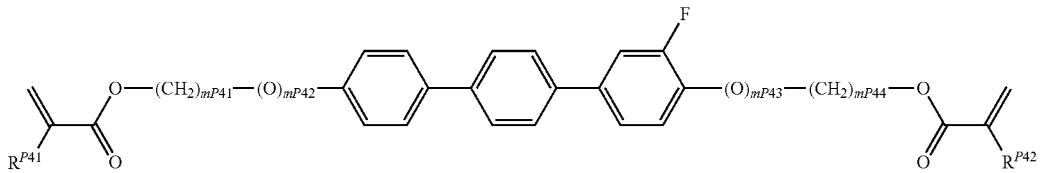

(P4-8)

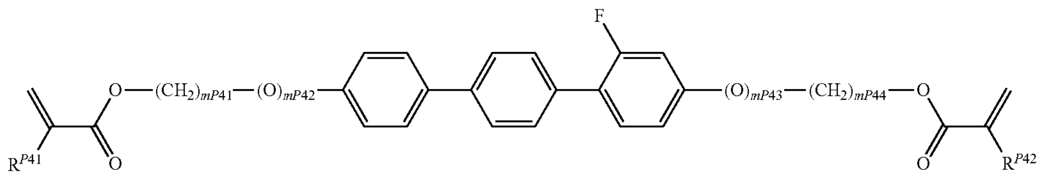

(P4-9)

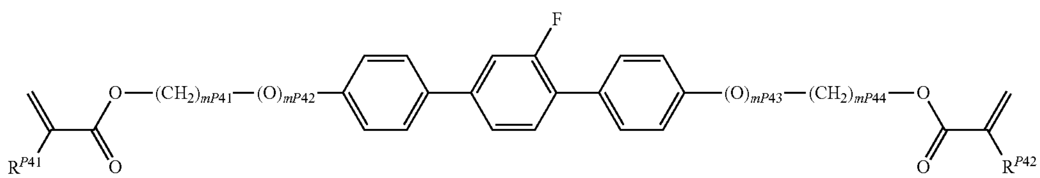

(P4-10)

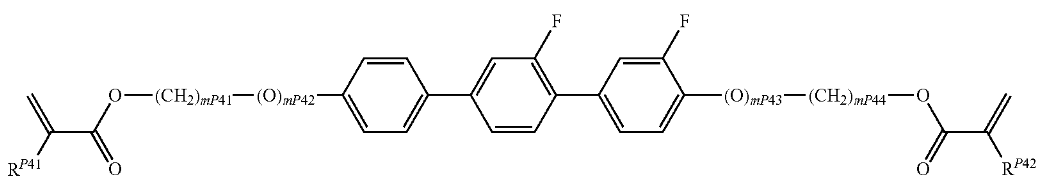

(P4-11)

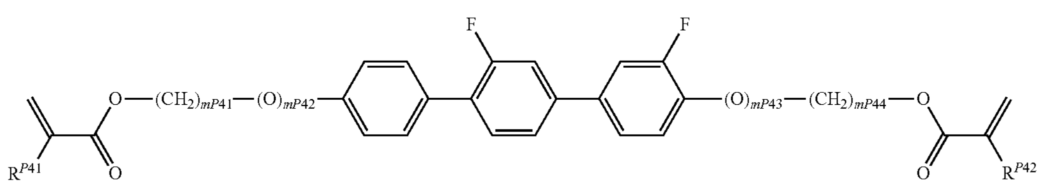

(wherein $R^{P41}$ and $R^{P42}$ independently denote a hydrogen atom or a methyl group, mP42 and mP43 independently denote an integer of 0 or 1, if mP42 denotes 0, then mP41 denotes an integer in the range of 1 to 6, if mp42 denotes 1, then mP41 denotes an integer in the range of 2 to 6, if mP43 denotes 0, then mP44 denotes an integer in the range of 1 to 6, and if mP43 denotes 1, then mp44 denotes an integer in the range of 2 to 6)

Such a compound preferably constitutes 40% or more by mass, more preferably 50% or more by mass, particularly preferably 60% or more by mass, in all the monomers to be used.

In the formula (P1), the compounds with an aryl ester structure in a mesogen represented by the formulae (P5-1) to (P5-6) are preferred because the compounds can initiate polymerization upon ultraviolet radiation and decrease the amount of polymerization initiator to be added.

[Chem. 7]

(P5-1)

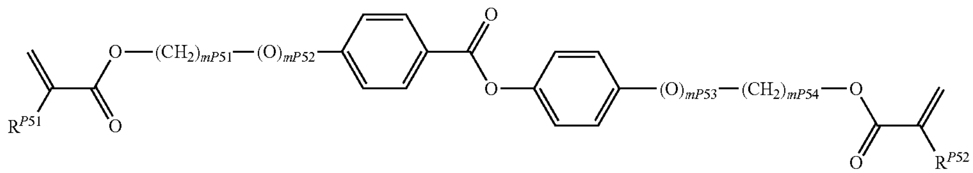

(P5-2)

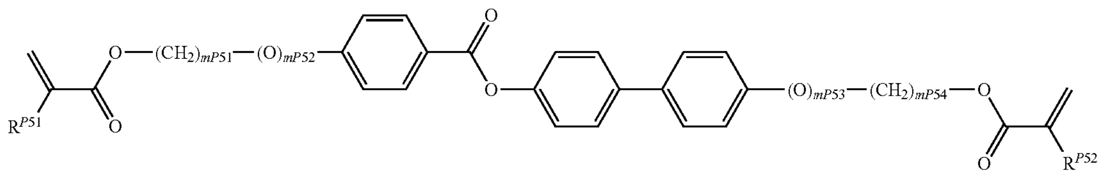

(P5-3)

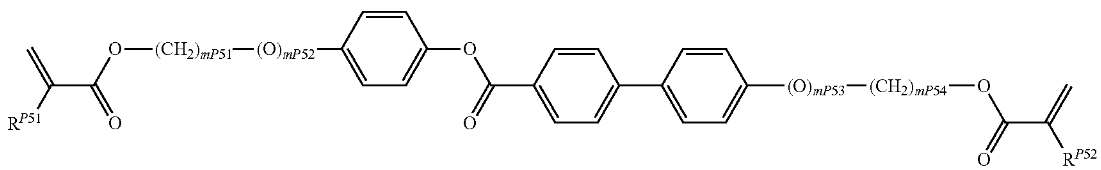

(P5-4)

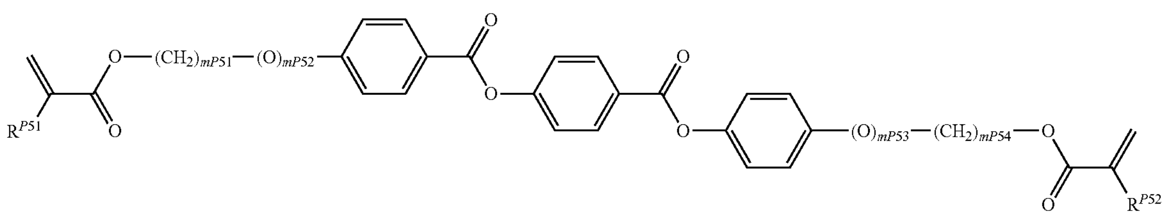

(P5-5)

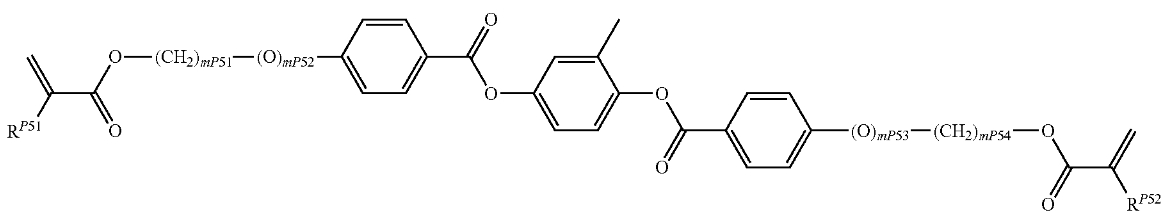

(P5-6)

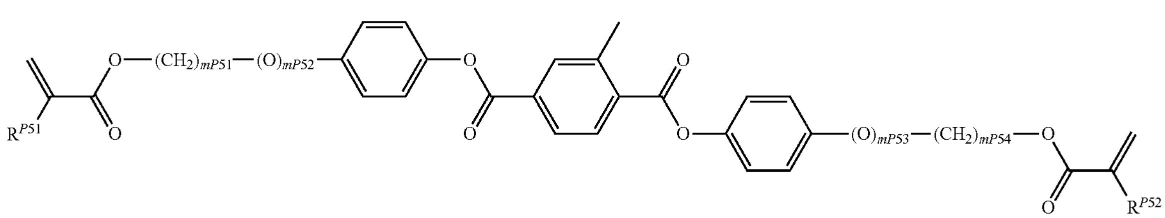

(wherein $R^{P51}$ and $R^{52}$ independently denote a hydrogen atom or a methyl group, mP52 and mP53 independently denote an integer of 0 or 1, if mP52 denotes 0, then mP51 denotes an integer in the range of 1 to 6, if mp52 denotes 1, then mP51 denotes an integer in the range of 2 to 6, if mP53 denotes 0, then mP54 denotes an integer in the range of 1 to 6, and if mP53 denotes 1, then mp54 denotes an integer in the range of 2 to 6)

A large amount of such a compound to be added tends to result in a low voltage holding ratio of a liquid crystal display device. Thus, such a compound preferably constitutes 30% or less by mass, more preferably 20% or less by mass, particularly preferably 10% or less by mass, in all the monomers to be used.

In the formula (P1), it is also preferred to introduce a cinnamate group into mesogens such as the compounds represented by the formulas (P6-1) to (P6-33).

[Chem. 8]
(P6-1)
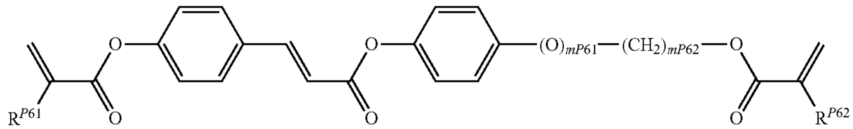
(P6-2)
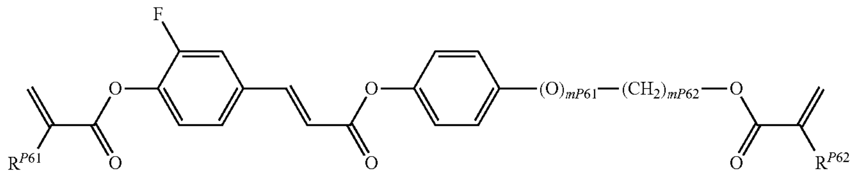
(P6-3)
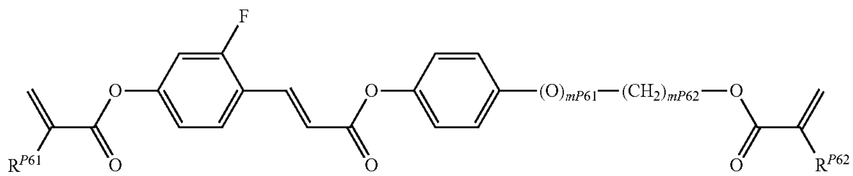
(P6-4)
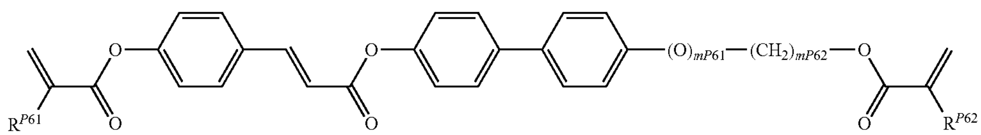
(P6-5)
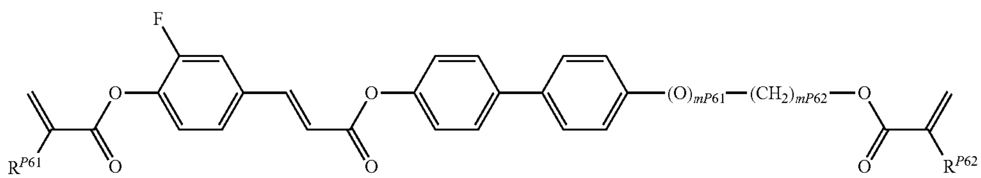
(P6-6)
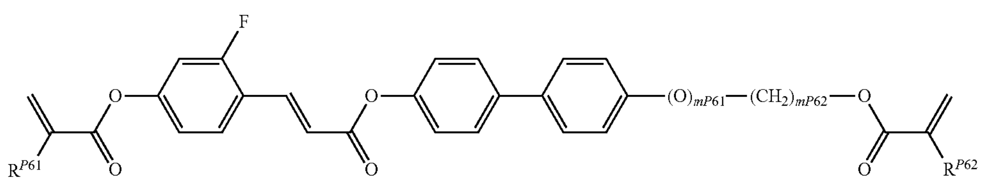
(P6-7)
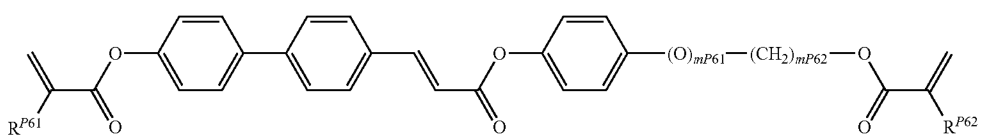
(P6-8)
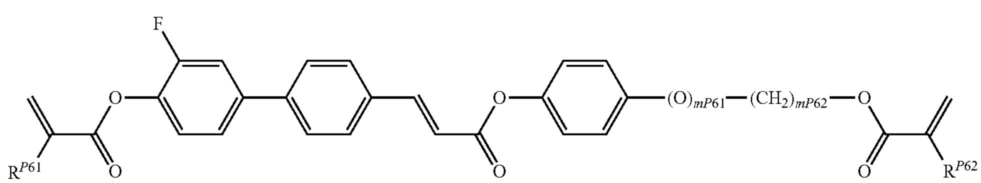
(P6-9)
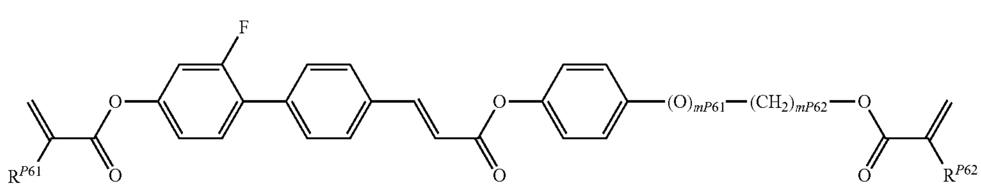

-continued
(P6-10)
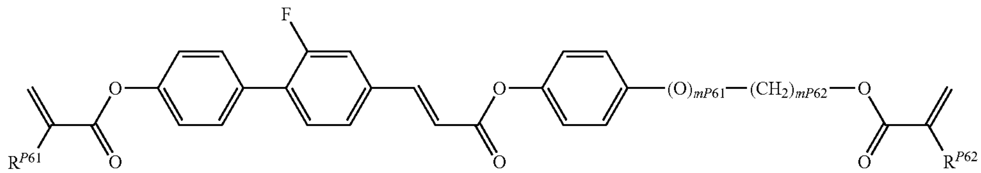
(P6-11)
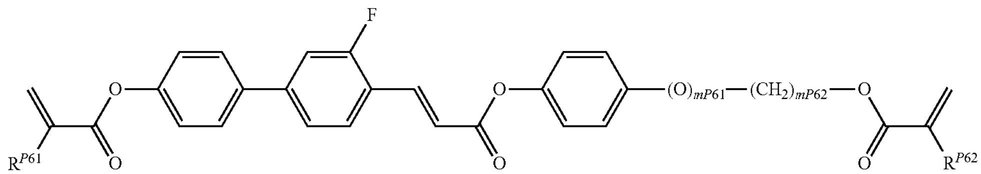
[Chem. 9]
(P6-12)
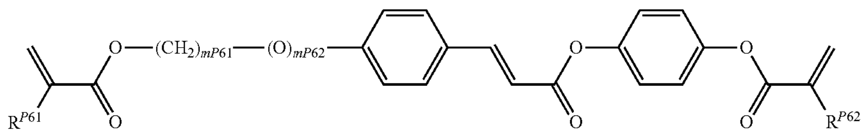
(P6-13)
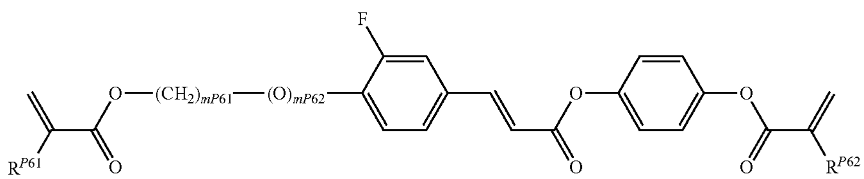
(P6-14)
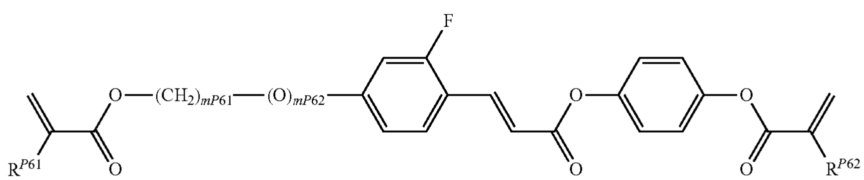
(P6-15)
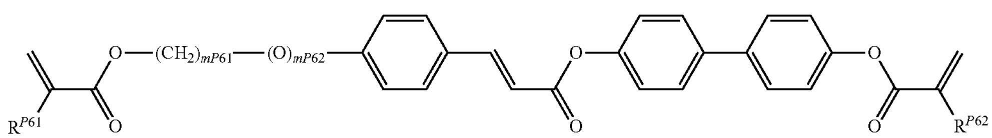
(P6-16)
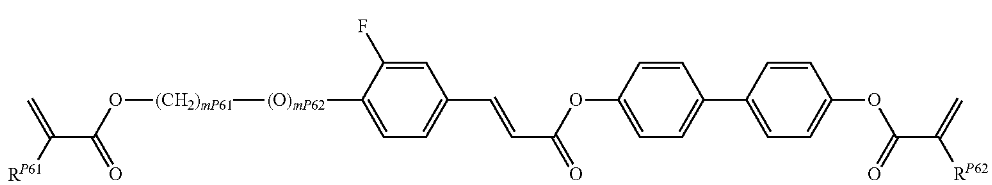
(P6-17)
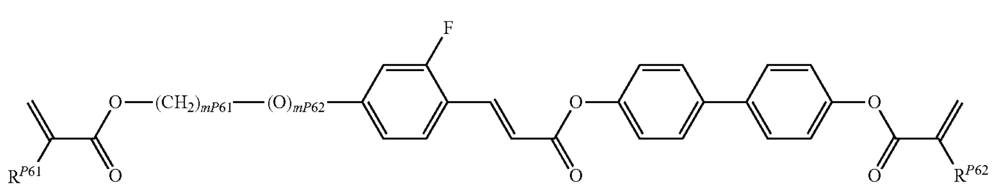
(P6-18)
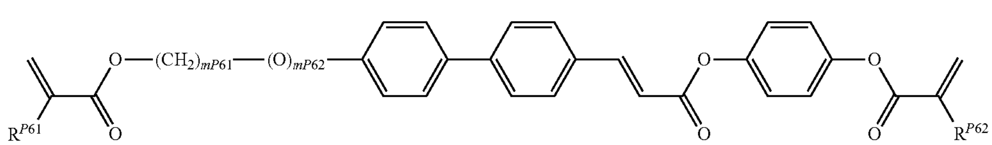

-continued
(P6-19)
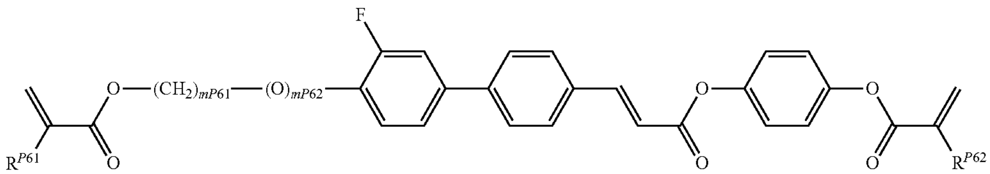
(P6-20)
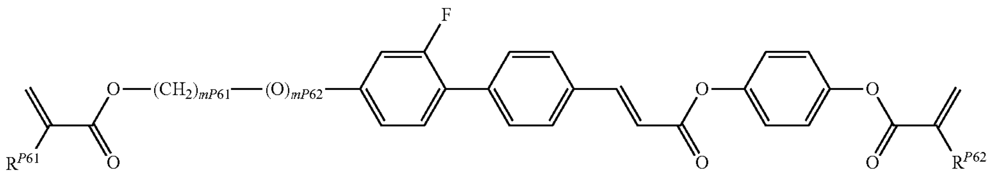
(P6-21)
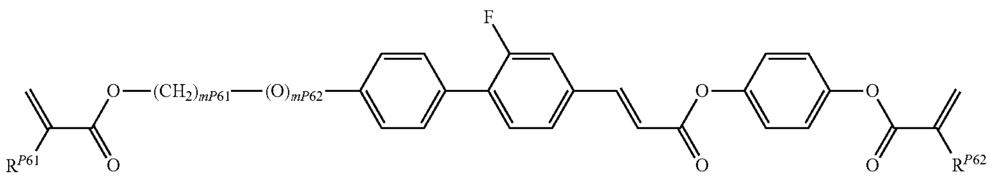
(P6-22)
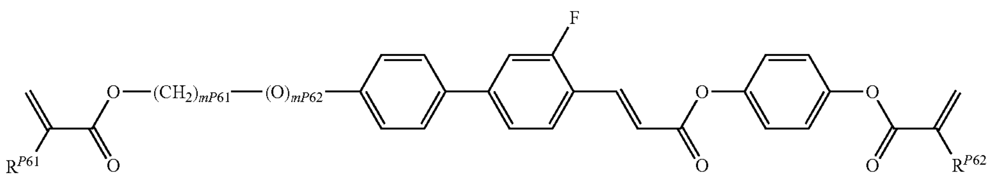
[Chem. 10]
(P6-23)
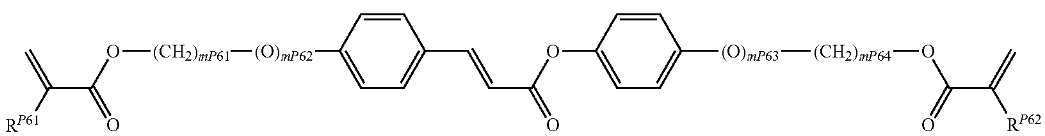
(P6-24)
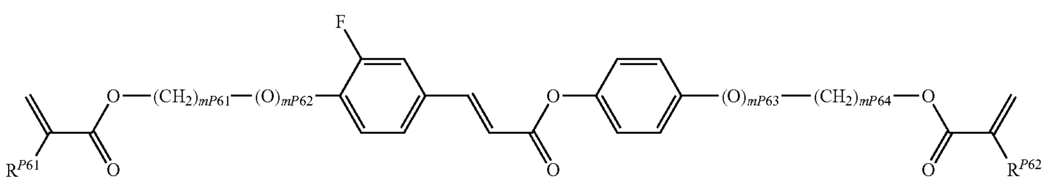
(P6-25)
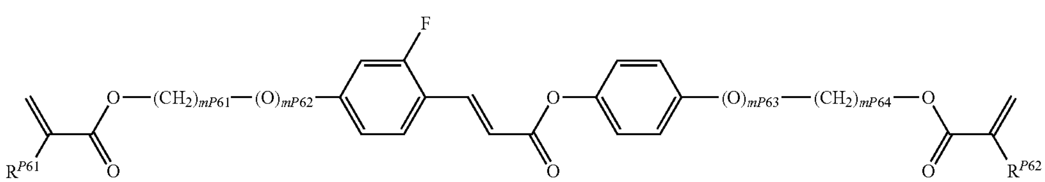
(P6-26)
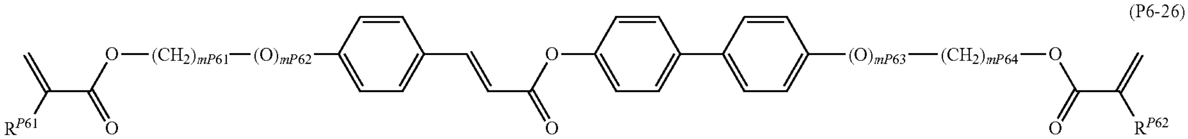
(P6-27)
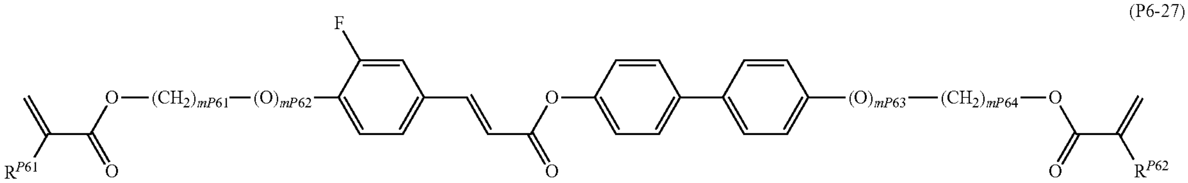

-continued (P6-28)

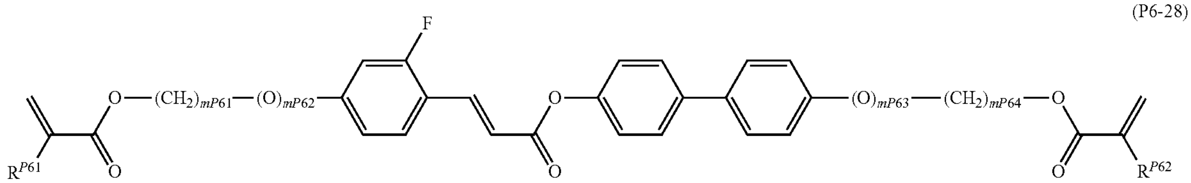

(P6-29)

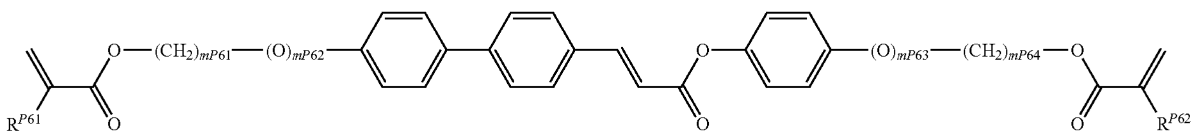

(P6-30)

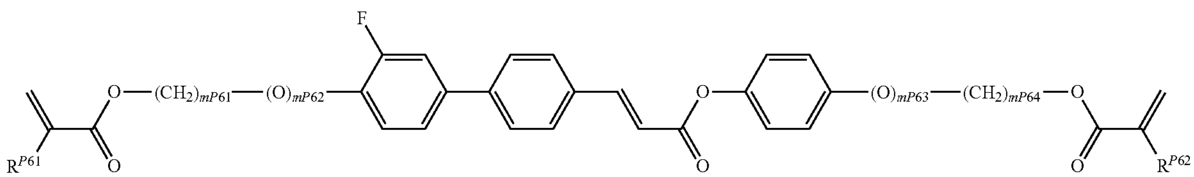

(P6-31)

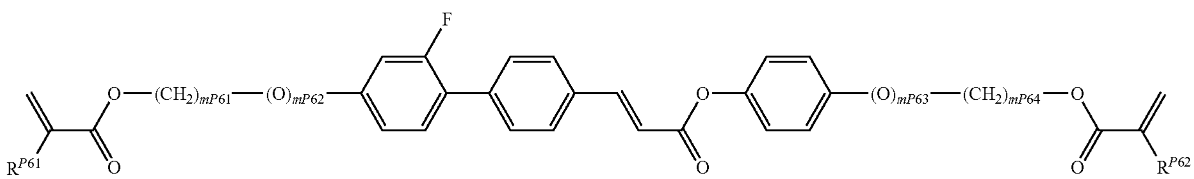

(P6-32)

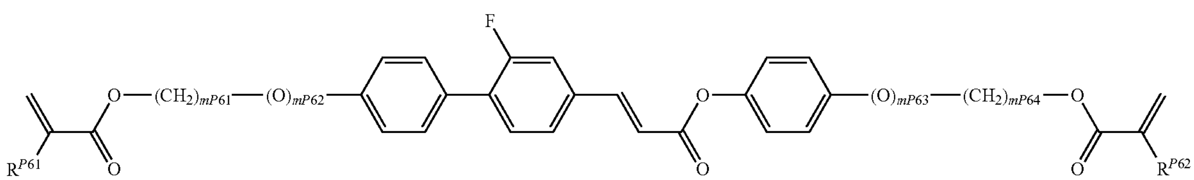

(P6-33)

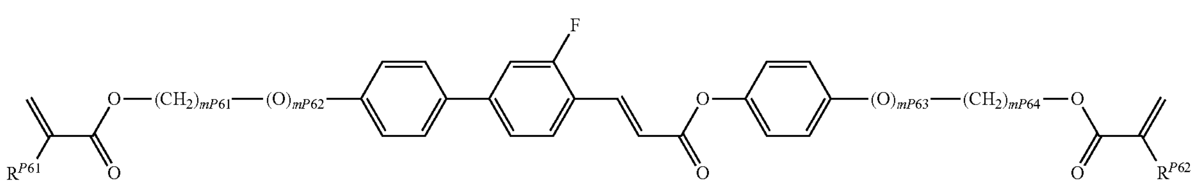

(wherein $R^{P61}$ and $R^{P62}$ independently denote a hydrogen atom or a methyl group, mP62 and mP63 independently denote an integer of 0 or 1, if mP62 denotes 0, then mP61 denotes an integer in the range of 1 to 6, if mp62 denotes 1, then mP61 denotes an integer in the range of 2 to 6, if mP63 denotes 0, then mP64 denotes an integer in the range of 1 to 6, and if mP63 denotes 1, then mp64 denotes an integer in the range of 2 to 6)

In the formula (P1), compounds with a fused ring, for example, represented by the following formulae (P7-1) to (P7-5) are preferred to control the sensitivity of a monomer because the compounds can shift the ultraviolet absorption region to the visible light side as compared with monocyclic compounds.

[Chem. 11]

(P7-1)

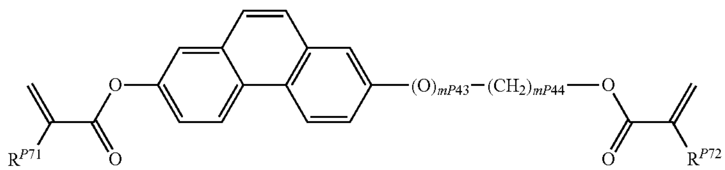

(P7-2)

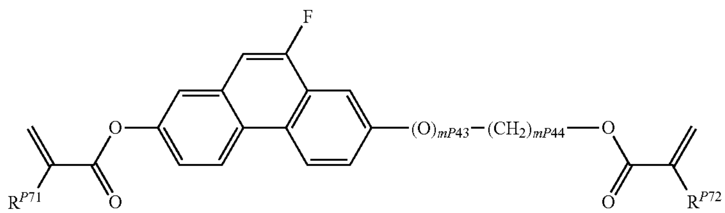

(P7-3)

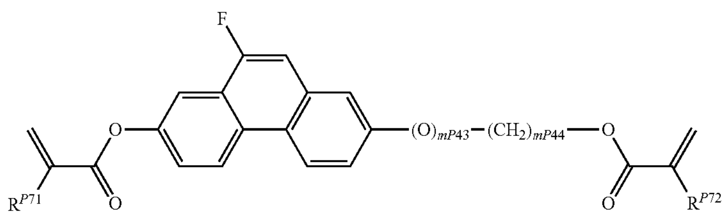

(P7-4)

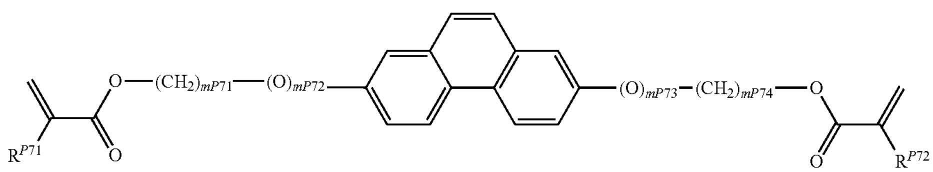

(P7-5)

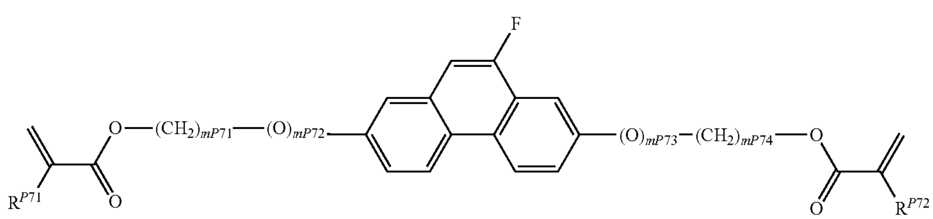

(wherein $R^{P71}$ and $R^{P72}$ independently denote a hydrogen atom or a methyl group, mP72 and mP73 independently denote an integer of 0 or 1, if mP72 denotes 0, then mP71 denotes an integer in the range of 1 to 6, if mp72 denotes 1, then mP71 denotes an integer in the range of 2 to 6, if mP73 denotes 0, then mP74 denotes an integer in the range of 1 to 6, and if mP73 denotes 1, then mp74 denotes an integer in the range of 2 to 6)

Although bifunctional monomers are exemplified as preferred compounds as described above, trifunctional monomers such as the compounds represented by the formulae (P8-1) to (P8-9) in the formula (P1) are also preferably used. They can improve the mechanical strength of a polymer or copolymer. Those having an ester bond in a mesogen are more preferred because they can initiate polymerization upon ultraviolet radiation and decrease the amount of polymerization initiator to be added.

[Chem. 12]

(P8-1)

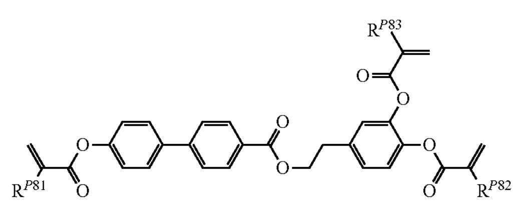

(P8-2)

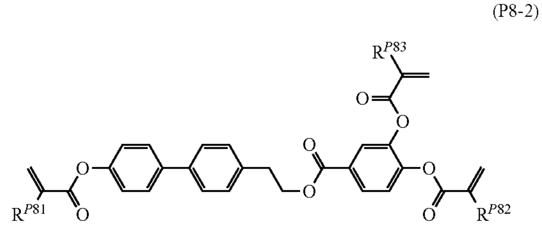

-continued
(P8-3)
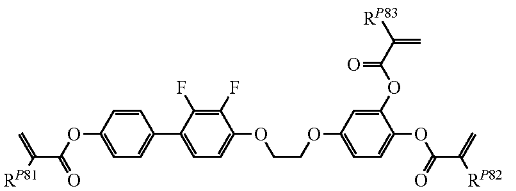
(P8-4)
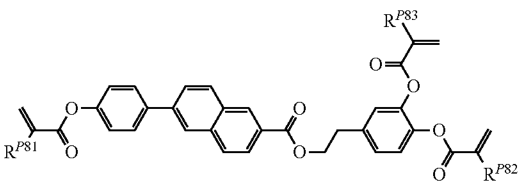
(P8-5)
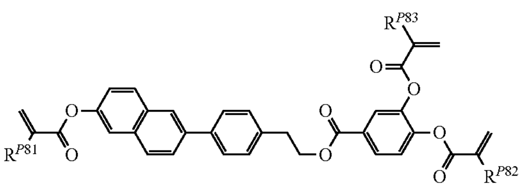
[Chem. 13]
(P8-6)
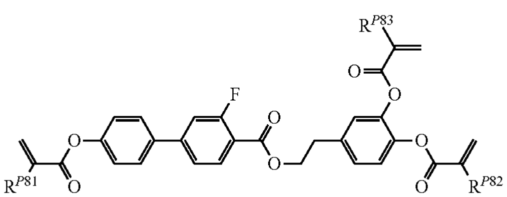
-continued
(P8-7)
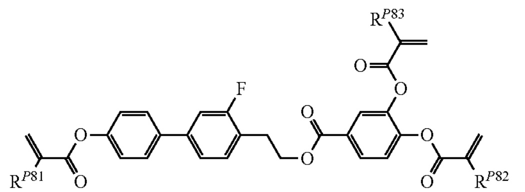
(P8-8)
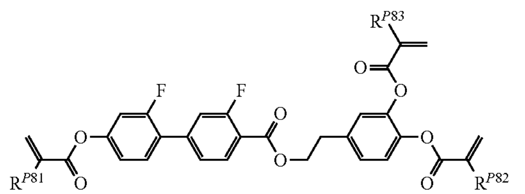
(P8-9)
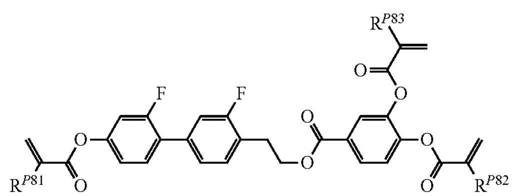
(wherein $R^{P81}$ and $R^{P83}$ independently denote a hydrogen atom or a methyl group.)
In the formula (P1), monofunctional monomers such as the compounds represented by the following formulae (P9-1) to (P9-10) are also preferred to control the drive voltage of a liquid crystal display device.
[Chem. 14]
(P9-1)
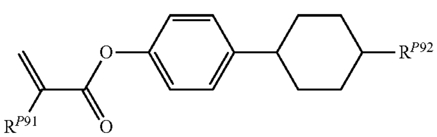
(P9-2)
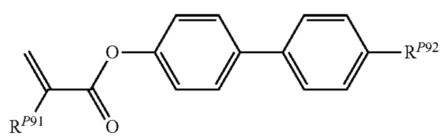
(P9-3)
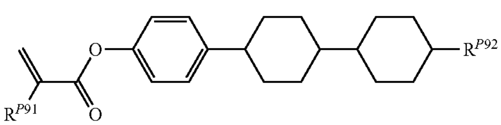
(P9-4)
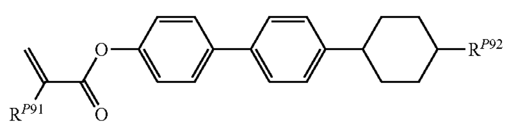
(P9-5)
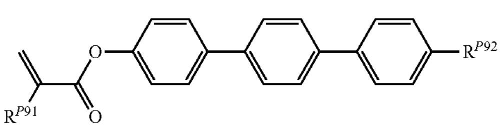
(P9-6)
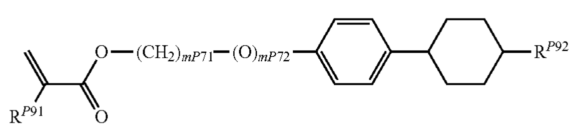
(P9-7)
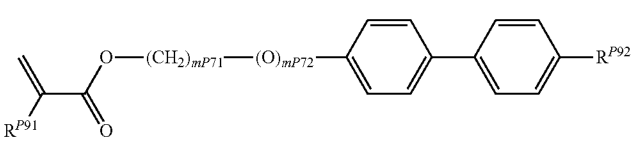

-continued (P9-8)

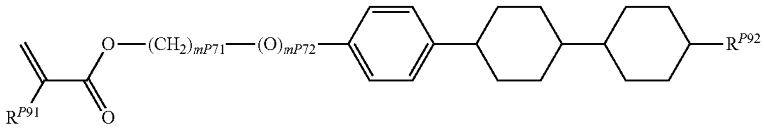

(P9-9)

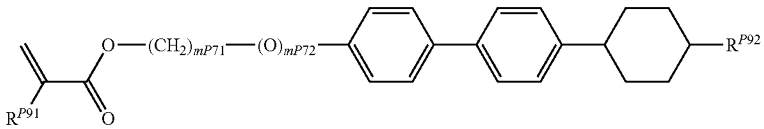

(P9-10)

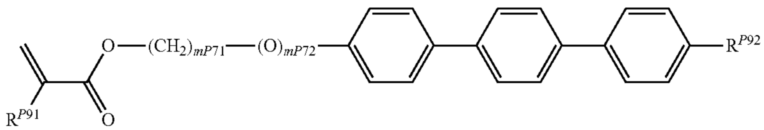

(wherein $R^{P91}$ denotes a hydrogen atom or a methyl group, and $R^{P92}$ denotes a hydrogen atom or an alkyl group having 1 to 18 carbon atoms)

In the formula (P1), providing a monomer with a photoisomerization function is preferred to utilize an optical alignment function due to the Weigert effect. The compounds represented by (P10-1) to (P10-12) are preferred in this respect.

[Chem. 15]

(P10-1)

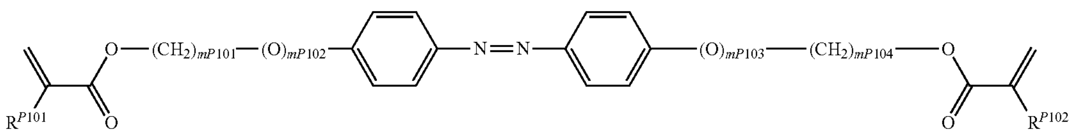

(P10-2)

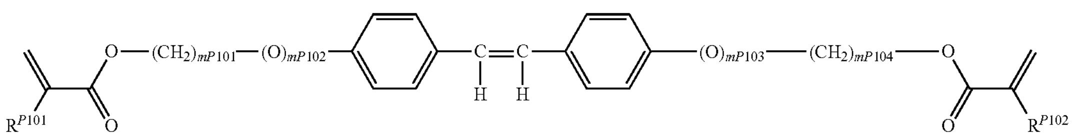

(P10-3)

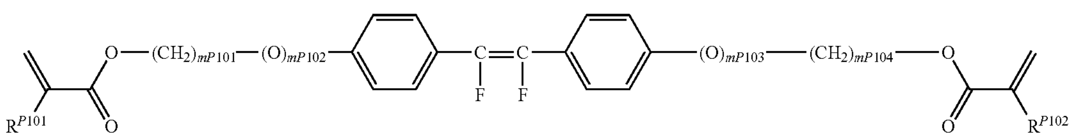

(P10-4)

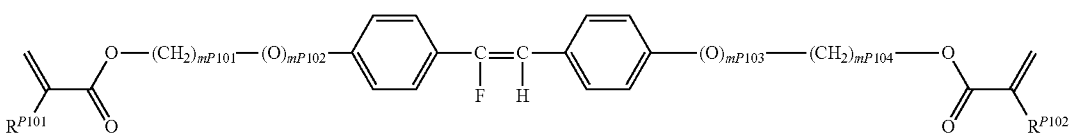

(P10-5)

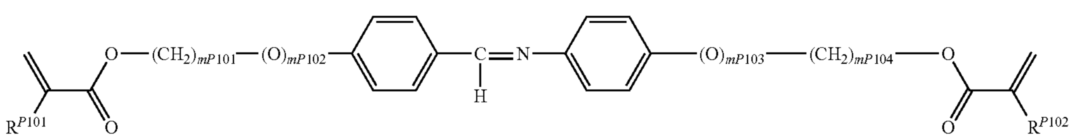

(P10-6)

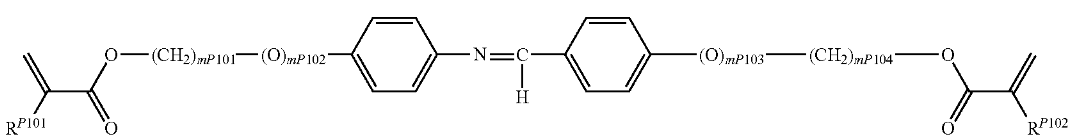

-continued (P10-7)

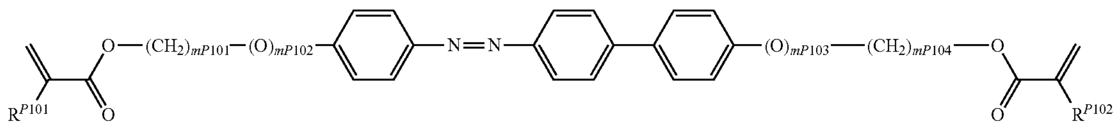

(P10-8)

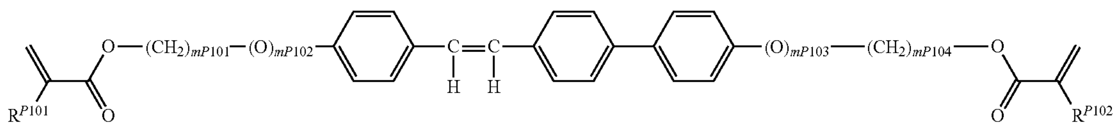

(P10-9)

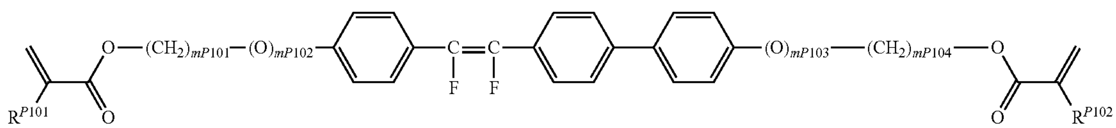

(P10-10)

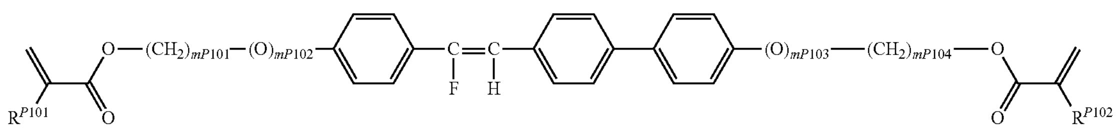

(P10-11)

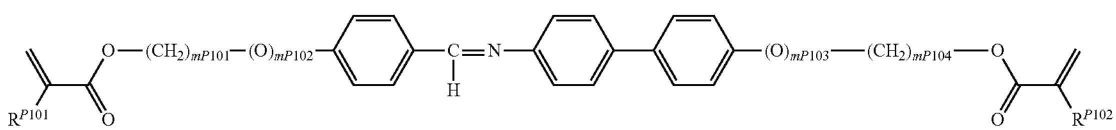

(P10-12)

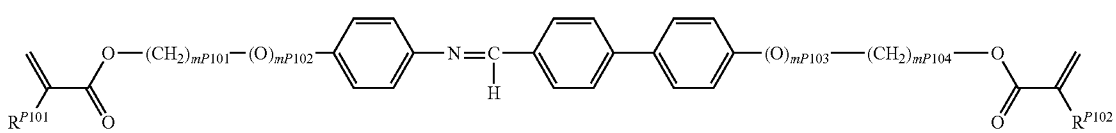

(wherein $R^{P101}$ and $R^{P102}$ independently denote a hydrogen atom or a methyl group, mP102 and mP103 independently denote an integer of 0 or 1, if mP102 denotes 0, then mP101 denotes an integer in the range of 1 to 6, if mp102 denotes 1, then mP101 denotes an integer in the range of 2 to 6, if mP103 denotes 0, then mP104 denotes an integer in the range of 1 to 6, and if mP103 denotes 1, then mp104 denotes an integer in the range of 2 to 6)

In the polymerizable monomer component (a) described above in detail, the compounds according to the above various specific examples may be represented by the following general formula (V)

[Chem. 16]

(V)

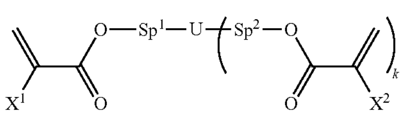

(wherein $X^1$ and $X^2$ independently denote a hydrogen atom or a methyl group, $Sp^1$ and $Sp^2$ independently denote a single bond, an alkylene group having 1 to 12 carbon atoms, or —O—$(CH_2)_s$— (wherein s denotes an integer in the range of 1 to 11, and the oxygen atom is bonded to an aromatic ring), U denotes a linear or branched polyvalent aliphatic hydrocarbon group having 2 to 20 carbon atoms or a polyvalent cyclic substituent having 5 to 30 carbon atoms, the polyvalent aliphatic hydrocarbon group may be substituted with an oxygen atom, provided that oxygen atoms are not adjacent to each other, or may be substituted with an alkyl group having 5 to 20 carbon atoms (an alkylene group in the group may be substituted with an oxygen atom, provided that oxygen atoms are not adjacent to each other) or a cyclic substituent, k denotes an integer in the range of 1 to 5, and in all the 1,4-phenylene groups in the formula, a hydrogen atom may be substituted with —$CH_3$, —$OCH_3$, a fluorine atom, or a cyano group)

or the following general formula (VI).

[Chem. 17]

(VI)

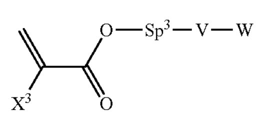

(wherein $X^3$ denote a hydrogen atom or a methyl group, $Sp^3$ denotes a single bond, an alkylene group having 1 to 12 carbon atoms, or —O—$(CH_2)_t$— (wherein t denotes an integer in the range of 2 to 11, and the oxygen atom is bonded to an aromatic ring), V denotes a linear or branched alkylene group having 2 to 20 carbon atoms, or a polyvalent cyclic substituent having 5 to 30 carbon atoms, a structural moiety that substituted with an oxygen atom, provided that oxygen atoms are not adjacent to each other, in a linear or branched alkylene structure having 2 to 20 carbon atoms, and in these chemical structures, a hydrogen atom on a carbon atom constituting the structures may be substituted with an alkyl group having 5 to 20 carbon atoms (an alkylene group in the group may be substituted with an oxygen atom, provided that oxygen atoms are not adjacent to each other) or a cyclic substituent, W denotes a hydrogen atom, a halogen atom, or an alkyl group having 1 to 15 carbon atoms, and in all the 1,4-phenylene groups in the formula, a hydrogen atom may be substituted with $—CH_3$, $—OCH_3$, a fluorine atom, or a cyano group)

$Sp^1$ and $Sp^2$ in the general formula (V) are preferably the same because, for example, when $Sp^1$ and $Sp^2$ are a linear or branched alkylene group having 1 to 12 carbon atoms, this facilitates the synthesis of the compound, and the ratio of compounds with different alkylene chain lengths to be used can be easily adjusted to control physical properties.

As described above, the polymerizable monomer component (a) described above in detail preferably constitutes 0.5% to 20% by mass, particularly preferably 1% to 10% by mass, in a polymerizable liquid crystal composition, and at any concentration in these ranges at least two polymerizable monomer components (A) with different Tgs are preferably contained to control Tg as required. Preferably, a polymerizable monomer component (a) that is a precursor of a polymer with a high Tg is a polymerizable monomer component (a) with a molecular structure that increases the cross-linking density, and has 2 or more functional groups. Preferably, a precursor of a polymer with a low Tg has 1 or 2 or more functional groups and has an increased molecular length with an alkylene group or the like being disposed as a spacer between functional groups. When the Tg of a polymer network is adjusted to improve the thermal stability or impact resistance of the polymer network, the ratio of a polyfunctional monomer to a monofunctional monomer is preferably appropriately adjusted. Tg also relates to thermal motion in a main chain and a side chain of a polymer network on the molecular level and also has an influence on electro-optical characteristics. For example, an increase in cross-linking density results in a decrease in the molecular motion of a main chain, an increased anchoring force for low-molecular-weight liquid crystals, an increased drive voltage, and a decreased turn-off time. On the other hand, a decrease in cross-linking density to decrease Tg tends to result in an increase in thermal motion of a polymer main chain, a decreased anchoring force for low-molecular-weight liquid crystals, a decreased drive voltage, and an increased turn-off time. The anchoring force at a polymer network interface is influenced by the molecular motion of a polymer side chain as well as Tg, and the use of an acrylate or methacrylate of an monovalent or divalent alcohol compound having 8 to 18 carbon atoms as a polymerizable monomer component (a) can decrease the anchoring force at a polymer interface. Such a polymerizable monomer component (A) is effective in inducing a pretilt angle at a substrate interface and decreases the anchoring force in the polar angle direction.

(Liquid Crystal Composition (B))

Next, the liquid crystal composition (B) for use in the present invention, that is, a nonpolymerizable liquid crystal composition may have positive or negative dielectric constant anisotropy. For a nonpolymerizable liquid crystal composition with negative anisotropy, a liquid crystal composition with negative dielectric constant anisotropy ($\Delta\varepsilon$ of less than −2) or a liquid crystal composition with little dielectric constant anisotropy ($\Delta\varepsilon$ in the range of −2 to 2) is preferably contained. For a nonpolymerizable liquid crystal composition with positive anisotropy, a liquid crystal composition with positive dielectric constant anisotropy ($\Delta\varepsilon$ of more than 2) or a liquid crystal composition with little dielectric constant anisotropy ($\Delta\varepsilon$ in the range of −2 to 2) is preferably contained.

In the nonpolymerizable liquid crystal composition, for negative dielectric constant anisotropy, the dielectric constant anisotropy $\Delta\varepsilon$ preferably ranges from −1.0 to −7.0, more preferably −1.5 to −6.5, still more preferably −2.0 to −6.0, particularly preferably −2.5 to −5.5. The dielectric constant anisotropy $\Delta\varepsilon$ preferably ranges from −3.0 to −6.0 in terms of low-voltage drive and −2.0 to −3.5 in terms of high-speed response.

The refractive index anisotropy $\Delta n$ preferably ranges from 0.100 to 0.140 to decrease the cell gap and thereby achieve high-speed response or 0.080 to 0.100 to increase the cell gap and thereby improve the yield in the production of a display. In the production of a reflective display, these preferred ranges are preferably in the range of 50% to 80% of the above values.

The nematic-isotropic phase transition temperature $T_{NI}$ preferably ranges from 65° C. to 150° C., preferably 70° C. to 130° C., preferably 70° C. to 90° C. in terms of high-speed response or when a display produced is mainly used indoors, preferably 80° C. to 120° C. when a display produced is mainly used outdoors.

The rotational viscosity is preferably 200 mPa·s or less, more preferably 180 mPa·s or less, still more preferably 150 mPa·s or less, particularly preferably 130 mPa·s or less, most preferably 100 mPa·s or less.

In the nonpolymerizable liquid crystal composition, for positive dielectric constant anisotropy, the dielectric constant anisotropy $\Delta\varepsilon$ preferably ranges from 1.0 to 20.0, more preferably 1.5 to 15.0, still more preferably 2.0 to 10.0, particularly preferably 3.0 to 8.5. The dielectric constant anisotropy $\Delta\varepsilon$ preferably ranges from 5.0 to 12.0 in terms of low-voltage drive or 1.5 to 5.0 in terms of high-speed response.

$\Delta n$ preferably ranges from 0.110 to 0.160 to decrease the cell gap and thereby achieve high-speed response or 0.090 to 0.110 to increase the cell gap and thereby improve the yield in the production of a display. In the production of a reflective display, these preferred ranges are preferably in the range of 50% to 80% of the above values.

The nematic-isotropic phase transition temperature $T_{NI}$ range preferably ranges from 65° C. to 150° C., preferably 70° C. to 130° C., preferably 70° C. to 90° C. in terms of high-speed response or when a display produced is mainly used indoors, preferably 80° C. to 120° C. when a display produced is mainly used outdoors.

The rotational viscosity is preferably 130 mPa·s or less, more preferably 100 mPa·s or less, still more preferably 90 mPa·s or less, particularly preferably 75 mPa·s or less, most preferably 60 mPa·s or less.

The liquid crystal composition (B) preferably further contains one or two or more compounds selected from the compounds represented by the general formulae (N-1), (N-2), (N-3) and (N-4). These compounds correspond to dielectrically negative compounds (with a negative $\Delta\varepsilon$ with an absolute value of more than 2).

[Chem. 18]

(N-1)

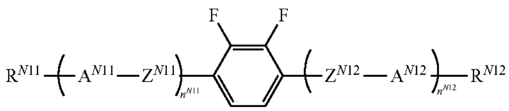

(N-2)

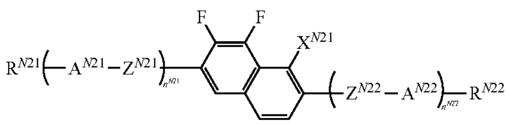

(N-3)

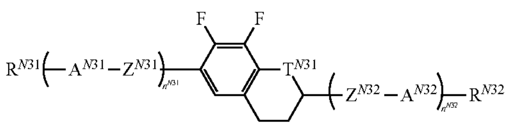

(N-4)

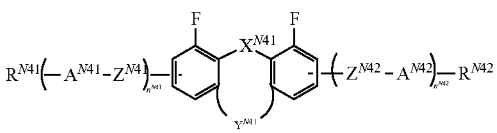

[in the general formulae (N-1), (N-2), (N-3), and (N-4), $R^{N11}$, $R^{N12}$, $R^{N21}$, $R^{N22}$, $R^{N31}$, $R^{N32}$, $R^{N41}$, and $R^{N42}$ independently denote an alkyl group having 1 to 8 carbon atoms, or a structural moiety with a chemical structure in which one —$CH_2$— or two or more nonadjacent —$CH_2$— groups in an alkyl chain having 2 to 8 carbon atoms are independently substituted with —CH═CH—, —C≡C—, —O—, —CO—, —COO—, or —OCO—, $A^{N11}$, $A^{N12}$, $A^{N21}$, $A^{N22}$, $A^{N31}$, $A^{N32}$, $A^{N41}$, and $A^{N42}$ independently denote a group selected from the group consisting of (a) a 1,4-cyclohexylene group (in which one —$CH_2$— or two or more nonadjacent —$CH_2$— groups are optionally substituted with —O—), (b) a 1,4-phenylene group (in which one —CH═ or two or more nonadjacent —CH═ groups are optionally substituted with —N═), (c) a naphthalene-2,6-diyl group, a 1,2,3,4-tetrahydronaphthalene-2,6-diyl group, or a decahydronaphthalene-2,6-diyl group (one —CH═ or two or more nonadjacent —CH═ groups in the naphthalene-2,6-diyl group or in the 1,2,3,4-tetrahydronaphthalene-2,6-diyl group are optionally substituted with —N═), and (d) a 1,4-cyclohexenylene group, in the groups (a), (b), (c), and (d), a hydrogen atom in the structure is independently optionally substituted with a cyano group, a fluorine atom, or a chlorine atom, $Z^{N11}$, $Z^{N12}$, $Z^{N21}$, $Z^{N22}$, $Z^{N31}$, $Z^{N32}$, $Z^{N41}$, and $Z^{N42}$ independently denote a single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF—, or —C≡C—, $X^{N21}$ denotes a hydrogen atom or a fluorine atom, $T^{N31}$ denotes —$CH_2$— or an oxygen atom, $X^{N41}$ denotes an oxygen atom, a nitrogen atom, or —$CH_2$—, $Y^{N41}$ denotes a single bond or —$CH_2$—, $n^{N11}$, $n^{N12}$, $n^{N21}$, $n^{N22}$, $n^{N31}$, $n^{N32}$, $n^{N41}$, and $n^{N42}$ independently denote an integer in the range of 0 to 3, $n^{N11}+n^{N12}$, $n^{N21}+n^{N22}$, and $n^{N31}+n^{N32}$ independently denote 1, 2, or 3, if there are a plurality of $A^{N11}$s to $A^{N32}$s and $Z^{N11}$s to $Z^{N32}$s, they may be the same or different, $n^{N41}+n^{N42}$ denotes an integer in the range of 0 to 3, if there are a plurality of $A^{N41}$s, $A^{N42}$s, $Z^{N41}$s, and $Z^{N42}$s, they may be the same or different]

The compounds represented by the general formulae (N-1), (N-2), (N-3), and (N-4) preferably have a negative Δε with an absolute value of more than 2.

In the general formulae (N-1), (N-2), and (N-3), $R^{N11}$, $R^{N12}$, $R^{N21}$, $R^{N22}$, $R^{N31}$, and $R^{N32}$ independently denote an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, still more preferably an alkyl group having 2 to 5 carbon atoms or an alkenyl group having 2 or 3 carbon atoms, particularly preferably an alkenyl group having 3 carbon atoms (a propenyl group).

If the ring structure to which $R^{N11}$, $R^{N12}$, $R^{N21}$, $R^{N22}$, $R^{N31}$, and $R^{N32}$ are bonded is a phenyl group (aromatic), then a linear alkyl group having 1 to 5 carbon atoms, a linear alkoxy group having 1 to 4 carbon atoms, and an alkenyl group having 4 or 5 carbon atoms are preferred. If the ring structure to which it is bonded is a saturated ring structure, such as cyclohexane, pyran, or dioxane, then a linear alkyl group having 1 to 5 carbon atoms, a linear alkoxy group having 1 to 4 carbon atoms, and a linear alkenyl group having 2 to 5 carbon atoms are preferred. To stabilize the nematic phase, the total number of carbon atoms and, if present, oxygen atoms is preferably 5 or less, and a straight chain is preferred.

The alkenyl group is preferably selected from the groups represented by the formulae (R1) to (R5). (The dark dot in each formula represents a carbon atom in the ring structure.)

[Chem. 19]

(R1)

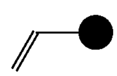

(R2)

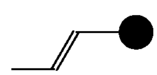

(R3)

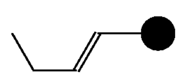

(R4)

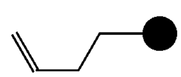

(R5)

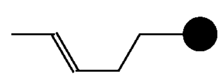

$A^{N11}$, $A^{N12}$, $A^{N21}$, $A^{N22}$, $A^{N31}$, and $A^{N32}$ preferably independently denote an aromatic when an increase in Δn is desired, an aliphatic to improve the response speed, or a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably one of the following structures,

[Chem. 20]

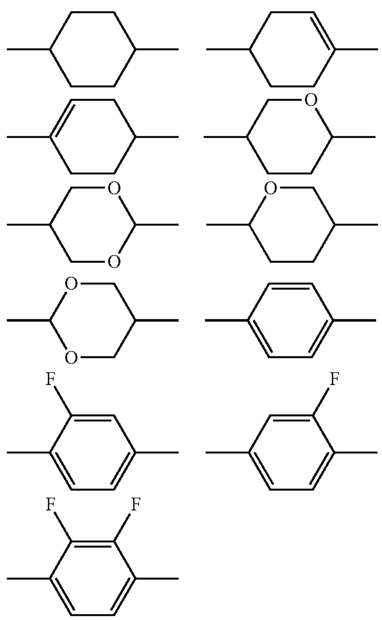

more preferably a trans-1,4-cyclohexylene group, a 1,4-cyclohexenylene group, or a 1,4-phenylene group.

$Z^{N11}$, $Z^{N12}$, $Z^{N21}$, $Z^{N22}$, $Z^{N31}$, and $Z^{N32}$ preferably independently denote —$CH_2O$—, —$CF_2O$—, —$CH_2CH_2$—, —$CF_2CF_2$—, or a single bond, more preferably —$CH_2O$—, —$CH_2CH_2$—, or a single bond, particularly preferably —$CH_2O$— or a single bond.

$X^{N21}$ preferably denotes a fluorine atom.

$T^{N31}$ preferably denotes an oxygen atom.

$n^{N11}+n^{N12}$, $n^{N21}+n^{N22}$ and, $n^{N31}+n^{N32}$ are preferably 1 or 2, and a combination of $n^{N11}$ of 1 and $n^{N12}$ of 0, a combination of $n^{N11}$ of 2 and $n^{N12}$ of 0, a combination of $n^{N11}$ of 1 and $n^{N12}$ of 1, a combination of $n^{N11}$ of 2 and $n^{N12}$ of 1, a combination of $n^{N21}$ of 1 and $n^{N22}$ of 0, a combination of $n^{N21}$ of 2 and $n^{N22}$ of 0, a combination of $n^{N31}$ of 1 and $n^{N32}$ of 0, and a combination of $n^{N31}$ of 2 and $n^{N32}$ of 0 are preferred.

The lower limit of the preferred amount of a compound represented by the formula (N-1) is 1% by mass, 10% by mass, 20% by mass, 30% by mass, 40% by mass, 50% by mass, 55% by mass, 60% by mass, 65% by mass, 70% by mass, 75% by mass, or 80% by mass of the total amount of the liquid crystal composition (B) for use in the present invention. The upper limit of the preferred amount is 95% by mass, 85% by mass, 75% by mass, 65% by mass, 55% by mass, 45% by mass, 35% by mass, 25% by mass, or 20% by mass.

The lower limit of the preferred amount of a compound represented by the formula (N-2) is 1% by mass, 10% by mass, 20% by mass, 30% by mass, 40% by mass, 50% by mass, 55% by mass, 60% by mass, 65% by mass, 70% by mass, 75% by mass, or 80% by mass of the total amount of the liquid crystal composition (B) for use in the present invention. The upper limit of the preferred amount is 95% by mass, 85% by mass, 75% by mass, 65% by mass, 55% by mass, 45% by mass, 35% by mass, 25% by mass, or 20% by mass.

The lower limit of the preferred amount of a compound represented by the formula (N-3) is 1% by mass, 10% by mass, 20% by mass, 30% by mass, 40% by mass, 50% by mass, 55% by mass, 60% by mass, 65% by mass, 70% by mass, 75% by mass, or 80% by mass of the total amount of the liquid crystal composition (B) for use in the present invention. The upper limit of the preferred amount is 95% by mass, 85% by mass, 75% by mass, 65% by mass, 55% by mass, 45% by mass, 35% by mass, 25% by mass, or 20% by mass.

When the liquid crystal composition (B) for use in the present invention needs to have a low viscosity and a high response speed, the lower limit is preferably low, and the upper limit is preferably low. When the liquid crystal composition (B) for use in the present invention needs to have a high $T_{NI}$ and high temperature stability, the lower limit is preferably low, and the upper limit is preferably low. When dielectric constant anisotropy is increased to maintain a low drive voltage, the lower limit is preferably high, and the upper limit is preferably high.

In a liquid crystal composition according to the present invention, among the compounds represented by the general formulae (N-1) to (N-4), in particular, a compound represented by the general formula (N-1) is preferred in terms of a high voltage holding ratio in a liquid crystal display device and in terms of low rotational viscosity.

Examples of the compounds represented by the general formula (N-1) include the compound group represented by the following general formulae (N-1a) to (N-1g).

[Chem. 21]

(N-1a)

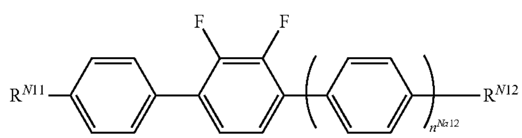

(N-1b)

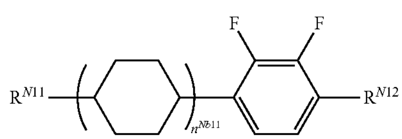

(N-1c)

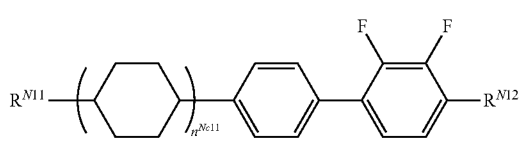

(N-1d)

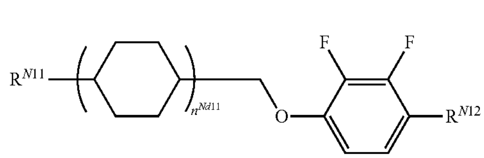

(N-1e)

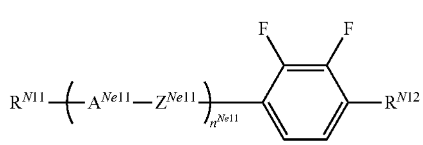

-continued (N-1f)

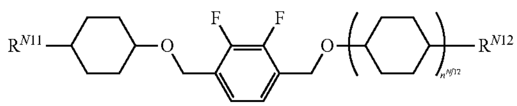

(N-1g)

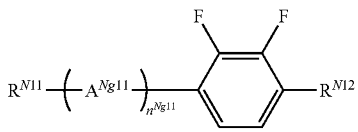

(wherein $R^{N11}$ and $R^{N12}$ have the same meaning as $R^{N11}$ and $R^{N12}$ in the general formula (N-1), $n^{Na11}$ denotes 0 or 1, $n^{Nb11}$ denotes 1 or 2, $n^{Nc11}$ denotes 0 or 1, $n^{Nd11}$ denotes 1 or 2, $n^{Ne11}$ denotes 1 or 2, $n^{Nf11}$ denotes 1 or 2, $n^{Ng11}$ denotes 1 or 2, $A^{Ne11}$ denotes a trans-1,4-cyclohexylene group or a 1,4-phenylene group, $A^{Ng11}$ denotes a trans-1,4-cyclohexylene group, a 1,4-cyclohexenylene group, or a 1,4-phenylene group, at least one of $A^{Ng11}$s denotes a 1,4-cyclohexenylene group, $Z^{Ne11}$ denotes a single bond or ethylene, and at least one of $Z^{Ne11}$s denotes ethylene)

Among these, in particular, those represented by the general formulae (N-1d) and (N-1f) are preferred in terms of a large absolute value of dielectric constant anisotropy Δε.

More specifically, a compound represented by the general formula (N-1) is preferably a compound selected from the compound group represented by the general formulae (N-1-1) to (N-1-21).

A compound represented by the general formula (N-1-1) is the following compound.

[Chem. 22]

(N-1-1)

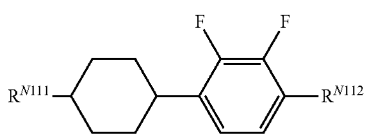

(wherein $R^{N111}$ and $R^{N112}$ have the same meaning as $R^{N11}$ and $R^{N12}$, respectively, in the general formula (N-1))

$R^{N111}$ preferably denotes an alkyl group having 1 to 5 carbon atoms or an alkenyl group having 2 to 5 carbon atoms, preferably a propyl group, a pentyl group, or a vinyl group. $R^{N112}$ preferably denotes an alkyl group having 1 to 5 carbon atoms, an alkenyl group having 4 or 5 carbon atoms, or an alkoxy group having 1 to 4 carbon atoms, preferably an ethoxy group or a butoxy group.

The compounds represented by the general formula (N-1-1) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat smaller when $T_{NI}$ is regarded as important. The amount is preferably set in a medium range to reduce drop marks and improve image-sticking characteristics.

The lower limit of the preferred amount of a compound represented by the formula (N-1-1) is 5% by mass, 10% by mass, 13% by mass, 15% by mass, 17% by mass, 20% by mass, 23% by mass, 25% by mass, 27% by mass, 30% by mass, 33% by mass, or 35% by mass of the total amount of the liquid crystal composition (B) for use in the present invention. The upper limit of the preferred amount is 50% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, 5% by mass, or 3% by mass of the total amount of the liquid crystal composition (B) for use in the present invention.

A compound represented by the general formula (N-1-1) is preferably a compound selected from the compound group represented by the formulae (N-1-1.1) to (N-1-1.22), preferably a compound represented by one of the formulae (N-1-1.1) to (N-1-1.4), preferably the compound represented by the formula (N-1-1.1) or (N-1-1.3).

[Chem. 23]

(N-1-1.1)

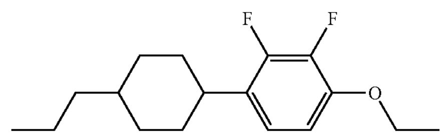

(N-1-1.2)

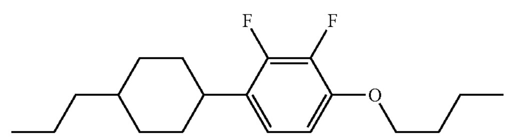

(N-1-1.3)

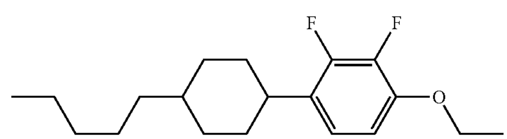

(N-1-1.4)

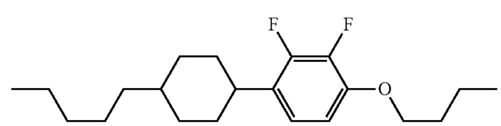

(N-1-1.11)

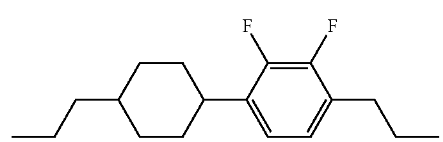

(N-1-1.12)

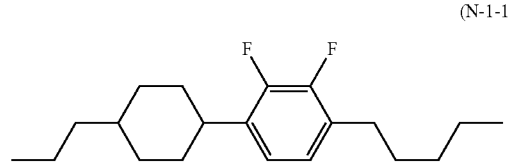

(N-1-1.13)

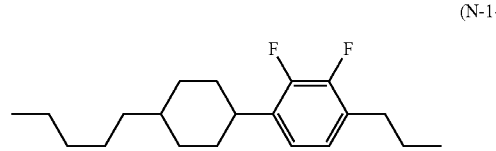

-continued (N-1-1.14)

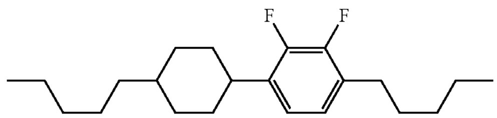

(N-1-1.20)

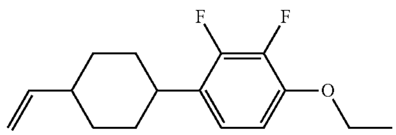

(N-1-1.21)

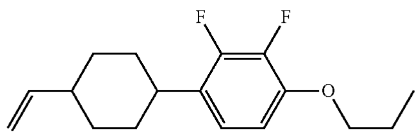

(N-1-1.22)

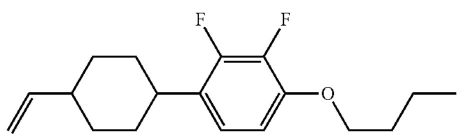

The compounds represented by the formulae (N-1-1.1) to (N-1-1.22) may be used alone or in combination. The lower limit of the preferred amount of each compound or these compounds is 5% by mass, 10% by mass, 13% by mass, 15% by mass, 17% by mass, 20% by mass, 23% by mass, 25% by mass, 27% by mass, 30% by mass, 33% by mass, or 35% by mass of the total amount of the liquid crystal composition (B) for use in the present invention. The upper limit of the preferred amount is 50% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, 5% by mass, or 3% by mass of the total amount of the liquid crystal composition (B) for use in the present invention.

A compound represented by the general formula (N-1-2) is the following compound.

[Chem. 24]

(N-1-2)

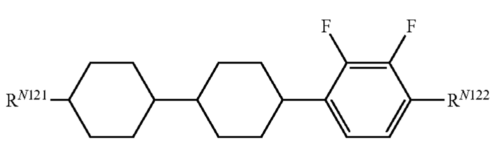

(wherein $R^{N121}$ and $R^{N122}$ have the same meaning as $R^{N11}$ and $R^{N12}$, respectively, in the general formula (N-1))

$R^{N121}$ preferably denotes an alkyl group having 1 to 5 carbon atoms or an alkenyl group having 2 to 5 carbon atoms, preferably an ethyl group, a propyl group, a butyl group, or a pentyl group. $R^{N122}$ preferably denotes an alkyl group having 1 to 5 carbon atoms, an alkenyl group having 4 or 5 carbon atoms, or an alkoxy group having 1 to 4 carbon atoms, preferably a methyl group, a propyl group, a methoxy group, an ethoxy group, or a propoxy group.

The compounds represented by the general formula (N-1-2) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat smaller when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-2) is 5% by mass, 7% by mass, 10% by mass, 13% by mass, 15% by mass, 17% by mass, 20% by mass, 23% by mass, 25% by mass, 27% by mass, 30% by mass, 33% by mass, 35% by mass, 37% by mass, 40% by mass, or 42% by mass of the total amount of the liquid crystal composition (B) for use in the present invention. The upper limit of the preferred amount is 50% by mass, 48% by mass, 45% by mass, 43% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, or 5% by mass of the total amount of the liquid crystal composition (B) for use in the present invention.

A compound represented by the general formula (N-1-2) is preferably a compound selected from the compound group represented by the formulae (N-1-2.1) to (N-1-2.22), preferably a compound represented by one of the formulae (N-1-2.3) to (N-1-2.7), (N-1-2.10), (N-1-2.11), (N-1-2.13), and (N-1-2.20), preferably a compound represented by one of the formulae (N-1-2.3) to (N-1-2.7) when improved Δε is regarded as important, preferably the compound represented by the formula (N-1-2.10), (N-1-2.11), or (N-1-2.13) when improved $T_{NI}$ is regarded as important, or preferably the compound represented by the formula (N-1-2.20) when an improved response speed is regarded as important.

[Chem. 25]

(N-1-2.1)

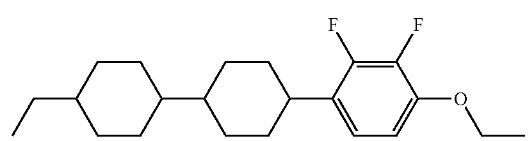

(N-1-2.2)

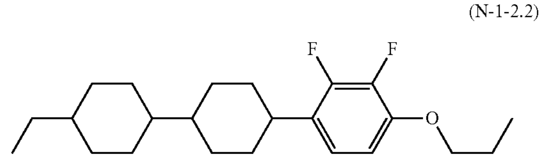

(N-1-2.3)

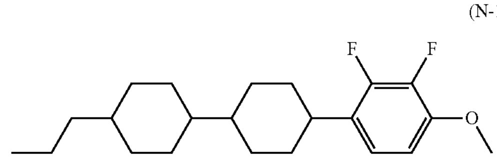

-continued (N-1-2.4)

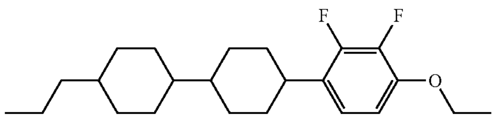

(N-1-2.5)

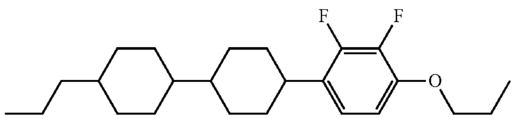

(N-1-2.6)

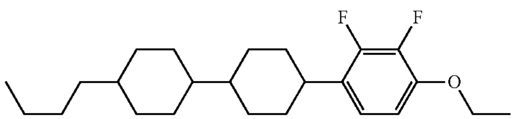

(N-1-2.7)

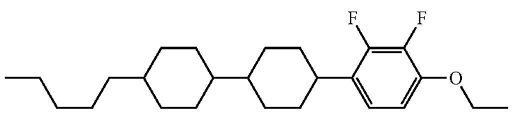

(N-1.2.10)

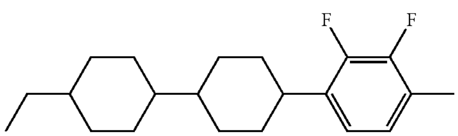

(N-1.2.11)

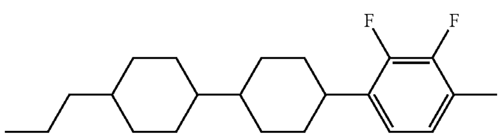

(N-1.2.12)

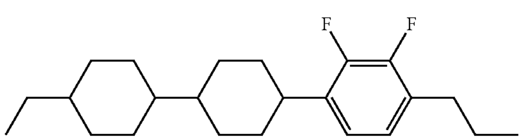

(N-1.2.13)

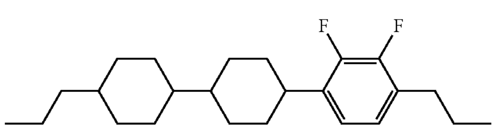

(N-1.2.20)

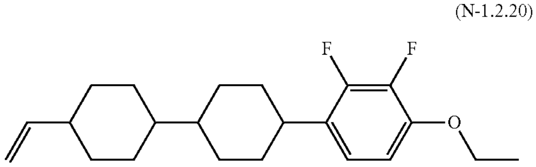

(N-1.2.21)

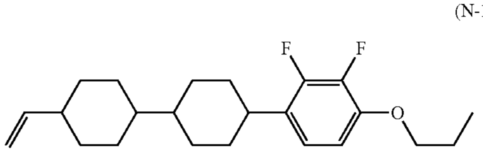

-continued (N-1.2.22)

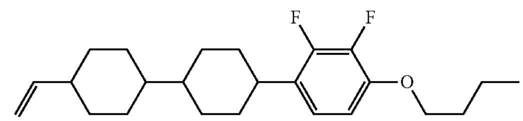

The compounds represented by the formulae (N-1-2.1) to (N-1-2.22) may be used alone or in combination. The lower limit of the preferred amount of each compound or these compounds is 5% by mass, 10% by mass, 13% by mass, 15% by mass, 17% by mass, 20% by mass, 23% by mass, 25% by mass, 27% by mass, 30% by mass, 33% by mass, or 35% by mass of the total amount of the liquid crystal composition (B) for use in the present invention. The upper limit of the preferred amount is 50% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, 5% by mass, or 3% by mass of the total amount of the liquid crystal composition (B) for use in the present invention.

A compound represented by the general formula (N-1-3) is the following compound.

[Chem. 26]

(N-1-3)

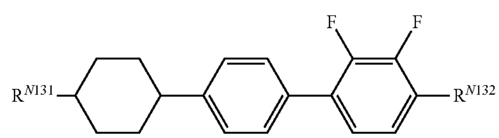

(wherein $R^{N131}$ and $R^{N132}$ have the same meaning as $R^{N11}$ and $R^{N12}$, respectively, in the general formula (N-1))

$R^{N131}$ preferably denotes an alkyl group having 1 to 5 carbon atoms or an alkenyl group having 2 to 5 carbon atoms, preferably an ethyl group, a propyl group, or a butyl group. $R^{N132}$ preferably denotes an alkyl group having 1 to 5 carbon atoms, an alkenyl group having 3 to 5 carbon atoms, or an alkoxy group having 1 to 4 carbon atoms, preferably a 1-propenyl group, an ethoxy group, a propoxy group, or a butoxy group.

The compounds represented by the general formula (N-1-3) are effective in increasing the refractive index anisotropy Δn and may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-3) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-3) is preferably a compound selected from the compound group represented by the formulae (N-1-3.1) to (N-1-3.21), preferably a compound represented by one of the formulae (N-1-3.1) to (N-1-3.7) and (N-1-3.21), preferably the compound represented by the formula (N-1-3.1), (N-1-3.2), (N-1-3.3), (N-1-3.4), or (N-1-3.6).

[Chem. 27]

(N-1-3.1)

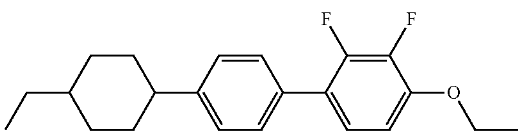

(N-1-3.2)

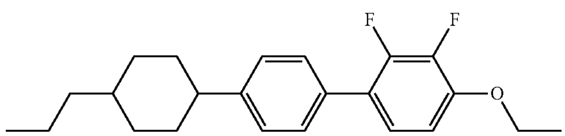

(N-1-3.3)

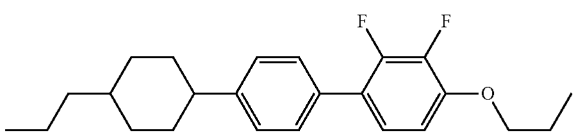

(N-1-3.4)

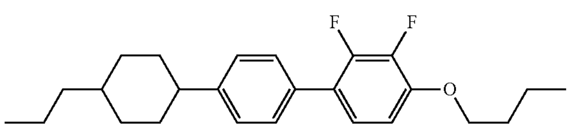

(N-1-3.5)

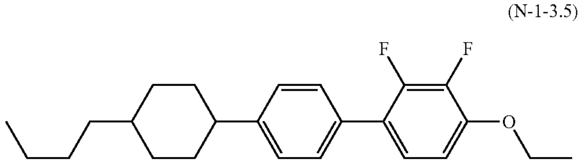

(N-1-3.6)

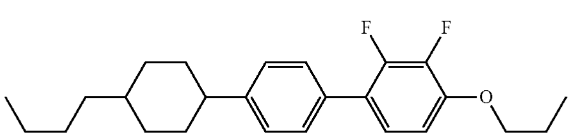

(N-1-3.7)

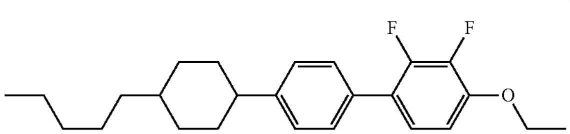

-continued (N-1-3.10)

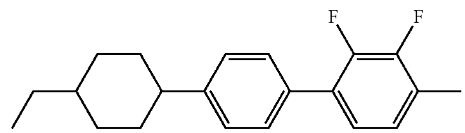

(N-1-3.11)

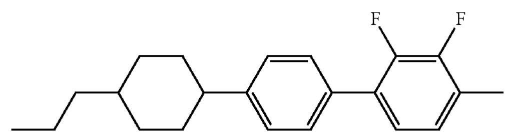

(N-1-3.20)

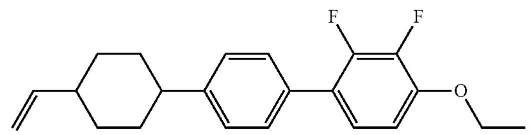

(N-1-3.21)

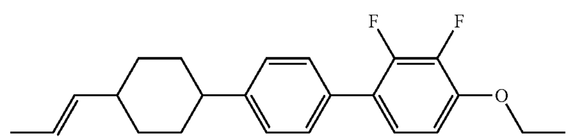

The compounds represented by the formulae (N-1-3.1) to (N-1-3.4), (N-1-3.6), and (N-1-3.21) may be used alone or in combination. A combination of the formula (N-1-3.1) and the formula (N-1-3.2) or a combination of two or three selected from the formulae (N-1-3.3), (N-1-3.4), and (N-1-3.6) is preferred. The lower limit of the preferred amount of each compound or these compounds is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-4) is the following compound.

[Chem. 28]

(N-1-4)

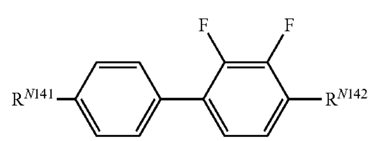

(wherein $R^{N141}$ and $R^{N142}$ have the same meaning as $R^{N11}$ and $R^{N12}$, respectively, in the general formula (N-1))

$R^{N141}$ and $R^{N142}$ preferably independently denote an alkyl group having 1 to 5 carbon atoms, an alkenyl group having 4 or 5 carbon atoms, or an alkoxy group having 1 to 4 carbon atoms, preferably a methyl group, a propyl group, an ethoxy group, or a butoxy group.

The compounds represented by the general formula (N-1-4) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The compounds have a low viscosity and are effective in increasing the dielectric constant anisotropy $\Delta\varepsilon$. The amount is preferably set somewhat larger when improved $\Delta\varepsilon$ is regarded as important and is effectively set somewhat larger when solubility at low temperatures is regarded as important. The amount is effectively set somewhat smaller to increase $T_{NI}$. The amount is preferably set in a medium range to reduce drop marks and improve image-sticking characteristics.

The lower limit of the preferred amount of a compound represented by the formula (N-1-4) is 3% by mass, 5% by mass, 7% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, 13% by mass, 11% by mass, 10% by mass, or 8% by mass of the total amount of the liquid crystal composition (B) for use in the present invention.

A compound represented by the general formula (N-1-4) is preferably a compound selected from the compound group represented by the formulae (N-1-4.1) to (N-1-4.14), preferably a compound represented by one of the formulae (N-1-4.1) to (N-1-4.4), preferably the compound represented by the formula (N-1-4.1), (N-1-4.2), or (N-1-4.4).

[Chem. 29]

(N-1-4.1)

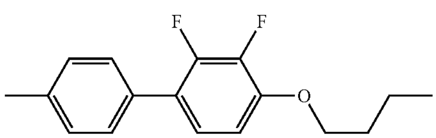

(N-1-4.2)

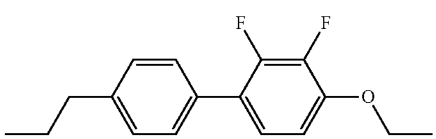

(N-1-4.3)

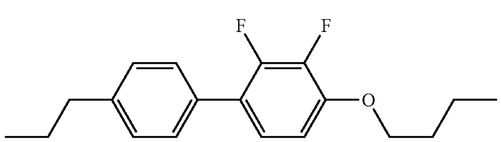

(N-1-4.4)

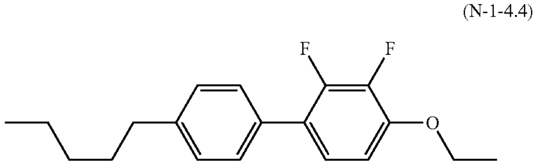

(N-1-4.11)

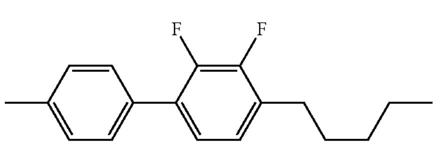

-continued (N-1-4.12)

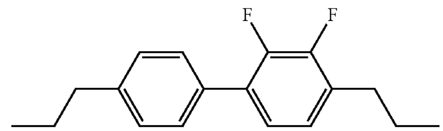

(N-1-4.13)

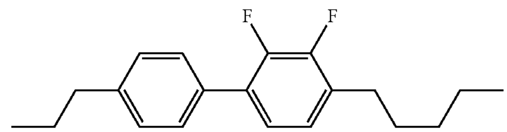

(N-1-4.14)

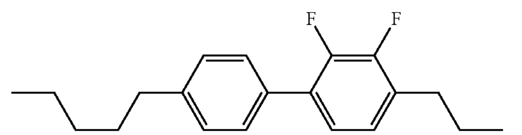

The compounds represented by the formulae (N-1-4.1) to (N-1-4.14) may be used alone or in combination. The lower limit of the preferred amount of each compound or these compounds is 3% by mass, 5% by mass, 7% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, 13% by mass, 11% by mass, 10% by mass, or 8% by mass of the total amount of the liquid crystal composition (B) for use in the present invention.

A compound represented by the general formula (N-1-5) is the following compound.

[Chem. 30]

(N-1-5)

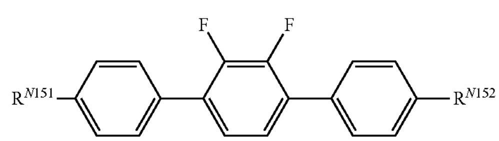

(wherein $R^{N151}$ and $R^{N152}$ have the same meaning as $R^{N11}$ and $R^{N12}$, respectively, in the general formula (N-1))

$R^{N151}$ and $R^{N152}$ preferably independently denote an alkyl group having 1 to 5 carbon atoms, an alkenyl group having 4 or 5 carbon atoms, or an alkoxy group having 1 to 4 carbon atoms, preferably an ethyl group, a propyl group, or a butyl group.

The compounds represented by the general formula (N-1-5) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved $\Delta\varepsilon$ is regarded as important, is effectively set somewhat smaller when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-5) is 5% by mass, 8% by mass, 10% by mass, 13% by mass, 15% by mass, 17% by mass, or 20% by mass of the total amount of the liquid crystal composition (B) for use in the present invention. The upper limit of the preferred amount is 35% by mass, 33% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-5) is preferably a compound selected from the compound group represented by the formulae (N-1-5.1) to (N-1-5.6), preferably the compound represented by the formula (N-1-5.1), (N-1-5.2), or (N-1-5.4).

[Chem. 31]

(N-1-5.1)

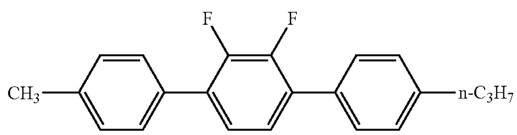

(N-1-5.2)

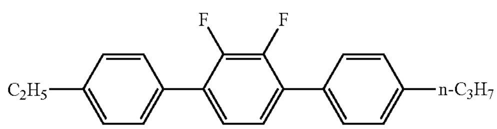

(N-1-5.3)

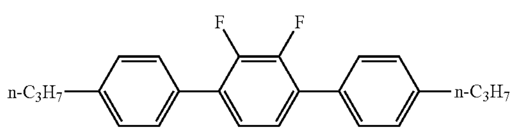

(N-1-5.4)

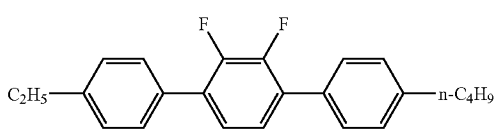

(N-1-5.5)

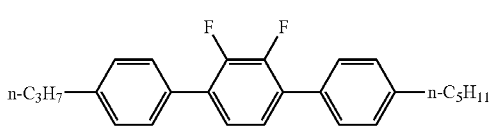

(N-1-5.6)

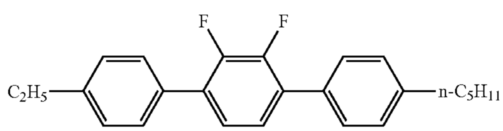

The compounds represented by the formulae (N-1-5.1), (N-1-5.2), and (N-1-5.4) may be used alone or in combination. The lower limit of the preferred amount of each compound or these compounds is 5% by mass, 8% by mass, 10% by mass, 13% by mass, 15% by mass, 17% by mass, or 20% by mass of the total amount of the liquid crystal composition (B) for use in the present invention. The upper limit of the preferred amount is 35% by mass, 33% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-10) is the following compound.

[Chem. 32]

(N-1-10)

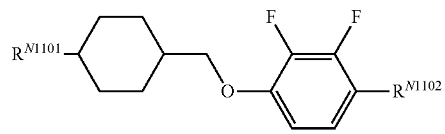

(wherein $R^{N1101}$ and $R^{N1102}$ have the same meaning as $R^{N11}$ and $R^{N12}$, respectively, in the general formula (N-1))

$R^{N1101}$ preferably denotes an alkyl group having 1 to 5 carbon atoms or an alkenyl group having 2 to 5 carbon atoms, preferably an ethyl group, a propyl group, a butyl group, a vinyl group, or a 1-propenyl group. $R^{N1102}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-10) are effective in increasing the dielectric constant anisotropy Δε and may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-10) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-10) is preferably a compound selected from the compound group represented by the formulae (N-1-10.1) to (N-1-10.14), preferably a compound represented by one of the formulae (N-1-10.1) to (N-1-10.5), preferably the compound represented by the formula (N-1-10.1), or (N-1-10.2).

[Chem. 33]

(N-1-10.1)

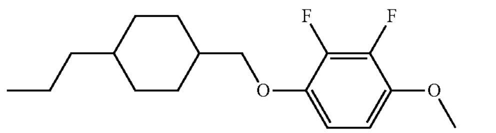

(N-1-10.2)

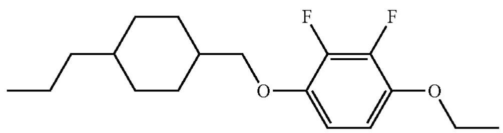

(N-1-10.3)

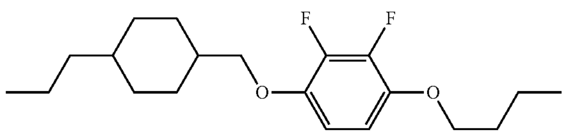

(N-1-10.4)

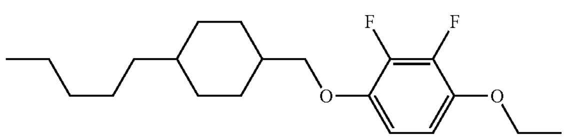

(N-1-10.5)

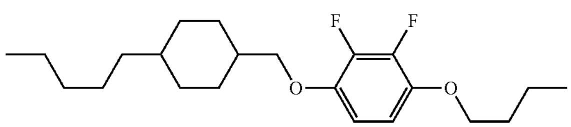

(N-1-10.11)

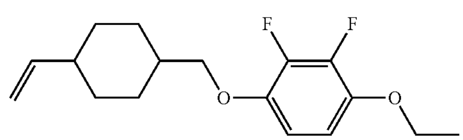

(N-1-10.12)

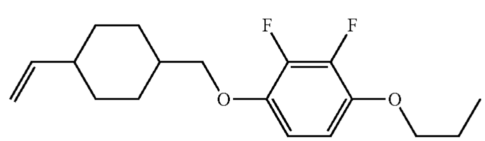

(N-1-10.13)

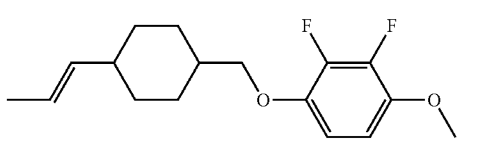

(N-1-10.14)

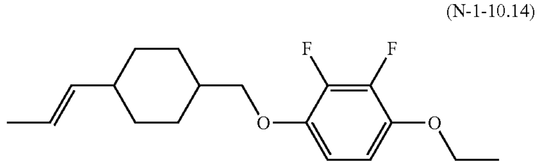

The compounds represented by the formulae (N-1-10.1), (N-1-10.2), (N-1-10.11), and (N-1-10.12) may be used alone or in combination. The lower limit of the preferred amount of each compound or these compounds is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-11) is the following compound.

[Chem. 34]

(N-1-11)

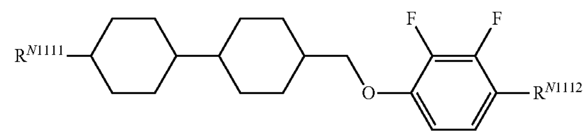

(wherein $R^{N1111}$ and $R^{N1112}$ have the same meaning as $R^{N11}$ and $R^{N12}$, respectively, in the general formula (N-1))

$R^{N1111}$ preferably denotes an alkyl group having 1 to 5 carbon atoms or an alkenyl group having 2 to 5 carbon atoms, preferably an ethyl group, a propyl group, a butyl group, a vinyl group, or a 1-propenyl group. $R^{N1112}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-11) are effective in increasing the dielectric constant anisotropy Δε and may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat smaller when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-11) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-11) is preferably a compound selected from the compound group represented by the formulae (N-1-11.1) to (N-1-11.14), preferably a compound represented by one of the formulae (N-1-11.1) to (N-1-11.5), preferably the compound represented by the formula (N-1-11.2) or (N-1-11.4).

[Chem. 35]

(N-1.11.1)

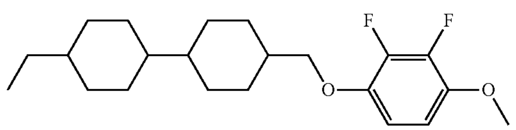

(N-1.11.2)

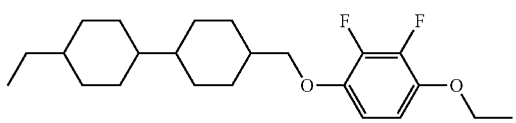

(N-1.11.3)

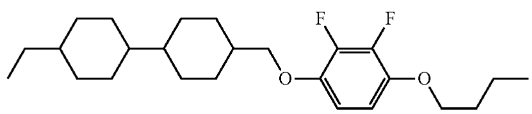

(N-1.11.4)

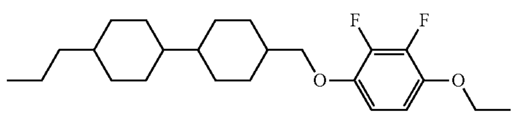

(N-1.11.5)

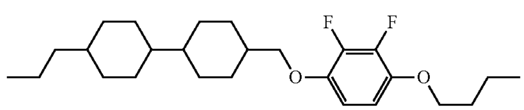

(N-1.11.11)

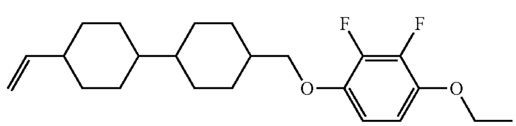

(N-1.11.12)

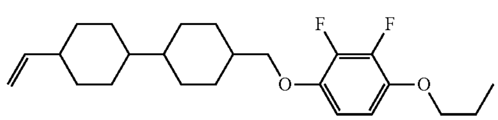

(N-1.11.13)

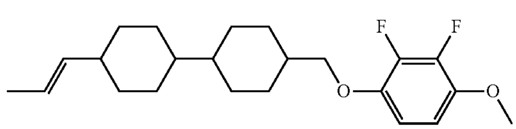

(N-1.11.14)

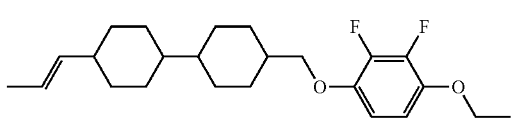

The compounds represented by the formulae (N-1-11.2) and (N-1-11.4) may be used alone or in combination. The lower limit of the preferred amount of each compound or these compounds is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-12) is the following compound.

[Chem. 36]

(N-1-12)

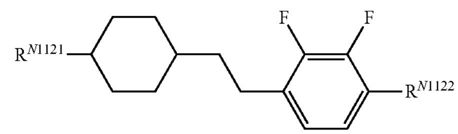

(wherein $R^{N1121}$ and $R^{N1122}$ have the same meaning as $R^{N11}$ and $R^{N12}$, respectively, in the general formula (N-1))

$R^{N1121}$ preferably denotes an alkyl group having 1 to 5 carbon atoms or an alkenyl group having 2 to 5 carbon atoms, preferably an ethyl group, a propyl group, or a butyl group. $R^{N1122}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-12) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-12) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-13) is the following compound.

[Chem. 37]

(N-1-13)

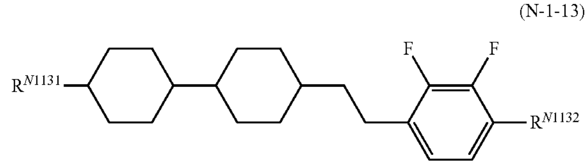

(wherein $R^{N1131}$ and $R^{N1132}$ have the same meaning as $R^{N11}$ and $R^{N12}$, respectively, in the general formula (N-1))

$R^{N1131}$ preferably denotes an alkyl group having 1 to 5 carbon atoms or an alkenyl group having 2 to 5 carbon atoms, preferably an ethyl group, a propyl group, or a butyl group. $R^{N1132}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-13) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-13) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-14) is the following compound.

[Chem. 38]

(N-1-14)

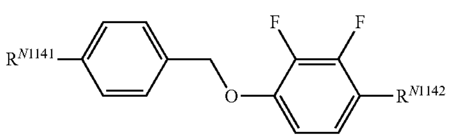

(wherein $R^{N1141}$ and $R^{N1142}$ have the same meaning as $R^{N11}$ and $R^{N12}$, respectively, in the general formula (N-1))

$R^{N1141}$ preferably denotes an alkyl group having 1 to 5 carbon atoms or an alkenyl group having 2 to 5 carbon atoms, preferably an ethyl group, a propyl group, or a butyl group. $R^{N1142}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-14) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-14) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-15) is the following compound.

[Chem. 39]

(N-1-15)

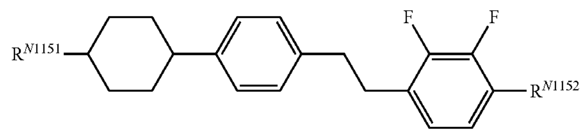

(wherein $R^{N1151}$ and $R^{N1152}$ have the same meaning as $R^{N11}$ and $R^{N12}$, respectively, in the general formula (N-1))

$R^{N1151}$ preferably denotes an alkyl group having 1 to 5 carbon atoms or an alkenyl group having 2 to 5 carbon atoms, preferably an ethyl group, a propyl group, or a butyl group. $R^{N1152}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-15) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-15) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-16) is the following compound.

[Chem. 40]

(N-1-16)

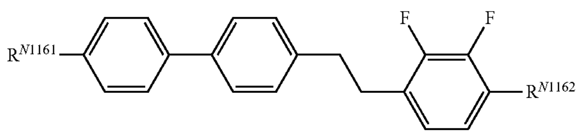

(wherein $R^{N1161}$ and $R^{N1162}$ have the same meaning as $R^{N11}$ and $R^{N12}$, respectively, in the general formula (N-1))

$R^{N1161}$ preferably denotes an alkyl group having 1 to 5 carbon atoms or an alkenyl group having 2 to 5 carbon atoms, preferably an ethyl group, a propyl group, or a butyl group. $R^{N1162}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-16) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-16) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-17) is the following compound.

[Chem. 41]

(N-1-17)

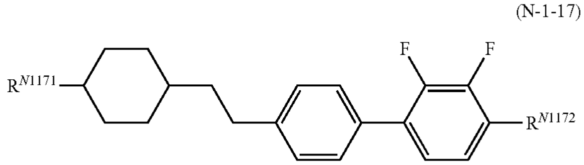

(wherein $R^{N1171}$ and $R^{N1172}$ have the same meaning as $R^{N11}$ and $R^{N12}$, respectively, in the general formula (N-1))

$R^{N1171}$ preferably denotes an alkyl group having 1 to 5 carbon atoms or an alkenyl group having 2 to 5 carbon atoms, preferably an ethyl group, a propyl group, or a butyl group. $R^{N1172}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-17) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-17) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-18) is the following compound.

[Chem. 42]

(N-1-18)

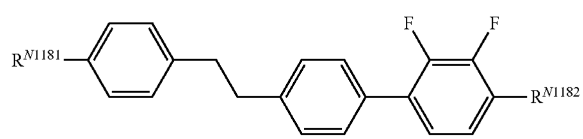

(wherein $R^{N1181}$ and $R^{N1182}$ have the same meaning as $R^{N11}$ and $R^{N12}$, respectively, in the general formula (N-1))

$R^{N1181}$ preferably denotes an alkyl group having 1 to 5 carbon atoms or an alkenyl group having 2 to 5 carbon atoms, preferably a methyl group, an ethyl group, a propyl group, or a butyl group. $R^{N1182}$ preferably denotes an alkyl group having 1 to 5 carbon atoms, an alkenyl group having 4 or 5 carbon atoms, or an alkoxy group having 1 to 4 carbon atoms, preferably an ethoxy group, a propoxy group, or a butoxy group.

The compounds represented by the general formula (N-1-18) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-18) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-18) is preferably a compound selected from the compound group represented by the formulae (N-1-18.1) to (N-1-18.5), preferably a compound represented by one of the formulae (N-1-18.1) to (N-1-18.3), preferably the compound represented by the formula (N-1-18.2) or (N-1-18.3).

[Chem. 43]

(N-1-18.1)

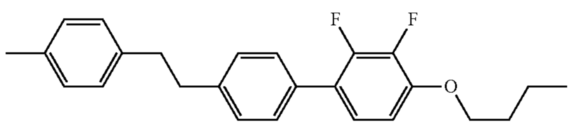

(N-1-18.2)

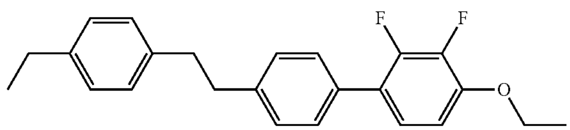

(N-1-18.3)

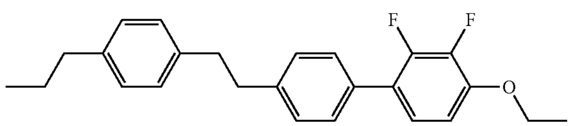

(N-1-18.4)

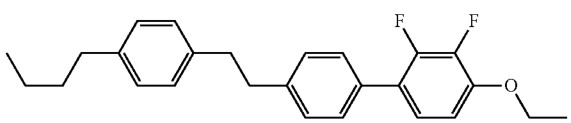

(N-1-18.5)

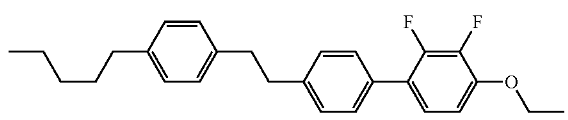

A compound represented by the general formula (N-1-20) is the following compound.

[Chem. 44]

(N-1-20)

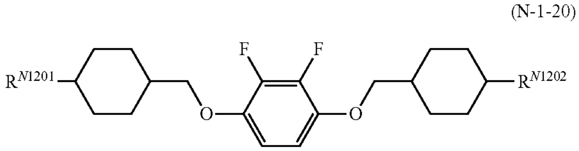

(wherein $R^{N1201}$ and $R^{N1202}$ have the same meaning as $R^{N11}$ and $R^{N12}$, respectively, in the general formula (N-1))

$R^{N1201}$ and $R^{N1202}$ preferably independently denote an alkyl group having 1 to 5 carbon atoms or an alkenyl group having 2 to 5 carbon atoms, preferably an ethyl group, a propyl group, or a butyl group.

The compounds represented by the general formula (N-1-20) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-20) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-21) is the following compound.

[Chem. 45]

(N-1-21)

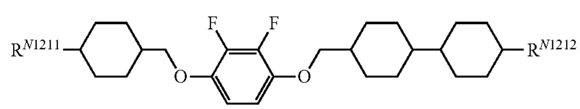

(wherein $R^{N1211}$ and $R^{N1212}$ have the same meaning as $R^{N11}$ and $R^{N12}$, respectively, in the general formula (N-1))

$R^{N1211}$ and $R^{N1212}$ preferably independently denote an alkyl group having 1 to 5 carbon atoms or an alkenyl group having 2 to 5 carbon atoms, preferably an ethyl group, a propyl group, or a butyl group.

The compounds represented by the general formula (N-1-21) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-21) is 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, or 13% by mass of the total amount of the liquid crystal composition (B) for use in the present invention.

A compound represented by the general formula (N-1-22) is the following compound.

[Chem. 46]

(N-1-22)

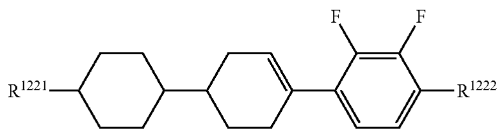

(wherein $R^{N1221}$ and $R^{N1222}$ have the same meaning as $R^{N11}$ and $R^{N12}$, respectively, in the general formula (N-1))

$R^{N1221}$ and $R^{N1222}$ preferably independently denote an alkyl group having 1 to 5 carbon atoms or an alkenyl group having 2 to 5 carbon atoms, preferably an ethyl group, a propyl group, or a butyl group.

The compounds represented by the general formula (N-1-22) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat larger when $T_{NI}$ is regarded as important. The amount is preferably set in a medium range to reduce drop marks and improve image-sticking characteristics.

The lower limit of the preferred amount of a compound represented by the formula (N-1-21) is 1% by mass, 5% by mass, 10% by mass, 13% by mass, 15% by mass, 17% by mass, or 20% by mass of the total amount of the liquid crystal composition (B) for use in the present invention. The upper limit of the preferred amount is 35% by mass, 30% by mass, 28% by mass, 25% by mass, 23% by mass, 20% by mass, 18% by mass, 15% by mass, 13% by mass, 10% by mass, or 5% by mass of the total amount of the liquid crystal composition (B) for use in the present invention.

A compound represented by the general formula (N-1-22) is preferably a compound selected from the compound group represented by the formulae (N-1-22.1) to (N-1-22.12), preferably a compound represented by one of the formulae (N-1-22.1) to (N-1-22.5), preferably a compound represented by one of the formulae (N-1-22.1) to (N-1-22.4).

[Chem. 47]

(N-1-22.1)

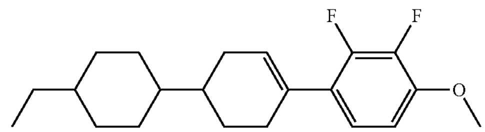

(N-1-22.2)

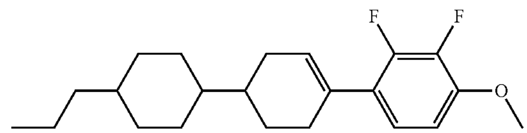

(N-1-22.3)

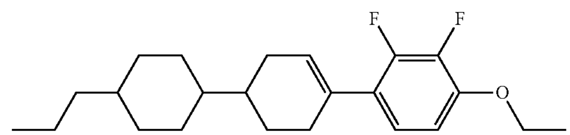

(N-1-22.4)

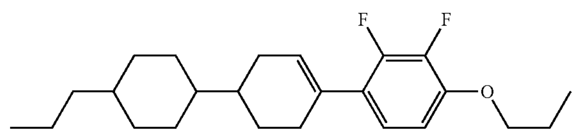

(N-1-22.5)

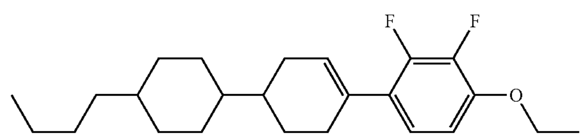

(N-1-22.6)

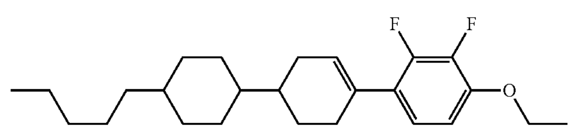

(N-1-22.11)

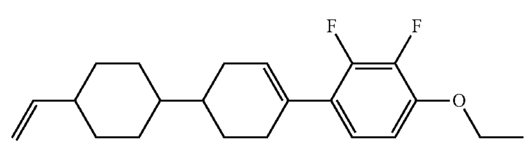

(N-1-22.12)

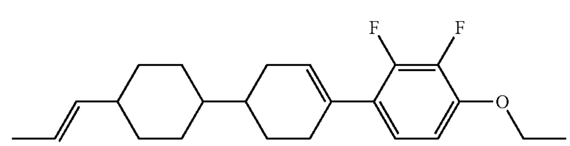

A compound represented by the general formula (N-3) is preferably a compound selected from the compound group represented by the general formula (N-3-2).

[Chem. 48]

(N-3-2)

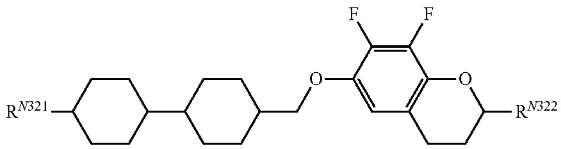

(wherein $R^{N321}$ and $R^{N322}$ have the same meaning as -$R^{N31}$ and $R^{N32}$, respectively, in the general formula (N-3))

$R^{N321}$ and $R^{N322}$ preferably denote an alkyl group having 1 to 5 carbon atoms or an alkenyl group having 2 to 5 carbon atoms, preferably a propyl group or a pentyl group.

The compounds represented by the general formula (N-3-2) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat smaller when $T_{NI}$ is regarded as important. The amount is preferably set in a medium range to reduce drop marks and improve image-sticking characteristics.

The lower limit of the preferred amount of a compound represented by the formula (N-3-2) is 3% by mass, 5% by mass, 10% by mass, 13% by mass, 15% by mass, 17% by mass, 20% by mass, 23% by mass, 25% by mass, 27% by mass, 30% by mass, 33% by mass, or 35% by mass of the total amount of the liquid crystal composition (B) for use in the present invention. The upper limit of the preferred amount is 50% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, or 5% by mass of the total amount of the liquid crystal composition (B) for use in the present invention.

A compound represented by the general formula (N-3-2) is preferably a compound selected from the compound group represented by the formulae (N-3-2.1) to (N-3-2.3).

[Chem. 49]

(N-3-2.1)

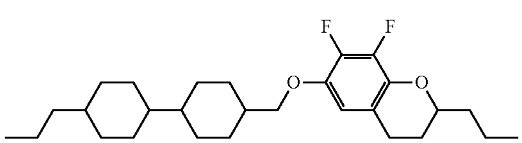

(N-3-2.2)

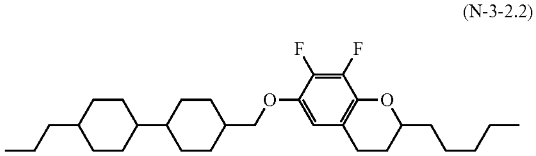

-continued (N-3-2.3)

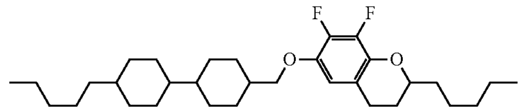

The compounds represented by the general formula (N-4) include the compound group represented by the following general formula (N-4-1).

[Chem. 50]

(N-4-1)

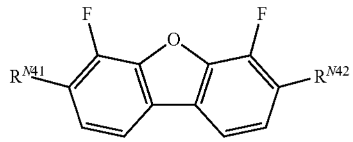

(wherein $R^{N41}$ and $R^{N42}$ have the same meaning as $R^{N41}$ and $R^{N42}$, respectively, in the general formula (N-4))

-$R^{N41}$ and $R^{N42}$ preferably denote an alkyl group having 1 to 5 carbon atoms or an alkoxy group having 2 to 5 carbon atoms, a propyl group, a pentyl group, an ethoxy group, a propoxy group, or a butoxy group.

The compounds represented by the general formula (N-4-1) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is preferably set somewhat larger when improved Δε is regarded as important, is effectively set somewhat larger when solubility at low temperatures is regarded as important, and is effectively set somewhat smaller when $T_{NI}$ is regarded as important. The amount is preferably set in a medium range to reduce drop marks and improve image-sticking characteristics.

The lower limit of the preferred amount of a compound represented by the formula (N-4-1) is 1% by mass, 3% by mass, 5% by mass, 10% by mass, 13% by mass, 15% by mass, 17% by mass, 20% by mass, 23% by mass, 25% by mass, 27% by mass, 30% by mass, 33% by mass, or 35% by mass of the total amount of the nonpolymerizable liquid crystal composition. The upper limit of the preferred amount is 50% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, or 5% by mass of the total amount of the nonpolymerizable liquid crystal composition.

A compound represented by the general formula (N-4-1) is preferably a compound selected from the compound group represented by the formulae (N-4-1.1) to (N-4-1.6).

[Chem. 51]

(N-4-1.1)

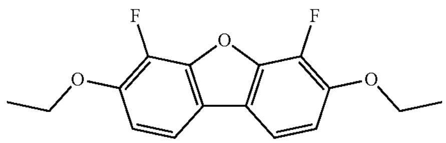

(N-4-1.2)

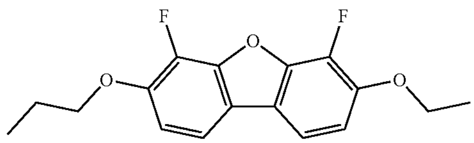

(N-4-1.3)

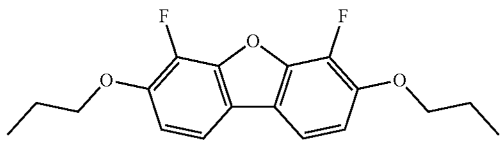

(N-4-1.4)

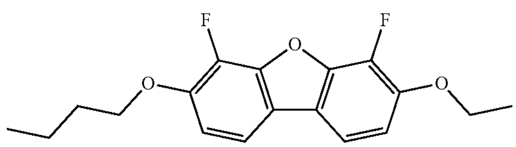

(N-4-1.5)

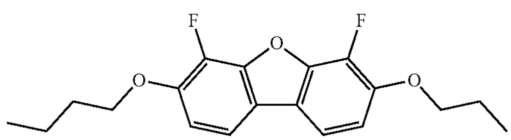

(N-4-1.6)

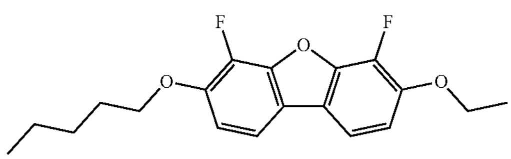

(p-Type Compound)

The liquid crystal composition (B) for use in the present invention preferably further contains one or two or more compounds represented by the general formula (J). These compounds correspond to dielectrically positive compounds (with Δε of more than 2).

[Chem. 52]

$$R^{J1}—A^{J1}\left(Z^{J1}—A^{J2}\right)_{n^{J1}}Z^{J2}—A^{J3}—X^{J1} \quad (J)$$

(wherein $R^{J1}$ denotes an alkyl group having 1 to 8 carbon atoms, and one —$CH_2$— or two or more nonadjacent —$CH_2$— groups in the alkyl group are independently optionally substituted with —CH═CH—, —C≡C—, —O—, —CO—, —COO—, or —OCO—, $n^{J1}$ denotes 0, 1, 2, 3, or 4, $A^{J1}$, $A^{J2}$, and $A^{J3}$ independently denote a group selected from the group consisting of (a) a 1,4-cyclohexylene group (in which one —$CH_2$— or two or more nonadjacent —$CH_2$— groups are optionally substituted with —O—), (b) a 1,4-phenylene group (in which one —CH═ or two or more nonadjacent —CH═ groups are optionally substituted with —N═), and (c) a naphthalene-2,6-diyl group, a 1,2,3,4-tetrahydronaphthalene-2,6-diyl group, or a decahydronaphthalene-2,6-diyl group (one —CH═ or two or more nonadjacent —CH═ groups in the naphthalene-2,6-diyl group or in the 1,2,3,4-tetrahydronaphthalene-2,6-diyl group are optionally substituted with —N═), the groups (a), (b), and (c) are independently optionally substituted with a cyano group, a fluorine atom, a chlorine atom, a methyl group, a trifluoromethyl group, or a trifluoromethoxy group, $Z^{J1}$ and $Z^{J2}$ independently denote a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{J1}$ denotes 2, 3, or 4, a plurality of $A^{J2}$s may be the same or different, and if $n^{J1}$ denotes 2, 3, or 4, a plurality of $Z^{J1}$s may be the same or different, and $X^{J1}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group)

In the general formula (J), $R^{J1}$ preferably denotes an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, still more preferably an alkyl group having 2 to 5 carbon atoms or an alkenyl group having 2 or 3 carbon atoms, particularly preferably an alkenyl group having 3 carbon atoms (a propenyl group).

$R^{J1}$ preferably denotes an alkyl group when reliability is regarded as important or an alkenyl group when lower viscosity is regarded as important.

If the ring structure to which $R^{J1}$ is bonded is a phenyl group (aromatic), then a linear alkyl group having 1 to 5 carbon atoms, a linear alkoxy group having 1 to 4 carbon atoms, and an alkenyl group having 4 or 5 carbon atoms are preferred. If the ring structure to which it is bonded is a saturated ring structure, such as cyclohexane, pyran, or dioxane, then a linear alkyl group having 1 to 5 carbon atoms, a linear alkoxy group having 1 to 4 carbon atoms, and a linear alkenyl group having 2 to 5 carbon atoms are preferred. To stabilize the nematic phase, the total number of carbon atoms and, if present, oxygen atoms is preferably 5 or less, and a straight chain is preferred.

The alkenyl group is preferably selected from the groups represented by the formulae (R1) to (R5). (The dark dot in each formula represents a carbon atom in the ring structure to which the alkenyl group is bonded.)

[Chem. 53]

(R1)

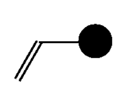

-continued (R2)

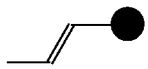

(R3)

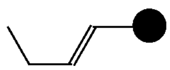

(R4)

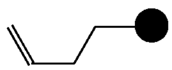

(R5)

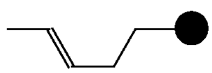

$A^{J1}$, $A^{J2}$, and $A^{J3}$ preferably independently denote an aromatic when an increase in Δn is desired, an aliphatic to improve the response speed, or a trans-1,4-cyclohexylene group, a 1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, they optionally being substituted with a fluorine atom, more preferably one of the following structures,

[Chem. 54]

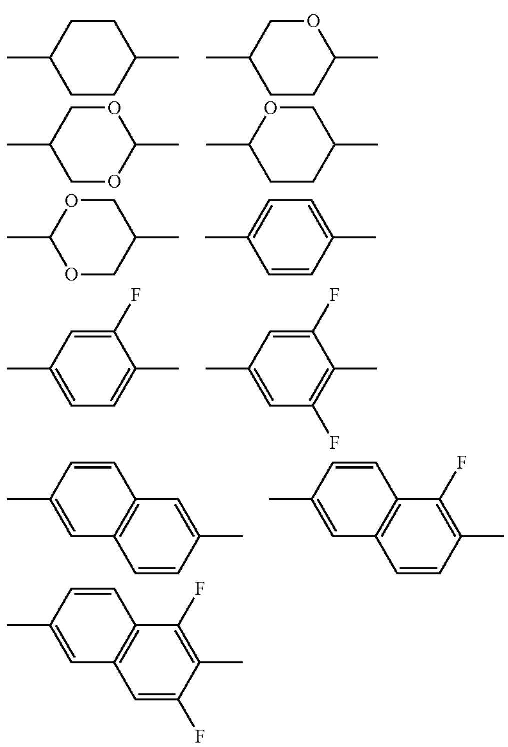

more preferably one of the following structures.

[Chem. 55]

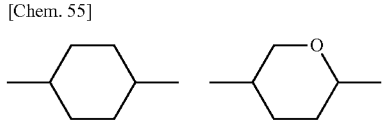

-continued

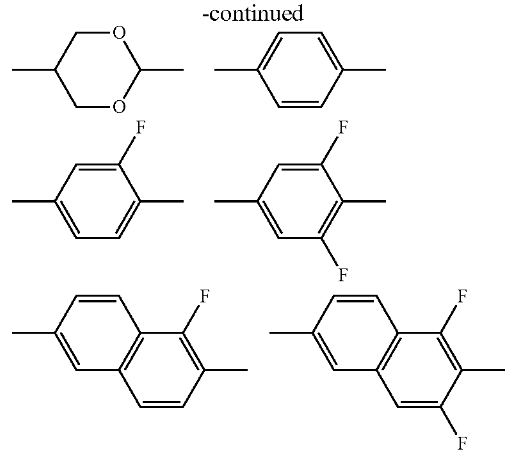

$Z^{J1}$ and $Z^{J2}$ preferably independently denote —$CH_2O$—, —$OCH_2$—, —$CF_2O$—, —$CH_2CH_2$—, —$CF_2CF_2$—, or a single bond, more preferably —$OCH_2$—, —$CF_2O$—, —$CH_2CH_2$—, or a single bond, particularly preferably —$OCH_2$—, —$CF_2O$—, or a single bond.

$X^{J1}$ preferably denotes a fluorine atom or a trifluoromethoxy group, preferably a fluorine atom.

$n^{J1}$ preferably denotes 0, 1, 2, or 3, preferably 0, 1, or 2, preferably 0 or 1 when improved Δε is regarded as important, preferably 1 or 2 when $T_{NI}$ is regarded as important.

Although compounds of any types may be combined, these compounds are combined in a manner that depends on the desired characteristics, such as solubility at low temperatures, transition temperature, electrical reliability, and birefringence index. For example, one, two, or three compounds are used in one embodiment of the present invention. Alternatively, four, five, six, seven, or more compounds are used in another embodiment of the present invention.

The amount of a compound represented by the general formula (J) in the liquid crystal composition (B) for use in the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the general formula (J) is 1% by mass, 10% by mass, 20% by mass, 30% by mass, 40% by mass, 50% by mass, 55% by mass, 60% by mass, 65% by mass, 70% by mass, 75% by mass, or 80% by mass of the total amount of the liquid crystal composition (B) for use in the present invention. For example, in one embodiment of the present invention, the upper limit of the preferred amount is 95% by mass, 85% by mass, 75% by mass, 65% by mass, 55% by mass, 45% by mass, 35% by mass, or 25% by mass of the total amount of the liquid crystal composition (B) for use in the present invention.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

$R^{J1}$ preferably denotes an alkyl group when reliability is regarded as important or an alkenyl group when lower viscosity is regarded as important.

A compound represented by the general formula (J) is preferably a compound represented by the general formula (M) or a compound represented by the general formula (K).

[Chem. 56]

(M)

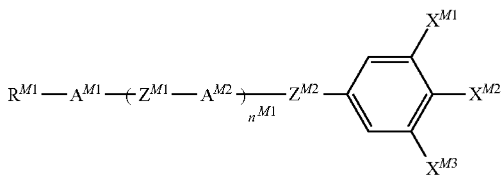

(wherein $R^{M1}$ denotes an alkyl group having 1 to 8 carbon atoms, and one —$CH_2$— or two or more nonadjacent —$CH_2$— groups in the alkyl group are independently optionally substituted with —CH═CH—, —C≡C—, —O—, —CO—, —COO—, or —OCO—, $n^{M1}$ denotes 0, 1, 2, 3, or 4, $A^{M1}$ and $A^{M2}$ independently denote a group selected from the group consisting of (a) a 1,4-cyclohexylene group (in which one —$CH_2$— or two or more nonadjacent —$CH_2$— groups are optionally substituted with —O— or —S—), and (b) a 1,4-phenylene group (in which one —CH═ or two or more nonadjacent —CH═ groups are optionally substituted with —N═), a hydrogen atom in the group (a) and the group (b) is independently optionally substituted with a cyano group, a fluorine atom, or a chlorine atom, $Z^{M1}$ and $Z^{M2}$ independently denote a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{M1}$ is 2, 3, or 4, a plurality of $A^{M2}$s may be the same or different, and if $n^{M1}$ is 2, 3, or 4, a plurality of $Z^{M1}$s may be the same or different, $X^{M1}$ and $X^{M3}$ independently denote a hydrogen atom, a chlorine atom, or a fluorine atom, and $X^{M2}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group)

[Chem. 57]

(K)

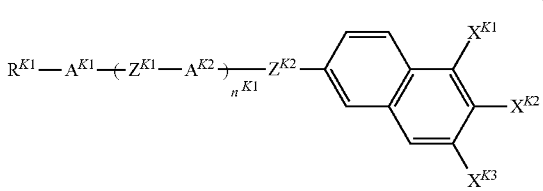

(wherein $R^{K1}$ denotes an alkyl group having 1 to 8 carbon atoms, and one —$CH_2$— or two or more nonadjacent —$CH_2$— groups in the alkyl group are independently optionally substituted with —CH═CH—, —C≡C—, —O—, —CO—, —COO—, or —OCO—, $n^{K1}$ denotes 0, 1, 2, 3, or 4, $A^{K1}$ and $A^{K2}$ independently denote a group selected from the group consisting of (a) a 1,4-cyclohexylene group (in which one —$CH_2$— or two or more nonadjacent —$CH_2$— groups are optionally substituted with —O— or —S—), and (b) a 1,4-phenylene group (in which one —CH═ or two or more nonadjacent —CH═ groups are optionally substituted with —N═), a hydrogen atom in the group (a) and the group (b) is independently optionally substituted with a cyano group, a fluorine atom, or a chlorine atom, $Z^{K1}$ and $Z^{K2}$ independently denote a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{K1}$ denotes 2, 3, or 4, a plurality of $A^{K2}$s may be the same or different, and if $n^{K1}$ denotes 2, 3, or 4, a plurality of $Z^{K1}$s may be the same or different, $X^{K1}$ and $X^{K3}$ independently denote a hydrogen atom, a chlorine atom, or a fluorine atom, and $X^{K2}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group)

The liquid crystal composition (B) for use in the present invention preferably further contains one or two or more compounds represented by the general formula (M). These compounds correspond to dielectrically positive compounds (with Δε of more than 2).

[Chem. 58]

(M)

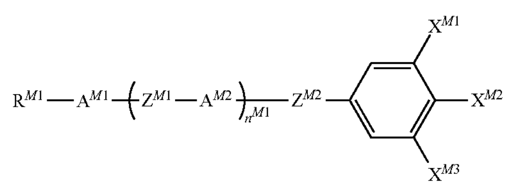

(wherein $R^{M1}$ denotes an alkyl group having 1 to 8 carbon atoms, and one —$CH_2$— or two or more nonadjacent —$CH_2$— groups in the alkyl group are independently optionally substituted with —CH═CH—, —C≡C—, —O—, —CO—, —COO—, or —OCO—, $n^{M1}$ denotes 0, 1, 2, 3, or 4, $A^{M1}$ and $A^{M2}$ independently denote a group selected from the group consisting of (a) a 1,4-cyclohexylene group (in which one —$CH_2$— or two or more nonadjacent —$CH_2$— groups are optionally substituted with —O— or —S—), and (b) a 1,4-phenylene group (in which one —CH═ or two or more nonadjacent —CH═ groups are optionally substituted with —N═), a hydrogen atom in the group (a) and the group (b) is independently optionally substituted with a cyano group, a fluorine atom, or a chlorine atom, $Z^{M1}$ and $Z^{M2}$ independently denote a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{M1}$ is 2, 3, or 4, a plurality of $A^{M2}$s may be the same or different, and if $n^{M1}$ is 2, 3, or 4, a plurality of $Z^{M1}$s may be the same or different, $X^{M1}$ and $X^{M3}$ independently denote a hydrogen atom, a chlorine atom, or a fluorine atom, and $X^{M2}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.)

In the general formula (M), $R^{M1}$ preferably denotes an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, still more preferably an alkyl group having 2 to 5 carbon atoms or an alkenyl group having 2 or 3 carbon atoms, particularly preferably an alkenyl group having 3 carbon atoms (a propenyl group).

$R^{M1}$ preferably denotes an alkyl group when reliability is regarded as important or an alkenyl group when lower viscosity is regarded as important.

If the ring structure to which it is bonded is a phenyl group (aromatic), then a linear alkyl group having 1 to 5 carbon atoms, a linear alkoxy group having 1 to 4 carbon atoms, and an alkenyl group having 4 or 5 carbon atoms are preferred. If the ring structure to which it is bonded is a saturated ring structure, such as cyclohexane, pyran, or dioxane, then a linear alkyl group having 1 to 5 carbon atoms, a linear alkoxy group having 1 to 4 carbon atoms, and a linear alkenyl group having 2 to 5 carbon atoms are preferred. To stabilize the nematic phase, the total number of carbon atoms and, if present, oxygen atoms is preferably 5 or less, and a straight chain is preferred.

The alkenyl group is preferably selected from the groups represented by the formulae (R1) to (R5). (The dark dot in each formula represents a carbon atom in the ring structure to which the alkenyl group is bonded.)

[Chem. 59]

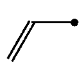
(R1)

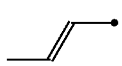
(R2)

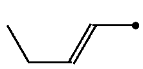
(R3)

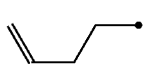
(R4)

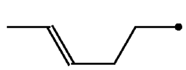
(R5)

$A^{M1}$ and $A^{M2}$ preferably independently denote an aromatic when an increase in Δn is desired, an aliphatic to improve the response speed, or a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably one of the following structures,

[Chem. 60]

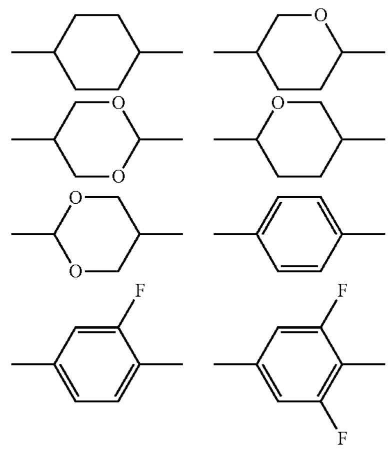

more preferably one of the following structures.

[Chem. 61]

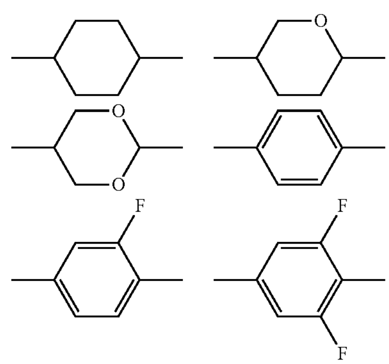

$Z^{M1}$ and $Z^{M2}$ preferably independently denote —$CH_2O$—, —$CF_2O$—, —$CH_2CH_2$—, —$CF_2CF_2$—, or a single bond, more preferably —$CF_2O$—, —$CH_2CH_2$—, or a single bond, particularly preferably —$CF_2O$— or a single bond.

$n^{M1}$ is preferably 0, 1, 2, or 3, preferably 0, 1, or 2, preferably 0 or 1 when improved Δε is regarded as important, preferably 1 or 2 when $T_{NI}$ is regarded as important.

Although compounds of any types may be combined, these compounds are combined in a manner that depends on the desired characteristics, such as solubility at low temperatures, transition temperature, electrical reliability, and birefringence index. For example, one, two, or three compounds are used in one embodiment of the present invention. Alternatively, four, five, six, seven, or more compounds are used in another embodiment of the present invention.

The amount of a compound represented by the general formula (M) in the liquid crystal composition (B) for use in the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (M) is 1% by mass, 10% by mass, 20% by mass, 30% by mass, 40% by mass, 50% by mass, 55% by mass, 60% by mass, 65% by mass, 70% by mass, 75% by mass, or 80% by mass of the total amount of the liquid crystal composition (B) for use in the present invention. For example, in one embodiment of the present invention, the upper limit of the preferred amount is 95% by mass, 85% by mass, 75% by mass, 65% by mass, 55% by mass, 45% by mass, 35% by mass, or 25% by mass of the total amount of the liquid crystal composition (B) for use in the present invention.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

A compound represented by the general formula (M) is preferably a compound selected from the compound group represented by the general formula (M-1), for example.

[Chem. 62]

(M-1)

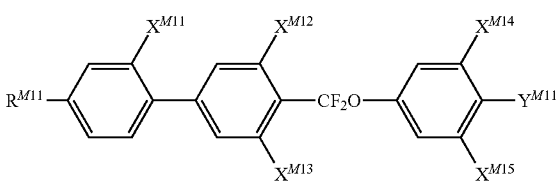

(wherein $R^{M11}$ denotes an alkyl group having 1 to 5 carbon atoms, an alkenyl group having 2 to 5 carbon atoms, or an alkoxy group having 1 to 4 carbon atoms, $X^{M11}$ to $X^{M15}$ independently denote a hydrogen atom or a fluorine atom, and $Y^{M11}$ denotes a fluorine atom or $OCF_3$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (M-1) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-1) is preferably a compound represented by one of the formulae (M-1.1) to (M-1.4), preferably a compound represented by the formula (M-1.1) or (M-1.2), more preferably the compound represented by the formula (M-1.2). Compounds represented by the formula (M-1.1) and (M-1.2) are also preferably used simultaneously.

[Chem. 63]

(M-1.1)

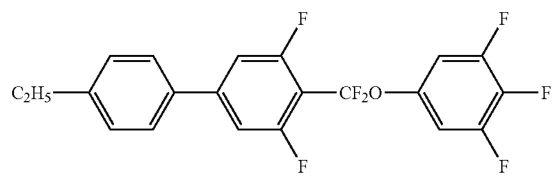

(M-1.2)

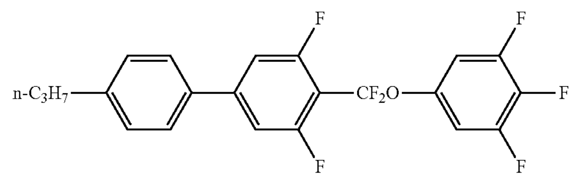

(M-1.3)

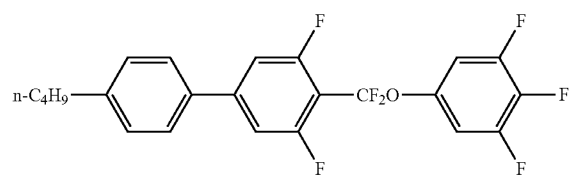

(M-1.4)

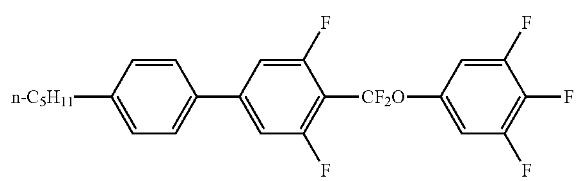

The lower limit of the preferred amount of the compound represented by the formula (M-1.1) is 1% by mass, 2% by mass, 5% by mass, or 6% by mass of the total amount of the liquid crystal composition (B) for use in the present invention. The upper limit of the preferred amount is 15% by mass, 13% by mass, 10% by mass, 8% by mass, or 5% by mass.

The lower limit of the preferred amount of the compound represented by the formula (M-1.2) is 1% by mass, 2% by mass, 5% by mass, or 6% by mass of the total amount of the liquid crystal composition (B) for use in the present invention. The upper limit of the preferred amount is 30% by mass, 25% by mass, 23% by mass, 20% by mass, 18% by mass, 15% by mass, 13% by mass, 10% by mass, or 8% by mass.

The lower limit of the preferred total amount of the compounds represented by the formulae (M-1.1) and (M-1.2) is 1% by mass, 2% by mass, 5% by mass, or 6% by mass of the total amount of the liquid crystal composition (B) for use in the present invention. The upper limit of the preferred amount is 30% by mass, 25% by mass, 23% by mass, 20% by mass, 18% by mass, 15% by mass, 13% by mass, 10% by mass, or 8% by mass.

A compound represented by the general formula (M) is preferably a compound selected from the compound group represented by the general formula (M-2), for example.

[Chem. 64]

(M-2)

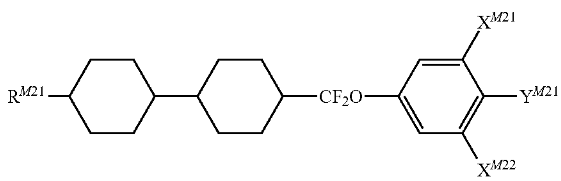

(wherein $R^{M21}$ denotes an alkyl group having 1 to 5 carbon atoms, an alkenyl group having 2 to 5 carbon atoms, or an alkoxy group having 1 to 4 carbon atoms, $X^{M21}$ and $X^{M22}$ independently denote a hydrogen atom or a fluorine atom, and $Y^{M21}$ denotes a fluorine atom, a chlorine atom, or $OCF_3$)

The lower limit of the preferred amount of a compound represented by the formula (M-1) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and needs to be resistant to image-sticking, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

A compound represented by the general formula (M-2) is preferably a compound represented by one of the formulae (M-2.1) to (M-2.5), preferably the compound represented by the formula (M-2.3) or/and the compound represented by the formula (M-2.5).

[Chem. 65]

(M-2.1)

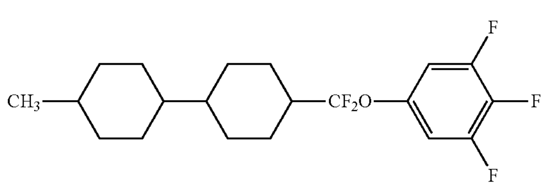

-continued (M-2.2)

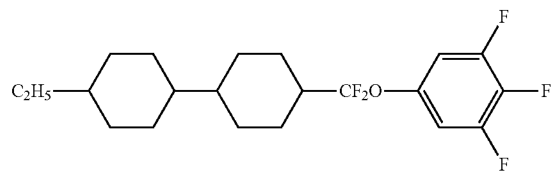

(M-2.3)

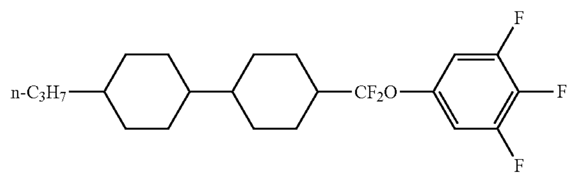

(M-2.4)

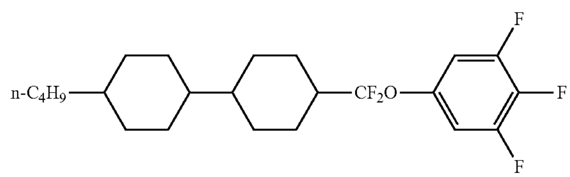

(M-2.5)

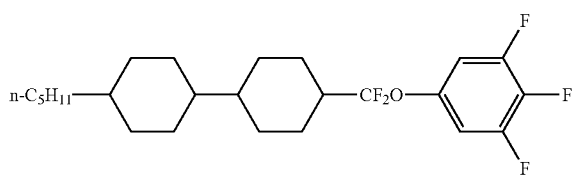

The lower limit of the preferred amount of the compound represented by the formula (M-2.2) is 1% by mass, 2% by mass, 5% by mass, or 6% by mass of the total amount of the liquid crystal composition (B) for use in the present invention. The upper limit of the preferred amount is 15% by mass, 13% by mass, 10% by mass, 8% by mass, or 5% by mass.

The lower limit of the preferred amount of the compound represented by the formula (M-2.3) is 1% by mass, 2% by mass, 5% by mass, or 6% by mass of the total amount of the liquid crystal composition (B) for use in the present invention. The upper limit of the preferred amount is 30% by mass, 25% by mass, 23% by mass, 20% by mass, 18% by mass, 15% by mass, 13% by mass, 10% by mass, or 8% by mass.

The lower limit of the preferred amount of the compound represented by the formula (M-2.5) is 1% by mass, 2% by mass, 5% by mass, or 6% by mass of the total amount of the liquid crystal composition (B) for use in the present invention. The upper limit of the preferred amount is 30% by mass, 25% by mass, 23% by mass, 20% by mass, 18% by mass, 15% by mass, 13% by mass, 10% by mass, or 8% by mass.

The lower limit of the preferred total amount of the compounds represented by the formulae (M-2.2), (M-2.3), and (M-2.5) is 1% by mass, 2% by mass, 5% by mass, or 6% by mass of the total amount of the liquid crystal composition (B) for use in the present invention. The upper limit of the preferred amount is 30% by mass, 25% by mass, 23% by mass, 20% by mass, 18% by mass, 15% by mass, 13% by mass, 10% by mass, or 8% by mass.

The amount is preferably 1% or more by mass, more preferably 5% or more by mass, still more preferably 8% or more by mass, still more preferably 10% or more by mass, still more preferably 14% or more by mass, particularly preferably 16% or more by mass, of the total amount of the liquid crystal composition (B) for use in the present invention. Considering solubility at low temperatures, transition temperature, electrical reliability, etc., the maximum amount is preferably 30% or less by mass, more preferably 25% or less by mass, still more preferably 22% or less by mass, particularly preferably less than 20% by mass.

A compound represented by the general formula (M) used in the liquid crystal composition (B) for use in the present invention is preferably a compound represented by the general formula (M-3).

[Chem. 66]

(M-3)

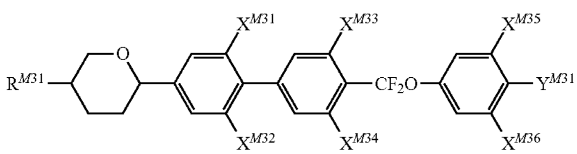

(wherein $R^{M31}$ denotes an alkyl group having 1 to 5 carbon atoms, an alkenyl group having 2 to 5 carbon atoms, or an alkoxy group having 1 to 4 carbon atoms, $X^{M31}$ to $X^{M36}$ independently denote a hydrogen atom or a fluorine atom, and $Y^{M31}$ denotes a fluorine atom, a chlorine atom, or $OCF_3$)

Although any compounds may be combined, one or two or more compounds are preferably combined in consideration of solubility at low temperatures, transition temperature, electrical reliability, and birefringence index.

The amount of a compound represented by the general formula (M-3) has the upper limit and the lower limit in each embodiment in consideration of characteristics such as solubility at low temperatures, transition temperature, electrical reliability, and birefringence index.

The lower limit of the preferred amount of a compound represented by the formula (M-3) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 20% by mass, 18% by mass, 15% by mass, 13% by mass, 10% by mass, 8% by mass, or 5% by mass.

More specifically, a compound represented by the general formula (M-3) used in the liquid crystal composition (B) for use in the present invention is preferably a compound represented by one of the formulae (M-3.1) to (M-3.8) and particularly preferably includes the compound represented by the formula (M-3.1) and/or the compound represented by the formula (M-3.2).

[Chem. 67]

(M-3.1)

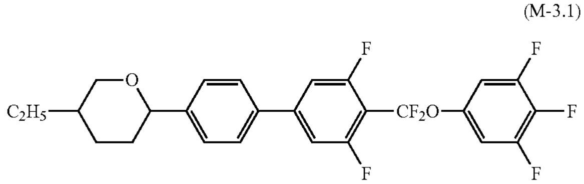

-continued (M-3.2)

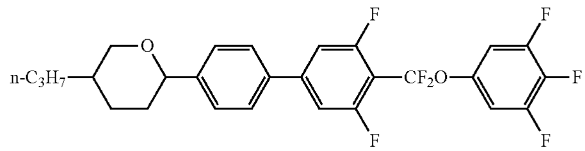

(M-3.3)

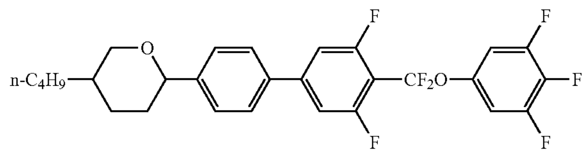

(M-3.4)

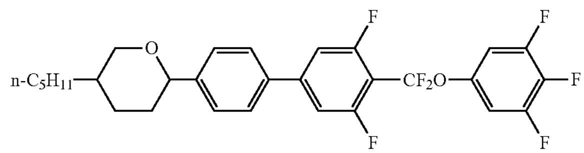

(M-3.5)

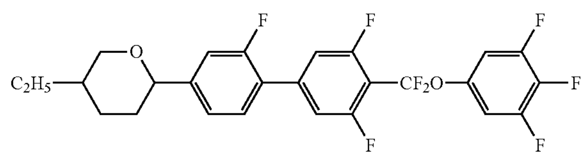

(M-3.6)

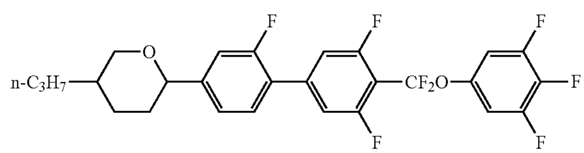

(M-3.7)

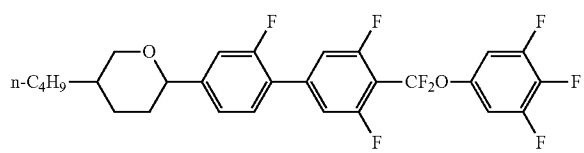

(M-3.8)

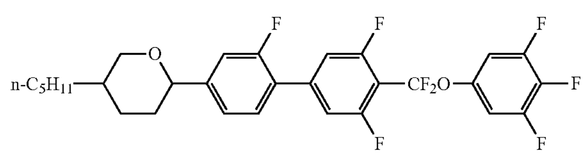

The lower limit of the preferred amount of the compound represented by the formula (M-3.1) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 20% by mass, 18% by mass, 15% by mass, 13% by mass, 10% by mass, 8% by mass, or 5% by mass.

The lower limit of the preferred amount of the compound represented by the formula (M-3.2) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 20% by mass, 18% by mass, 15% by mass, 13% by mass, 10% by mass, 8% by mass, or 5% by mass.

The lower limit of the preferred total amount of the compounds represented by the formulae (M-3.1) and (M-3.2) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 20% by mass, 18% by mass, 15% by mass, 13% by mass, 10% by mass, 8% by mass, or 5% by mass.

A compound represented by the general formula (M) is preferably a compound selected from the group represented by the general formula (M-4).

[Chem. 68]

(M-4)

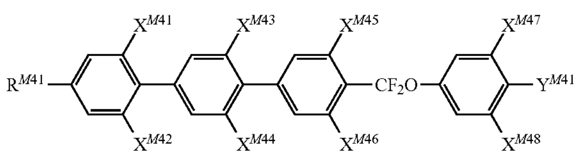

(wherein $R^{M41}$ denotes an alkyl group having 1 to 5 carbon atoms, an alkenyl group having 2 to 5 carbon atoms, or an alkoxy group having 1 to 4 carbon atoms, $X^{M41}$ to $X^{M48}$ independently denote a fluorine atom or a hydrogen atom, and $Y^{M41}$ denotes a fluorine atom, a chlorine atom, or $OCF_3$)

Although any compounds may be combined, one, two, three, or more compounds are preferably combined in consideration of solubility at low temperatures, transition temperature, electrical reliability, birefringence index, etc.

The amount of a compound represented by the general formula (M-4) has the upper limit and the lower limit in each embodiment in consideration of characteristics such as solubility at low temperatures, transition temperature, electrical reliability, and birefringence index.

The lower limit of the preferred amount of a compound represented by the formula (M-4) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention is used in a liquid crystal display device with a small cell gap, an increased amount of compound represented by the general formula (M-4) is suitable. When the liquid crystal composition (B) for use in the present invention is used in a liquid crystal display device with a low drive voltage, an increased amount of compound represented by the general formula (M-4) is suitable. When the liquid crystal composition (B) for use in the present invention is used in a liquid crystal display device used in low-temperature environments, a decreased amount of compound represented by the general formula (M-4) is suitable. For a composition for use in a liquid crystal display device with a high response speed, a decreased amount of compound represented by the general formula (M-4) is suitable.

More specifically, a compound represented by the general formula (M-4) used in the liquid crystal composition (B) for use in the present invention is preferably a compound represented by one of the formulae (M-4.1) to (M-4.4) and preferably includes a compound represented by one of the formulae (M-4.2) to (M-4.4), more preferably the compound represented by the formula (M-4.2).

[Chem. 69]

(M-4.1)

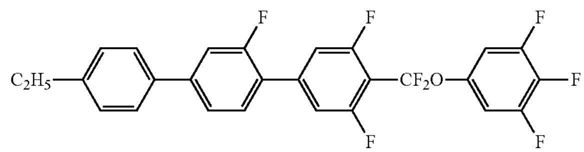

(M-4.2)

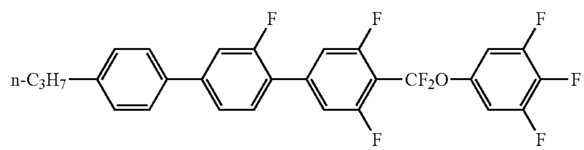

(M-4.3)

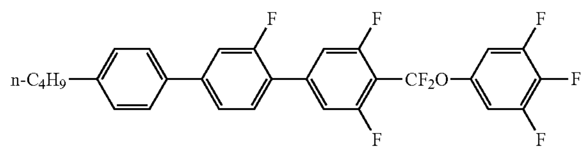

(M-4.4)

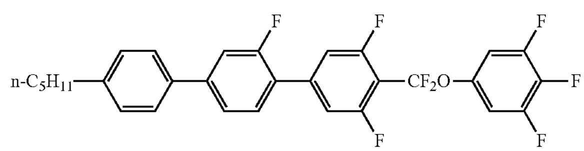

A compound represented by the general formula (M) is preferably a compound represented by the general formula (M-5).

[Chem. 70]

(M-5)

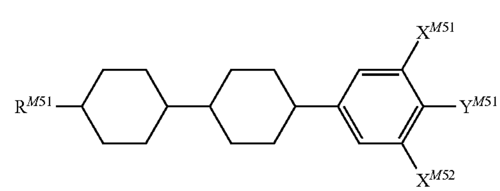

(wherein $R^{M51}$ denotes an alkyl group having 1 to 5 carbon atoms, an alkenyl group having 2 to 5 carbon atoms, or an alkoxy group having 1 to 4 carbon atoms, $X^{M51}$ and $X^{M52}$ independently denote a hydrogen atom or a fluorine atom, and $Y^{M51}$ denotes a fluorine atom, a chlorine atom, or $OCF_3$)

Although compounds of any types may be combined, compounds are appropriately combined in each embodiment in consideration of solubility at low temperatures, transition temperature, electrical reliability, birefringence index, etc. For example, one compound is used in one embodiment of the present invention, two compounds are combined in another embodiment, three compounds are combined in still another embodiment, four compounds are combined in still another embodiment, five compounds are combined in still another embodiment, and at least six compounds are combined in still another embodiment.

The lower limit of the preferred amount of a compound represented by the formula (M-5) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 50% by mass, 45% by mass, 40% by mass, 35% by mass, 33% by mass, 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and needs to be resistant to image-sticking, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

A compound represented by the general formula (M-5) is preferably a compound represented by one of the formulae (M-5.1) to (M-5.4).

[Chem. 71]

(M-5.1)

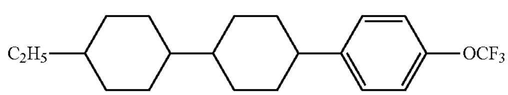

(M-5.2)

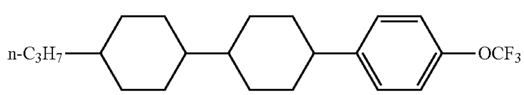

(M-5.3)

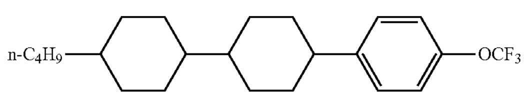

(M-5.4)

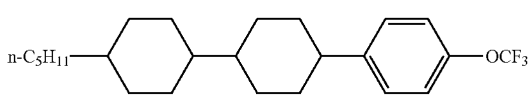

The lower limit of the preferred amount of these compounds is 1% by mass, 2% by mass, 5% by mass, 8% by mass, 10% by mass, 13% by mass, or 15% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-5) is preferably a compound represented by one of the formulae (M-5.11) to (M-5.17), preferably a compound represented by the formula (M-5.11), (M-5.13), or (M-5.17).

[Chem. 72]

(M-5.11)

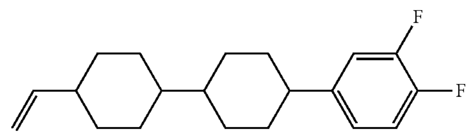

(M-5.12)

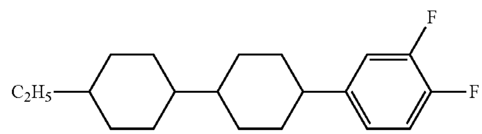

(M-5.13)

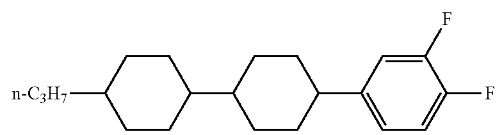

(M-5.14)

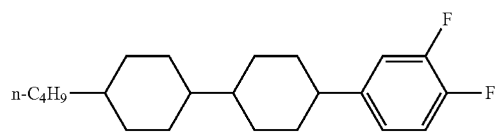

(M-5.15)

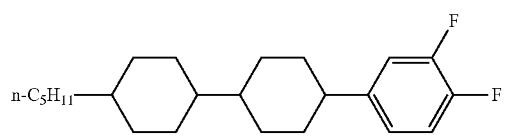

(M-5.16)

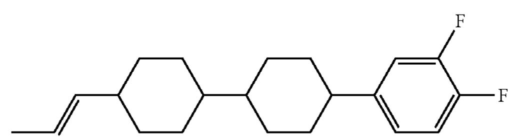

(M-5.17)

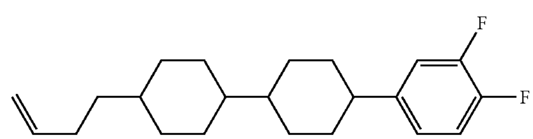

The lower limit of the preferred amount of these compounds is 1% by mass, 2% by mass, 5% by mass, 8% by mass, 10% by mass, 13% by mass, or 15% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-5) is preferably a compound represented by one of the formulae (M-5.21) to (M-5.28), preferably a compound represented by the formula (M-5.21), (M-5.22), (M-5.23), or (M-5.25).

[Chem. 73]

(M-5.21)

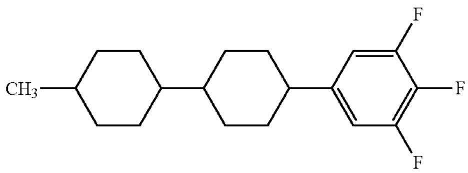

(M-5.22)

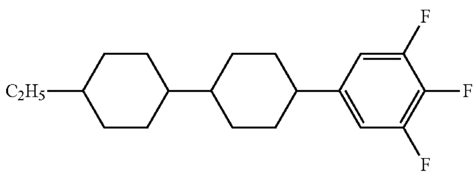

(M-5.23)

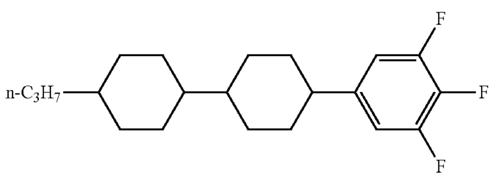

(M-5.24)

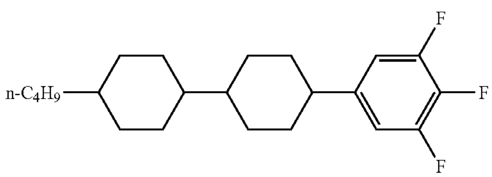

(M-5.25)

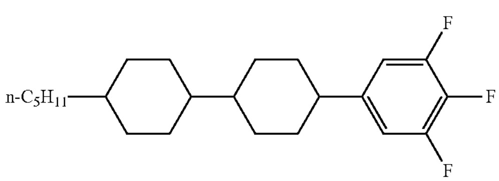

(M-5.26)

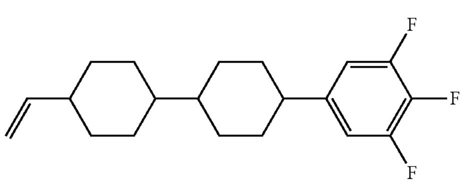

(M-5.27)

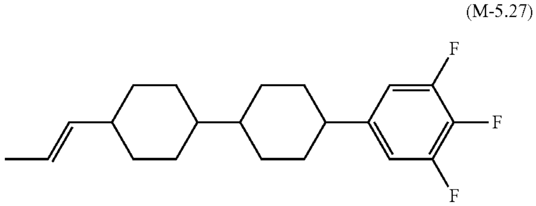

-continued (M-5.28)

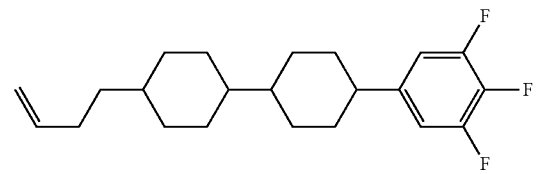

The lower limit of the preferred amount of these compounds is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 40% by mass, 35% by mass, 33% by mass, 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M) is preferably a compound represented by the general formula (M-6).

[Chem. 74]

(M-6)

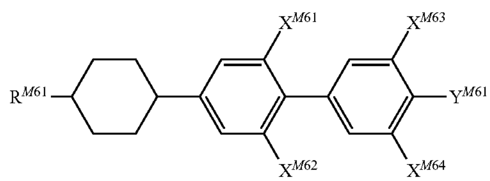

(wherein $R^{M61}$ denotes an alkyl group having 1 to 5 carbon atoms, an alkenyl group having 2 to 5 carbon atoms, or an alkoxy group having 1 to 4 carbon atoms, $X^{M61}$ to $X^{M64}$ independently denote a fluorine atom or a hydrogen atom, and $Y^{M61}$ denotes a fluorine atom, a chlorine atom, or $OCF_3$)

Although compounds of any types may be combined, compounds are appropriately combined in each embodiment in consideration of solubility at low temperatures, transition temperature, electrical reliability, birefringence index, etc.

The lower limit of the preferred amount of a compound represented by the formula (M-6) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention is used in a liquid crystal display device with a low drive voltage, an increased amount of compound represented by the general formula (M-6) is suitable. For a composition for use in a liquid crystal display device with a high response speed, a decreased amount of a compound represented by the general formula (M-6) is suitable.

More specifically, a compound represented by the general formula (M-6) is preferably a compound represented by one of the formulae (M-6.1) to (M-6.4) and particularly preferably includes a compound represented by the formula (M-6.2) or (M-6.4).

[Chem. 75]

(M-6.1)

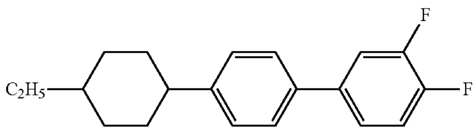

(M-6.2)

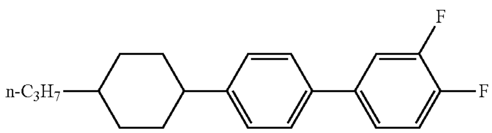

(M-6.3)

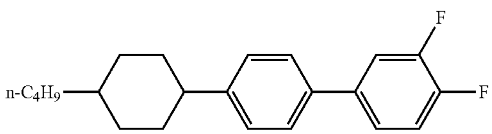

(M-6.4)

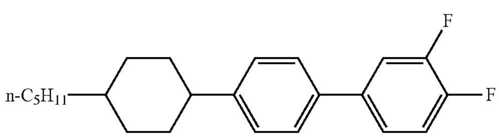

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-6) is preferably a compound represented by one of the formulae (M-6.11) to (M-6.14) and particularly preferably includes a compound represented by the formula (M-6.12) or (M-6.14).

[Chem. 76]

(M-6.11)

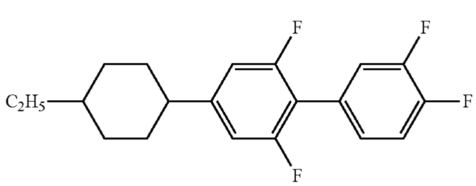

(M-6.12)

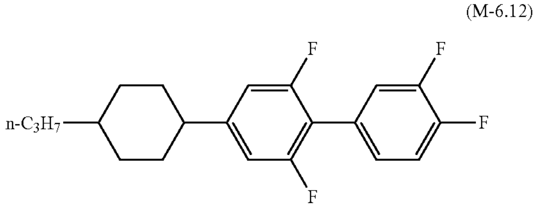

-continued (M-6.13)

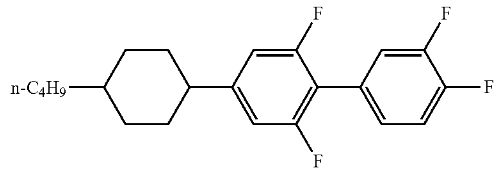

(M-6.14)

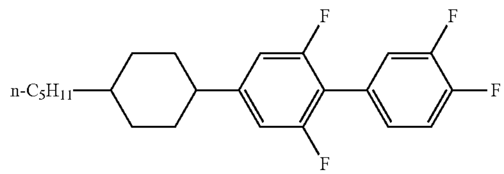

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-6) is preferably a compound represented by one of the formulae (M-6.21) to (M-6.24) and particularly preferably includes a compound represented by the formula (M-6.21), (M-6.22), or (M-6.24).

[Chem. 77]

(M-6.21)

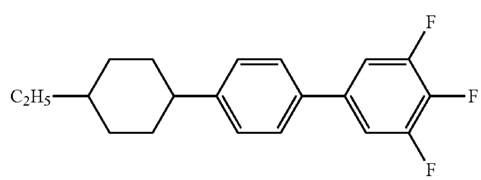

(M-6.22)

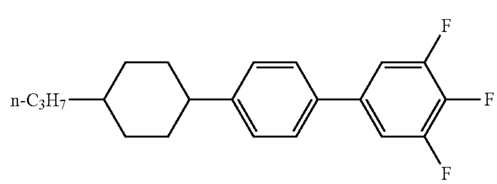

(M-6.23)

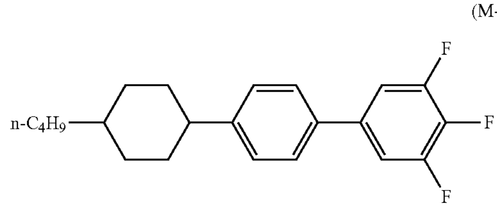

-continued (M-6.24)

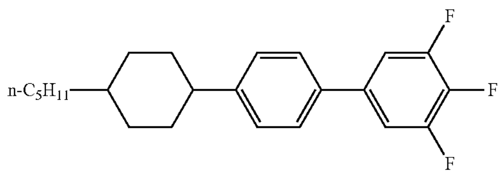

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-6) is preferably a compound represented by one of the formulae (M-6.31) to (M-6.34). Among them, the compounds represented by the formulae (M-6.31) and (M-6.32) are preferably included.

[Chem. 78]

(M-6.31)

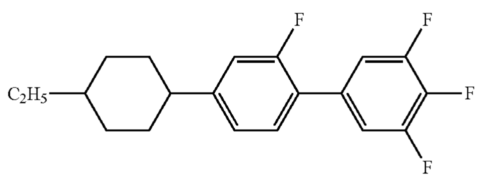

(M-6.32)

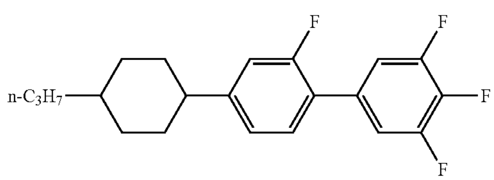

(M-6.33)

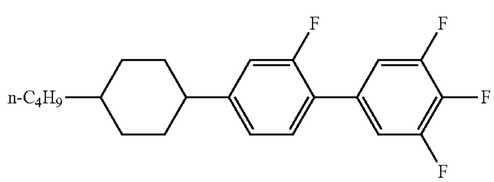

(M-6.34)

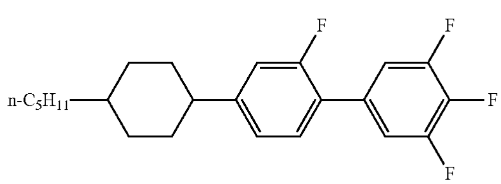

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-6) is preferably a compound represented by one of the formulae (M-6.41) to (M-6.44) and particularly preferably includes the compound represented by the formula (M-6.42).

[Chem. 79]

(M-6.41)

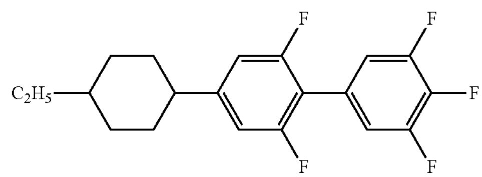

(M-6.42)

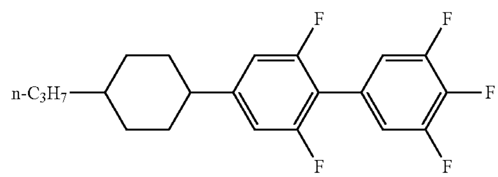

(M-6.43)

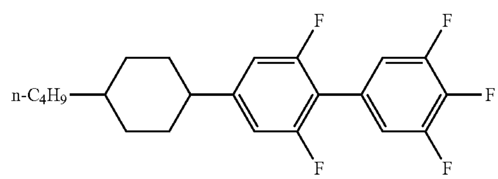

(M-6.44)

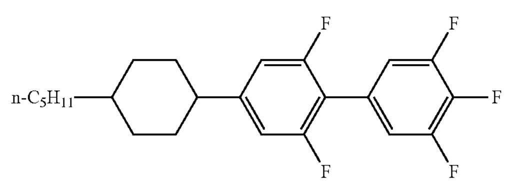

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M) is preferably a compound selected from the compound group represented by the general formula (M-7).

[Chem. 80]

(M-7)

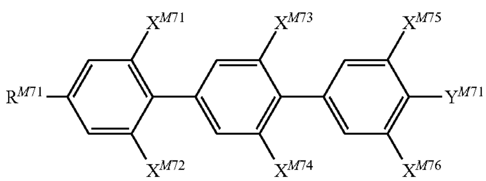

(wherein $X^{M71}$ to $X^{M76}$ independently denote a fluorine atom or a hydrogen atom, $R^{M71}$ denotes an alkyl group having 1 to 5 carbon atoms, an alkenyl group having 2 to 5 carbon atoms, or an alkoxy group having 1 to 4 carbon atoms, and $Y^{M71}$ denotes a fluorine atom or $OCF_3$)

Although compounds of any types may be combined, one or two of these compounds are preferably contained, one to three of these compounds are more preferably contained, and one to four of these compounds are still more preferably contained.

The amount of a compound represented by the general formula (M-7) has the upper limit and the lower limit in each embodiment in consideration of characteristics such as solubility at low temperatures, transition temperature, electrical reliability, and birefringence index.

The lower limit of the preferred amount of a compound represented by the formula (M-7) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention is used in a liquid crystal display device with a small cell gap, an increased amount of compound represented by the general formula (M-7) is suitable. When the liquid crystal composition (B) for use in the present invention is used in a liquid crystal display device with a low drive voltage, an increased amount of compound represented by the general formula (M-7) is suitable. When the liquid crystal composition (B) for use in the present invention is used in a liquid crystal display device used in low-temperature environments, a decreased amount of compound represented by the general formula (M-7) is suitable. For a composition for use in a liquid crystal display device with a high response speed, a decreased amount of compound represented by the general formula (M-7) is suitable.

A compound represented by the general formula (M-7) is preferably a compound represented by one of the formulae (M-7.1) to (M-7.4), preferably the compound represented by the formula (M-7.2).

[Chem. 81]

(M-7.1)

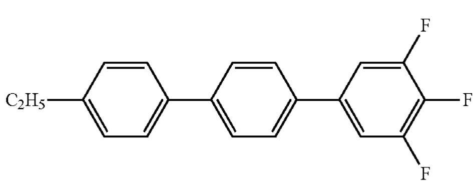

-continued (M-7.2)

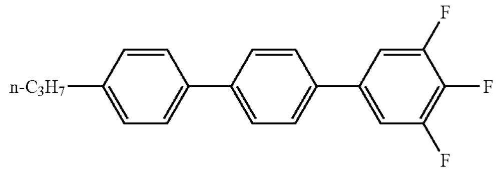

(M-7.3)

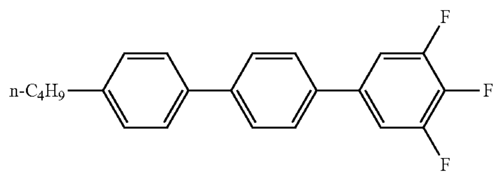

(M-7.4)

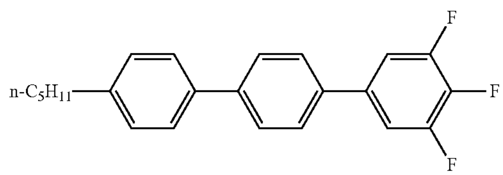

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-7) is preferably a compound represented by one of the formulae (M-7.11) to (M-7.14), preferably a compound represented by the formula (M-7.11) or (M-7.12).

[Chem. 82]

(M-7.11)

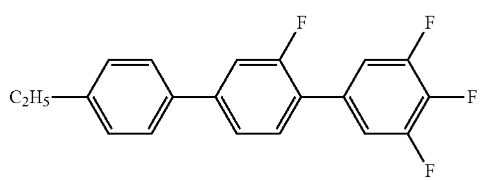

(M-7.12)

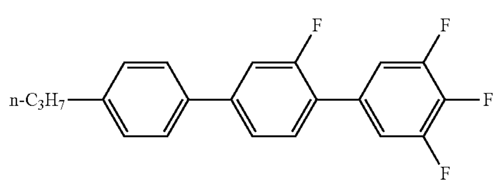

(M-7.13)

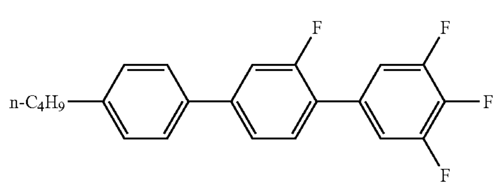

-continued (M-7.14)

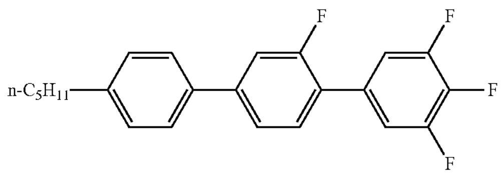

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-7) is preferably a compound represented by one of the formulae (M-7.21) to (M-7.24), preferably a compound represented by the formula (M-7.21) or (M-7.22).

[Chem. 83]

(M-7.21)

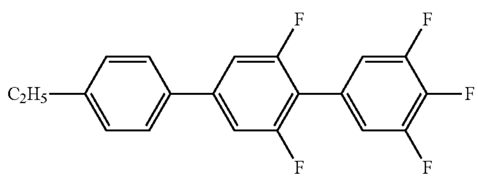

(M-7.22)

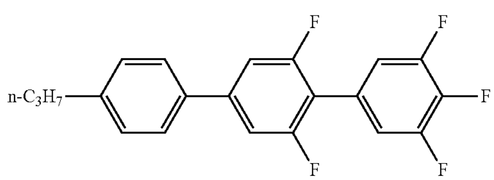

(M-7.23)

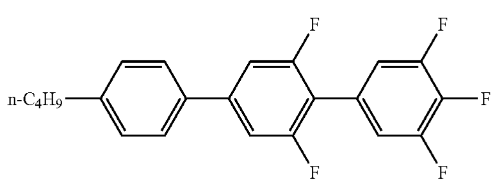

(M-7.24)

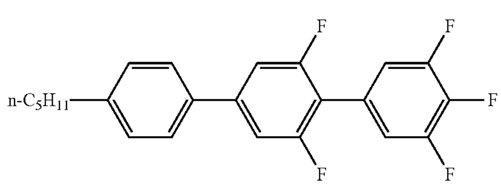

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M) is preferably a compound represented by the general formula (M-8).

[Chem. 84]

(M-8)

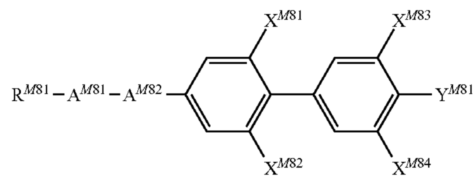

(wherein $X^{M81}$ to $X^{M84}$ independently denote a fluorine atom or a hydrogen atom, $Y^{M81}$ denotes a fluorine atom, a chlorine atom, or —$OCF_3$, $R^{M81}$ denotes an alkyl group having 1 to 5 carbon atoms, an alkenyl group having 2 to 5 carbon atoms, or an alkoxy group having 1 to 4 carbon atoms, $A^{M81}$ and $A^{M82}$ independently denote a 1,4-cyclohexylene group, a 1,4-phenylene group, or

[Chem. 85]

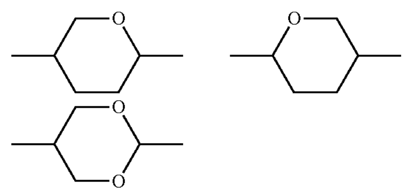

and a hydrogen atom in the 1,4-phenylene group may be substituted with a fluorine atom)

The lower limit of the preferred amount of a compound represented by the general formula (M-8) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-8) used in the liquid crystal composition (B) for use in the present invention is preferably a compound represented by one of the formulae (M-8.1) to (M-8.4) and particularly preferably includes a compound represented by the formula (M-8.1) or (M-8.2).

[Chem. 86]

(M-8.1)

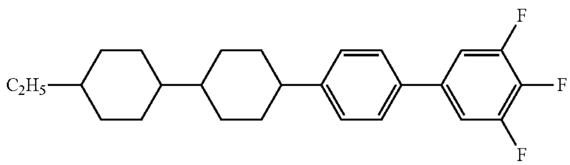

(M-8.2)

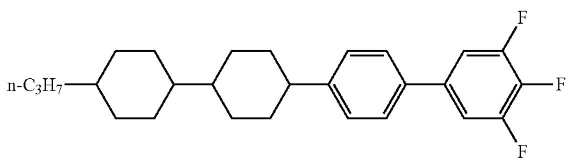

(M-8.3)

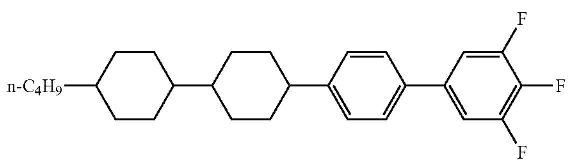

(M-8.4)

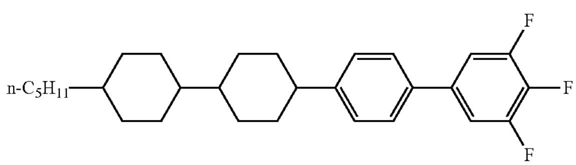

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-8) used in the liquid crystal composition (B) for use in the present invention is preferably a compound represented by one of the formulae (M-8.11) to (M-8.14) and particularly preferably includes the compound represented by the formula (M-8.12).

[Chem. 87]

(M-8.11)

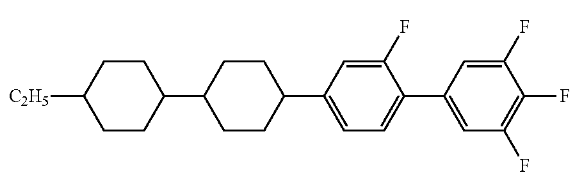

-continued (M-8.12)

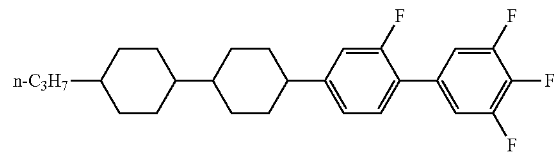

(M-8.13)

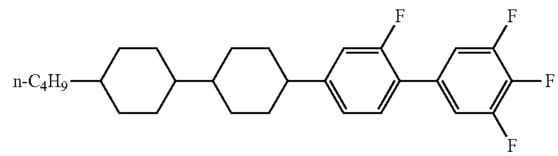

(M-8.14)

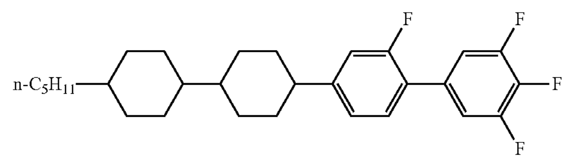

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-8) used in the liquid crystal composition (B) for use in the present invention is preferably a compound represented by one of the formulae (M-8.21) to (M-8.24) and particularly preferably includes the compound represented by the formula (M-8.22).

[Chem. 88]

(M-8.21)

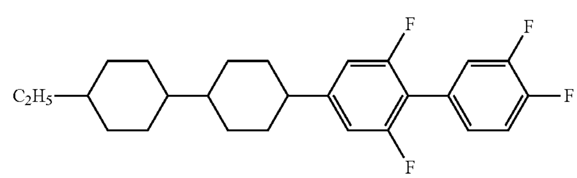

(M-8.22)

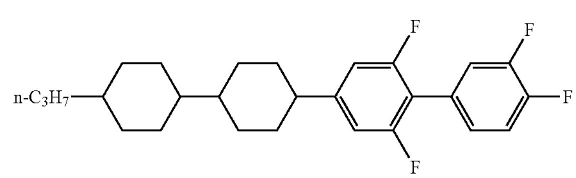

(M-8.23)

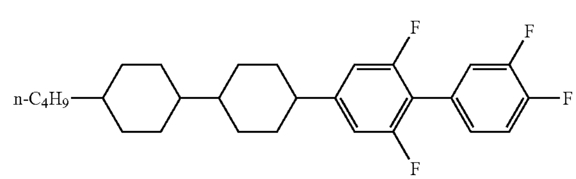

-continued (M-8.24)

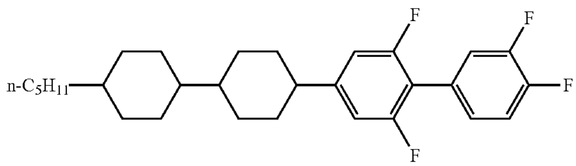

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-8) used in the liquid crystal composition (B) for use in the present invention is preferably a compound represented by one of the formulae (M-8.31) to (M-8.34) and particularly preferably includes the compound represented by the formula (M-8.32).

[Chem. 89]

(M-8.31)

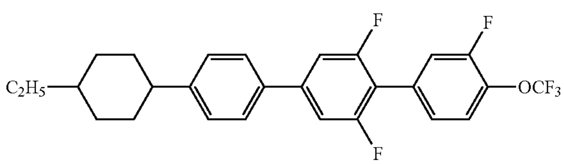

(M-8.32)

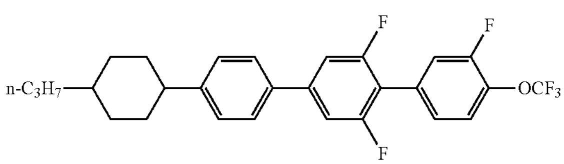

(M-8.33)

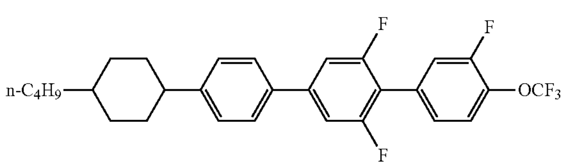

(M-8.34)

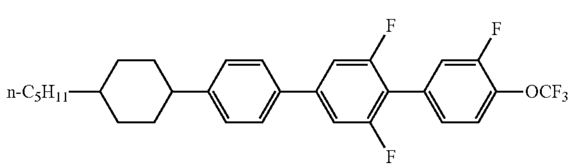

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-8) used in the liquid crystal composition (B) for use in the present invention is preferably a compound represented by one of the formulae (M-8.41) to (M-8.44) and particularly preferably includes the compound represented by the formula (M-8.42).

[Chem. 90]

(M-8.41)

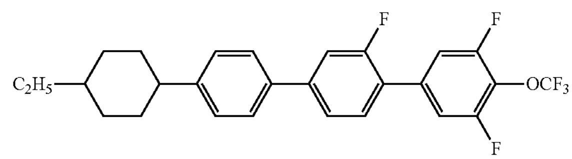

(M-8.42)

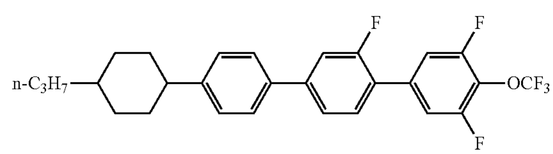

(M-8.43)

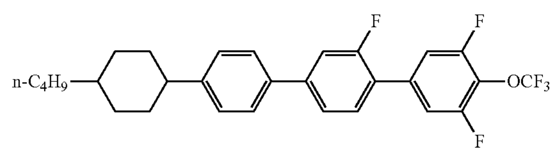

(M-8.44)

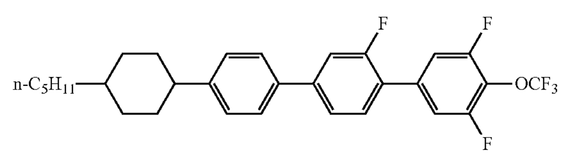

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

More specifically, a compound represented by the general formula (M-8) used in the liquid crystal composition (B) for use in the present invention is preferably a compound represented by one of the formulae (M-8.51) to (M-8.54) and particularly preferably includes the compound represented by the formula (M-8.52).

[Chem. 91]

(M-8.51)

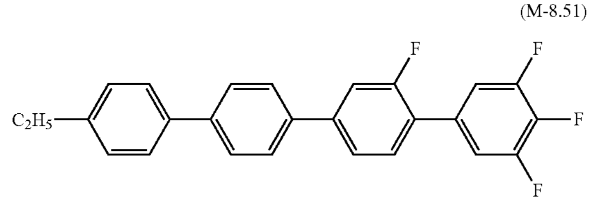

-continued (M-8.52)

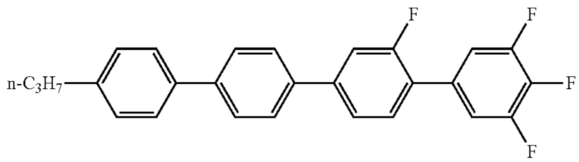

(M-8.53)

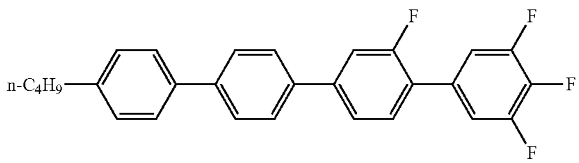

(M-8.54)

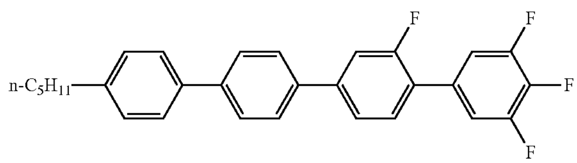

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M) may have the following substructure in its structure.

[Chem. 92]

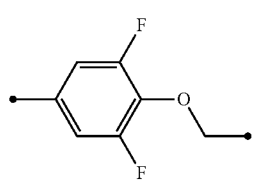

(Each dark dot in the formula represents a carbon atom in the ring structure to which the substructure is bonded.)

A compound having the substructure is preferably a compound represented by one of the general formulae (M-10) to (M-18).

A compound represented by the general formula (M-10) is described below.

[Chem. 93]

(M-10)

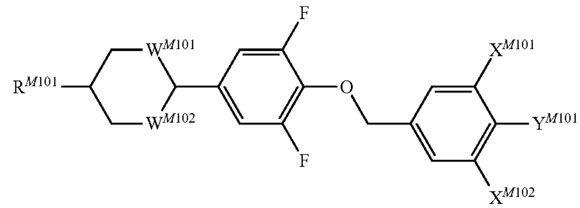

(wherein $X^{M101}$ and $X^{M102}$ independently denote a fluorine atom or a hydrogen atom, $Y^{M101}$ denotes a fluorine atom, a chlorine atom, or —$OCF_3$, $R^{M101}$ denotes an alkyl group having 1 to 5 carbon atoms, an alkenyl group having 2 to 5 carbon atoms, or an alkoxy group having 1 to 4 carbon atoms, and $W^{M101}$ and $W^{M102}$ independently denote —$CH_2$— or —O—)

The lower limit of the preferred amount of a compound represented by the general formula (M-10) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-10) used in the liquid crystal composition (B) for use in the present invention is preferably a compound represented by one of the formulae (M-10.1) to (M-10.12) and particularly preferably includes a compound represented by one of the formulae (M-10.5) to (M-10.12).

[Chem. 94]

(M-10.1)

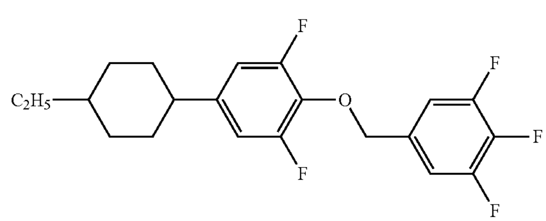

(M-10.2)

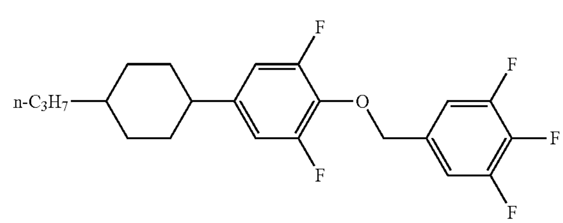

-continued (M-10.3)

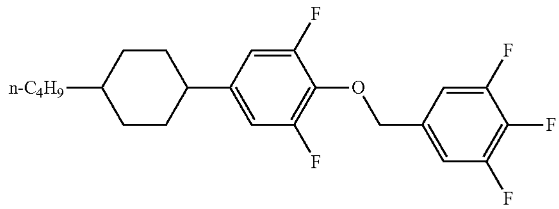

(M-10.4)

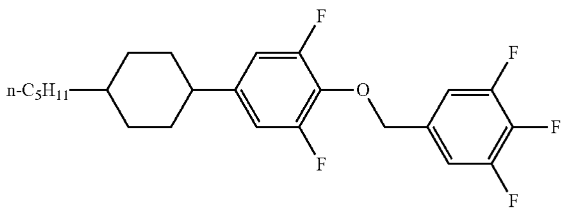

(M-10.5)

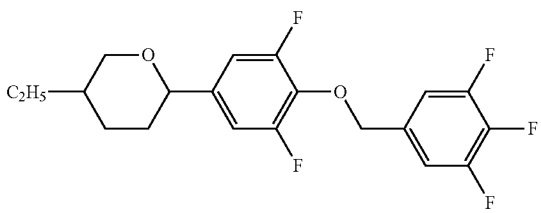

(M-10.6)

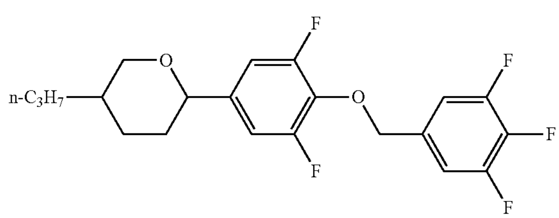

(M-10.7)

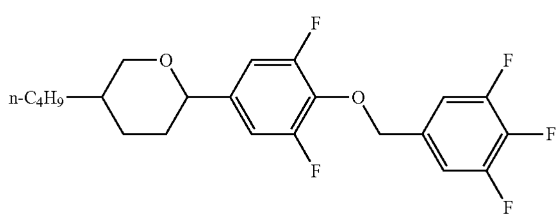

(M-10.8)

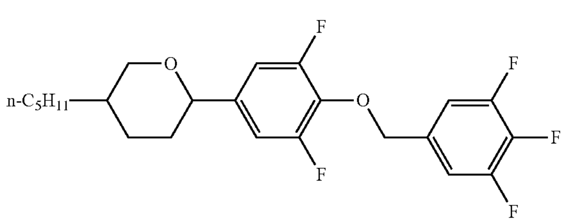

-continued

[Chem. 95]

(M-10.9)

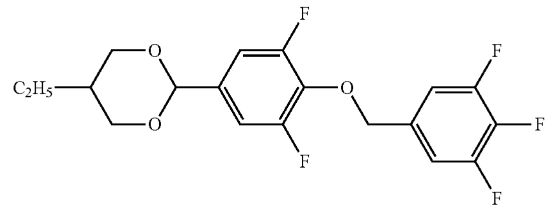

(M-10.10)

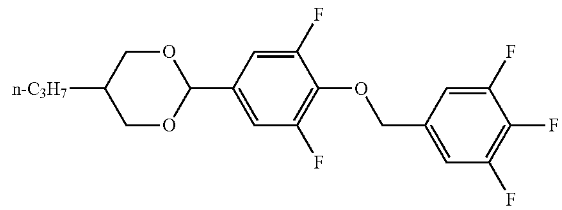

(M-10.11)

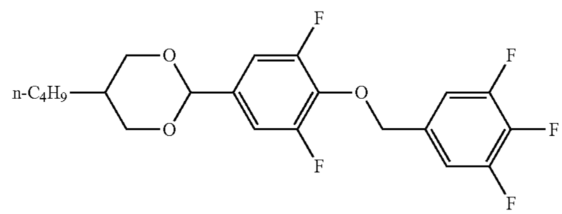

(M-10.12)

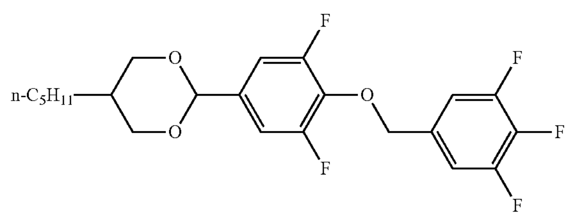

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-11) is described below.

[Chem. 96]

(M-11)

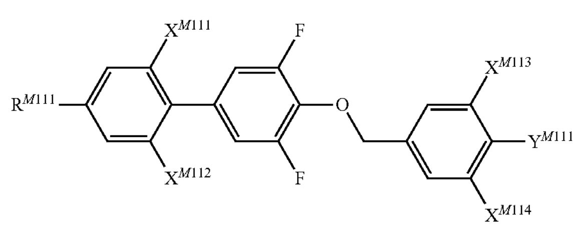

(wherein $X^{M111}$ to $X^{M114}$ independently denote a fluorine atom or a hydrogen atom, $Y^{M111}$ denotes a fluorine atom, a chlorine atom, or —$OCF_3$, and $R^{M111}$ denotes an alkyl group having 1 to 5 carbon atoms, an alkenyl group having 2 to 5 carbon atoms, or an alkoxy group having 1 to 4 carbon atoms)

The lower limit of the preferred amount of a compound represented by the general formula (M-11) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-11) used in the liquid crystal composition (B) for use in the present invention is preferably a compound represented by one of the formulae (M-11.1) to (M-11.8) and particularly preferably includes a compound represented by one of the formulae (M-11.1) to (M-11.4).

[Chem. 97]

(M-11.1)

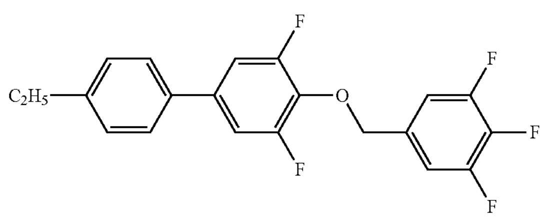

(M-11.2)

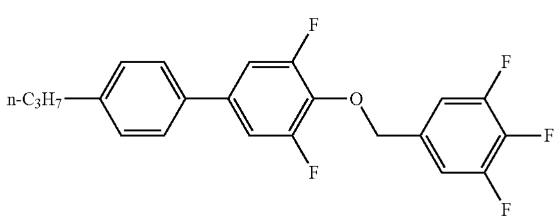

(M-11.3)

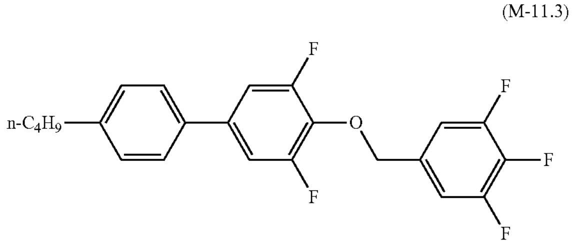

-continued (M-11.4)

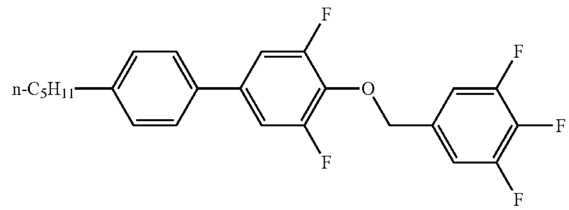

(M-11.5)

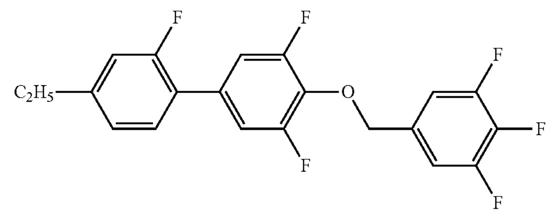

(M-11.6)

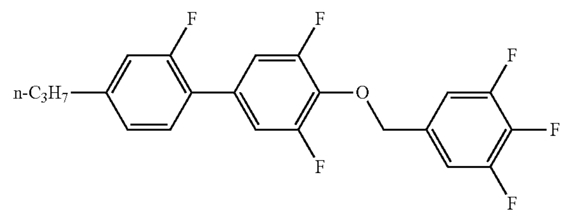

(M-11.7)

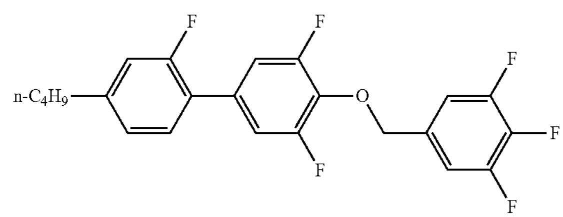

(M-11.8)

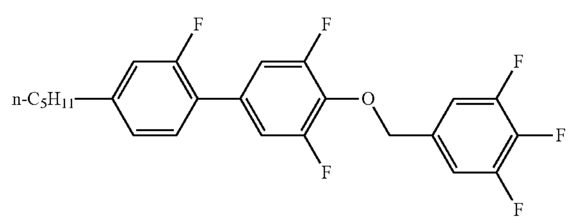

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-12) is described below.

[Chem. 98]

(M-12)

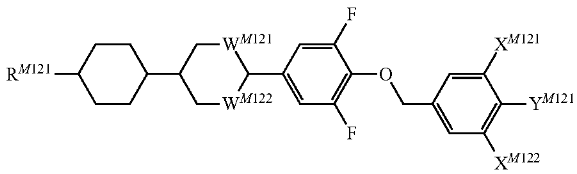

(wherein $X^{M121}$ and $X^{M122}$ independently denote a fluorine atom or a hydrogen atom, $Y^{M121}$ denotes a fluorine atom, a chlorine atom, or —$OCF_3$, $R^{M121}$ denotes an alkyl group having 1 to 5 carbon atoms, an alkenyl group having 2 to 5 carbon atoms, or an alkoxy group having 1 to 4 carbon atoms, and $W^{M121}$ and $W^{M122}$ independently denote —$CH_2$— or —O—)

The lower limit of the preferred amount of a compound represented by the general formula (M-12) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-12) used in the liquid crystal composition (B) for use in the present invention is preferably a compound represented by one of the formulae (M-12.1) to (M-12.12) and particularly preferably includes a compound represented by one of the formulae (M-12.5) to (M-12.8).

[Chem. 99]

(M-12.1)

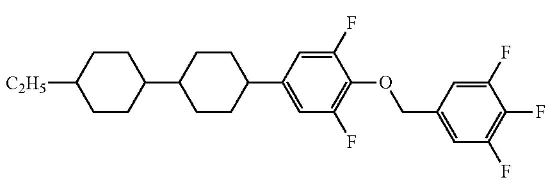

(M-12.2)

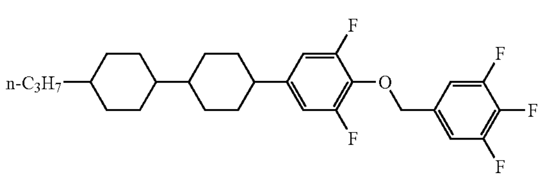

-continued (M-12.3)

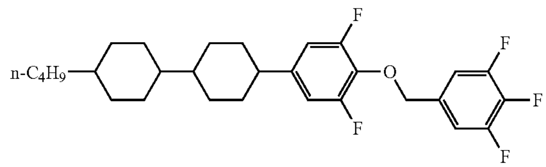

(M-12.4)

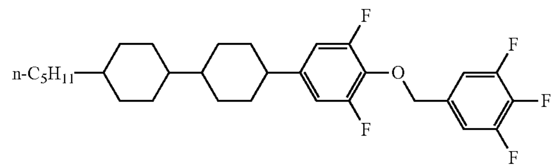

(M-12.5)

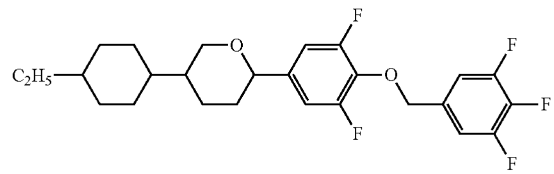

(M-12.6)

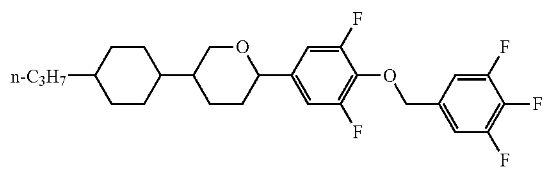

(M-12.7)

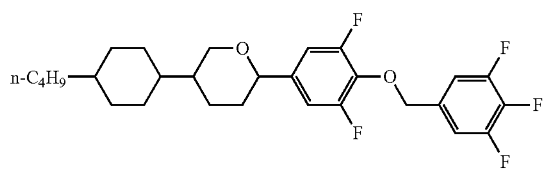

(M-12.8)

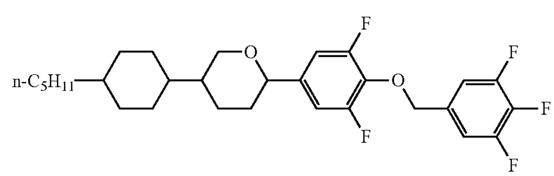

[Chem. 100]

(M-12.9)

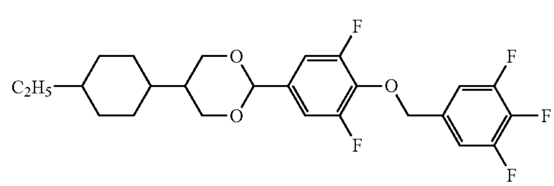

(M-12.10)

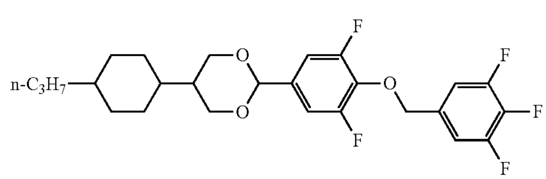

-continued (M-12.11)

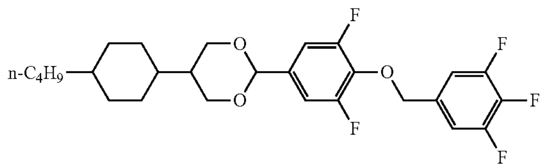

(M-12.12)

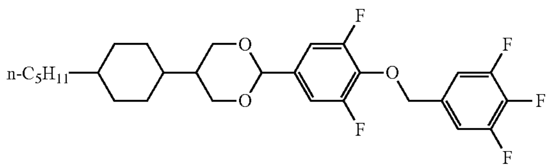

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-13) is described below.

[Chem. 101]

(M-13)

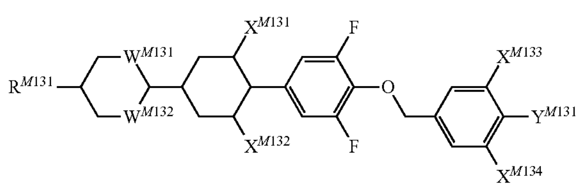

(wherein $X^{M131}$ to $X^{M134}$ independently denote a fluorine atom or a hydrogen atom, $Y^{M131}$ denotes a fluorine atom, a chlorine atom, or —$OCF_3$, $R^{M131}$ denotes an alkyl group having 1 to 5 carbon atoms, an alkenyl group having 2 to 5 carbon atoms, or an alkoxy group having 1 to 4 carbon atoms, and $W^{M131}$ and $W^{M132}$ independently denote —$CH_2$— or —O—)

The lower limit of the preferred amount of a compound represented by the general formula (M-13) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-13) used in the liquid crystal composition (B) for use in the present invention is preferably a compound represented by one of the formulae (M-13.1) to (M-13.28) and particularly preferably includes a compound represented by one of the formulae (M-13.1) to (M-13.4), (M-13.11) to (M-13.14), and (M-13.25) to (M-13.28).

[Chem. 102]

(M-13.1)

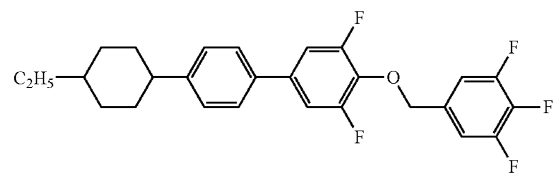

(M-13.2)

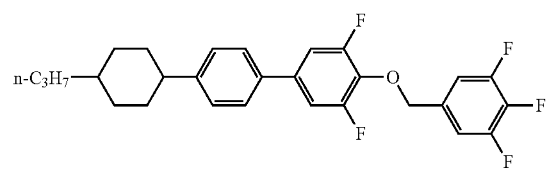

(M-13.3)

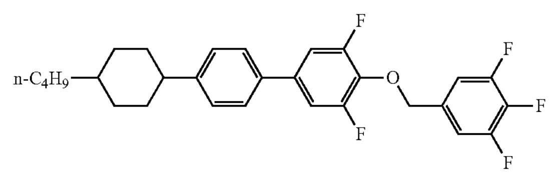

(M-13.4)

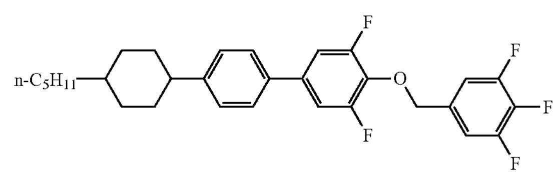

(M-13.5)

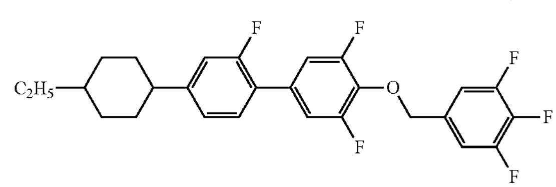

(M-13.6)

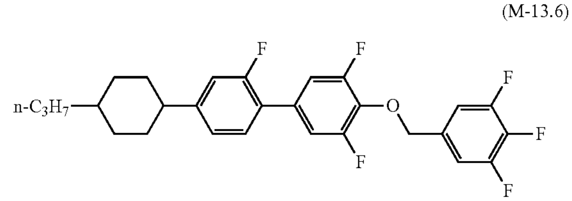

-continued
(M-13.7)
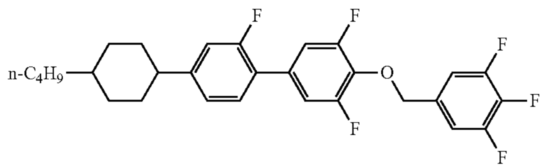
(M-13.8)
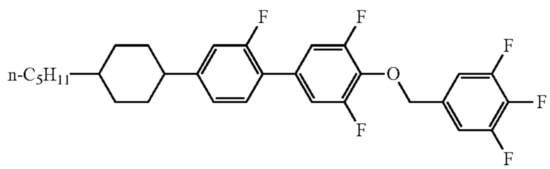
[Chem. 103]
(M-13.11)
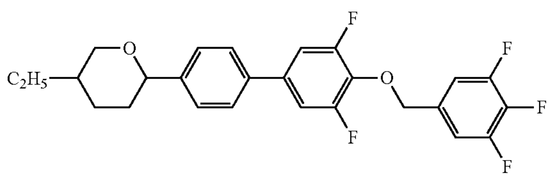
(M-13.12)
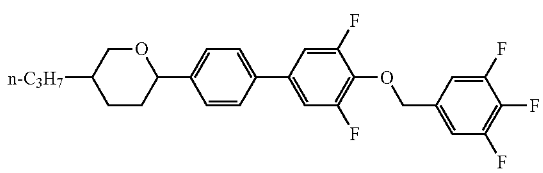
(M-13.13)
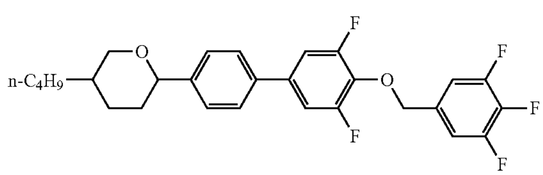
(M-13.14)
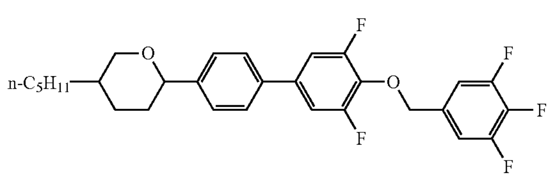
(M-13.15)
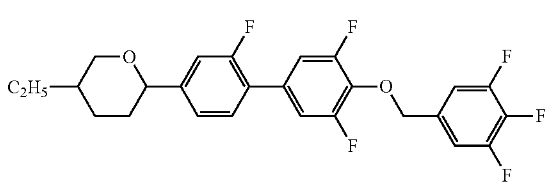
(M-13.16)
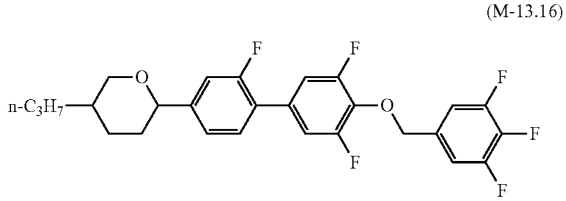
-continued
(M-13.17)
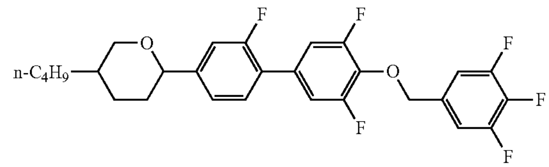
(M-13.18)
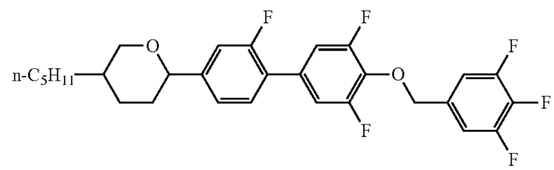
[Chem. 104]
(M-13.21)
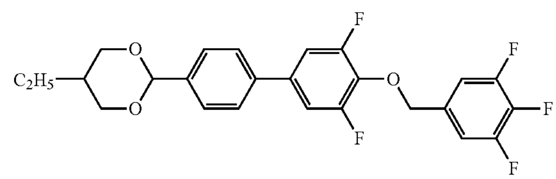
(M-13.22)
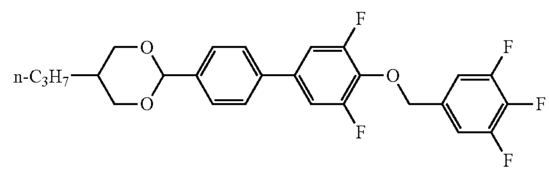
(M-13.23)
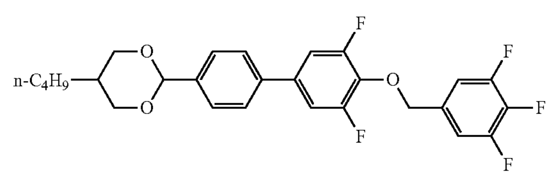
(M-13.24)
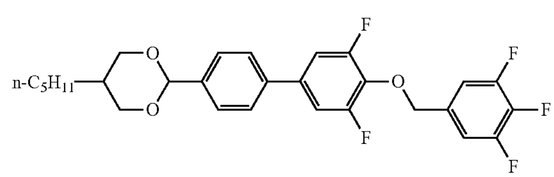
(M-13.25)
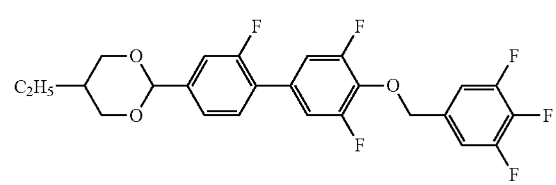
(M-13.26)
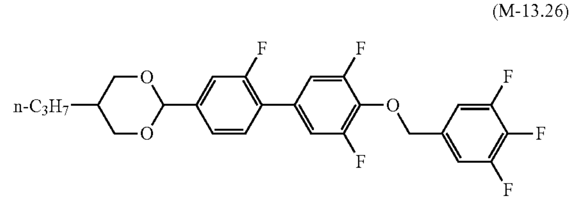

-continued (M-13.27)

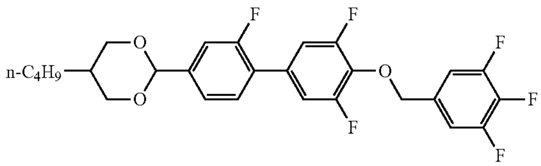

(M-13.28)

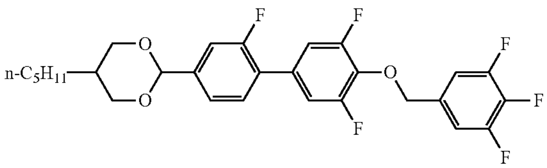

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-14) is described below.

[Chem. 105]

(M-14)

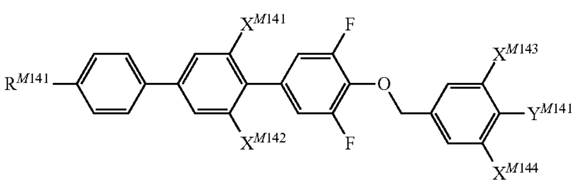

(wherein $X^{M141}$ to $X^{M144}$ independently denote a fluorine atom or a hydrogen atom, $Y^{M141}$ denotes a fluorine atom, a chlorine atom, or —$OCF_3$, $R^{M141}$ denotes an alkyl group having 1 to 5 carbon atoms, an alkenyl group having 2 to 5 carbon atoms, or an alkoxy group having 1 to 4 carbon atoms, and $W^{M141}$ and $W^{M142}$ independently denote —$CH_2$— or —O—)

The lower limit of the preferred amount of a compound represented by the general formula (M-14) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-14) used in the liquid crystal composition (B) for use in the present invention is preferably a compound represented by one of the formulae (M-14.1) to (M-14.8) and particularly preferably includes a compound represented by the formula (M-14.5) or (M-14.8).

[Chem. 106]

(M-14.1)

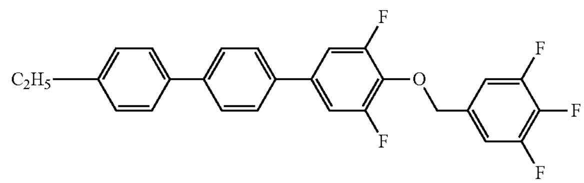

(M-14.2)

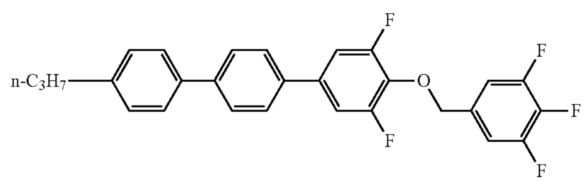

(M-14.3)

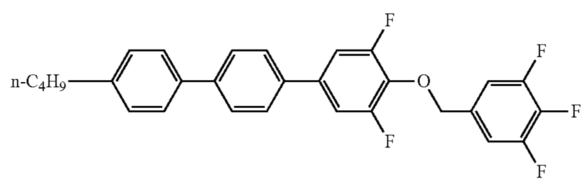

(M-14.4)

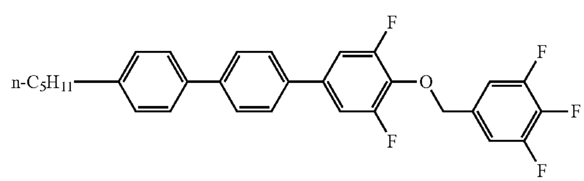

(M-14.5)

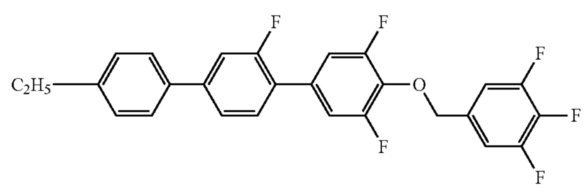

(M-14.6)

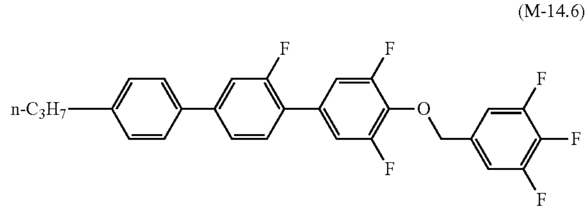

-continued (M-14.7)

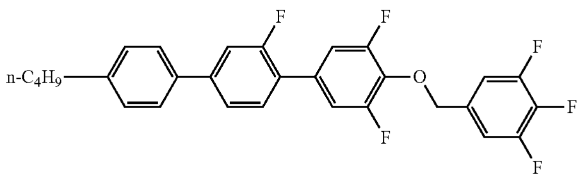

(M-14.8)

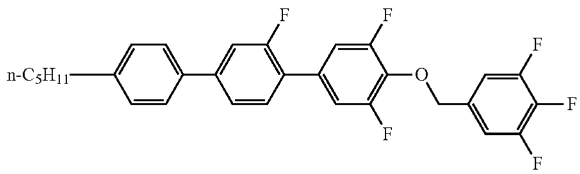

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-15) is described below.

[Chem. 107]

(M-15)

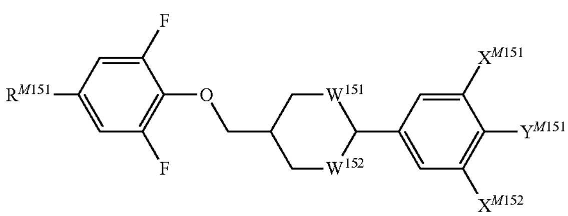

(wherein $X^{M151}$ and $X^{M152}$ independently denote a fluorine atom or a hydrogen atom, $Y^{M151}$ denotes a fluorine atom, a chlorine atom, or —$OCF_3$, $R^{M151}$ denotes an alkyl group having 1 to 5 carbon atoms, an alkenyl group having 2 to 5 carbon atoms, or an alkoxy group having 1 to 4 carbon atoms, and $W^{M151}$ and $W^{M152}$ independently denote —$CH_2$— or —O—)

The lower limit of the preferred amount of a compound represented by the general formula (M-15) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-15) used in the liquid crystal composition (B) for use in the present invention is preferably a compound represented by one of the formulae (M-15.1) to (M-15.14) and particularly preferably includes a compound represented by one of the formulae (M-15.5) to (M-15.8) and (M-15.11) to (M-15.14).

[Chem. 108]

(M-15.1)

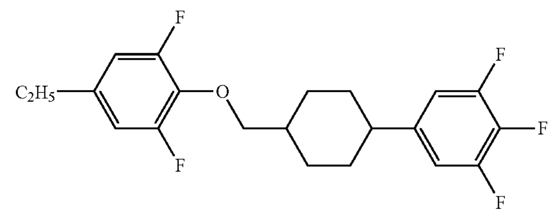

(M-15.2)

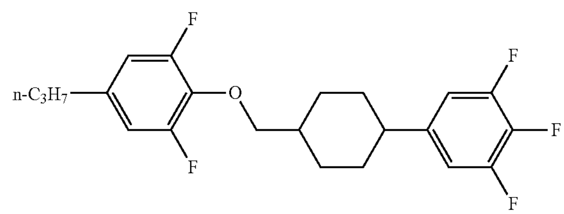

(M-15.3)

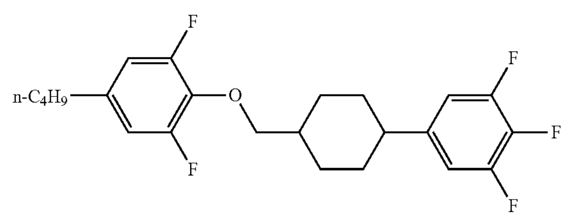

(M-15.4)

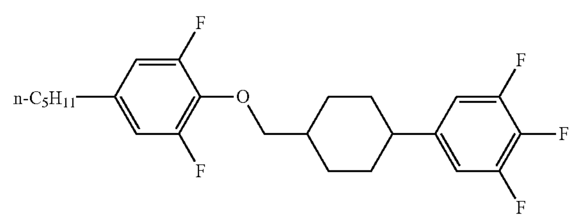

(M-15.5)

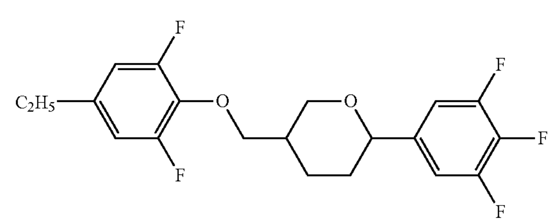

-continued (M-15.6)

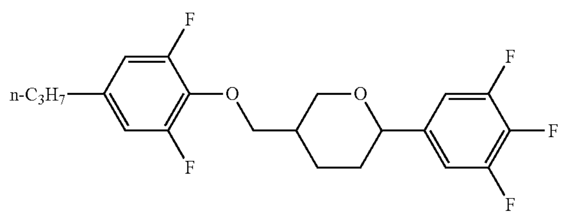

(M-15.7)

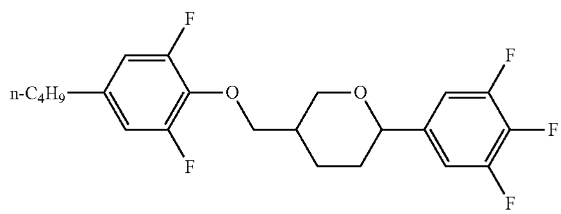

(M-15.8)

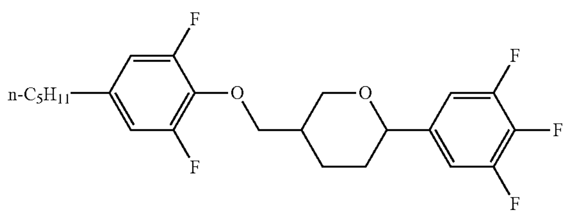

[Chem. 109]

(M-15.11)

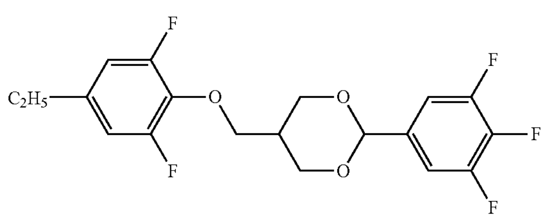

(M-15.12)

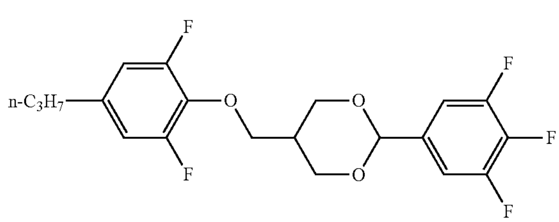

(M-15.13)

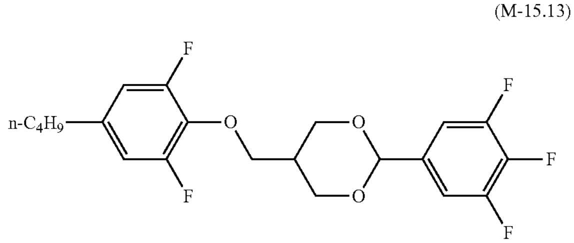

-continued (M-15.14)

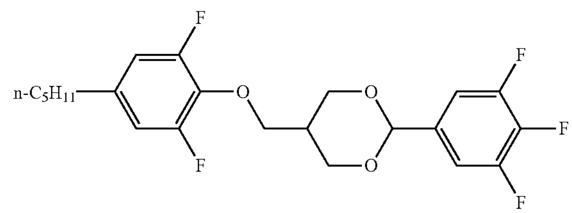

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-16) is described below.

[Chem. 110]

(M-16)

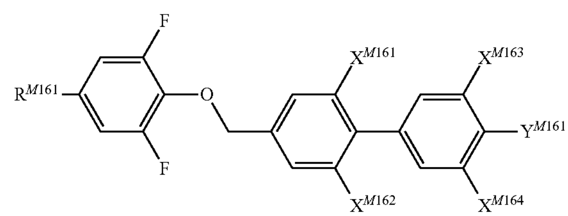

(wherein $X^{M161}$ to $X^{M164}$ independently denote a fluorine atom or a hydrogen atom, $Y^{M161}$ denotes a fluorine atom, a chlorine atom, or —$OCF_3$, and $R^{M161}$ denotes an alkyl group having 1 to 5 carbon atoms, an alkenyl group having 2 to 5 carbon atoms, or an alkoxy group having 1 to 4 carbon atoms)

The lower limit of the preferred amount of a compound represented by the general formula (M-16) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-16) used in the liquid crystal composition (B) for use in the present invention is preferably a compound represented by one of the formulae (M-16.1) to (M-16.8)

and particularly preferably includes a compound represented by one of the formulae (M-16.1) to (M-16.4).

[Chem. 111]

(M-16.1)

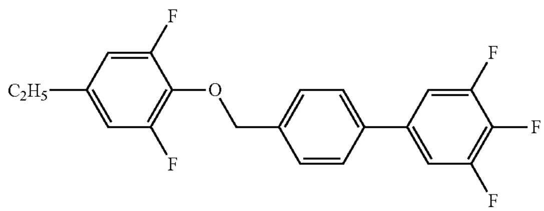

(M-16.2)

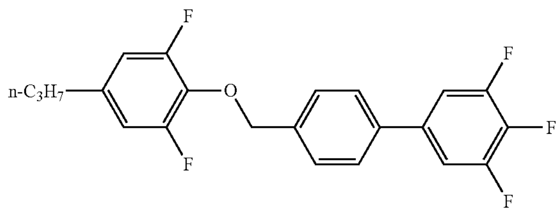

(M-16.3)

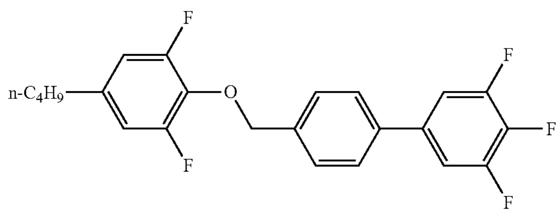

(M-16.4)

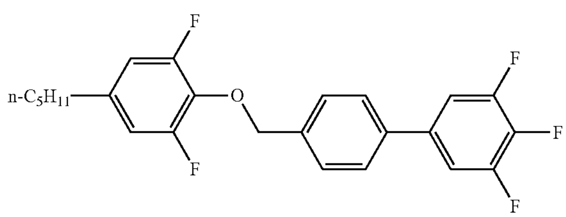

(M-16.5)

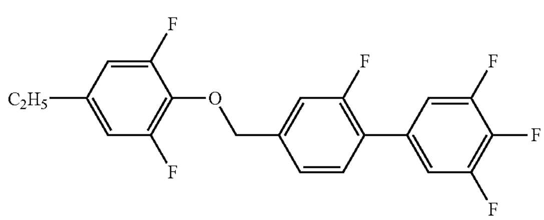

(M-16.6)

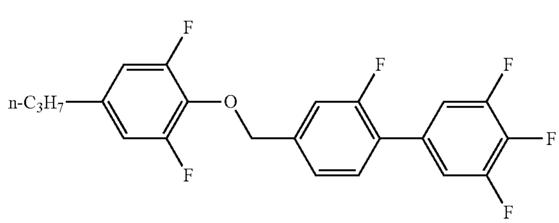

-continued (M-16.7)

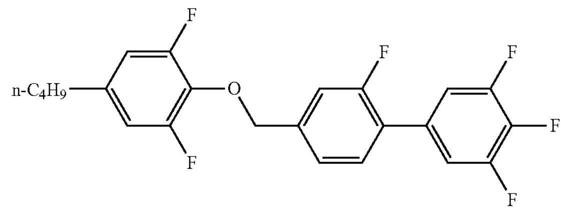

(M-16.8)

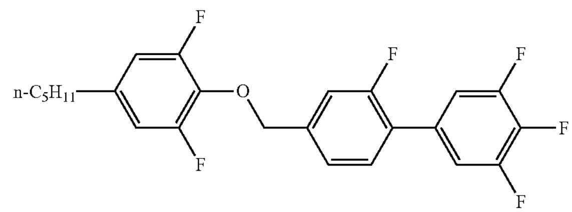

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-17) is described below.

[Chem. 112]

(M-17)

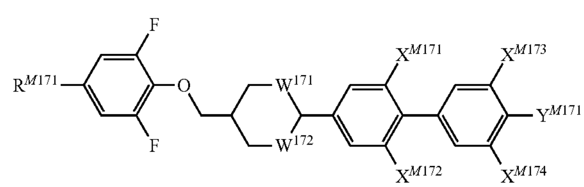

(wherein $X^{M171}$ to $X^{M174}$ independently denote a fluorine atom or a hydrogen atom, $Y^{M171}$ denotes a fluorine atom, a chlorine atom, or —$OCF_3$, $R^{M171}$ denotes an alkyl group having 1 to 5 carbon atoms, an alkenyl group having 2 to 5 carbon atoms, or an alkoxy group having 1 to 4 carbon atoms, and $W^{M171}$ and $W^{M172}$ independently denote —$CH_2$— or —O—)

The lower limit of the preferred amount of a compound represented by the general formula (M-17) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-17) used in the liquid crystal composition (B) for use in the present invention is preferably a compound represented by one of the formulae (M-17.1) to (M-17.52) and particularly preferably includes a compound represented by one of the formulae (M-17.9) to (M-17.12), (M-17.21) to (M-17.28), and (M-17.45) to (M-17.48).

[Chem. 113]

(M-17.1)

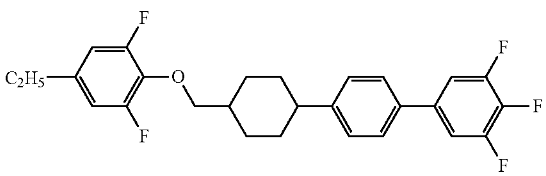

(M-17.2)

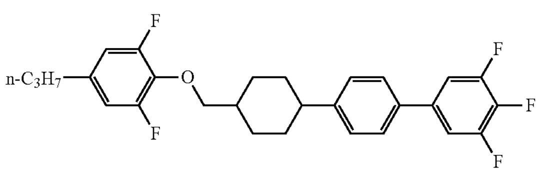

(M-17.3)

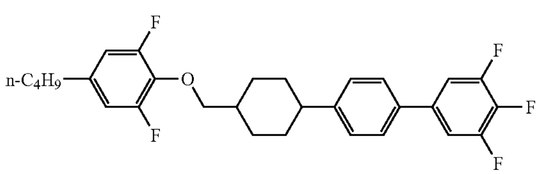

(M-17.4)

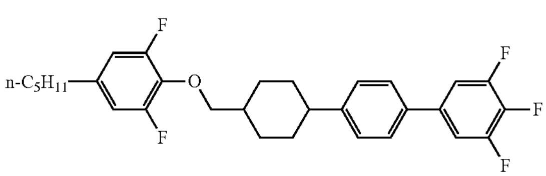

(M-17.5)

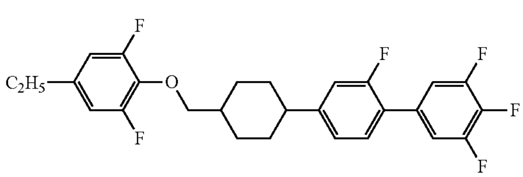

(M-17.6)

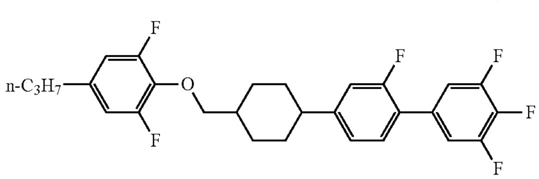

-continued (M-17.7)

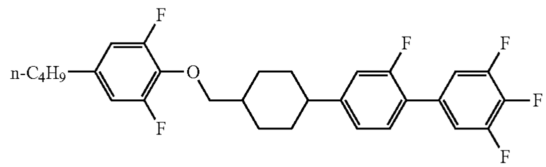

(M-17.8)

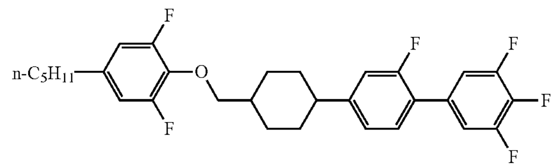

[Chem. 114]

(M-17.9)

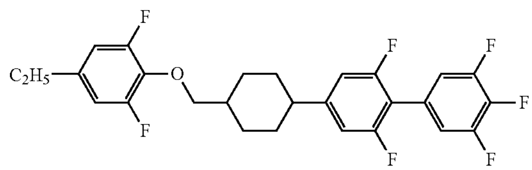

(M-17.10)

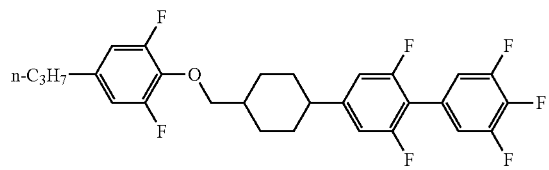

(M-17.11)

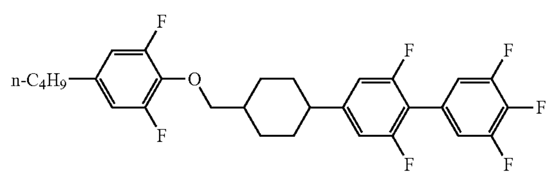

(M-17.12)

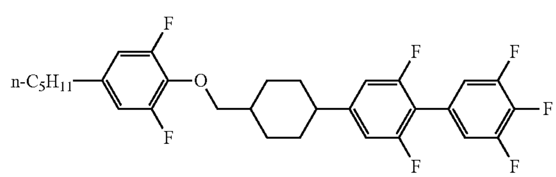

[Chem. 115]

(M-17.21)

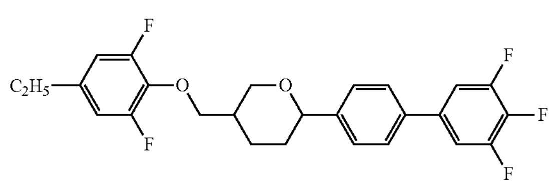

(M-17.22)

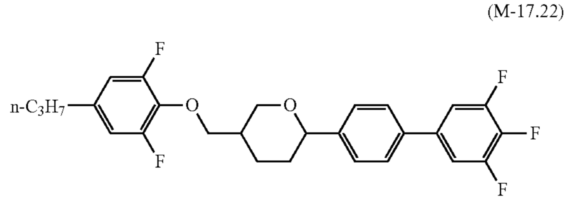

-continued
(M-17.23)
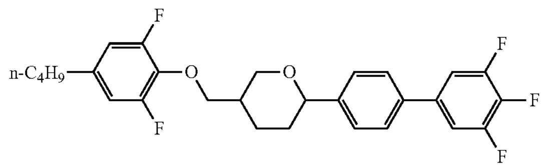
(M-17.24)
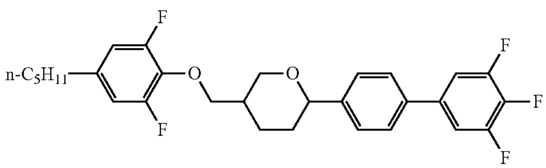
(M-17.25)
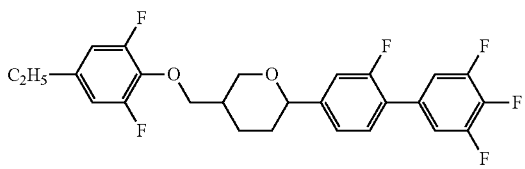
(M-17.26)
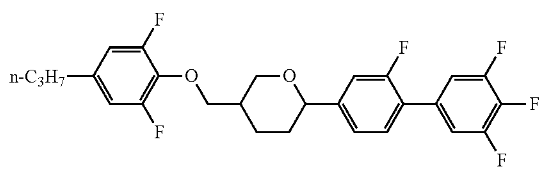
(M-17.27)
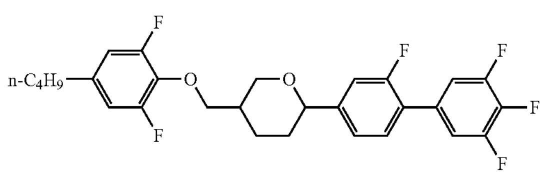
(M-17.28)
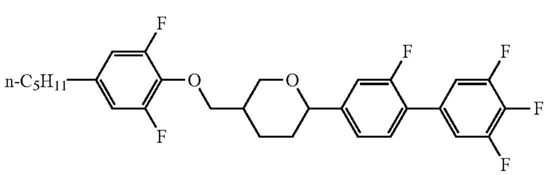
[Chem. 116]
(M-17.29)
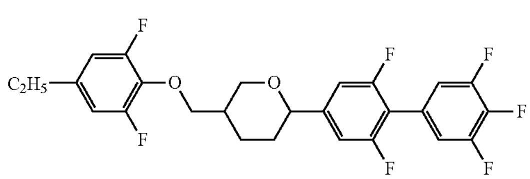
(M-17.30)
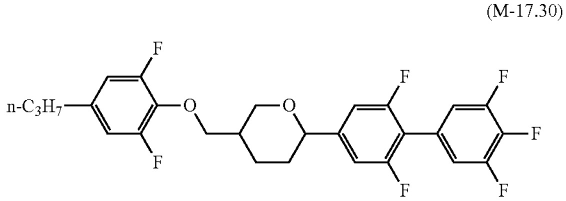
-continued
(M-17.31)
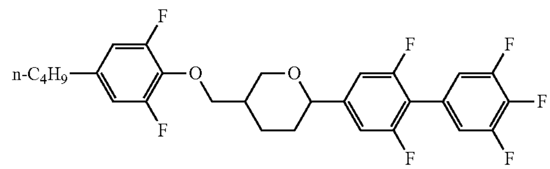
(M-17.32)
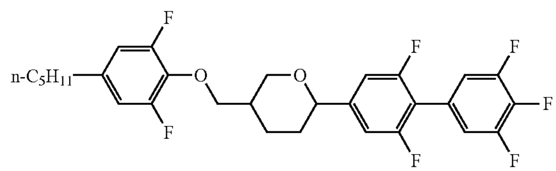
[Chem. 117]
(M-17.41)
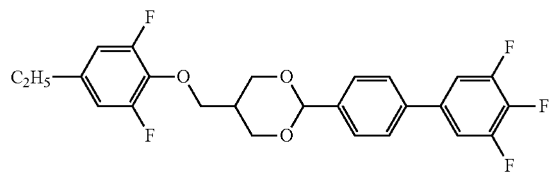
(M-17.42)
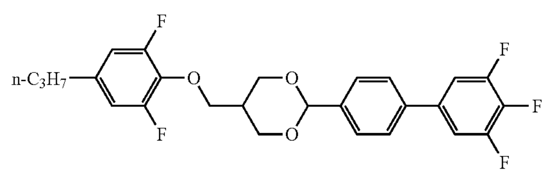
(M-17.43)
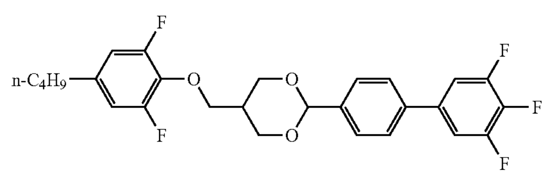
(M-17.44)
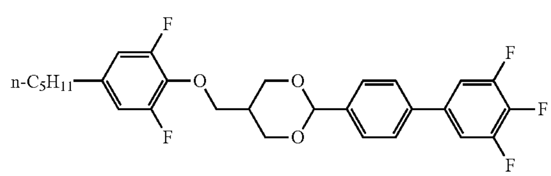
(M-17.45)
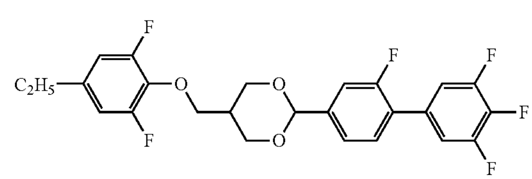
(M-17.46)
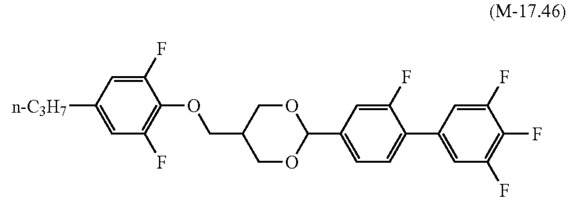

-continued (M-17.47)

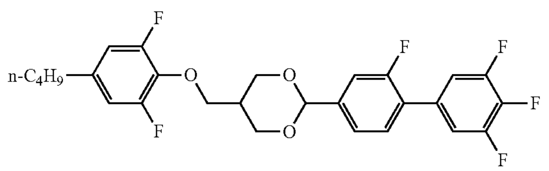

(M-17.48)

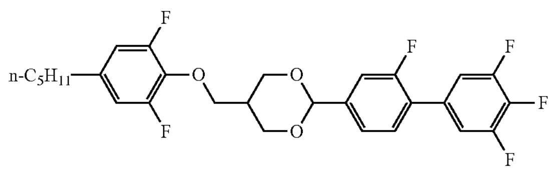

[Chem. 118]

(M-17.49)

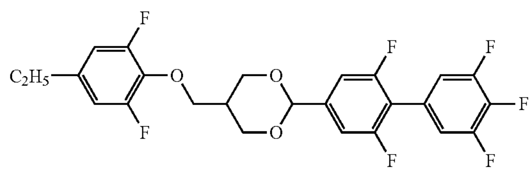

(M-17.50)

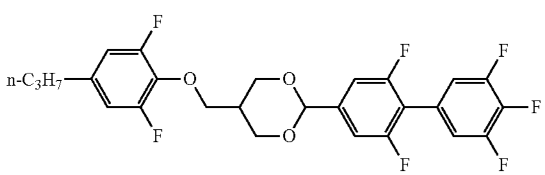

(M-17.51)

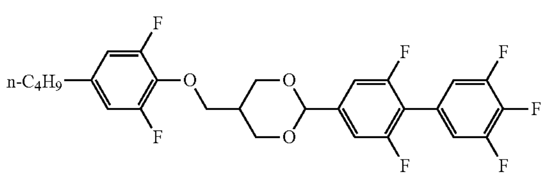

(M-17.52)

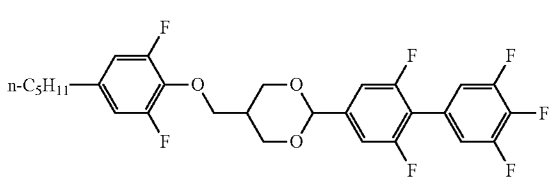

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (M-18) is described below.

[Chem. 119]

(M-18)

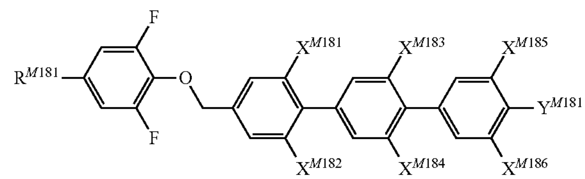

(wherein $X^{M181}$ to $X^{M186}$ independently denote a fluorine atom or a hydrogen atom, $Y^{M181}$ denotes a fluorine atom, a chlorine atom, or —$OCF_3$, and $R^{M181}$ denotes an alkyl group having 1 to 5 carbon atoms, an alkenyl group having 2 to 5 carbon atoms, or an alkoxy group having 1 to 4 carbon atoms)

The lower limit of the preferred amount of a compound represented by the general formula (M-18) is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When a composition resistant to image-sticking is required, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (M-18) used in the liquid crystal composition (B) for use in the present invention is preferably a compound represented by one of the formulae (M-18.1) to (M-18.12) and particularly preferably includes a compound represented by one of the formulae (M-18.5) to (M-18.8).

[Chem. 120]

(M-18.1)

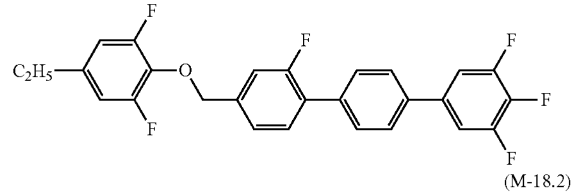

(M-18.2)

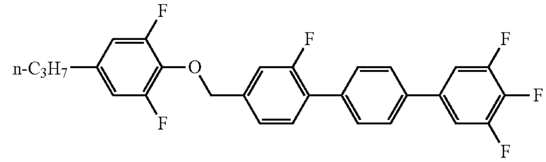

-continued (M-18.3)

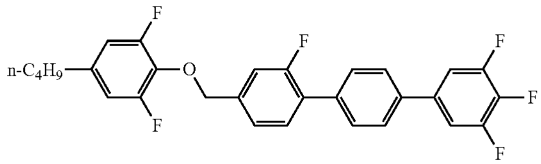

(M-18.4)

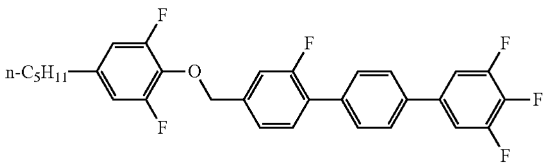

(M-18.5)

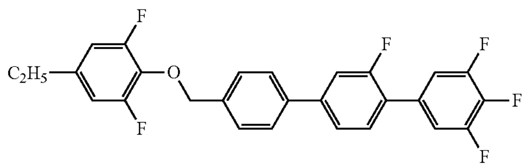

(M-18.6)

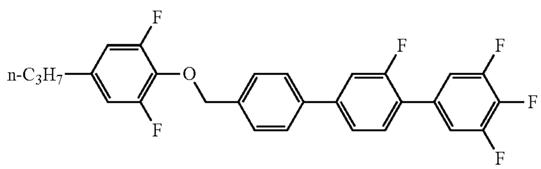

(M-18.7)

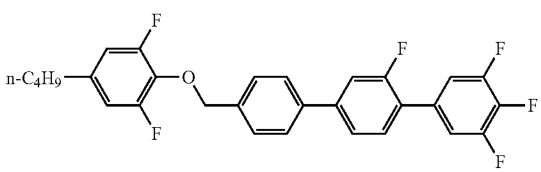

(M-18.8)

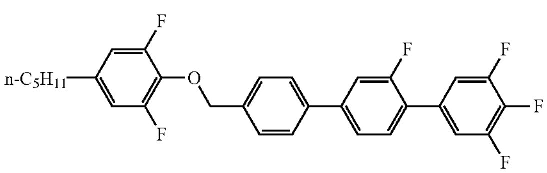

[Chem. 121]

(M-18.9)

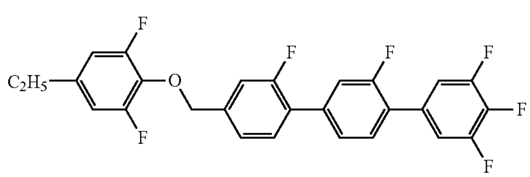

(M-18.10)

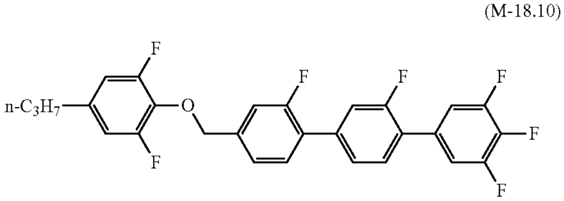

-continued (M-18.11)

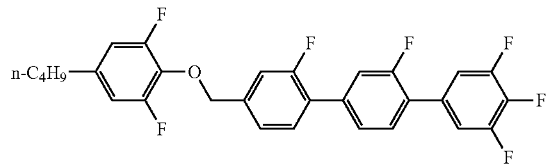

(M-18.12)

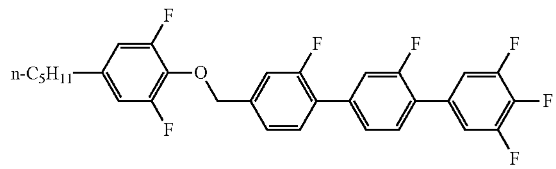

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

The liquid crystal composition (B) for use in the present invention preferably contains one or two or more compounds represented by the general formula (K). These compounds correspond to dielectrically positive compounds (with Δε of more than 2).

[Chem. 122]

(K)

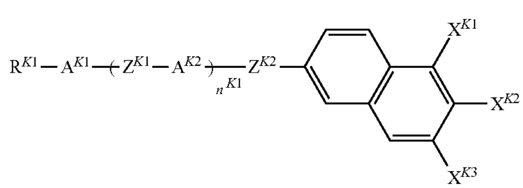

(wherein $R^{K1}$ denotes an alkyl group having 1 to 8 carbon atoms, and one —$CH_2$— or two or more nonadjacent —$CH_2$— groups in the alkyl group are independently optionally substituted with —CH═CH—, —C≡C—, —O—, —CO—, —COO—, or —OCO—, $n^{K1}$ denotes 0, 1, 2, 3, or 4, $A^{K1}$ and $A^{K2}$ independently denote a group selected from the group consisting of (a) a 1,4-cyclohexylene group (in which one —$CH_2$— or two or more nonadjacent —$CH_2$— groups are optionally substituted with —O— or —S—), and (b) a 1,4-phenylene group (in which one —CH═ or two or more nonadjacent —CH═ groups are optionally substituted with —N═), a hydrogen atom in the group (a) and the group (b) is independently optionally substituted with a cyano group, a fluorine atom, or a chlorine atom, $Z^{K1}$ and $Z^{K2}$ independently denote a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{K1}$ denotes 2, 3, or 4, a plurality of $A^{K2}$s may be the same or different, and if $n^{K1}$ denotes 2, 3, or 4, a plurality of $Z^{K1}$s may be the same or different, $X^{K1}$ and $X^{K3}$ independently denote a hydrogen atom, a chlorine atom, or a fluorine atom, and $X^{K2}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group)

In the general formula (K), $R^{K1}$ preferably denotes an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, still more preferably an alkyl group having 2 to 5 carbon atoms or an alkenyl group having 2 or 3 carbon atoms, particularly preferably an alkenyl group having 3 carbon atoms (a propenyl group).

$R^{K1}$ preferably denotes an alkyl group when reliability is regarded as important or an alkenyl group when lower viscosity is regarded as important.

If the ring structure to which it is bonded is a phenyl group (aromatic), then a linear alkyl group having 1 to 5 carbon atoms, a linear alkoxy group having 1 to 4 carbon atoms, and an alkenyl group having 4 or 5 carbon atoms are preferred. If the ring structure to which it is bonded is a saturated ring structure, such as cyclohexane, pyran, or dioxane, then a linear alkyl group having 1 to 5 carbon atoms, a linear alkoxy group having 1 to 4 carbon atoms, and a linear alkenyl group having 2 to 5 carbon atoms are preferred. To stabilize the nematic phase, the total number of carbon atoms and, if present, oxygen atoms is preferably 5 or less, and a straight chain is preferred.

The alkenyl group is preferably selected from the groups represented by the formulae (R1) to (R5). (The dark dot in each formula represents a carbon atom in the ring structure to which the alkenyl group is bonded.)

[Chem. 123]

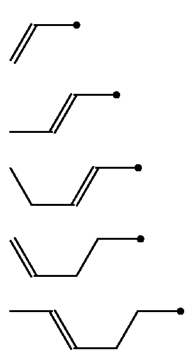

(R1)
(R2)
(R3)
(R4)
(R5)

$A^{K1}$ and $A^{K2}$ preferably independently denote an aromatic when an increase in Δn is desired, an aliphatic to improve the response speed, or a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably one of the following structures,

[Chem. 124]

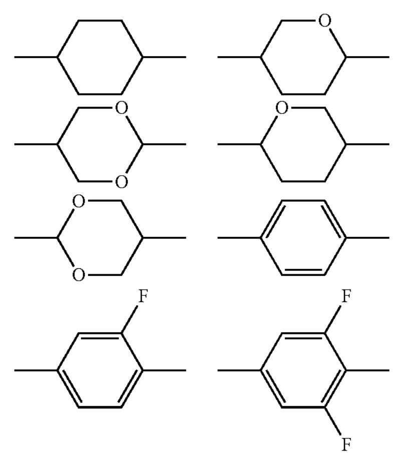

more preferably one of the following structures.

[Chem. 125]

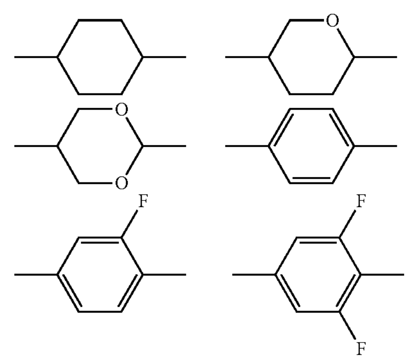

$Z^{K1}$ and $Z^{K2}$ preferably independently denote —$CH_2O$—, —$CF_2O$—, —$CH_2CH_2$—, —$CF_2CF_2$—, or a single bond, more preferably —$CF_2O$—, —$CH_2CH_2$—, or a single bond, particularly preferably —$CF_2O$— or a single bond.

$n^{K1}$ is preferably 0, 1, 2, or 3, preferably 0, 1, or 2, preferably 0 or 1 when improved Δε is regarded as important, preferably 1 or 2 when $T_{NI}$ is regarded as important.

Although compounds of any types may be combined, these compounds are combined in a manner that depends on the desired characteristics, such as solubility at low temperatures, transition temperature, electrical reliability, and birefringence index. For example, one, two, or three compounds are used in one embodiment of the present invention. Alternatively, four, five, six, seven, or more compounds are used in another embodiment of the present invention.

The amount of a compound represented by the general formula (K) in the liquid crystal composition (B) for use in the present invention should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (K) is 1% by mass, 10% by mass, 20% by mass, 30% by mass, 40% by mass, 50% by mass, 55% by mass, 60% by mass, 65% by mass, 70% by mass, 75% by mass, or 80% by mass of the total amount of the liquid crystal composition (B) for use in the present invention. For example, in one embodiment of the present invention, the upper limit of the preferred amount is 95% by mass, 85% by mass, 75% by mass, 65% by mass, 55% by mass, 45% by mass, 35% by mass, or 25% by mass of the total amount of the liquid crystal composition (B) for use in the present invention.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

A compound represented by the general formula (K) is preferably a compound selected from the compound group represented by the general formula (K-1), for example.

[Chem. 126]

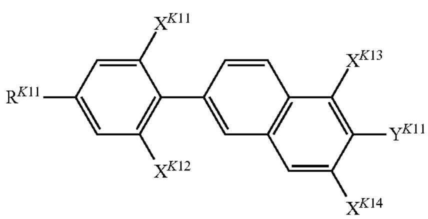

(K-1)

(wherein $R^{K11}$ denotes an alkyl group having 1 to 5 carbon atoms, an alkenyl group having 2 to 5 carbon atoms, or an alkoxy group having 1 to 4 carbon atoms, $X^{K11}$ to $X^{K14}$ independently denote a hydrogen atom or a fluorine atom, and $Y^{K11}$ denotes a fluorine atom or $OCF_3$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-1) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (K-1) is preferably a compound represented by one of the formulae (K-1.1) to (K-1.4), preferably a compound represented by the formula (K-1.1) or (K-1.2), more preferably the compound represented by the formula (K-1.2). A compound represented by the formula (K-1.1) or (K-1.2) is also preferably used simultaneously.

[Chem. 127]

(K-1.1)

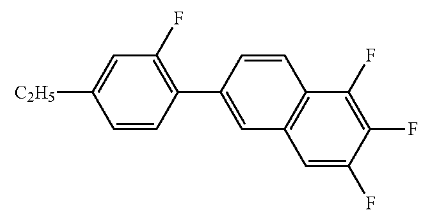

(K-1.2)

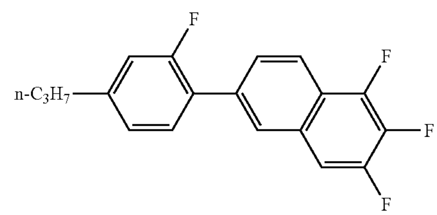

(K-1.3)

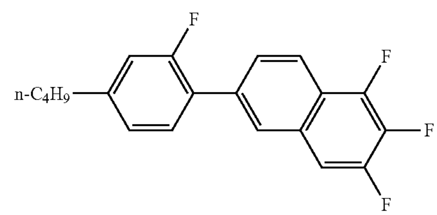

(K-1.4)

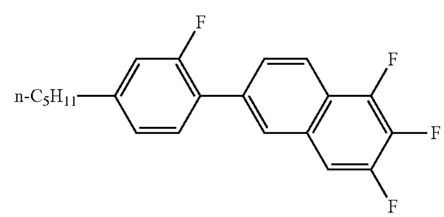

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (K) is preferably a compound selected from the compound group represented by the general formula (K-2), for example.

[Chem. 128]

(K-2)

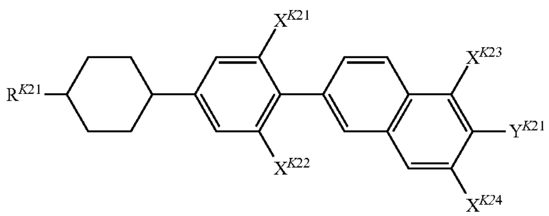

(wherein $R^{K21}$ denotes an alkyl group having 1 to 5 carbon atoms, an alkenyl group having 2 to 5 carbon atoms, or an alkoxy group having 1 to 4 carbon atoms, $X^{K21}$ to $X^{K24}$ independently denote a hydrogen atom or a fluorine atom, and $Y^{K21}$ denotes a fluorine atom or $OCF_3$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-2) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (K-2) is preferably a compound represented by one of the formulae (K-2.1) to (K-2.6), preferably a compound represented by the formula (K-2.5) or (K-2.6), more preferably the compound represented by the formula (K-2.6). A compound represented by the formula (K-2.5) or (K-2.6) is also preferably used simultaneously.

[Chem. 129]

(K-2.1)

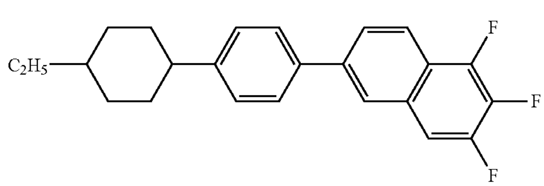

-continued (K-2.2)

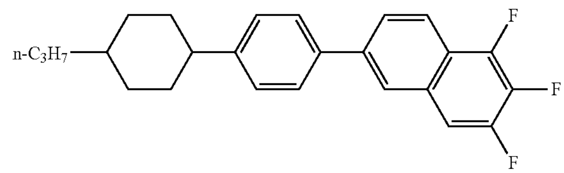

(K-2.3)

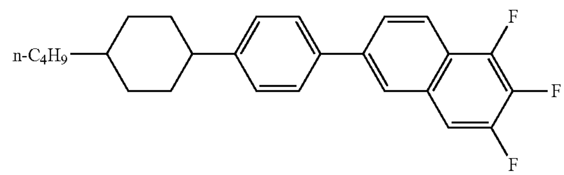

(K-2.4)

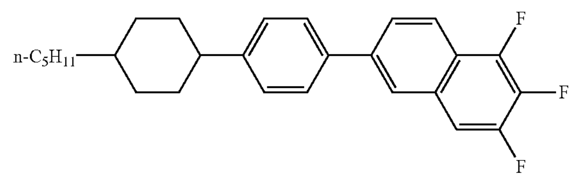

(K-2.5)

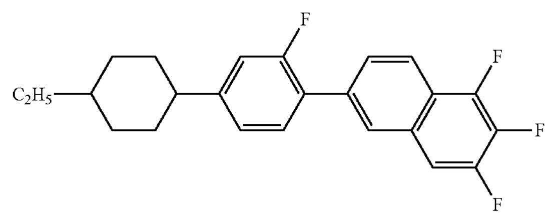

(K-2.6)

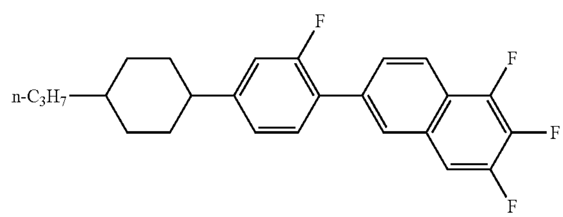

(K-2.7)

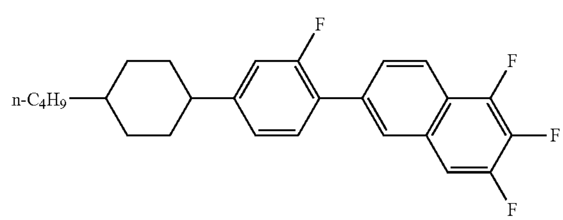

(K-2.8)

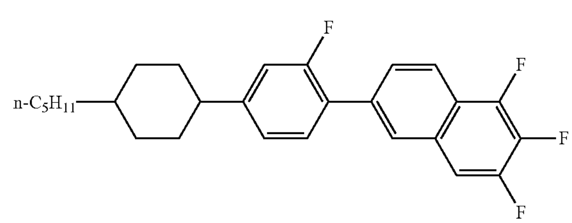

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (K) is preferably a compound selected from the compound group represented by the general formula (K-3), for example.

[Chem. 130]

(K-3)

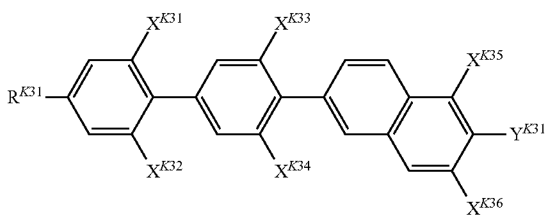

(wherein $R^{K31}$ denotes an alkyl group having 1 to 5 carbon atoms, an alkenyl group having 2 to 5 carbon atoms, or an alkoxy group having 1 to 4 carbon atoms, $X^{K31}$ to $X^{K36}$ independently denote a hydrogen atom or a fluorine atom, and $Y^{K31}$ denotes a fluorine atom or $OCF_3$)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-3) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (K-3) is preferably a compound represented by one of the formulae (K-3.1) to (K-3.4), more preferably a compound represented by the formula (K-3.1) or (K-3.2). The compounds represented by the formulae (K-3.1) and (K-3.2) are also preferably used simultaneously.

[Chem. 131]

(K-3.1)

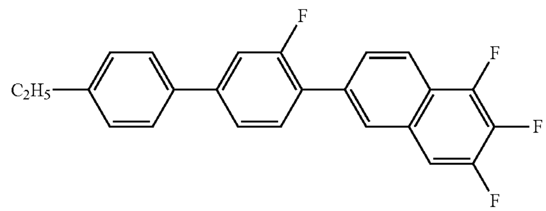

(K-3.2)

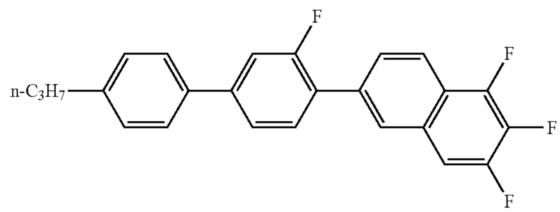

(K-3.3)

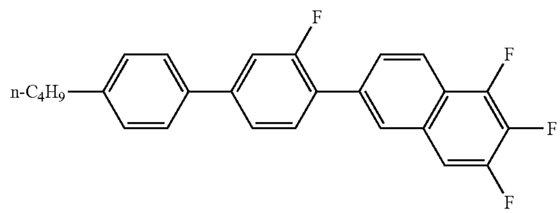

(K-3.4)

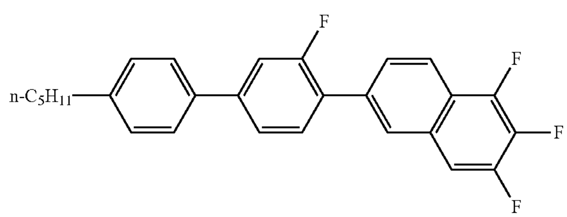

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (K) is preferably a compound selected from the compound group represented by the general formula (K-4), for example.

[Chem. 132]

(K-4)

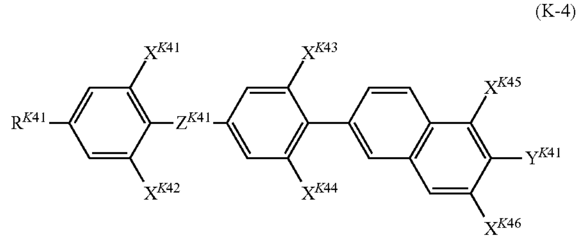

(wherein $R^{K41}$ denotes an alkyl group having 1 to 5 carbon atoms, an alkenyl group having 2 to 5 carbon atoms, or an alkoxy group having 1 to 4 carbon atoms, $X^{K41}$ to $X^{K46}$ independently denote a hydrogen atom or a fluorine atom, $Y^{K41}$ denotes a fluorine atom or $OCF_3$, and $Z^{K41}$ denotes —$OCH_2$—, —$CH_2O$—, —$OCF_2$—, or —$CF_2O$—)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-4) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (K-4) is preferably a compound represented by one of the formulae (K-4.1) to (K-4.18), more preferably a compound represented by the formula (K-4.1), (K-4.2), (K-4.11), or (K-4.12). The compounds represented by the formulae (K-4.1), (K-4.2), (K-4.11), (K-4.12) are also preferably used simultaneously.

[Chem. 133]

(K-4.1)

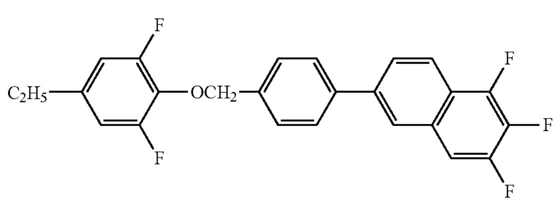

(K-4.2)

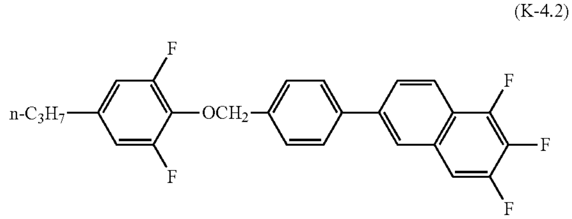

-continued (K-4.3)

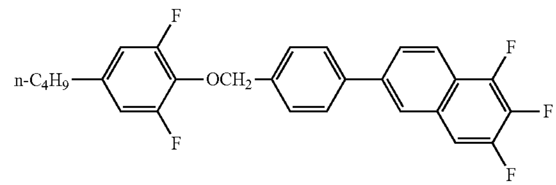

(K-4.4)

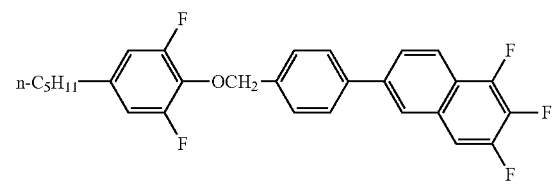

(K-4.5)

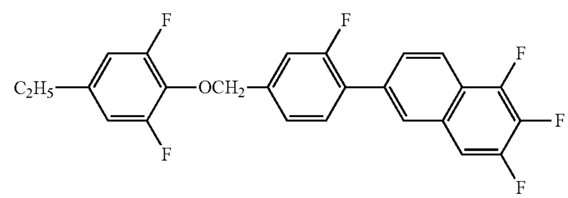

(K-4.6)

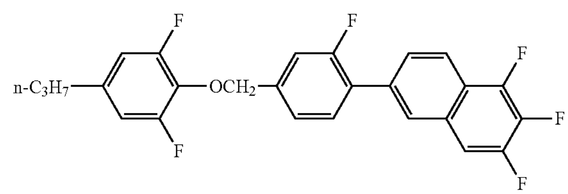

(K-4.7)

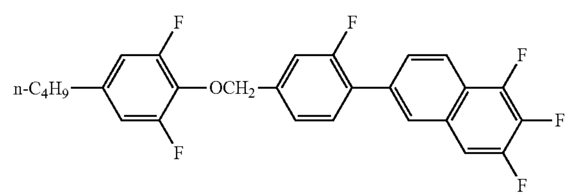

(K-4.8)

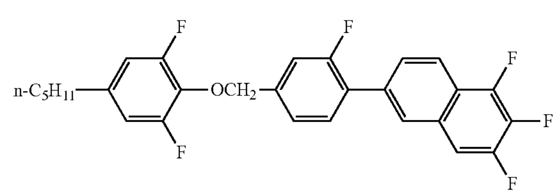

[Chem. 134]

(K-4.11)

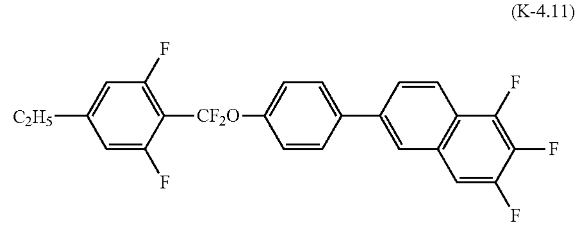

-continued (K-4.12)

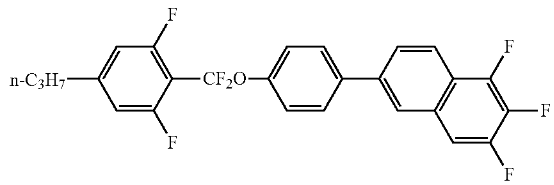

(K-4.13)

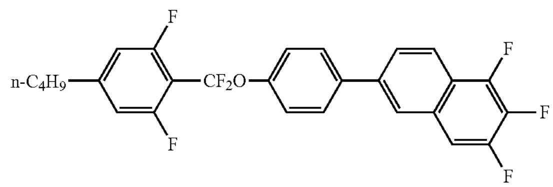

(K-4.14)

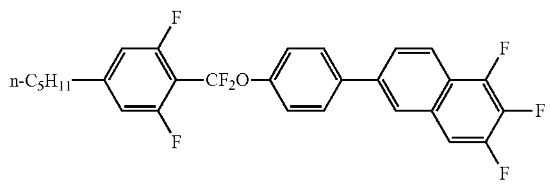

(K-4.15)

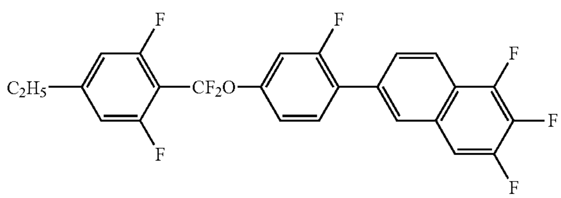

(K-4.16)

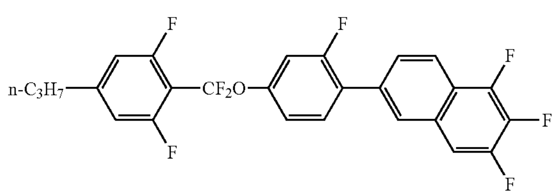

(K-4.17)

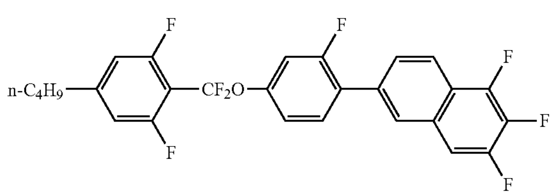

(K-4.18)

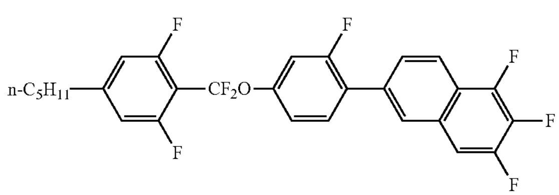

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (K) is preferably a compound selected from the compound group represented by the general formula (K-5), for example.

[Chem. 135]

(K-5)

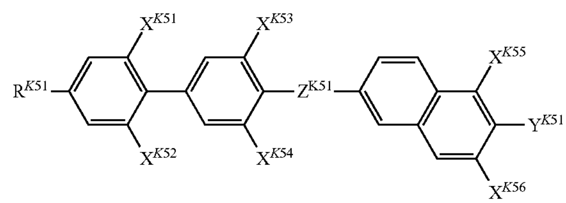

(wherein $R^{K51}$ denotes an alkyl group having 1 to 5 carbon atoms, an alkenyl group having 2 to 5 carbon atoms, or an alkoxy group having 1 to 4 carbon atoms, $X^{K51}$ to $X^{K56}$ independently denote a hydrogen atom or a fluorine atom, $Y^{K51}$ denotes a fluorine atom or $OCF_3$, and $Z^{K51}$ denotes —$OCH_2$—, —$CH_2O$—, —$OCF_2$—, or —$CF_2O$—)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-5) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (K-5) is preferably a compound represented by one of the formulae (K-5.1) to (K-5.18), preferably a compound represented by one of the formulae (K-5.11) to (K-5.14), more preferably the compound represented by the formula (K-5.12).

[Chem. 136]
(K-5.1)
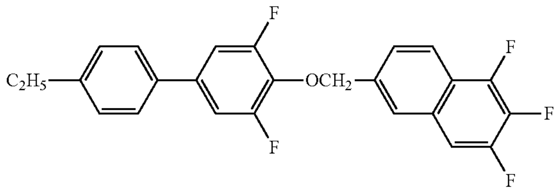
(K-5.2)
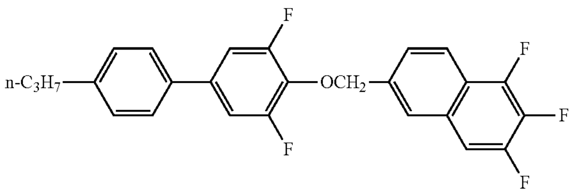
(K-5.3)
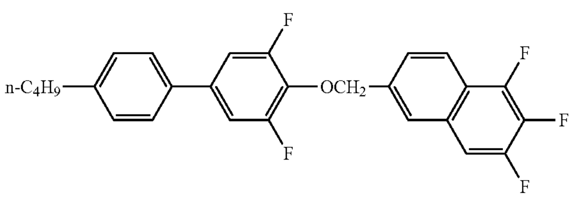
(K-5.4)
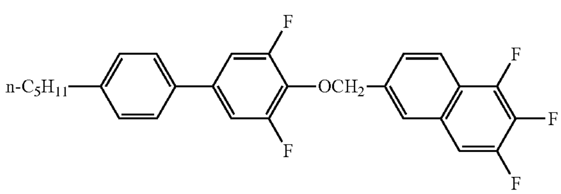
(K-5.5)
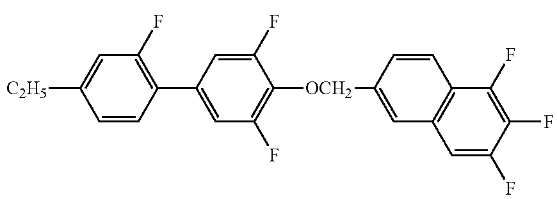
(K-5.6)
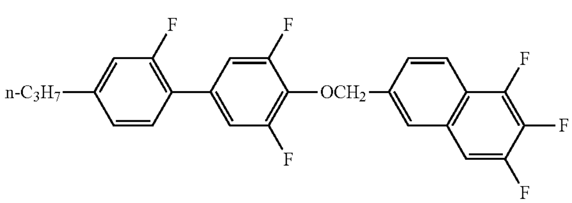
(K-5.7)
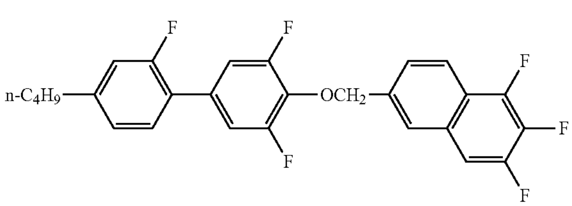
-continued
(K-5.8)
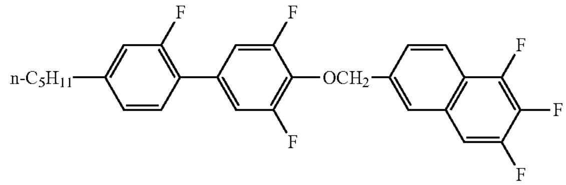
[Chem. 137]
(K-5.11)
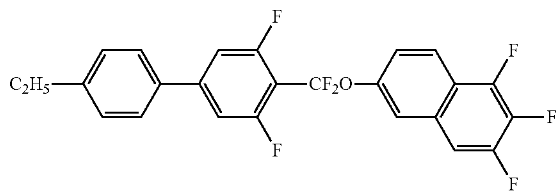
(K-5.12)
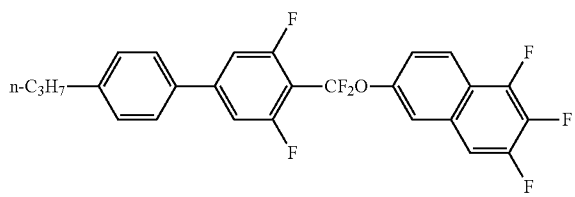
(K-5.13)
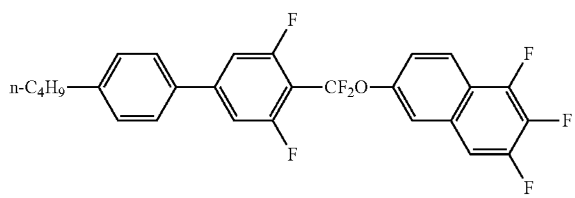
(K-5.14)
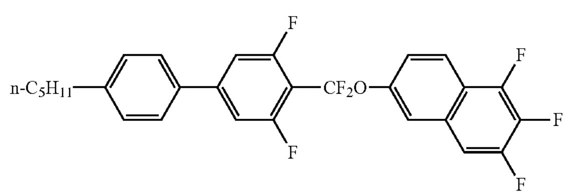
(K-5.15)
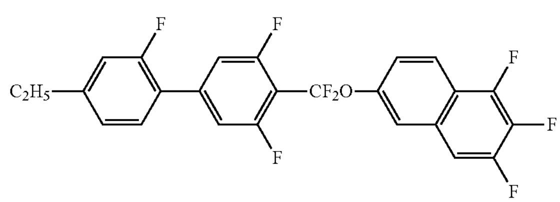
(K-5.16)
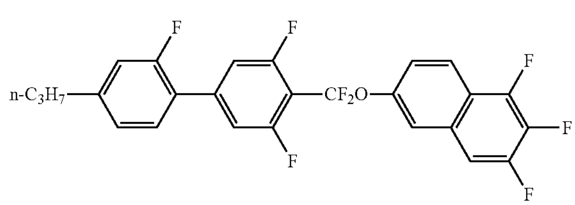

-continued (K-5.17)

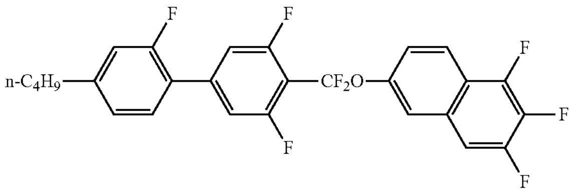

(K-5.18)

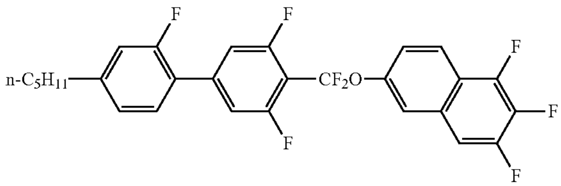

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A compound represented by the general formula (K) is preferably a compound selected from the compound group represented by the general formula (K-6), for example.

[Chem. 138]

(K-6)

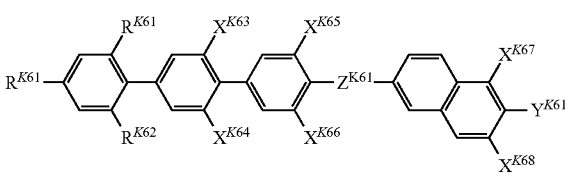

(wherein $R^{K61}$ denotes an alkyl group having 1 to 5 carbon atoms, an alkenyl group having 2 to 5 carbon atoms, or an alkoxy group having 1 to 4 carbon atoms, $X^{K61}$ to $X^{K68}$ independently denote a hydrogen atom or a fluorine atom, $Y^{K61}$ denotes a fluorine atom or $OCF_3$, and $Z^{K61}$ denotes —$OCH_2$—, —$CH_2O$—, —$OCF_2$—, or —$CF_2O$—)

Although compounds of any types may be combined, these compounds are combined in a manner that depends on the desired characteristics, such as solubility at low temperatures, transition temperature, electrical reliability, and birefringence index. For example, one, two, three, or more compounds are used in one embodiment of the present invention.

The lower limit of the preferred amount of a compound represented by the formula (K-6) is 1% by mass, 2% by mass, 5% by mass, 8% by mass, 10% by mass, 13% by mass, 15% by mass, 18% by mass, 20% by mass, 22% by mass, 25% by mass, or 30% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

When the liquid crystal composition (B) for use in the present invention needs to have a low viscosity and a high response speed, the lower limit is preferably somewhat lower, and the upper limit is preferably somewhat lower. When the liquid crystal composition (B) for use in the present invention needs to have a high $T_{NI}$ and high temperature stability, the lower limit is preferably somewhat lower, and the upper limit is preferably somewhat lower. When dielectric constant anisotropy is increased to maintain a low drive voltage, the lower limit is preferably somewhat higher, and the upper limit is preferably somewhat higher.

More specifically, a compound represented by the general formula (K-6) is preferably a compound represented by one of the formulae (K-6.1) to (K-6.18), preferably a compound represented by one of the formulae (K-6.15) to (K-6.18), more preferably a compound represented by the formula (K-6.16) or (K-6.17). The compounds represented by the formulae (K-6.16) and (K-6.17) are also preferably used simultaneously.

[Chem. 139]

(K-6.1)

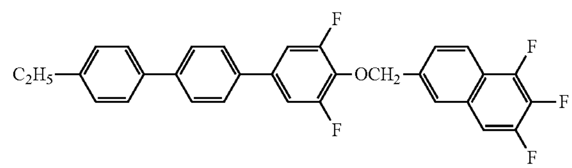

(K-6.2)

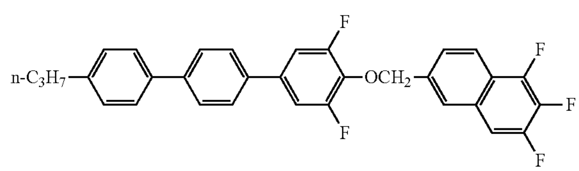

(K-6.3)

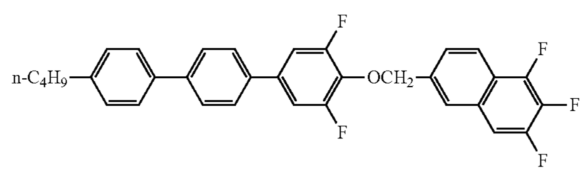

(K-6.4)

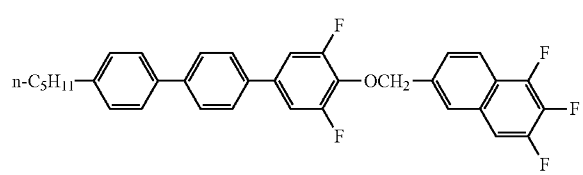

(K-6.5)

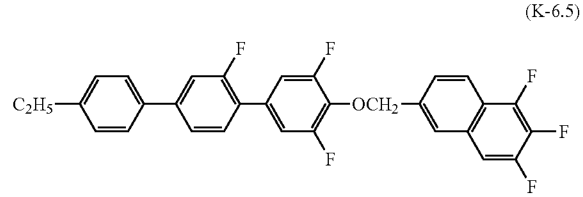

-continued (K-6.6)

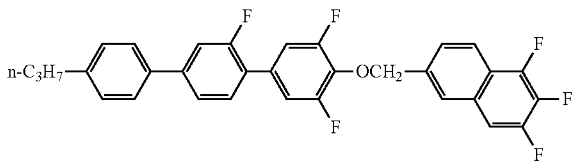

(K-6.7)

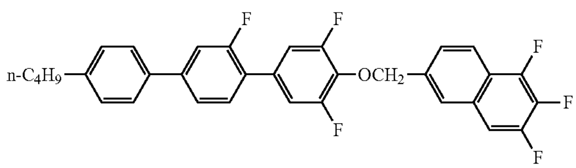

(K-6.8)

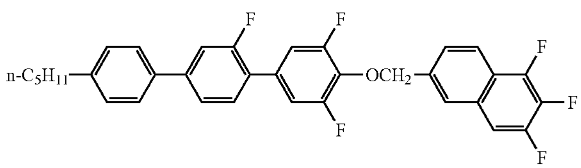

[Chem. 140]

(K-6.11)

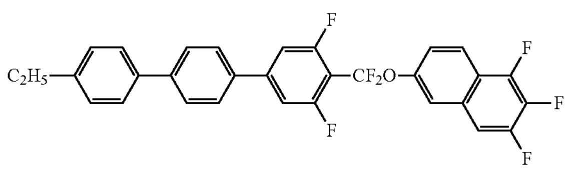

(K-6.12)

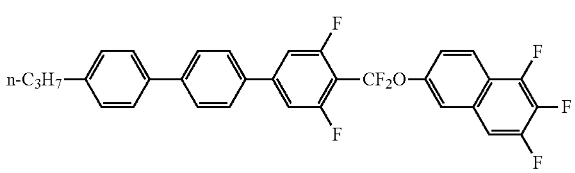

(K-6.13)

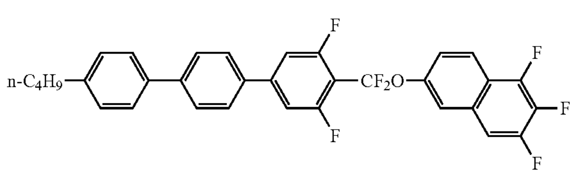

(K-6.14)

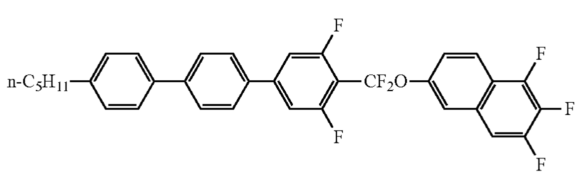

(K-6.15)

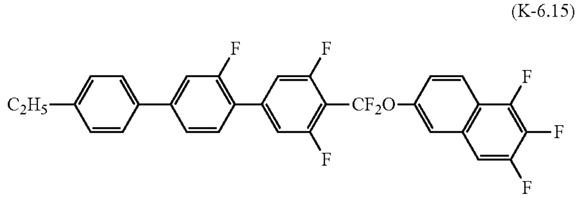

-continued (K-6.16)

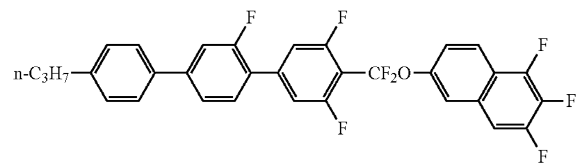

(K-6.17)

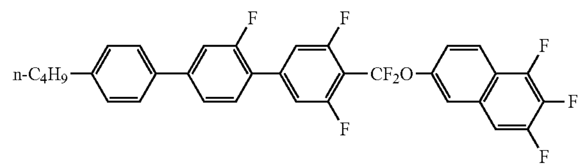

(K-6.18)

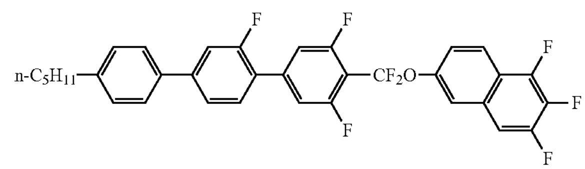

The lower limit of the preferred amount of these compounds is 1% by mass, 2% by mass, 4% by mass, 5% by mass, 8% by mass, 10% by mass, 13% by mass, 15% by mass, 18% by mass, or 20% by mass of the total amount of the liquid crystal composition (B) for use in the present invention. The upper limit of the preferred amount is 30% by mass, 28% by mass, 25% by mass, 23% by mass, 20% by mass, 18% by mass, 15% by mass, 13% by mass, 10% by mass, 8% by mass, or 5% by mass.

A liquid crystal composition with little dielectric constant anisotropy preferably contains one or two or more compounds represented by the general formula (L). A compound represented by the general formula (L) corresponds to a dielectrically nearly neutral compound (with $\Delta\varepsilon$ in the range of −2 to 2).

[Chem. 141]

$$R^{L1}—A^{L1}—Z^{L1}—(A^{L2}—Z^{L2})_{n^{L1}}—A^{L3}—R^{L2} \quad (L)$$

($R^{L1}$ and $R^{L2}$ independently denote an alkyl group having 1 to 8 carbon atoms, and one —$CH_2$— or two or more nonadjacent —$CH_2$— groups in the alkyl group are independently optionally substituted with —CH═CH—, —C≡C—, —O—, —CO—, —COO—, or —OCO—, $n^{L1}$ denotes 0, 1, 2, or 3, $A^{L1}$, $A^{L2}$, and $A^{L3}$ independently denote a group selected from the group consisting of (a) a 1,4-cyclohexylene group (in which one —$CH_2$— or two or more nonadjacent —$CH_2$— groups are optionally substituted with —O—), (b) a 1,4-phenylene group (in which one —CH═ or two or more nonadjacent —CH═ groups are optionally substituted with —N═), (c) a naphthalene-2,6-diyl group, a 1,2,3,4-tetrahydronaphthalene-2,6-diyl group, or a decahydronaphthalene-2,6-diyl group (one —CH═ or two or more nonadjacent —CH═ groups in the naphthalene-2,6-diyl group or in the 1,2,3,4-tetrahydronaphthalene-2,6-diyl group are optionally substituted with —N═), the groups (a), (b), and (c) are independently optionally substituted with a cyano group, a fluorine atom, or a chlorine atom, $Z^{L1}$ and $Z^{L2}$ independently denote a single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF—, or —C≡C—, and if $n^{L1}$ denotes 2 or 3, a plurality of $A^{L2}$s may be the same or different, and if n1 denotes 2 or 3, a plurality of $Z^{L2}$s may be the same or different, but the compounds represented by the general formulae (N-1), (N-2), (N-3), (N-4), and (J) are excluded)

The compounds represented by the general formula (L) may be used alone or in combination. Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Two, three, four, five, six, seven, eight, nine, ten, or more compounds are used in another embodiment of the present invention.

The amount of a compound represented by the general formula (L) in the liquid crystal composition (B) should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (L) is 1% by mass, 10% by mass, 20% by mass, 30% by mass, 40% by mass, 50% by mass, 55% by mass, 60% by mass, 65% by mass, 70% by mass, 75% by mass, or 80% by mass of the total amount of the liquid crystal composition (B). The upper limit of the preferred amount is 95% by mass, 85% by mass, 75% by mass, 65% by mass, 55% by mass, 45% by mass, 35% by mass, or 25% by mass.

When the liquid crystal composition (B) needs to have a low viscosity and a high response speed, the lower limit is preferably high, and the upper limit is preferably high. When the liquid crystal composition (B) needs to have a high $T_{NI}$ and high temperature stability, the lower limit is preferably high, and the upper limit is preferably high. When dielectric constant anisotropy is increased to maintain a low drive voltage, the lower limit is preferably low, and the upper limit is preferably low.

When reliability is regarded as important, both $R^{L1}$ and $R^{L2}$ preferably denote an alkyl group. When lower volatility of the compound is regarded as important, both $R^{L1}$ and $R^{L2}$ preferably denote an alkoxy group. When lower viscosity is regarded as important, at least one of $R^{L1}$ and $R^{L2}$ preferably denotes an alkenyl group.

The number of halogen atoms in the molecule is preferably 0, 1, 2, or 3, preferably 0 or 1, preferably 1 when compatibility with another liquid crystal molecule is regarded as important.

When the ring structure to which $R^{L1}$ and $R^{L2}$ are bonded is a phenyl group (aromatic), $R^{L1}$ and $R^{L2}$ preferably denote a linear alkyl group having 1 to 5 carbon atoms, a linear alkoxy group having 1 to 4 carbon atoms, or an alkenyl group having 4 or 5 carbon atoms. When the ring structure to which $R^{L1}$ and $R^{L2}$ are bonded is a saturated ring structure, such as cyclohexane, pyran, or dioxane, $R^{L1}$ and $R^{L2}$ preferably denote a linear alkyl group having 1 to 5 carbon atoms, a linear alkoxy group having 1 to 4 carbon atoms, or a linear alkenyl group having 2 to 5 carbon atoms. To stabilize the nematic phase, the total number of carbon atoms and, if present, oxygen atoms is preferably 5 or less, and a straight chain is preferred.

The alkenyl group is preferably selected from the groups represented by the formulae (R1) to (R5). (The dark dot in each formula represents a carbon atom in the ring structure.)

[Chem. 142]

(R1)

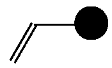

(R2)

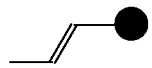

(R3)

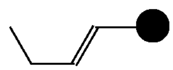

(R4)

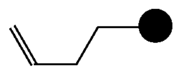

(R5)

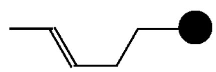

When the response speed is regarded as important, $n^{L1}$ is preferably 0. To improve the upper limit temperature of the nematic phase, $n^{L1}$ is preferably 2 or 3. To achieve the balance therebetween, $n^{L1}$ is preferably 1. To satisfy the characteristics required for the composition, compounds with different $n^{L1}$s are preferably combined.

$A^{L1}$, $A^{L2}$, and $A^{L3}$ preferably denote an aromatic when an increase in Δn is desired, an aliphatic to improve the response speed, or a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably one of the following structures,

[Chem. 143]

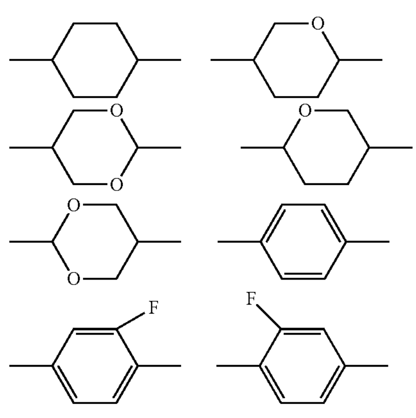

more preferably a trans-1,4-cyclohexylene group or a 1,4-phenylene group.

When the response speed is regarded as important, $Z^{L1}$ and $Z^{L2}$ preferably denote a single bond.

The number of halogen atoms per molecule of a compound represented by the general formula (L) is preferably 0 or 1.

A compound represented by the general formula (L) is preferably a compound selected from the compound group represented by the general formulae (L-1) to (L-8).

A compound represented by the general formula (L-1) is the following compound.

[Chem. 144]

(L-1)

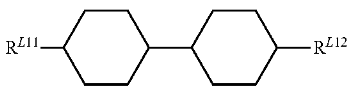

(wherein $R^{L11}$ and $R^{L12}$ have the same meaning as $R^{L1}$ and $R^{L2}$, respectively, in the general formula (L))

$R^{L11}$ and $R^{L12}$ preferably denote a linear alkyl group having 1 to 5 carbon atoms, a linear alkoxy group having 1 to 4 carbon atoms, or a linear alkenyl group having 2 to 5 carbon atoms.

The compounds represented by the general formula (L-1) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The lower limit of the preferred amount is 1% by mass, 2% by mass, 3% by mass, 5% by mass, 7% by mass, 10% by mass, 15% by mass, 20% by mass, 25% by mass, 30% by mass, 35% by mass, 40% by mass, 45% by mass, 50% by mass, or 55% by mass of the total amount of the liquid crystal composition (B). The upper limit of the preferred amount is 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, or 25% by mass of the total amount of the liquid crystal composition (B).

When the liquid crystal composition (B) needs to have a low viscosity and a high response speed, the lower limit is preferably high, and the upper limit is preferably high. When the liquid crystal composition (B) needs to have a high $T_{NI}$ and high temperature stability, the lower limit is preferably medium, and the upper limit is preferably medium. When the dielectric constant anisotropy is increased to maintain a low driving voltage, the lower limit is preferably low, and the upper limit is preferably low.

A compound represented by the general formula (L-1) is preferably a compound selected from the compound group represented by the general formula (L-1-1).

[Chem. 145]

(L-1-1)

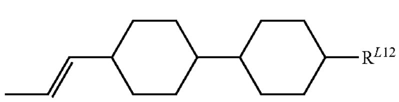

(wherein $R^2$ has the same meaning as in the general formula (L-1))

A compound represented by the general formula (L-1-1) is preferably a compound selected from the compound group represented by the formulae (L-1-1.1) to (L-1-1.3), preferably a compound represented by the formula (L-1-1.2) or (L-1-1.3), particularly preferably the compound represented by the formula (L-1-1.3).

[Chem. 146]

(L-1-1.1)

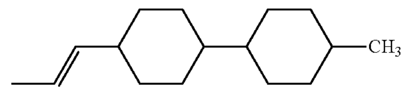

(L-1-1.2)

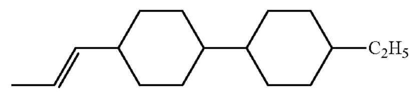

(L-1-1.3)

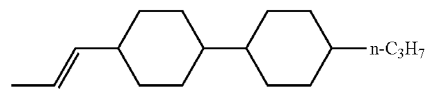

The lower limit of the preferred amount of the compound represented by the formula (L-1-1.3) is 1% by mass, 2% by mass, 3% by mass, 5% by mass, 7% by mass, or 10% by mass of the total amount of the liquid crystal composition (B). The upper limit of the preferred amount is 20% by mass, 15% by mass, 13% by mass, 10% by mass, 8% by mass, 7% by mass, 6% by mass, 5% by mass, or 3% by mass of the total amount of the liquid crystal composition (B).

A compound represented by the general formula (L-1) is preferably a compound selected from the compound group represented by the general formula (L-1-2) particularly to reduce the viscosity of the liquid crystal composition (B).

[Chem. 147]

(L-1-2)

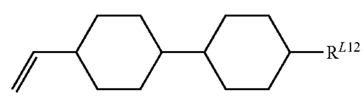

(wherein $R^{L12}$ has the same meaning as in the general formula (L-1))

The lower limit of the preferred amount of a compound represented by the formula (L-1-2) is 1% by mass, 5% by mass, 10% by mass, 15% by mass, 17% by mass, 20% by mass, 23% by mass, 25% by mass, 27% by mass, 30% by mass, or 35% by mass of the total amount of the liquid crystal composition (B). The upper limit of the preferred amount is 60% by mass, 55% by mass, 50% by mass, 45% by mass, 42% by mass, 40% by mass, 38% by mass, 35% by mass, 33% by mass, or 30% by mass of the total amount of the liquid crystal composition (B).

A compound represented by the general formula (L-1-2) is preferably a compound selected from the compound group represented by the formulae (L-1-2.1) to (L-1-2.4), preferably a compound represented by one of the formulae (L-1-2.2) to (L-1-2.4). In particular, the compound represented by the formula (L-1-2.2) is preferred to particularly improve the response speed of the liquid crystal composition (B). A compound represented by the formula (L-1-2.3) or (L-1-2.4) is preferably used to increase $T_{NI}$ rather than the response speed. To improve solubility at low temperatures, it is undesirable that the amount of a compound represented by the formula (L-1-2.3) or (L-1-2.4) be 30% or more by mass.

[Chem. 148]

(L-1-2.1)

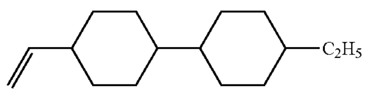

(L-1-2.2)

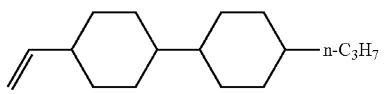

(L-1-2.3)

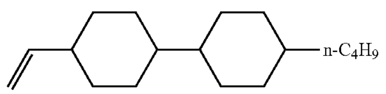

(L-1-2.4)

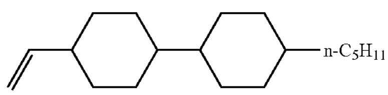

The lower limit of the preferred amount of the compound represented by the formula (L-1-2.2) is 10% by mass, 15% by mass, 18% by mass, 20% by mass, 23% by mass, 25% by mass, 27% by mass, 30% by mass, 33% by mass, 35% by mass, 38% by mass, or 40% by mass of the total amount of the liquid crystal composition (B). The upper limit of the preferred amount is 60% by mass, 55% by mass, 50% by mass, 45% by mass, 43% by mass, 40% by mass, 38% by mass, 35% by mass, 32% by mass, 30% by mass, 27% by mass, 25% by mass, or 22% by mass of the total amount of the liquid crystal composition (B).

The lower limit of the preferred total amount of the compound represented by the formula (L-1-1.3) and the compound represented by the formula (L-1-2.2) is 10% by mass, 15% by mass, 20% by mass, 25% by mass, 27% by mass, 30% by mass, 35% by mass, or 40% by mass of the total amount of the liquid crystal composition (B). The upper limit of the preferred amount is 60% by mass, 55% by mass, 50% by mass, 45% by mass, 43% by mass, 40% by mass, 38% by mass, 35% by mass, 32% by mass, 30% by mass, 27% by mass, 25% by mass, or 22% by mass of the total amount of the liquid crystal composition (B).

A compound represented by the general formula (L-1) is preferably a compound selected from the compound group represented by the general formula (L-1-3).

[Chem. 149]

(L-1-3)

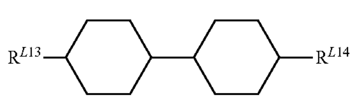

(wherein $R^{L3}$ and $R^{L4}$ independently denote an alkyl group having 1 to 8 carbon atoms or an alkoxy group having 1 to 8 carbon atoms)

$R^{L13}$ and $R^{L14}$ preferably denote a linear alkyl group having 1 to 5 carbon atoms, a linear alkoxy group having 1 to 4 carbon atoms, or a linear alkenyl group having 2 to 5 carbon atoms.

The lower limit of the preferred amount of a compound represented by the formula (L-1-3) is 1% by mass, 5% by mass, 10% by mass, 13% by mass, 15% by mass, 17% by mass, 20% by mass, 23% by mass, 25% by mass, or 30% by mass of the total amount of the liquid crystal composition (B). The upper limit of the preferred amount is 60% by mass, 55% by mass, 50% by mass, 45% by mass, 40% by mass, 37% by mass, 35% by mass, 33% by mass, 30% by mass, 27% by mass, 25% by mass, 23% by mass, 20% by mass, 17% by mass, 15% by mass, 13% by mass, or 10% by mass of the total amount of the liquid crystal composition (B).

More specifically, a compound represented by the general formula (L-1-3) is preferably a compound selected from the compound group represented by the formulae (L-1-3.1) to (L-1-3.13), preferably a compound represented by the formula (L-1-3.1), (L-1-3.3), or (L-1-3.4). In particular, the compound represented by the formula (L-1-3.1) is preferred to particularly improve the response speed of the liquid crystal composition (B). A compound represented by the formula (L-1-3.3), (L-1-3.4), (L-1-3.11), or (L-1-3.12) is preferably used to increase $T_{NI}$ rather than the response speed.

Among these compounds, the formula (L-1-3.1) and the formula (L-1-3.3) are preferably combined in terms of high compatibility and very high low-temperature stability of the liquid crystal composition (B).

[Chem. 105]

(L-1-3.1)

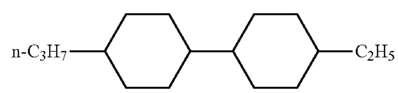

(L-1-3.2)

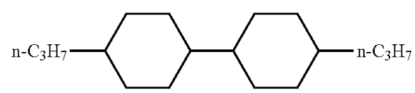

(L-1-3.3)

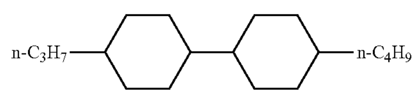

(L-1-3.4)

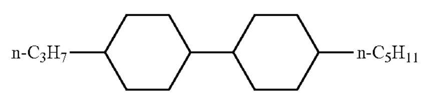

(L-1-3.11)

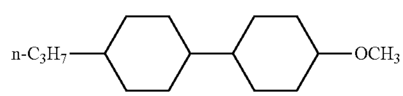

(L-1-3.12)

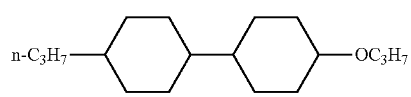

(L-1-3.13)

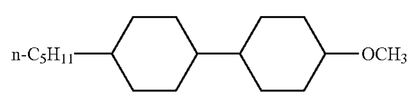

The lower limit of the preferred amount of the compound represented by the formula (L-1-3.1) is 1% by mass, 2% by mass, 3% by mass, 5% by mass, 7% by mass, 10% by mass, 13% by mass, 15% by mass, 18% by mass, or 20% by mass of the total amount of the liquid crystal composition (B). The upper limit of the preferred amount is 20% by mass, 17% by mass, 15% by mass, 13% by mass, 10% by mass, 8% by mass, 7% by mass, or 6% by mass of the total amount of the liquid crystal composition (B).

A compound represented by the general formula (L-1) is preferably a compound selected from the compound group represented by the general formulae (L-1-4) and/or (L-1-5).

[Chem. 151]

(I-1-4)

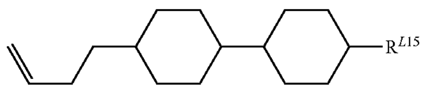

(I-1-5)

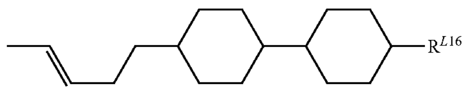

(wherein $R^{L15}$ and $R^{L16}$ independently denote an alkyl group having 1 to 8 carbon atoms or an alkoxy group having 1 to 8 carbon atoms)

$R^{L15}$ and $R^{L16}$ preferably denote a linear alkyl group having 1 to 5 carbon atoms, a linear alkoxy group having 1 to 4 carbon atoms, or a linear alkenyl group having 2 to 5 carbon atoms.

The lower limit of the preferred amount of the compound represented by the formula (L-1-4) is 1% by mass, 5% by mass, 10% by mass, 13% by mass, 15% by mass, 17% by mass, or 20% by mass of the total amount of the liquid crystal composition (B). The upper limit of the preferred amount is 25% by mass, 23% by mass, 20% by mass, 17% by mass, 15% by mass, 13% by mass, or 10% by mass of the total amount of the liquid crystal composition (B).

The lower limit of the preferred amount of the compound represented by the formula (L-1-5) is 1% by mass, 5% by mass, 10% by mass, 13% by mass, 15% by mass, 17% by mass, or 20% by mass of the total amount of the liquid crystal composition (B). The upper limit of the preferred amount is 25% by mass, 23% by mass, 20% by mass, 17% by mass, 15% by mass, 13% by mass, or 10% by mass of the total amount of the liquid crystal composition (B).

The compounds represented by the general formulae (L-1-4) and (L-1-5) are preferably compounds selected from the compound group represented by the formulae (L-1-4.1) to (L-1-5.3), preferably a compound represented by the formula (L-1-4.2) or (L-1-5.2).

[Chem. 152]

(L-1-4.1)

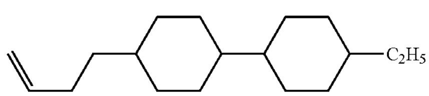

(L-1-4.2)

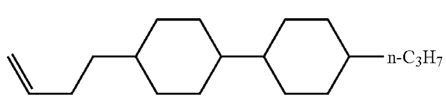

(L-1-4.3)

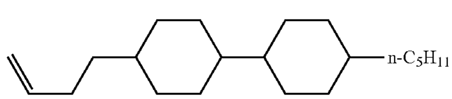

(L-1-5.1)

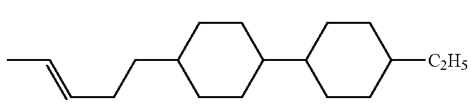

(L-1-5.2)

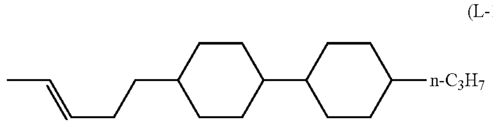

-continued (L-1-5.3)

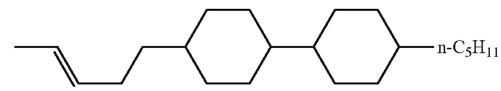

The lower limit of the preferred amount of the compound represented by the formula (L-1-4.2) is 1% by mass, 2% by mass, 3% by mass, 5% by mass, 7% by mass, 10% by mass, 13% by mass, 15% by mass, 18% by mass, or 20% by mass of the total amount of the liquid crystal composition (B). The upper limit of the preferred amount is 20% by mass, 17% by mass, 15% by mass, 13% by mass, 10% by mass, 8% by mass, 7% by mass, or 6% by mass of the total amount of the liquid crystal composition (B).

Two or more compounds selected from the compounds represented by the formulae (L-1-1.3), (L-1-2.2), (L-1-3.1), (L-1-3.3), (L-1-3.4), (L-1-3.11), and (L-1-3.12) are preferably combined, and two or more compounds selected from the compounds represented by the formulae (L-1-1.3), (L-1-2.2), (L-1-3.1), (L-1-3.3), (L-1-3.4), and (L-1-4.2) are preferably combined. The lower limit of the preferred total amount of these compounds is 1% by mass, 2% by mass, 3% by mass, 5% by mass, 7% by mass, 10% by mass, 13% by mass, 15% by mass, 18% by mass, 20% by mass, 23% by mass, 25% by mass, 27% by mass, 30% by mass, 33% by mass, or 35% by mass of the total amount of the liquid crystal composition (B). The upper limit of the preferred amount is 80% by mass, 70% by mass, 60% by mass, 50% by mass, 45% by mass, 40% by mass, 37% by mass, 35% by mass, 33% by mass, 30% by mass, 28% by mass, 25% by mass, 23% by mass, or 20% by mass of the total amount of the liquid crystal composition (B). When the reliability of the composition is regarded as important, two or more compounds selected from the compounds represented by the formulae (L-1-3.1), (L-1-3.3), and (L-1-3.4) are preferably combined. When the response speed of the composition is regarded as important, two or more compounds selected from the compounds represented by the formulae (L-1-1.3) and (L-1-2.2) are preferably combined.

A compound represented by the general formula (L-1) is preferably a compound selected from the compound group represented by the general formula (L-1-6).

[Chem. 153]

(L-1-6)

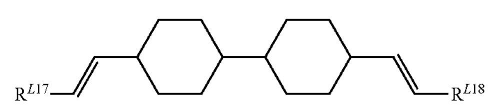

(wherein $R^{L17}$ and $R^{L18}$ independently denote a methyl group or a hydrogen atom)

The lower limit of the preferred amount of a compound represented by the formula (L-1-6) is 1% by mass, 5% by mass, 10% by mass, 15% by mass, 17% by mass, 20% by mass, 23% by mass, 25% by mass, 27% by mass, 30% by mass, or 35% by mass of the total amount of the liquid crystal composition (B). The upper limit of the preferred amount is 60% by mass, 55% by mass, 50% by mass, 45% by mass, 42% by mass, 40% by mass, 38% by mass, 35% by mass, 33% by mass, or 30% by mass of the total amount of the liquid crystal composition (B).

A compound represented by the general formula (L-1-6) is preferably a compound selected from the compound group represented by the formulae (L-1-6.1) to (L-1-6.3).

[Chem. 154]

(L-1.6.1)

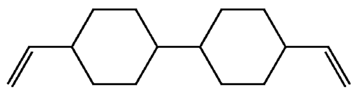

(L-1.6.2)

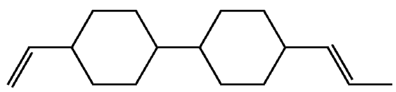

(L-1.6.3)

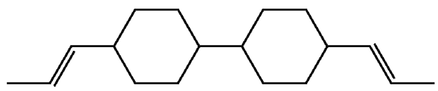

A compound represented by the general formula (L-2) is the following compound.

[Chem. 155]

(L-2)

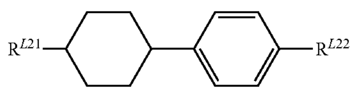

(wherein $R^{L21}$ and $R^{L22}$ have the same meaning as $R^{L1}$ and $R^{L2}$, respectively, in the general formula (L))

$R^{L21}$ preferably denotes an alkyl group having 1 to 5 carbon atoms or an alkenyl group having 2 to 5 carbon atoms, and $R^{L22}$ preferably denotes an alkyl group having 1 to 5 carbon atoms, an alkenyl group having 4 or 5 carbon atoms, or an alkoxy group having 1 to 4 carbon atoms.

The compounds represented by the general formula (L-1) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount is effectively set somewhat larger when solubility at low temperatures is regarded as important and is effectively set somewhat smaller when the response speed is regarded as important. The amount is preferably set in a medium range to reduce drop marks and improve image-sticking characteristics.

The lower limit of the preferred amount of the compound represented by the formula (L-2) is 1% by mass, 2% by mass, 3% by mass, 5% by mass, 7% by mass, or 10% by mass of the total amount of the liquid crystal composition (B). The upper limit of the preferred amount is 20% by mass, 15% by mass, 13% by mass, 10% by mass, 8% by mass, 7% by mass, 6% by mass, 5% by mass, or 3% by mass of the total amount of the liquid crystal composition (B).

A compound represented by the general formula (L-2) is preferably a compound selected from the compound group represented by the formulae (L-2.1) to (L-2.6), preferably a compound represented by the formula (L-2.1), (L-2.3), (L-2.4), or (L-2.6).

[Chem. 156]

(L-2.1)

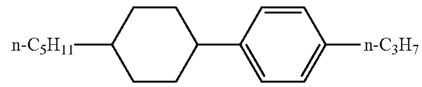

(L-2.2)

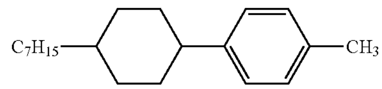

(L-2.3)

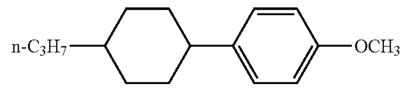

(L-2.4)

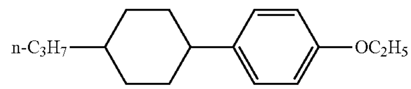

(L-2.5)

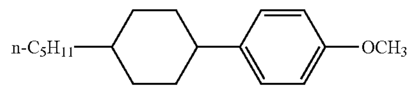

(L-2.6)

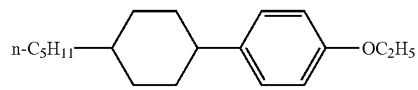

A compound represented by the general formula (L-3) is the following compound.

[Chem. 157]

(L-3)

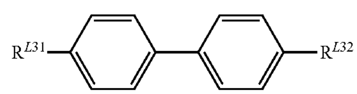

(wherein $R^{L31}$ and $R^{L32}$ have the same meaning as $R^{L1}$ and $R^{L2}$, respectively, in the general formula (L))

$R^{L31}$ and $R^{L32}$ preferably independently denote an alkyl group having 1 to 5 carbon atoms, an alkenyl group having 4 or 5 carbon atoms, or an alkoxy group having 1 to 4 carbon atoms.

The compounds represented by the general formula (L-3) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The lower limit of the preferred amount of the compound represented by the formula (L-3) is 1% by mass, 2% by mass, 3% by mass, 5% by mass, 7% by mass, or 10% by mass of the total amount of the liquid crystal composition (B). The upper limit of the preferred amount is 20% by mass, 15% by mass, 13% by mass, 10% by mass, 8% by mass, 7% by mass, 6% by mass, 5% by mass, or 3% by mass of the total amount of the liquid crystal composition (B).

The amount is effectively set somewhat larger to achieve a high birefringence index and is effectively set somewhat smaller when a high $T_{NI}$ is regarded as important. The amount is preferably set in a medium range to reduce drop marks and improve image-sticking characteristics.

A compound represented by the general formula (L-3) is preferably a compound selected from the compound group represented by the formulae (L-3.1) to (L-3.4), preferably a compound represented by one of the formulae (L-3.1) to (L-3.7). In particular, a compound represented by the formula (L-3.1) is preferred in terms of high Δn and low viscosity or in terms of high $T_{NI}$ and low viscosity.

[Chem. 158]

(L-3.1)

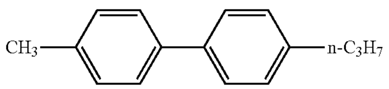

(L-3.2)

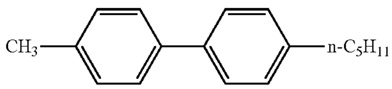

(L-3.3)

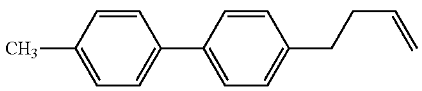

(L-3.4)

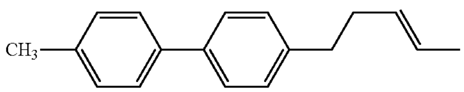

(L-3.6)

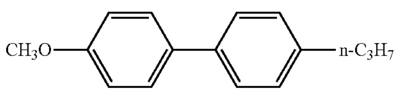

(L-3.7)

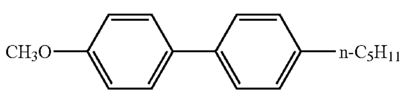

A compound represented by the general formula (L-4) is the following compound.

[Chem. 159]

(L-4)

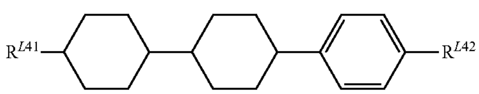

(wherein $R^{L41}$ and $R^{L42}$ have the same meaning as $R^{L1}$ and $R^{L2}$, respectively, in the general formula (L))

$R^{L41}$ preferably denotes an alkyl group having 1 to 5 carbon atoms or an alkenyl group having 2 to 5 carbon atoms, and $R^{L42}$ preferably denotes an alkyl group having 1 to 5 carbon atoms, an alkenyl group having 4 or 5 carbon atoms, or an alkoxy group having 1 to 4 carbon atoms.

The compounds represented by the general formula (L-4) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount of a compound represented by the general formula (L-4) in the liquid crystal composition (B) should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (L-4) is 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass of the total amount of the liquid crystal composition (B). The upper limit of the preferred amount of a compound represented by the formula (L-4) is 50% by mass, 40% by mass, 35% by mass, 30% by mass, 20% by mass, 15% by mass, 10% by mass, or 5% by mass of the total amount of the liquid crystal composition (B).

A compound represented by the general formula (L-4) is preferably a compound represented by one of the formulae (L-4.1) to (L-4.3), for example.

[Chem. 160]

(L-4.1)

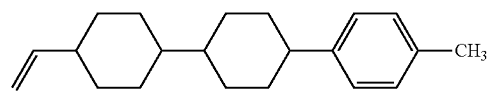

(L-4.2)

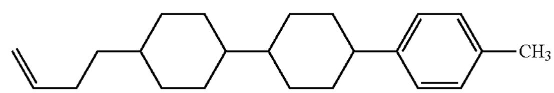

(L-4.3)

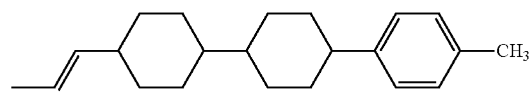

Depending on the desired characteristics, such as solubility at low temperatures, transition temperature, electrical reliability, and birefringence index, the compound represented by the formula (L-4.1), the compound represented by the formula (L-4.2), or both the compound represented by the formula (L-4.1) and the compound represented by the formula (L-4.2) may be contained, or all the compounds represented by the formulae (L-4.1) to (L-4.3) may be contained. The lower limit of the preferred amount of a compound represented by the formula (L-4.1) or (L-4.2) is 3% by mass, 5% by mass, 7% by mass, 9% by mass, 11% by mass, 12% by mass, 13% by mass, 18% by mass, or 21% by mass of the total amount of the liquid crystal composition (B). The preferred upper limit is 45% by mass, 40% by mass, 35% by mass, 30% by mass, 25% by mass, 23% by mass, 20% by mass, 18% by mass, 15% by mass, 13% by mass, 10% by mass, or 8% by mass.

When both the compound represented by the formula (L-4.1) and the compound represented by the formula (L-4.2) are contained, the lower limit of the preferred amount of both compounds is 15% by mass, 19% by mass, 24% by mass, or 30% by mass of the total amount of the liquid crystal composition (B), and the preferred upper limit is 45, 40% by mass, 35% by mass, 30% by mass, 25% by mass, 23% by mass, 20% by mass, 18% by mass, 15% by mass, or 13% by mass.

A compound represented by the general formula (L-4) is preferably a compound represented by one of the formulae (L-4.4) to (L-4.6), preferably the compound represented by the formula (L-4.4), for example.

[Chem.161]

(L-4.4)

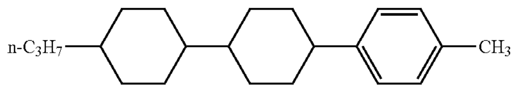

(L-4.5)

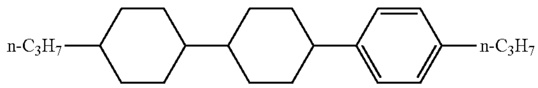

(L-4.6)

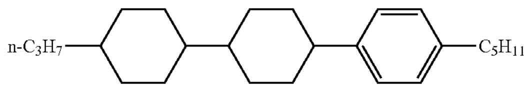

Depending on the desired characteristics, such as solubility at low temperatures, transition temperature, electrical reliability, and birefringence index, the compound represented by the formula (L-4.4), the compound represented by the formula (L-4.5), or both the compound represented by the formula (L-4.4) and the compound represented by the formula (L-4.5) may be contained.

The lower limit of the preferred amount of a compound represented by the formula (L-4.4) or (L-4.5) is 3% by mass, 5% by mass, 7% by mass, 9% by mass, 11% by mass, 12% by mass, 13% by mass, 18% by mass, or 21% by mass of the total amount of the liquid crystal composition (B). The preferred upper limit is 45, 40% by mass, 35% by mass, 30% by mass, 25% by mass, 23% by mass, 20% by mass, 18% by mass, 15% by mass, 13% by mass, 10% by mass, or 8% by mass.

When both the compound represented by the formula (L-4.4) and the compound represented by the formula (L-4.5) are contained, the lower limit of the preferred amount of both compounds is 15% by mass, 19% by mass, 24% by mass, or 30% by mass of the total amount of the liquid crystal composition (B), and the preferred upper limit is 45, 40% by mass, 35% by mass, 30% by mass, 25% by mass, 23% by mass, 20% by mass, 18% by mass, 15% by mass, or 13% by mass.

A compound represented by the general formula (L-4) is preferably a compound represented by one of the formulae (L-4.7) to (L-4.10), particularly preferably the compound represented by the formula (L-4.9).

[Chem.162]

(L-4.7)

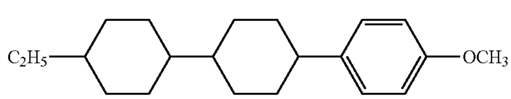

(L-4.8)

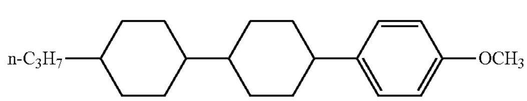

-continued (L-4.9)

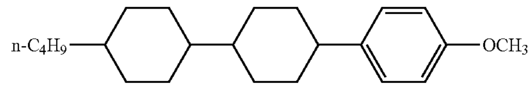

(L-4.10)

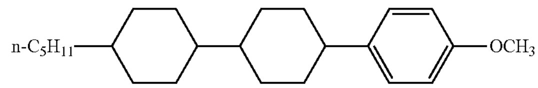

A compound represented by the general formula (L-5) is the following compound.

[Chem. 163]

(L-5)

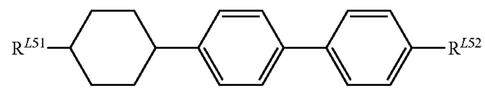

(wherein $R^{L51}$ and $R^{L52}$ have the same meaning as $R^{L1}$ and $R^{L2}$, respectively, in the general formula (L))

$R^{L51}$ preferably denotes an alkyl group having 1 to 5 carbon atoms or an alkenyl group having 2 to 5 carbon atoms, and $R^{L52}$ preferably denotes an alkyl group having 1 to 5 carbon atoms, an alkenyl group having 4 or 5 carbon atoms, or an alkoxy group having 1 to 4 carbon atoms.

The compounds represented by the general formula (L-5) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The amount of a compound represented by the general formula (L-5) in the liquid crystal composition (B) should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (L-5) is 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass of the total amount of the liquid crystal composition (B). The upper limit of the preferred amount of a compound represented by the formula (L-5) is 50% by mass, 40% by mass, 35% by mass, 30% by mass, 20% by mass, 15% by mass, 10% by mass, or 5% by mass of the total amount of the liquid crystal composition (B).

A compound represented by the general formula (L-5) is preferably a compound represented by the formula (L-5.1) or (L-5.2). In particular, the compound represented by the formula (L-5.1) is preferred due to high compatibility with another liquid crystal compound and because an addition in a small amount can increase Δn and the nematic-isotropic phase transition temperature $T_{NI}$ and improve the low-temperature stability. In particular, a combination with the compound represented by the formula (L-1-3.1) greatly improves the low-temperature stability.

The lower limit of the preferred amount of these compounds is 1% by mass, 2% by mass, 3% by mass, 5% by mass, or 7% by mass of the total amount of the liquid crystal composition (B). The upper limit of the preferred amount of these compounds is 20% by mass, 15% by mass, 13% by mass, 10% by mass, or 9% by mass.

[Chem.164]

(L-5.1)

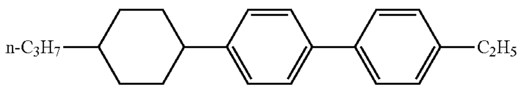

(L-5.2)

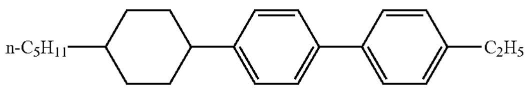

A compound represented by the general formula (L-5) is preferably a compound represented by the formula (L-5.3) or (L-5.4).

The lower limit of the preferred amount of these compounds is 1% by mass, 2% by mass, 3% by mass, 5% by mass, or 7% by mass of the total amount of the liquid crystal composition (B). The upper limit of the preferred amount of these compounds is 20% by mass, 15% by mass, 13% by mass, 10% by mass, or 9% by mass.

[Chem.165]

(L-5.3)

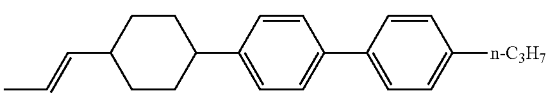

(L-5.4)

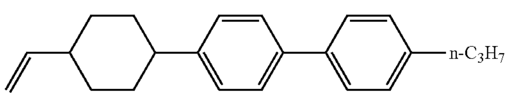

A compound represented by the general formula (L-5) is preferably a compound selected from the compound group represented by the formulae (L-5.5) to (L-5.7), particularly preferably the compound represented by the formula (L-5.7).

The lower limit of the preferred amount of these compounds is 1% by mass, 2% by mass, 3% by mass, 5% by mass, or 7% by mass of the total amount of the liquid crystal composition (B). The upper limit of the preferred amount of these compounds is 20% by mass, 15% by mass, 13% by mass, 10% by mass, or 9% by mass.

[Chem. 166]

(L-5.5)

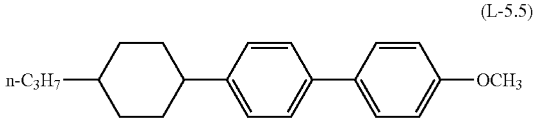

-continued (L-5.6)

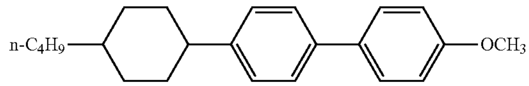

(L-5.7)

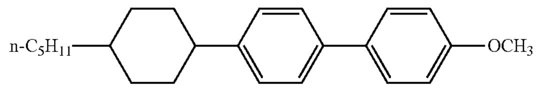

A compound represented by the general formula (L-6) is the following compound.

[Chem. 167]

(L-6)

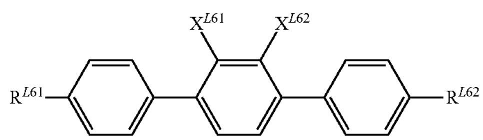

(wherein $R^{L61}$ and $R^{L62}$ have the same meaning as $R^{L1}$ and $R^{L2}$ respectively, in the general formula (L), and $X^{L61}$ and $X^{L62}$ independently denote a hydrogen atom or a fluorine atom)

$R^{L61}$ and $R^{L62}$ preferably independently denote an alkyl group having 1 to 5 carbon atoms or an alkenyl group having 2 to 5 carbon atoms. One of $X^{L61}$ and $X^{L62}$ preferably denotes a fluorine atom, and the other preferably denotes a hydrogen atom.

The compounds represented by the general formula (L-6) may be used alone or as a combination of two or more thereof. Although compounds of any types may be combined, these compounds are appropriately combined in a manner that depends on the desired characteristics, such as solubility at low temperatures, transition temperature, electrical reliability, and birefringence index. For example, one, two, three, four, five, or more compounds are used in one embodiment of the present invention.

The lower limit of the preferred amount of a compound represented by the formula (L-6) is 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass of the total amount of the liquid crystal composition (B). The upper limit of the preferred amount of a compound represented by the formula (L-6) is 50% by mass, 40% by mass, 35% by mass, 30% by mass, 20% by mass, 15% by mass, 10% by mass, or 5% by mass of the total amount of the liquid crystal composition (B). When an increased Δn is regarded as important, the amount is preferably increased, and when precipitation at low temperatures is regarded as important, the amount is preferably decreased.

A compound represented by the general formula (L-6) is preferably a compound represented by one of the formulae (L-6.1) to (L-6.9).

[Chem. 168]

(L-6.1)

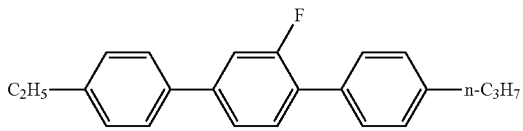

(L-6.2)

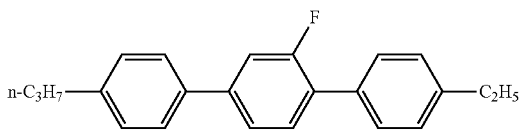

(L-6.3)

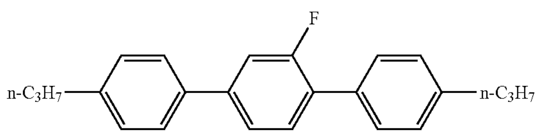

(L-6.4)

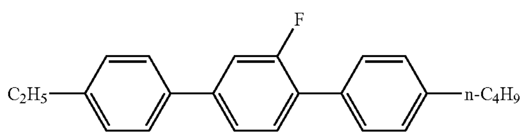

(L-6.5)

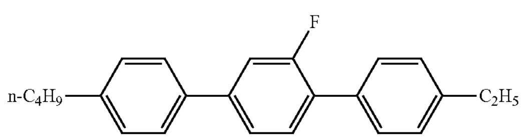

(L-6.6)

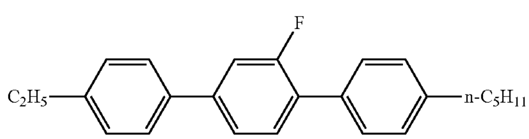

(L-6.7)

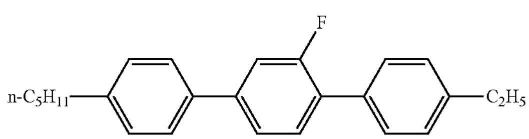

(L-6.8)

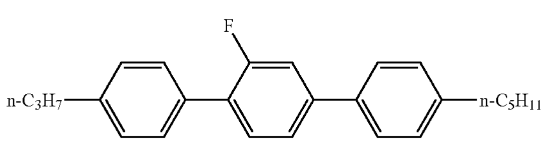

(L-6.9)

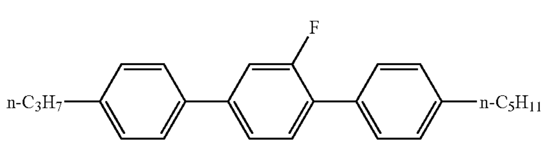

Although compounds of any types may be combined, one to three of these compounds are preferably contained, and one to four of these compounds are more preferably contained. Because a broad molecular weight distribution of a compound to be selected is also effective for solubility, for example, one compound represented by the formula (L-6.1) or (L-6.2), one compound represented by the formula (L-6.4) or (L-6.5), one compound represented by the formula (L-6.6) or (L-6.7), and one compound represented by the formula (L-6.8) or (L-6.9) are preferably appropriately combined. Among these, the compounds represented by the formulae (L-6.1), (L-6.3), (L-6.4), (L-6.6), and (L-6.9) are preferably contained.

A compound represented by the general formula (L-6) is preferably, for example, a compound represented by one of the formulae (L-6.10) to (L-6.17) and is, among these, preferably the compound represented by the formula (L-6.11)

[Chem. 169]

(L-6.10)

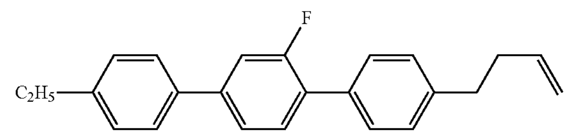

(L-6.11)

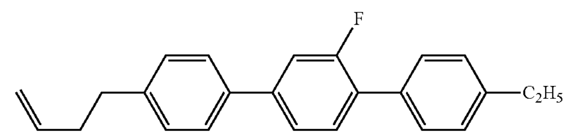

(L-6.12)

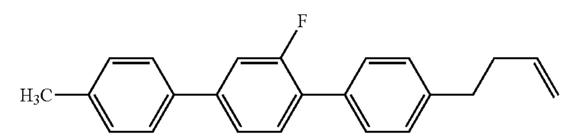

(L-6.13)

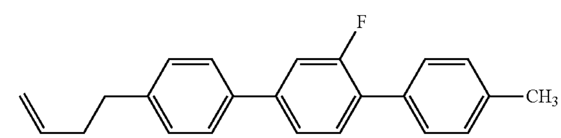

(L-6.14)

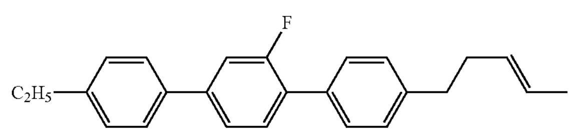

(L-6.15)

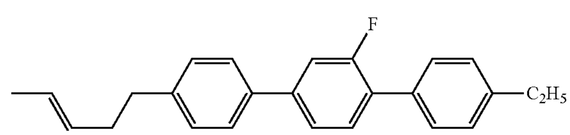

(L-6.16)

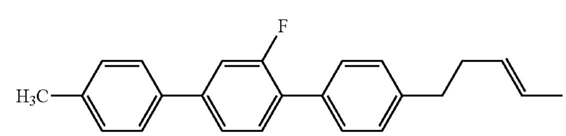

(L-6.17)

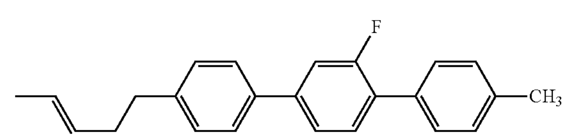

The lower limit of the preferred amount of these compounds is 1% by mass, 2% by mass, 3% by mass, 5% by mass, or 7% by mass of the total amount of the liquid crystal composition (B). The upper limit of the preferred amount of these compounds is 20% by mass, 15% by mass, 13% by mass, 10% by mass, or 9% by mass.

A compound represented by the general formula (L-7) is the following compound.

[Chem. 170]

(L-7)

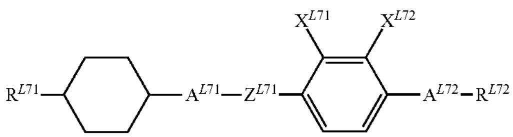

(wherein $R^{L71}$ and $R^{L72}$ have the same meaning as $R^{L1}$ and $R^{L2}$, respectively, in the general formula (L), $A^{L71}$ and $A^{L72}$ independently have the same meaning as $A^{L2}$ and $A^{L3}$, respectively, in the general formula (L), a hydrogen atom in $A^{L71}$ and $A^{L72}$ is independently optionally substituted with a fluorine atom, $Z^{L71}$ has the same meaning as $Z^{L2}$ in the general formula (L), and $X^{L71}$ and $X^{L72}$ independently denote a fluorine atom or a hydrogen atom)

$R^{L71}$ and $R^{L72}$ preferably independently denote an alkyl group having 1 to 5 carbon atoms, an alkenyl group having 2 to 5 carbon atoms, or an alkoxy group having 1 to 4 carbon atoms, $A^{L71}$ and $A^{L72}$ preferably independently denote a 1,4-cyclohexylene group or a 1,4-phenylene group, a hydrogen atom in $A^{L71}$ and $A^{L72}$ is independently optionally substituted with a fluorine atom, $Z^{L71}$ preferably denotes a single bond or COO—, preferably a single bond, and $X^{L71}$ and $X^{L72}$ preferably denote a hydrogen atom.

Although compounds of any types may be combined, they are combined in a manner that depends on the desired characteristics, such as solubility at low temperatures, transition temperature, electrical reliability, and birefringence index. For example, one, two, three, or four compounds are used in one embodiment of the present invention.

The amount of a compound represented by the general formula (L-7) in the liquid crystal composition (B) should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of a compound represented by the formula (L-7) is 1% by mass, 2% by mass, 3% by mass, 5% by mass, 7% by mass, 10% by mass, 14% by mass, 16% by mass, or 20% by mass of the total amount of the liquid crystal composition (B). The upper limit of the preferred amount of a compound represented by the formula (L-7) is 30% by mass, 25% by mass, 23% by mass, 20% by mass, 18% by mass, 15% by mass, 10% by mass, or 5% by mass of the total amount of the liquid crystal composition (B).

In an embodiment in which the liquid crystal composition (B) with a high $T_{NI}$ is desired, the amount of a compound represented by the formula (L-7) is preferably somewhat larger. In an embodiment in which the liquid crystal composition (B) with a low viscosity is desired, the amount of a compound represented by the formula (L-7) is preferably somewhat smaller.

A compound represented by the general formula (L-7) is preferably a compound represented by one of the formulae (L-7.1) to (L-7.4), preferably the compound represented by the formula (L-7.2).

[Chem. 171]

(L-7.1)

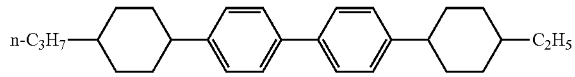

(L-7.2)

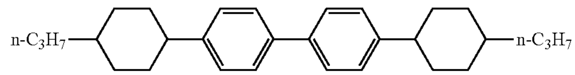

(L-7.3)

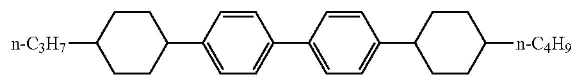

(L-7.4)

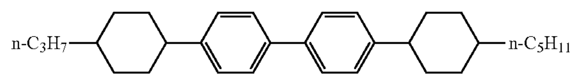

A compound represented by the general formula (L-7) is preferably a compound represented by one of the formulae (L-7.11) to (L-7.13), preferably the compound represented by the formula (L-7.11).

[Chem. 172]

(L-7.11)

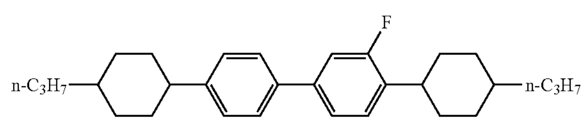

(L-7.12)

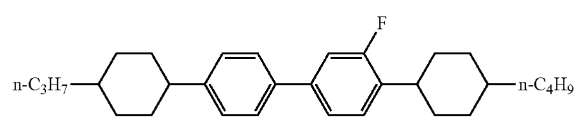

(L-7.13)

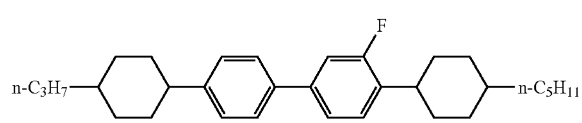

A compound represented by the general formula (L-7) is a compound represented by one of the formulae (L-7.21) to (L-7.23). The compound represented by the formula (L-7.21) is preferred.

[Chem. 173]

(L-7.21)

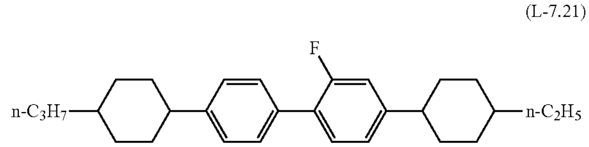

-continued (L-7.22)

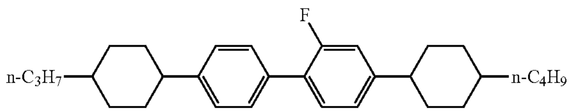

(L-7.23)

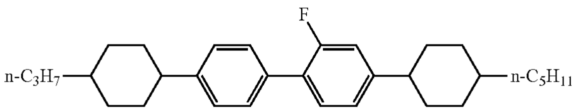

A compound represented by the general formula (L-7) is preferably a compound represented by one of the formulae (L-7.31) to (L-7.34), preferably the compound represented by the formula (L-7.31) and/or the compound represented by the formula (L-7.32).

[Chem. 174]

(L-7.31)

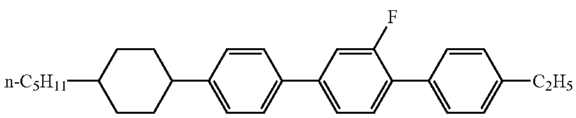

(L-7.32)

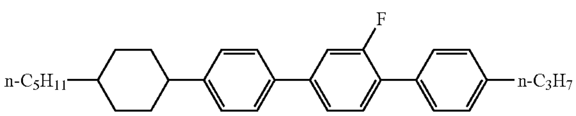

(L-7.33)

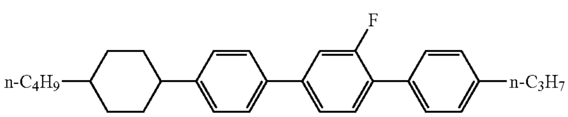

-continued (L-7.34)

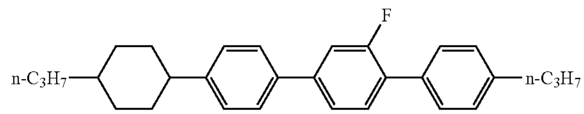

A compound represented by the general formula (L-7) is preferably a compound represented by one of the formulae (L-7.41) to (L-7.44), preferably the compound represented by the formula (L-7.41) and/or the compound represented by the formula (L-7.42).

[Chem. 175]

(L-7.41)

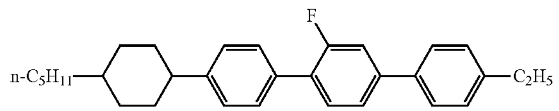

(L-7.42)

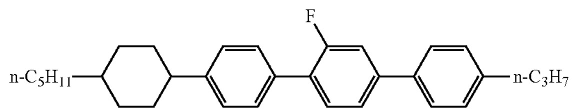

(L-7.43)

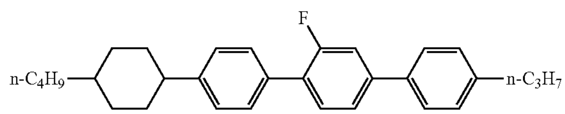

(L-7.44)

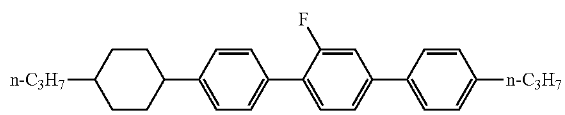

A compound represented by the general formula (L-7) is preferably a compound represented by one of the formulae (L-7.51) to (L-7.53).

[Chem. 176]

(L-7.51)

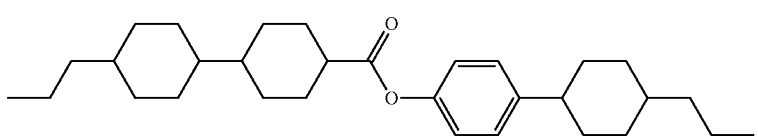

(L-7.52)

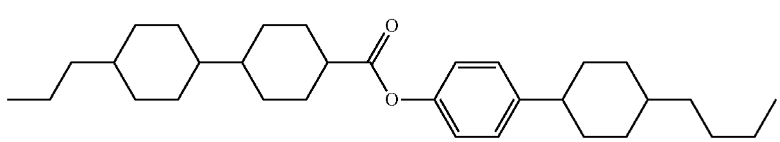

(L-7.53)

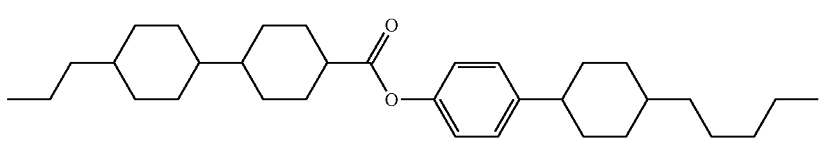

A compound represented by the general formula (L-8) is the following compound.

[Chem. 177]

(L-8)

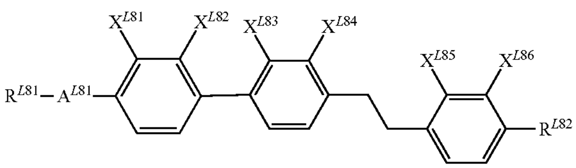

(wherein $R^{L81}$ and $R^{L82}$ have the same meaning as $R^{L1}$ and $R^{L2}$, respectively, in the general formula (L), $A^{L81}$ has the same meaning as $A^{L1}$ in the general formula (L) or denotes a single bond, a hydrogen atom in $A^{L81}$ is independently optionally substituted with a fluorine atom, and $X^{L81}$ to $X^{L86}$ independently denote a fluorine atom or a hydrogen atom)

In the formula, $R^{L81}$ and $R^{L82}$ preferably independently denote an alkyl group having 1 to 5 carbon atoms, an alkenyl group having 2 to 5 carbon atoms, or an alkoxy group having 1 to 4 carbon atoms, $A^{L81}$ preferably denotes a 1,4-cyclohexylene group or a 1,4-phenylene group, a hydrogen atom in —$A^{L81}$ and $A^{L82}$ is independently optionally substituted with a fluorine atom, and there is preferably 0 or 1 fluorine atom in a ring structure in the general formula (L-8) and 0 or 1 fluorine atom in the molecule.

Although compounds of any types may be combined, they are combined in a manner that depends on the desired characteristics, such as solubility at low temperatures, transition temperature, electrical reliability, and birefringence index. For example, one, two, three, or four compounds are used in one embodiment of the present invention.

The amount of a compound represented by the general formula (L-8) in the liquid crystal composition (B) should be appropriately adjusted in a manner that depends on the desired characteristics, such as solubility at low temperatures, transition temperature, electrical reliability, birefringence index, process compatibility, drop marks, image-sticking, and dielectric constant anisotropy.

The lower limit of the preferred amount of the compound represented by the formula (L-8) is 1% by mass, 2% by mass, 3% by mass, 5% by mass, 7% by mass, 10% by mass, 14% by mass, 16% by mass, or 20% by mass of the total amount of the liquid crystal composition (B). The upper limit of the preferred amount of a compound represented by the formula (L-8) is 30% by mass, 25% by mass, 23% by mass, 20% by mass, 18% by mass, 15% by mass, 10% by mass, or 5% by mass of the total amount of the liquid crystal composition (B).

In an embodiment in which the liquid crystal composition (B) with a high $T_{NI}$ is desired, the amount of a compound represented by the formula (L-8) is preferably somewhat larger. In an embodiment in which the liquid crystal composition (B) with a low viscosity is desired, the amount of a compound represented by the formula (L-8) is preferably somewhat smaller.

A compound represented by the general formula (L-8) preferably denotes a compound represented by one of the formulae (L-8.1) to (L-8.4), more preferably a compound represented by one of the formulae (L-8.3), (L-8.5), (L-8.6), (L-8.13), (L-8.16) to (L-8.18), and (L-8.23) to (L-8.28).

[Chem. 178]

(L-8.1)

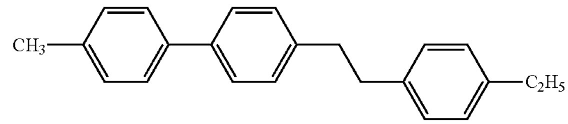

(L-8.2)

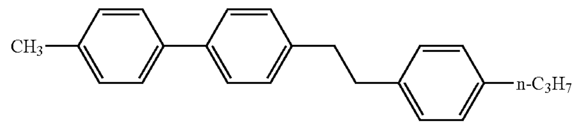

(L-8.3)

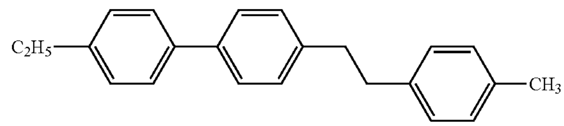

(L-8.4)

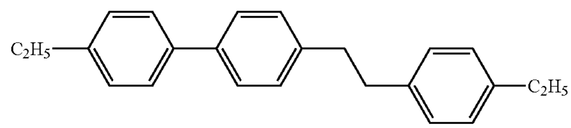

(L-8.5)

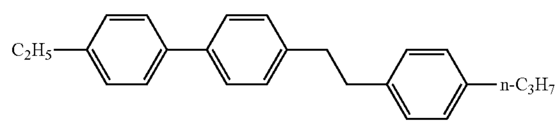

(L-8.6)

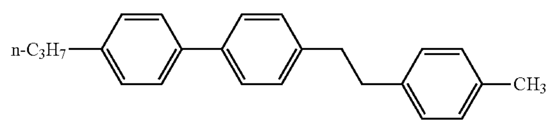

(L-8.7)

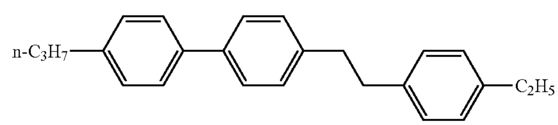

(L-8.8)

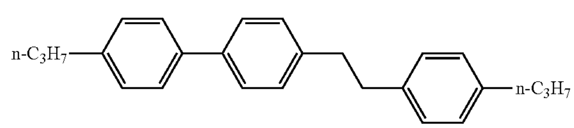

[Chem. 179]

(L-8.11)

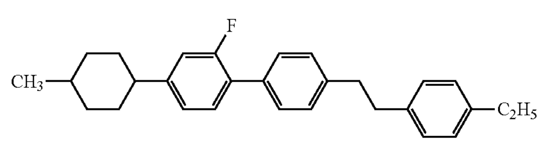

(L-8.12)

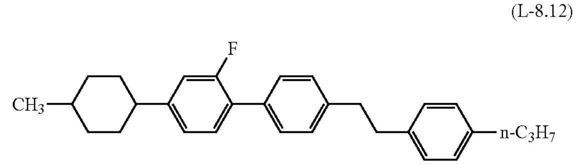

-continued (L-8.13)

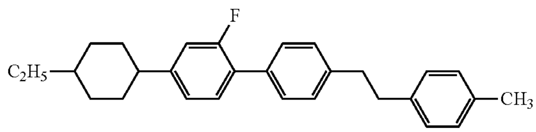

(L-8.14)

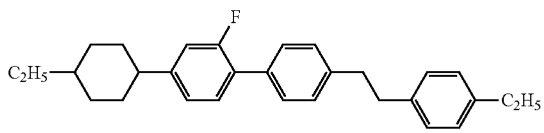

(L-8.15)

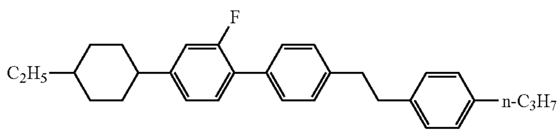

(L-8.16)

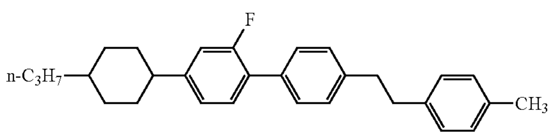

(L-8.17)

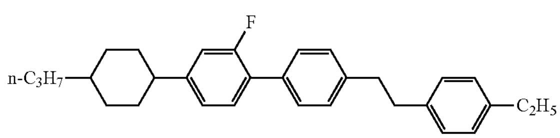

(L-8.18)

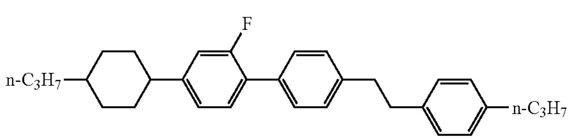

[Chem. 180]

(L-8.21)

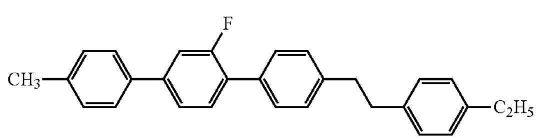

(L-8.22)

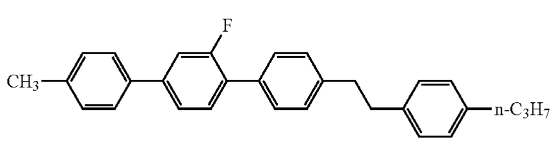

(L-8.23)

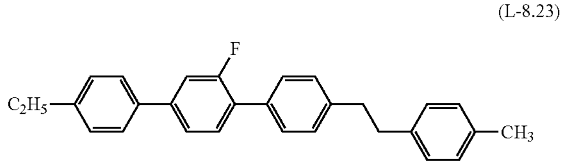

(L-8.24)

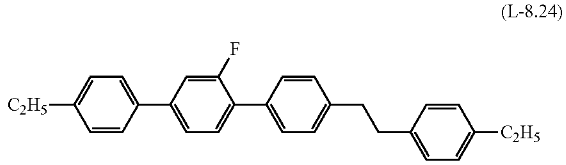

-continued (L-8.25)

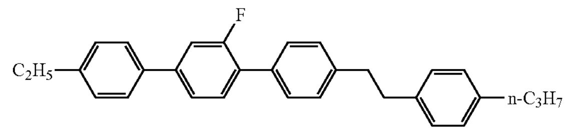

(L-8.26)

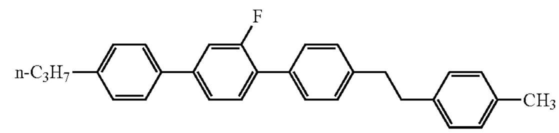

(L-8.27)

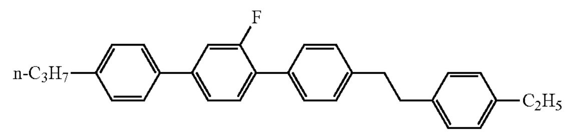

(L-8.28)

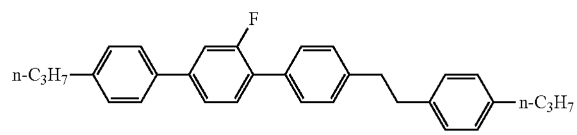

The lower limit of the preferred total amount of the compounds represented by the general formulae (L), (N-1), (N-2), (N-3), (N-4), and (J) is 80% by mass, 85% by mass, 88% by mass, 90% by mass, 92% by mass, 93% by mass, 94% by mass, 95% by mass, 96% by mass, 97% by mass, 98% by mass, 99% by mass, or 100% by mass of the total amount of the liquid crystal composition (B). The upper limit of the preferred amount is 100% by mass, 99% by mass, 98% by mass, or 95% by mass. To obtain a composition with a large absolute Δε, one of the compounds represented by the general formulae (N-1), (N-2), (N-3), (N-4), and (J) is preferably 0% by mass.

The lower limit of the preferred total amount of the compounds represented by the general formulae (L-1) to (L-7), (M-1) to (M-8), and (N-1) to (N-4) is 80% by mass, 85% by mass, 88% by mass, 90% by mass, 92% by mass, 93% by mass, 94% by mass, 95% by mass, 96% by mass, 97% by mass, 98% by mass, 99% by mass, or 100% by mass of the total amount of the liquid crystal composition (B). The upper limit of the preferred amount is 100% by mass, 99% by mass, 98% by mass, or 95% by mass.

The liquid crystal composition (B) preferably contains no compound having a structure in which oxygen atoms are bonded together, such as a peroxy (—CO—OO—) structure, in its molecule.

When the reliability and long-term stability of a composition are regarded as important, the amount of compound(s) having a carbonyl group is preferably 5% or less by mass, more preferably 3% or less by mass, still more preferably 1% or less by mass, most preferably substantially zero percent, of the total mass of the composition.

When stability under UV radiation is regarded as important, the amount of compound(s) substituted with a chlorine atom is preferably 15% or less by mass, preferably 10% or less by mass, preferably 8% or less by mass, more preferably 5% or less by mass, preferably 3% or less by mass, more preferably substantially zero percent, of the total mass of the composition.

The amount of a compound in which all the ring structures of its molecule are 6-membered rings is preferably increased. The amount of a compound in which all the ring structures of its molecule are 6-membered rings is preferably 80% or more by mass, more preferably 90% or more by mass, still more preferably 95% or more by mass, of the total mass of the composition. Most preferably, a composition is composed substantially solely of a compound in which all the ring structures of its molecule are 6-membered rings.

To prevent the oxidative degradation of a composition, the amount of compound(s) having a cyclohexenylene group as a ring structure is preferably decreased. The amount of compound(s) having a cyclohexenylene group is preferably 10% or less, preferably 8% or less, more preferably 5% or less, preferably 3% or less, still more preferably substantially zero percent, of the total mass of the composition.

When improved viscosity and $T_{NI}$ are regarded as important, the amount of compound(s) having a 2-methylbenzene-1,4-diyl group in its molecule in which a hydrogen atom is optionally substituted with a halogen is preferably decreased, and the amount of compound(s) having a 2-methylbenzene-1,4-diyl group in its molecule is preferably 10% or less by mass, preferably 8% or less by mass, more preferably 5% or less by mass, preferably 3% or less by mass, still more preferably substantially zero percent, of the total mass of the composition.

The phrase "substantially zero percent", as used herein, refers to zero percent except for incidental inclusions.

When a compound in the liquid crystal composition (B) has an alkenyl group as a side chain, and the alkenyl group is bonded to cyclohexane, the alkenyl group preferably has 2 to 5 carbon atoms. When the alkenyl group is bonded to benzene, the alkenyl group preferably has 4 or 5 carbon atoms, and an unsaturated bond of the alkenyl group is preferably not directly bonded to benzene.

A liquid crystal composition for use in the liquid crystal composition (B) preferably has an average elastic constant ($K_{AVG}$) in the range of 10 to 25. The lower limit of the average elastic constant ($K_{AVG}$) is preferably 10, 10.5, 11, 11.5, 12, 12.3, 12.5, 12.8, 13, 13.3, 13.5, 13.8, 14, 14.3, 14.5, 14.8, 15, 15.3, 15.5, 15.8, 16, 16.3, 16.5, 16.8, 17, 17.3, 17.5, 17.8, or 18. The upper limit of the average elastic constant ($K_{AVG}$) is preferably 25, 24.5, 24, 23.5, 23, 22.8, 22.5, 22.3, 22, 21.8, 21.5, 21.3, 21, 20.8, 20.5, 20.3, 20, 19.8, 19.5, 19.3, 19, 18.8, 18.5, 18.3, 18, 17.8, 17.5, 17.3, or 17. When a reduction in power consumption is regarded as important, the light amount of a backlight is effectively decreased, the light transmittance of a liquid crystal display device is preferably improved, and for that purpose $K_{AVG}$ is preferably set somewhat lower. When improved response speed is regarded as important, $K_{AVG}$ is preferably set somewhat higher.

In the liquid crystal composition (B), a function Z of the rotational viscosity and the refractive index anisotropy preferably has a particular value.

$$Z=\gamma_1/\Delta n^2 \quad \text{[Math. 1]}$$

(wherein $\gamma_1$ denotes the rotational viscosity, and $\Delta n$ denotes the refractive index anisotropy)

Z is preferably 13000 or less, more preferably 12000 or less, particularly preferably 11000 or less.

When the liquid crystal composition (B) is used in an active-matrix display device, the liquid crystal composition (B) needs to have a specific resistance of $10^{12}$ (Ω·m) or more, preferably $10^{13}$ (Ω·m), more preferably $10^{14}$ (Ω·m) or more.

A method for polymerizing a polymerizable liquid crystal composition for use in the present invention may be radical polymerization, anionic polymerization, or cationic polymerization, and is preferably thermal or photo radical polymerization, more preferably radical polymerization by photo-Fries rearrangement or radical polymerization with a photopolymerization initiator.

A thermal polymerization initiator or a photopolymerization initiator, preferably a photopolymerization initiator, can be used as a polymerization initiator in radical polymerization. More specifically, the photopolymerization initiator is preferably an acetophenone, such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propan-1-one, 2-benzyl-2-dimethylanino-1-(4-morpholinophenyl)-butanone, 4'-phenoxyacetophenone, or 4'-ethoxyacetophenone; a benzoin, such as benzoin, benzoin isopropyl ether, benzoin isobutyl ether, benzoin methyl ether, or benzoin ethyl ether; an acylphosphine oxide, such as 2,4,6-trimethylbenzoyldiphenylphosphine oxide; benzil, methyl phenyl glyoxylate; a benzophenone, such as benzophenone, methyl o-benzoylbenzoate, 4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, 3,3'-dimethyl-4-methoxybenzophenone, 2,5-dimethylbenzophenone, or 3,4-dimethylbenzophenone; a thioxanthone, such as 2-isopropylthioxanthone, 2,4-dimethylthioxanthone, 2,4-diethylthioxanthone, or 2,4-dichlorothioxanthone; an aminobenzophenone, such as Michler's ketone or 4,4'-diethylaninobenzophenone; or 10-butyl-2-chloroacridone, 2-ethylanthraquinone, 9,10-phenanthrenequinone, or canphorquinone. Among these, benzyl dimethyl ketal is most preferred. Although these polymerization initiators may be used alone, a plurality of polymerization initiators are preferably used in consideration of the life and reactivity of radicals.

When a liquid crystal display device according to the present invention is applied to a vertical alignment cell in VA mode or the like, the polymerizable liquid crystal composition for use in the production of a device has no mesogenic group, which induces vertical alignment, in a polymerizable monomer and may be used in combination with a monovalent or divalent acrylate or methacrylate of an alcohol compound having 8 to 18 carbon atoms.

A method for forming the liquid crystal layer described above in detail may be more specifically a method for opposing two substrates with a transparent electrode layer interposed therebetween, adjusting the distance between the substrates with a spacer, placing a polymerizable liquid crystal composition between the substrates, and polymerizing a polymerizable monomer component (a) in the composition.

The thickness of the liquid crystal layer is preferably adjusted in the range of 1 to 100 μm, more preferably 1.5 to 10 μm. When a polarizer is used, the product of the refractive index anisotropy Δn of liquid crystals and the cell thickness d is preferably adjusted to achieve the maximum contrast. When two polarizers are used, the polarization axis of each polarizer may be adjusted to improve the viewing angle or contrast. A retardation film for increasing the viewing angle may also be used.

For example, the spacer may be glass particles, plastic particles, alumina particles, or a columnar spacer formed of a photoresist material.

(Method for Producing Liquid Crystal Display Device)

A polymerizable liquid crystal composition may be applied between two substrates by a typical vacuum injection method or by a typical ODF method. In a process of producing a liquid crystal display device by the ODF method, a light and heat curable epoxy sealant is applied in a closed-loop bank shape to a back or front plane substrate using a dispenser. A predetermined amount of a polymerizable liquid crystal composition is dropped inside the closed-loop bank while degassing is performed. The front plane and the back plane are joined to produce the liquid crystal display device. A polymerizable liquid crystal composition for use in the present invention can be suitably used because a composite material of liquid crystals and the polymerizable monomer component (a) can be stably added dropwise in the ODF process.

To achieve high liquid crystal alignment capability, an appropriate rate of polymerization is desirable. Thus, the polymerizable monomer component (a) is preferably polymerized by irradiation with ultraviolet light or an electron beam, which is an active energy beam, alone or in combination. When ultraviolet light is used, a polarized or unpolarized light source may be used. When a polymerizable liquid crystal composition for use in the production of a liquid crystal display device is polymerized between two substrates, at least the substrate to be irradiated is transparent to an active energy beam. To provide liquid crystal molecules with pretilt by voltage application, preferably, an alternating electric field is applied to a polymerizable liquid crystal composition containing the polymerizable monomer component (a) at a temperature in the range of −50° C. to 20° C., and the polymerizable liquid crystal composition is irradiated with ultraviolet light or an electron beam. The alternating electric field preferably has a frequency in the range of 10 Hz to 10 kHz, more preferably 100 Hz to 5 kHz. The voltage depends on the desired pretilt angle of a liquid crystal display device. Thus, the pretilt angle of a liquid crystal display device can be controlled by the voltage to be applied. A transverse electric field MVA mode liquid crystal display device preferably has a pretilt angle in the range of 80 to 89.9 degrees in terms of stability of alignment and contrast.

With respect to the irradiation temperature, the temperature of the polymerizable liquid crystal composition preferably ranges from −50° C. to 30° C., as described above. The range of 20° C. to −10° C. is more preferred because this enables polymerization at an increased degree of alignment of liquid crystal molecules and because this lowers the compatibility between a polymer of the polymerizable monomer component (a) and the liquid crystal composition (B), makes phase separation easier, decreases the space distances of the polymer network (A), and improves the off-response speed.

Examples of lamps for generating ultraviolet light include metal halide lamps, high-pressure mercury lamps, and ultra-high-pressure mercury lamps. The wavelength of ultraviolet radiation is preferably in the range outside the absorption wavelength range of the liquid crystal composition. If necessary, ultraviolet light with a wavelength of less than 365 nm is preferably removed. The ultraviolet radiation intensity preferably ranges from 0.1 mW/cm$^2$ to 100 W/cm$^2$, more preferably 2 mW/cm$^2$ to 50 W/cm$^2$. The ultraviolet radiation energy can be appropriately determined and preferably ranges from 10 mJ/cm$^2$ to 500 J/cm$^2$, more preferably 100 mJ/cm$^2$ to 200 J/cm$^2$. During ultraviolet radiation, the ultraviolet radiation intensity may be changed. The ultraviolet radiation time depends on the ultraviolet radiation intensity and preferably ranges from 10 to 3600 seconds, more preferably 10 to 600 seconds.

When a vertical alignment cell is used to form a liquid crystal layer, preferably, the polymer network (A) is fibrous or columnar and is formed in almost the same direction as the liquid crystal composition (B) vertical to a liquid crystal cell substrate. When a vertical alignment film on a cell substrate surface is a vertical alignment film that is subjected to rubbing treatment to induce a pretilt angle and induce a tilt alignment of liquid crystals, the fibrous or columnar polymer network (A) is preferably formed with a tilt in the same direction as the pretilted alignment of the liquid crystal composition (B).

In what is called the VA mode for vertical alignment, the following are methods for providing a low-molecular-weight liquid crystal compound with pretilt and tilting the polymer network (A).

(1) A method for applying a voltage to align a low-molecular-weight liquid crystal compound with a tilt and irradiating the low-molecular-weight liquid crystal compound with ultraviolet light or the like to form the polymer network (A).

(2) A method for incorporating a photo-alignment function into a polymer network.

A liquid crystal device according to the present invention can be produced by one of these methods as required.

More specifically, a method (1) for inducing a pretilt angle while a voltage is applied may be a method for polymerizing the liquid crystal composition (B) while a voltage in the range of approximately 0.9 V lower than the threshold voltage of the liquid crystal composition (B) to approximately 2 V higher than the threshold voltage is applied, a method for applying a voltage equal to or higher than the threshold voltage for a short time from several seconds to tens of seconds during the formation of the polymer network (A) and then applying a voltage lower than the threshold voltage to form a polymer network, or a method for polymerizing a liquid crystal composition while a voltage equal to or higher than the threshold voltage is applied.

For a vertical alignment liquid crystal display device, the fibrous or columnar polymer network (A) formed in the liquid crystal layer is preferably tilted to induce a pretilt angle of 90 to 80 degrees with a transparent substrate plane. The pretilt angle particularly preferably ranges from 90 to 85 degrees, 89.9 to 85 degrees, 89.9 to 87 degrees, or 89.9 to 88 degrees. The fibrous or columnar polymer network formed by any of the methods characteristically connects two cell substrates. This can improve the thermal stability of the pretilt angle and improve the reliability of the liquid crystal display device.

A method (2) for incorporating a photo-alignment function into a polymer network may be a method for using as part of the polymer network material a monomer that has the Weigert effect, that is, that causes a photoisomerization reaction. Because the skeleton of a photoisomerizable monomer tends to align parallel to the traveling direction of ultraviolet light during ultraviolet radiation to form a polymer network, the direction of ultraviolet radiation can be changed to control the pretilt. The amount of a photoisomerizable monomer to be added preferably ranges from 0.01% to 1% by mass.

When a parallel alignment cell, for example, in an IPS or FFS mode is employed, the liquid crystal composition (B) is aligned parallel to the alignment direction of an alignment film in which the fibrous or columnar polymer network (A) is disposed on a liquid crystal cell substrate face by phase separation polymerization using a polymerizable liquid crystal composition for use in the production of a liquid crystal display device, and is preferably formed so that the direction of refractive index anisotropy or an easy alignment axis of the formed fibrous or columnar polymer network and the alignment direction of the liquid crystal composition (B) are almost same direction. More preferably, the fibrous or columnar polymer network is preferably disposed on almost the entire cell except the space in which the liquid crystal composition (B) is dispersed. To induce the pretilt angle with a polymer interface direction, a monovalent or divalent acrylate or methacrylate of an alcohol compound having 8 to 18 carbon atoms is preferably used as a monomer in combination with a monomer with a mesogenic group.

In a liquid crystal display device according to the present invention, it is desirable to reduce light scattering to achieve high-contrast display. For example, the amount of the polymerizable monomer (a) in a polymerizable liquid crystal composition can be increased to form a polymer network with space distances shorter than the visible light wavelength, thereby preventing light scattering.

In a liquid crystal layer in a liquid crystal display device according to the present invention, if the substrate surface has high polarity, the polymerizable monomer component (a) is likely to be localized near a liquid crystal cell substrate interface, and a polymer network grows from the substrate surface and forms a polymer network layer in contact with the substrate interface. Thus, the polymer network layer, the liquid crystal layer, the polymer network layer, and the counter substrate are stacked on the cell substrate surface in this order. In the present invention, such a multilayer structure of polymer network layer/liquid crystal layer/polymer network layer and the formation of a polymer network layer with a thickness of 0.5% or more, preferably 1% or more, more preferably 5% or more, of the cell thickness in the cell cross-sectional direction have a desirable tendency to decrease the turn-off time by the action of the anchoring force between the polymer network and low-molecular-weight liquid crystals. The cell thickness has a great influence, and if the turn-off time increases with the cell thickness, the thickness of the polymer network layer is increased as required. In the structure of the polymer network in the polymer network layer, low-molecular-weight liquid crystals and the easy alignment axis or the uniaxial optical axis extend in almost the same direction, and the low-molecular-weight liquid crystals are formed to induce the pretilt angle. The polymer network (A) preferably has an average space distance in the range of 90 to 450 nm.

In the present invention, an excessively low monomer content of the polymerizable liquid crystal composition tends to result in insufficient coverage of the entire cell with the polymer network layer and the formation of a discontinuous polymer network layer. Thus, as described above, the monomer content of the polymerizable liquid crystal composition preferably ranges from 0.5% to 20% by mass. An increase in the concentration of monomer in a liquid crystal composition for use in the production of a liquid crystal display device results in an increase in the anchoring force between the liquid crystal composition (B) and the polymer interface and a decrease in turn-off response time (τd). An increase in the anchoring force between the liquid crystal composition (B) and the polymer interface tends to result in an increase in drive voltage. Because of such a tendency, the concentration of the polymerizable monomer (a) in a polymerizable liquid crystal composition for use in the production of a liquid crystal display device preferably ranges from 1% to 10% by mass, particularly preferably 1.5% to 8% by mass, particularly preferably 1.8% to 5% by mass.

From the perspective of the off-response speed and low drive voltage, as described above, the range of 1% to 10% by mass is more preferred, and the range of 6% to 10% by mass is preferred to achieve a higher off-response speed. In the range of 6% to 10% by mass, a combination of the bifunctional monomer and a monofunctional monomer with a low anchoring force is preferred, and if necessary polymerization is performed at a temperature in the range of 25° C. to −20° C. to form a polymerization phase separation structure. For polymerization, if the polymerizable monomer (a) has a melting point equal to or higher than room temperature, polymerization at a temperature approximately 5° C. lower than the melting point is preferred due to the same effects as low-temperature polymerization.

When a liquid crystal display device according to the present invention is used in a TFT drive liquid crystal display device, the voltage holding ratio is an important characteristic to improve reliability, such as reduced flicker and image retention due to image-sticking. The voltage holding ratio is decreased by ionic impurities, particularly movable ions, in a liquid crystal composition for use in the production of a liquid crystal display device. Thus, movable ions are preferably removed by purification or the like to achieve a specific resistance of $10^{14}$ Ω·cm or more. In the formation of a polymer network by radical polymerization, ionic impurities produced from a photopolymerization initiator may decrease the voltage holding ratio. Thus, a polymerization initiator is preferably chosen to decrease the amounts of organic acid and low-molecular-weight by-products produced.

When a liquid crystal display device according to the present invention has an alignment film, the easy alignment axis direction of the alignment film is preferably the same as the easy alignment axis direction of the polymer network (A). In this case, a polarizer or a retardation film can be provided to utilize the alignment state for display.

In a liquid crystal display device according to the present invention, a liquid crystal layer containing a polymer network (A) and a liquid crystal composition (B) is disposed between two substrates having transparent properties on at least one side thereof, and the loss factor (tan δ) (loss modulus/storage modulus) of the liquid crystal layer calculated from storage modulus (Pa) and loss modulus (Pa) in a sinusoidal vibration measured with a rheometer at 25° C. and at a measurement frequency of 1 Hz ranges from 0.1 to 1. In a method for producing a liquid crystal display device according to the present invention, to achieve a high response speed as well as a good balance between drive voltage and transmittance of liquid crystals, the ultraviolet radiation time to form the polymer network (A) preferably ranges from 25 to 45 seconds, more preferably 27 to 43 seconds, particularly preferably 30 to 40 seconds, before the loss factor (tan δ) (loss modulus/storage modulus) of a liquid crystal layer calculated from storage modulus (Pa) and loss modulus (Pa) in a sinusoidal vibration measured with a rheometer at 25° C. and at a measurement frequency of 1 Hz reaches 1 or less. The ultraviolet radiation time in this range elapsed before the loss factor (tan δ) (loss modulus/storage modulus) reaches 1 or less can be achieved by a method of adjusting the polymerization initiator content of the liquid crystal composition (B), a method of adjusting the voltage application time, a method of using an optimum material for the polymerizable monomer component (a) to form the polymer network (A), a method of adjusting the polymerizable monomer component (a) content, and a method of adjusting the ultraviolet radiation intensity. These methods can be appropriately combined.

A specific structure of a liquid crystal display device according to the present invention including the liquid crystal layer described above in detail is described below with reference to FIGS. 1 to 11.

(FFS Liquid Crystal Display Device)

FIG. 1 is a schematic view of a liquid crystal display device. The components in FIG. 1 are individually illustrated for convenience of explanation. As illustrated in FIG. 1, a liquid crystal display device 10 according to an embodiment of the present invention is a transverse electric field (an FFS mode as a form of IPS as an example in the figure) liquid crystal display device that includes a polymerizable liquid crystal composition for use in the production of a liquid crystal display device (or a liquid crystal layer 5) disposed between a first transparent insulating substrate 2 and an opposing second transparent insulating substrate 7. An electrode layer 3 is formed on the first transparent insulating substrate 2 on the side of the liquid crystal layer 5. A pair of alignment films 4 (4*a*, 4*b*) that directly abut on a polymerizable liquid crystal composition for use in the production of a liquid crystal display device constituting the liquid crystal layer 5 and induce homogeneous alignment are disposed between the liquid crystal layer 5 and the first transparent insulating substrate 2 and between the liquid crystal layer 5 and the second transparent insulating substrate 7. Liquid crystal molecules in the polymerizable liquid crystal composition for use in the production of the device are aligned approximately parallel to the substrates 2 and 7 when no voltage is applied.

Figure 3:
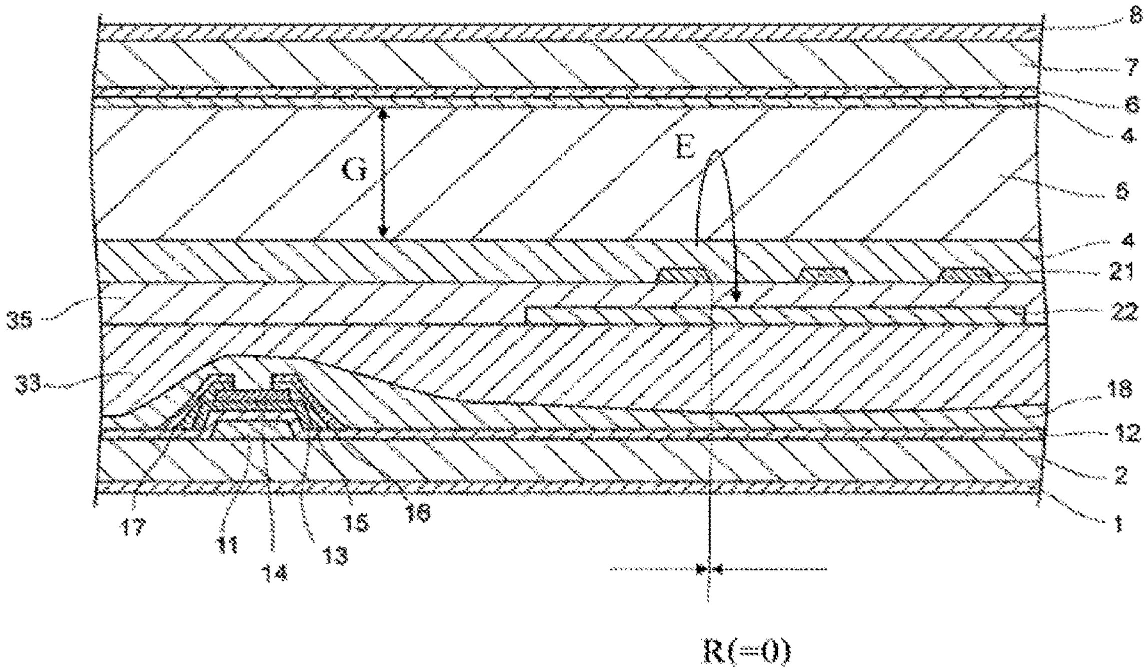
FIG. 3 is a cross-sectional view of a liquid crystal display device according to the present invention.

As illustrated in FIGS. 1 and 3, the second substrate 7 and the first substrate 2 may be disposed between a pair of polarizers 1 and 8. Furthermore, in FIG. 1, a color filter 6 is disposed between the second substrate 7 and the alignment film 4.

A liquid crystal display device according to the present invention may have the form of what is called a color filter on array (COA) and may include a color filter between an electrode layer including a thin-film transistor and a liquid crystal layer or a color filter between an electrode layer including the thin-film transistor and the first substrate.

Thus, the liquid crystal display device 10 according to an embodiment of the present invention includes the first polarizer 1, the first substrate 2, the electrode layer 3 including a thin-film transistor, the alignment film 4, the liquid crystal layer 5 containing a polymerizable liquid crystal composition for use in the production of a liquid crystal display device, the alignment film 4, the color filter 6, the second substrate 7, and the second polarizer 8.

The first substrate 2 and the second substrate 7 may be made of glass or a flexible transparent material, such as a plastic. One of the first substrate 2 and the second substrate 7 may be made of an opaque material, such as silicon. The two substrates 2 and 7 are bonded together via a sealing material and a sealant, such as an epoxy thermosetting composition, disposed on the peripheral region. The distance between the substrates may be maintained, for example, with a granular spacer, such as glass particles, plastic particles, or alumina particles, or a resin spacer column formed by photolithography.

Figure 2:
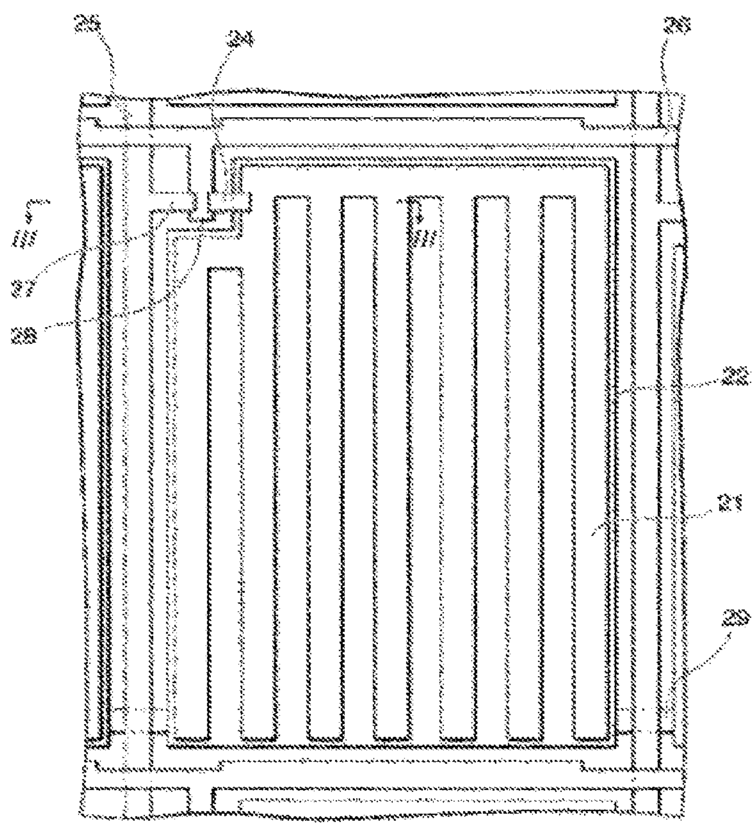
FIG. 2 is a fragmentary enlarged view of FIG. 1.

FIG. 2 is an enlarged plan view of a region within the line II of the electrode layer 3 formed on the substrate 2 in FIG. 1. FIG. 3 is a cross-sectional view of the liquid crystal display device illustrated in FIG. 1 taken along the line III-III of FIG. 2. As illustrated in FIG. 2, the electrode layer 3 including a thin-film transistor formed on the first substrate 2 includes a matrix of a plurality of gate lines 24 and a plurality of data lines 25 crossing each other. The gate lines 24 relay scanning signals. The data lines 25 relay display signals. FIG. 2 illustrates only a pair of gate lines 24 and a pair of data lines 25.

A region surrounded by the gate lines 26 and the data lines 25 forms a unit pixel of a liquid crystal display. A pixel electrode 21 and a common electrode 22 are formed in the unit pixel. A thin-film transistor that includes a source electrode 27, a drain electrode 24, and a gate electrode 28 is disposed near an intersecting portion at which the gate lines 26 and the data lines 25 cross each other. The thin-film transistor is coupled to the pixel electrode 21 as a switching device for supplying display signals to the pixel electrode 21. A common line 29 is disposed along the gate lines 26. The common line is coupled to the common electrode 22 to supply common signals to the common electrode 22.

For example, as illustrated in FIG. 3, a preferred embodiment of the structure of the thin-film transistor includes a gate electrode 11 formed on the substrate 2, a gate-insulating layer 12 covering the gate electrode 11 and covering almost the entire surface of the substrate 2, a semiconductor layer 13 disposed on the gate-insulating layer 12 and facing the gate electrode 11, a protective layer 14 partly covering the semiconductor layer 13, a drain electrode 16 covering the protective layer 14 and one side end portion of the semiconductor layer 13 and in contact with the gate-insulating layer 12 disposed on the substrate 2, a source electrode 17 covering the protective layer 14 and the other side end portion of the semiconductor layer 13 and in contact with the gate-insulating layer 12 disposed on the substrate 2, and an insulating protective layer 18 covering the drain electrode 16 and the source electrode 17. An anodic oxide film (not shown) may be formed on the gate electrode 11 to eliminate the difference in level relative to the gate electrode.

The semiconductor layer 13 may be formed of amorphous silicon or polycrystalline polysilicon. The use of a transparent semiconductor film, such as ZnO, In—Ga—Zn—O (IGZO), or ITO, is preferred to suppress the detrimental effects of a photocarrier resulting from light absorption and to increase the aperture ratio of the device.

To decrease the width or height of the Schottky barrier, an ohmic contact layer 15 may be disposed between the semiconductor layer 13 and the drain electrode 16 or the source electrode 17. The ohmic contact layer may be formed of a material doped with high concentrations of impurities, such as phosphorus, for example, n-type amorphous silicon or n-type polycrystalline polysilicon.

The gate lines 26, the data lines 25, and the common line 29 are preferably formed of a metal film, more preferably Al, Cu, Au, Ag, Cr, Ta, Ti, Mo, W, Ni, or an alloy thereof, particularly preferably lines of A1 or an alloy thereof. The insulating protective layer 18 is a layer having an insulation function and is formed of a silicon nitride film, a silicon dioxide film, a silicon oxynitride film, or the like.

In the embodiments illustrated in FIGS. 2 and 3, the common electrode 22 is a flat electrode formed over almost the entire surface of the gate-insulating layer 12, and the pixel electrode 21 is an interdigitated electrode formed over the insulating protective layer 18 covering the common electrode 22. Thus, the common electrode 22 is closer to the first substrate 2 than the pixel electrode 21 is, and these electrodes are superposed with each other via the insulating protective layer 18. The pixel electrode 21 and the common electrode 22 are formed of, for example, a transparent electrically conductive material, such as indium tin oxide (ITO), indium zinc oxide (IZO), or indium zinc tin oxide (IZTO). The pixel electrode 21 and the common electrode 22 formed of a transparent electrically conductive material have an increased aperture area per unit pixel area and therefore have an increased aperture ratio and increased transmittance.

The interelectrode distance (hereinafter also referred to as the minimum distance) R between the pixel electrode 21 and the common electrode 22 is smaller than the distance G between the first substrate 2 and the second substrate 7 in order to form a fringing field between the pixel electrode 21 and the common electrode 22. The interelectrode distance R refers to the distance between electrodes in the direction parallel to the substrates. FIG. 3 illustrates an example with an interelectrode distance R=0 in which the flat common electrode 22 overlaps the interdigitated pixel electrode 21, and the minimum distance R is smaller than the distance (that is, the cell gap) G between the first substrate 2 and the second substrate 7. Thus, a fringing field E is formed. Thus, the FFS liquid crystal display device can utilize a horizontal electric field formed perpendicular to the interdigitated lines of the pixel electrode 21 and a parabolic electric field. The electrode width 1 of the interdigitated portion of the pixel electrode 21 and the gap width m of the interdigitated portion of the pixel electrode 21 are preferably such that all the liquid crystal molecules in the liquid crystal layer 5 can be driven by the electric field generated. The minimum distance R between the pixel electrode and the common electrode can be adjusted as the (average) film thickness of the gate-insulating layer 12. Unlike that illustrated in FIG. 3, the interelectrode distance (also referred to as the minimum distance) R between the pixel electrode 21 and the common electrode 22 in a liquid crystal display device according to the present invention may be larger than the distance G between the first substrate 2 and the second substrate 7 (IPS mode). In this case, for example, interdigitated pixel electrodes and interdigitated common electrodes may be alternately disposed on almost the same plane.

A preferred embodiment of a liquid crystal display device according to the present invention is preferably an FFS mode liquid crystal display device that utilizes the fringing field, as illustrated in FIG. 3. The shortest distance d between the common electrode 22 and the adjacent pixel electrode 21 smaller than the shortest distance D between the alignment films 4 (the distance between substrates) results in the formation of a fringing field between the common electrode and the pixel electrode and enables efficient utilization of horizontal and vertical alignments of liquid crystal molecules. In an FFS mode liquid crystal display device according to the present invention, the application of a voltage to liquid crystal molecules with a long axis parallel to the alignment direction of the alignment layer forms an equipotential line of a parabolic electric field between the pixel electrode 21 and the common electrode 22 up to the top of the pixel electrode 21 and the common electrode 22, thereby aligning the long axes of liquid crystal molecules in the liquid crystal layer 5 along the formed electric field. This enables liquid crystal molecules even with low dielectric anisotropy to be driven.

The color filter 6 according to the present invention preferably has a black matrix (not shown) in a portion corresponding to the thin-film transistor and a storage capacitor to prevent light leakage. The color filter 6 is typically composed of a dot of three filter pixels red (R), green (G), and blue (B). For example, these three filters are aligned in the direction in which the gate lines extend. The color filter 6 may be produced by a pigment dispersion method, a printing method, an electrodeposition method, or a staining method. For example, in a method for producing a color filter by a pigment dispersion method, a curable coloring composition for a color filter is applied to a transparent substrate, is patterned, and is cured by heating or light irradiation. This process is repeatedly performed for three colors red, green, and blue to produce pixel units for color filters. A pixel electrode that includes an active device, such as TFT or a thin-film diode, may be formed on the substrate (what is called a color filter on array).

The pair of alignment films 4 that directly abut on a polymerizable liquid crystal composition for use in the production of a device constituting the liquid crystal layer 5 and induce homogeneous alignment are disposed on the electrode layer 3 and the color filter 6.

In the polarizer 1 and the polarizer 8, the polarization axis of each polarizer can be adjusted to improve the viewing angle and contrast. The polarizer 1 and the polarizer 8 preferably have orthogonal transmission axes such that the transmission axis of each polarizer can operate in the normally black mode. In particular, one of the polarizer 1 and the polarizer 8 is preferably disposed so as to have a transmission axis parallel to the alignment direction of liquid crystal molecules. The product of the refractive index anisotropy $\Delta n$ of a liquid crystal and the cell thickness d is preferably adjusted to maximize the contrast. A retardation film for increasing the viewing angle may also be used.

In a liquid crystal display device according to another embodiment in the IPS mode, the shortest distance d between a common electrode and an adjacent pixel electrode is longer than the shortest distance G between the liquid-crystal alignment films. For example, common electrodes and pixel electrodes are disposed on the same substrate, the common electrodes and the pixel electrodes are alternately disposed, and the shortest distance d between a common electrode and an adjacent pixel electrode is longer than the shortest distance G between the liquid-crystal alignment films.

In a method for producing a liquid crystal display device according to the present invention, after a film is formed on a substrate with an electrode layer and/or on a substrate surface, preferably, a pair of substrates are separately opposed with the film interposed therebetween, and then a liquid crystal composition is placed between the substrates. The distance between the substrates is preferably adjusted with a spacer.

The distance between the substrates (which is the average thickness of the liquid crystal layer to be formed and is also referred to as the distance between films) is preferably adjusted in the range of 1 to 100 μm. More preferably, the average distance between the films ranges from 1.5 to 10 μm.

In the present invention, a spacer used to adjust the distance between substrates is glass particles, plastic particles, alumina particles, or a columnar spacer formed of a photoresist material, for example.

(FFS or IPS Liquid Crystal Display Device)

A liquid crystal display device according to another embodiment of the present invention is described below with reference to FIGS. 4 and 5.

Figure 4:
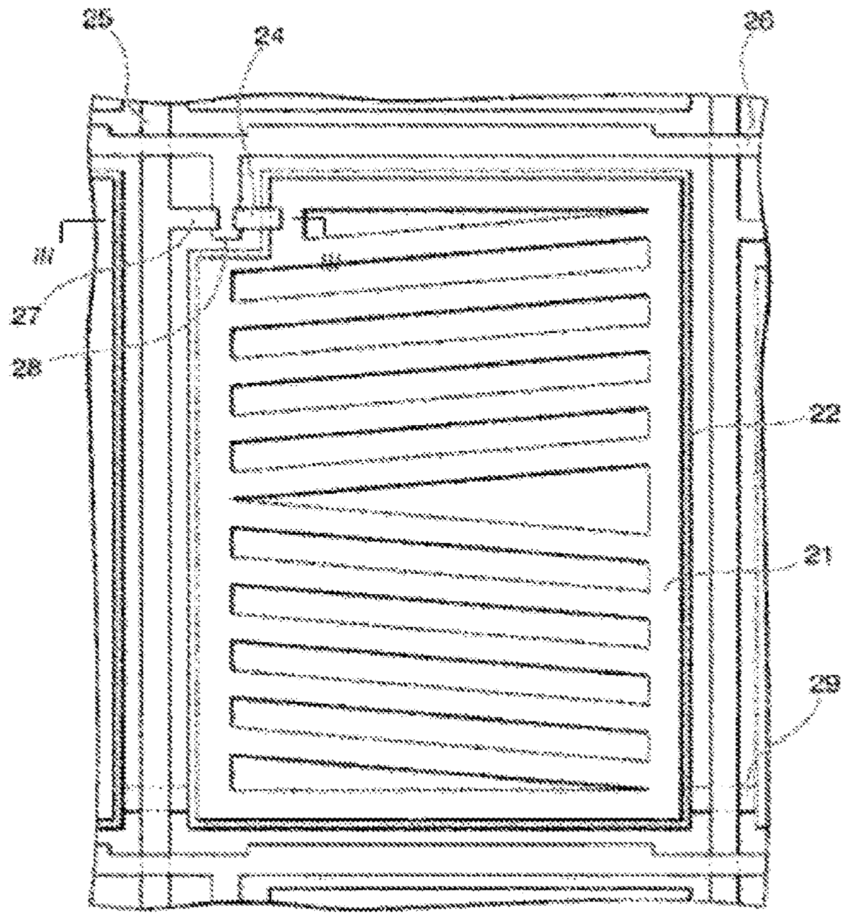
FIG. 4 is a fragmentary enlarged view of FIG. 1.

For example, FIG. 4 is an enlarged plan view of a region within the II line on the electrode layer 3 formed on the substrate 2 in FIG. 1.

As illustrated in FIG. 4, the pixel electrode 21 may have a slit. The slit pattern may have a tilt angle with the gate lines 24 or the data lines 25.

In the pixel electrode 21 in FIG. 4, generally rectangular openings are bored in a generally rectangular flat sheet electrode. An interdigitated common electrode 22 is formed on the entire back side of the pixel electrode 21 via the insulating protective layer 18 (not shown). The shortest distance R between a common electrode and an adjacent pixel electrode smaller than the shortest distance G between alignment layers results in the FFS mode. The shortest distance R longer than the shortest distance G results in the IPS mode. The surface of the pixel electrode is preferably covered with a protective insulating film and an alignment film layer. In the same manner as described above, a storage capacitor 23 for storing display signals sent through the data lines 25 may be disposed in a region surrounded by the gate lines 24 and the data lines 25. The openings may have any shape and may be not only generally rectangular as illustrated in FIG. 4 but also of a known shape, such as elliptic, circular, rectangular, rhombic, triangular, or parallelogrammic. The shortest distance R between a common electrode and an adjacent pixel electrode longer than the shortest distance G between alignment layers results in an IPS mode display device. The shortest distance R smaller than the shortest distance G results in an FFS mode display device.

Figure 5:
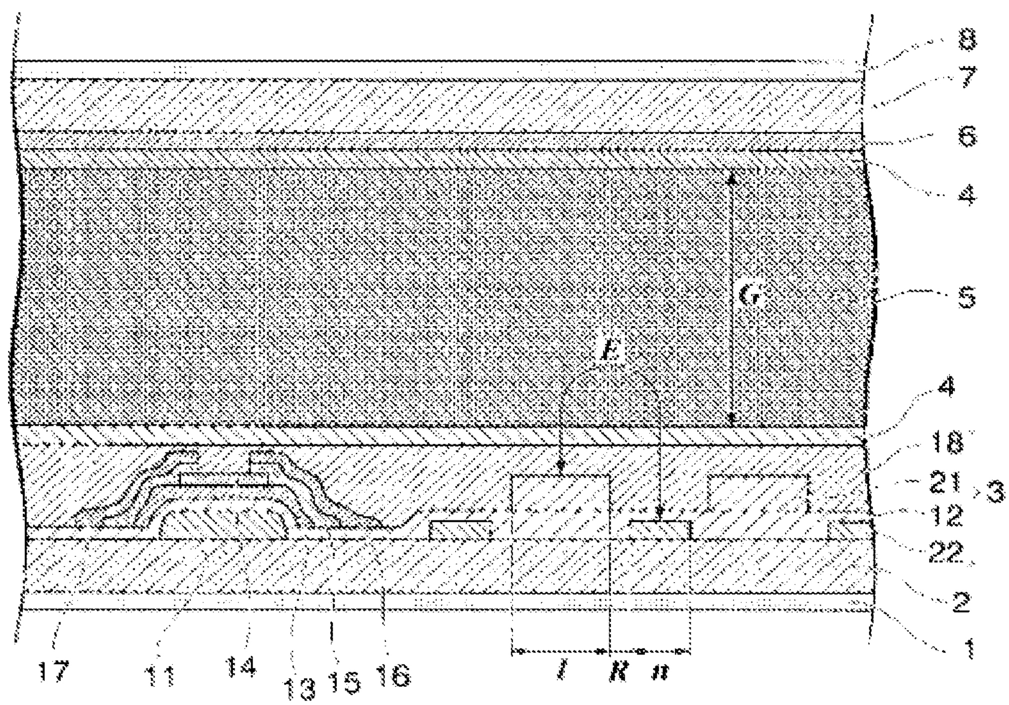
FIG. 5 is a cross-sectional view of a liquid crystal display device according to the present invention.

FIG. 5 illustrates an embodiment different from that illustrated in FIG. 3 and is another example of a cross-sectional view of the liquid crystal display device illustrated in FIG. 1 taken along the line III-III of FIG. 2. A first substrate 2 on which an electrode layer 3 including an alignment layer 4 and a thin-film transistor 20 is formed and a second substrate 7 on which the alignment layer 4 is formed are disposed at a predetermined distance G with the alignment layers facing each other. A liquid crystal layer 5 containing a liquid crystal composition is disposed in the space between the alignment layers. A gate-insulating layer 12, a common electrode 22, an insulating protective layer 18, a pixel electrode 21, and an alignment layer 4 are stacked in this order on part of the surface of the first substrate 2. As also illustrated in FIG. 4, triangular openings are bored in the center and both ends of the flat sheet of the pixel electrode 21, and rectangular openings are bored in the remaining region of the pixel electrode 21. In the common electrode 22, an interdigitated common electrode approximately parallel to generally elliptical openings in the pixel electrode 21 is disposed closer to the first substrate than the pixel electrode is.

In the example illustrated in FIG. 5, the common electrode 22 is interdigitated or has slits, and the interelectrode distance R between the pixel electrode 21 and the common electrode 22 is a (for convenience, the horizontal component of the interelectrode distance is denoted by R in FIG. 5). Although the common electrode 22 is disposed over the gate-insulating layer 12 in FIG. 3, the common electrode 22 may be disposed on the first substrate 2, and the pixel electrode 21 may be disposed on the gate-insulating layer 12, as illustrated in FIG. 5. The electrode width 1 of the pixel electrode 21, the electrode width n of the common electrode 22, and the interelectrode distance R are preferably adjusted such that all the liquid crystal molecules in the liquid crystal layer 5 can be driven by the electric field generated. Furthermore, although the positions of the pixel electrode 21 and the common electrode 22 in the thickness direction are different in FIG. 5, the positions of the electrodes in the thickness direction may be the same, or a common electrode may be disposed in the liquid crystal layer 5.

(Vertical Electric Field Type Liquid Crystal Display Device)

Figure 6:
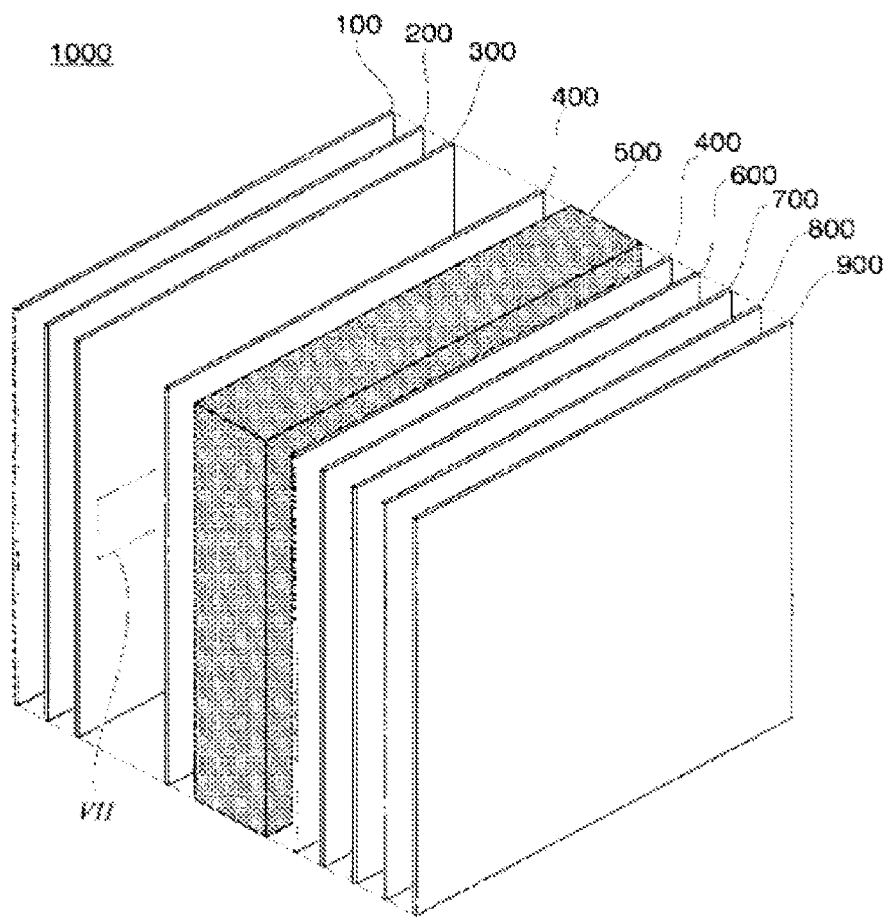
FIG. 6 is a schematic view of a liquid crystal display device according to the present invention.

Another preferred embodiment of the present invention is a vertical electric field type liquid crystal display device produced by using a liquid crystal composition. FIG. 6 is a schematic view of a vertical electric field type liquid crystal display device. The components in FIG. 6 are individually illustrated for convenience of explanation.

Figure 7:
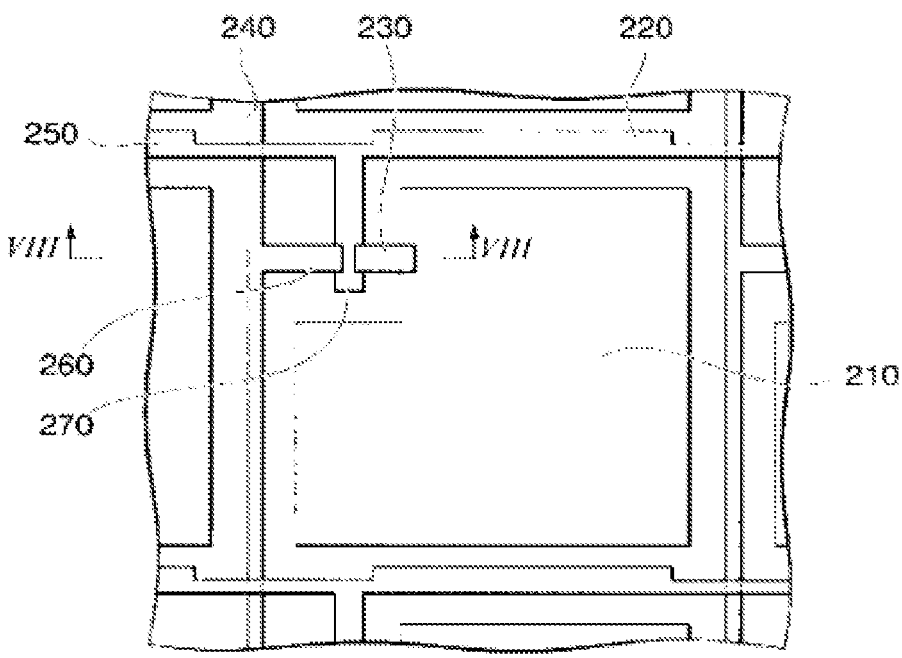
FIG. 7 is a fragmentary enlarged view of FIG. 6.

FIG. 7 is an enlarged plan view of a region within the line VII in an electrode layer 300 (hereinafter also referred to as a thin-film transistor layer 300) including a thin-film transistor formed on a substrate illustrated in FIG. 6.

Figure 8:
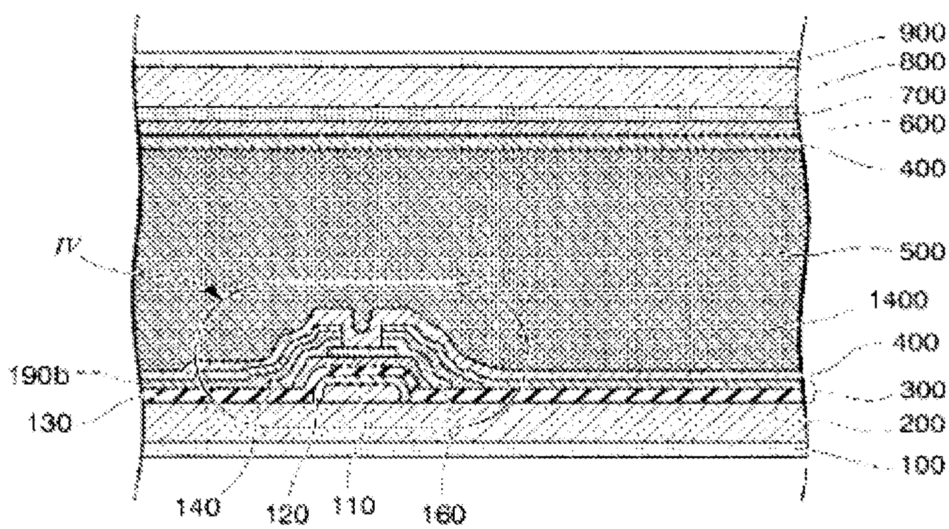
FIG. 8 is a cross-sectional view of a liquid crystal display device according to the present invention.

FIG. 8 is a cross-sectional view of the liquid crystal display device illustrated in FIG. 6 taken along the line VIII-VIII of FIG. 7. A vertical electric field type liquid crystal display device according to the present invention is described below with reference to FIGS. 6 to 8.

As illustrated in FIG. 6, a vertical alignment type liquid crystal display device 1000 according to the present invention includes a second substrate 800 including a transparent electrode (layer) 600 (hereinafter also referred to as a common electrode 600) formed of a transparent electrically conductive material, a first substrate 200 including a thin-film transistor layer 300 in which a pixel electrode formed of a transparent electrically conductive material and a thin-film transistor for controlling the pixel electrode in each pixel are formed, and a polymerizable liquid crystal composition for use in the production of a liquid crystal display device disposed between the first substrate 200 and the second substrate 800 (or the liquid crystal layer 500). The alignment of liquid crystal molecules in the polymerizable liquid crystal composition for use in the production of a device when no voltage is applied is approximately perpendicular to the substrates 200 and 800. As illustrated in FIGS. 6 and 8, the second substrate 800 and the first substrate 200 may be disposed between a pair of polarizers 100 and 900.

Furthermore, in FIG. 6, a color filter 700 is disposed between the first substrate 800 and the common electrode 600. A pair of alignment films 400 adjacent to the liquid crystal layer 500 according to the present invention and in direct contact with the polymerizable liquid crystal composition for use in the production of a liquid crystal display device constituting the liquid crystal layer 500 are formed on the transparent electrodes (layers) 600 and 300.

Thus, the vertical alignment type liquid crystal display device 1000 according to the present invention includes the first polarizer 100, the first substrate 200, the electrode layer (also referred to as the thin-film transistor layer) 300 including a thin-film transistor, the alignment film 400, the layer 500 containing the liquid crystal composition, the alignment film 400, the common electrode 600, the color filter 700, the second substrate 800, and the second polarizer 900 stacked in this order. The alignment films 400 are preferably photo-alignment films.

The alignment films are liquid crystal cells produced by alignment treatment (mask rubbing or photo-alignment). A vertical alignment film slightly tilted (0.1 to 5.0 degrees) relative to the direction normal to a substrate is formed on the inside of a transparent electrode of each liquid crystal cell (on the liquid crystal layer side).

The liquid crystal layer 500 is formed by vertically aligning polymerizable monomers in a polymerization liquid crystal composition according to the present invention disposed between the substrates due to the alignment regulating force of the vertical alignment film and then polymerizing and fixing the polymerizable monomers by ultraviolet radiation to form the polymer network (A). It is assumed that the polymer network (A) thus formed has approximately four structures: (1) the polymer network is formed from the upper substrate to the lower substrate, (2) the polymer network is formed from the upper (lower) substrate to some intermediate position in the liquid crystal direction, (3) the polymer network is formed only near the surface of the alignment film (mainly in the case of monofunctional monomers), and (4) the polymer networks are bonded together in the liquid crystal layer (without floating). Any of these structures includes polymer networks for stabilizing two different alignment states in which the refractive index anisotropy or easy alignment axis of the polymer networks is formed to stabilize the alignment state at the threshold voltage or higher or to stabilize the alignment state at the threshold voltage or lower.

The polymer network (A) with anisotropy thus formed is almost completely separated from the liquid crystal composition (B). Liquid crystal molecules are probably aligned in the polymer network (A). Thus, the polymer network coexists with the liquid crystal molecules and has a structure distinctly different from the molecular alignment structure of what is called a polymer network liquid crystal that causes light scattering when no voltage is applied and completely different from the structure of an alignment maintaining layer localized near the alignment film used in PSA or the like.

Although FIGS. 6 to 8 illustrate the polymer network and the liquid crystal molecular alignment structure by a method using mask rubbing or a photo-alignment film, also in what is called an MVA mode with a structure such as a rib or slit or in PVA, the pretilt of a polymer network or liquid crystal molecules near the substrate interface is formed by the oblique electric field strength applied through the structure or the slit, thereby providing a device structure equivalent to that illustrated in FIG. 6.

In a VA liquid crystal display with a liquid crystal molecular alignment due to such a polymer network and liquid crystal molecules, the anchoring force to the liquid crystal molecules when no voltage is applied is enhanced by the synergistic effects of the anchoring forces of the liquid-crystal alignment film and the polymer network, thereby enabling the response speed to be increased when the voltage is OFF.

The vertical alignment type liquid crystal display device described above in detail is preferably a multi-domain division aligned liquid crystal display device in which each pixel is divided into two to eight to improve the viewing angle dependence. Although such division alignment may be achieved by mask rubbing of the alignment film 4, a multi-domain VA device with a liquid crystal alignment direction specified by the following means is preferred in terms of the manufacturability of the device.

1) A means of forming a rib on both the first substrate 2 and the second substrate 7, 2) a means of using an electrode slit in the first pixel electrode 21 and forming a rib on the second substrate 7, 3) a means of using a fine slit electrode in the first pixel electrode 21 and forming a rib on the second substrate 7, 4) a means of using a slit electrode in the first pixel electrode 21 and in the second common electrode 22, 5) a means of using a fine slit electrode in the first pixel electrode 21 and using a polymer to form pretilt in liquid crystals, or 6) a means of using as an alignment film what is called a photo-alignment film that can provide liquid crystals with a uniform alignment direction by linear polarization ultraviolet radiation.

Among these, in particular, a liquid crystal display device produced by 5) a means of using a polymer to form pretilt in liquid crystals or 6) a means of using a photo-alignment film is preferred because a polymer network of the liquid crystal layer 5 can easily be formed and because the optical axis direction or easy alignment axis direction of the polymer network (A) in the liquid crystal layer 5 can be easily controlled to be the same as or almost the same as the easy alignment axis direction of the liquid crystal composition (B).

Figure 11:
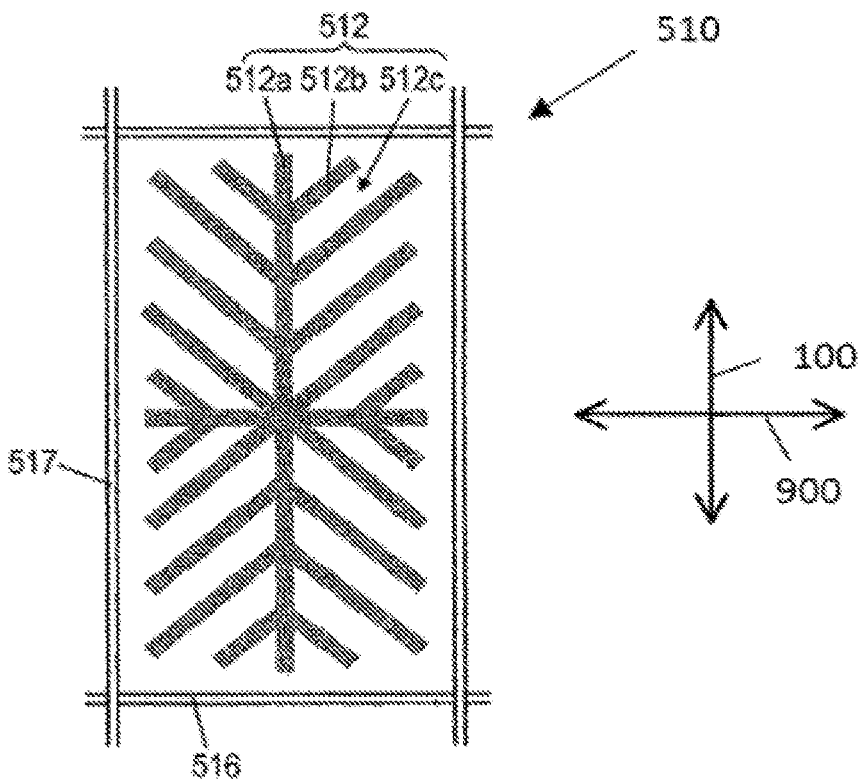
FIG. 11 is a schematic view of the electrode structure of a fishbone VA liquid crystal cell in an example.
Figure 12:
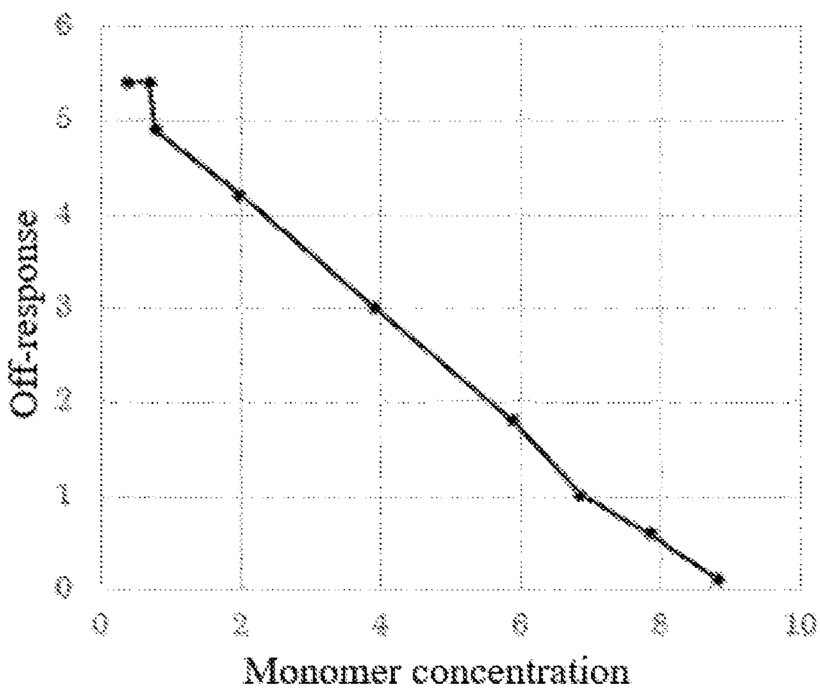
FIG. 12 is a graph showing the relationship between the amount of monomer to be added to a liquid crystal host LCN-10 and off-response.
Figure 13:
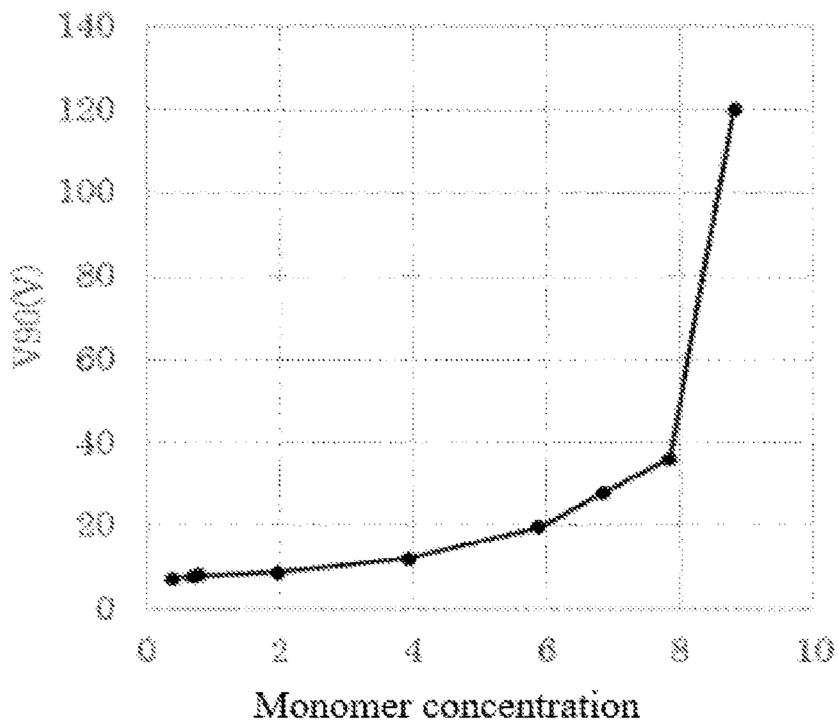
FIG. 13 is a graph showing the relationship between the amount of monomer to be added to a liquid crystal host LCN-10 and V90.

When a fine slit electrode is used as the pixel electrode 21, what is called a fishbone electrode as illustrated in FIG. 11 is preferred in terms of the stability of the alignment direction. The fishbone electrode is described below in detail with reference to FIG. 11. This electrode is composed of a transparent electrode, for example, formed of ITO, and slit portions 512*c* are bored in part of the electrode material (ITO). A cross-shaped slit portion 512*c* approximately 3 to 5 μm in width connecting the middle points on the opposite sides of the rectangular cell functions as an alignment regulating structure. Slit portions 512*c* 5 μm in width obliquely extending at 45 degrees from a pixel trunk electrode 512*a* are formed at intervals of 8 These slit portions 512*c* function as an auxiliary alignment control factor to reduce a disturbance in the azimuth direction when tilted. The pixel electrode has a width of 3 for example. In FIG. 11, a pixel trunk electrode 512*a* makes an angle of 45 degrees with pixel branch electrodes 512*b*. The branch electrodes extend in four different directions at every 90 degrees around the center of the pixel serving as the center of symmetry. Although liquid crystal molecules are tilt-aligned by voltage application, the liquid crystal molecules are tilt-aligned in these four directions, and four divided domains can be formed in one pixel to increase the viewing angle.

(Transverse•Oblique Electric Field Type Alignment Divided Liquid Crystal Display Device)

A method of applying an oblique electric field and a transverse electric field to a liquid crystal layer is proposed as a new display technique of alignment division of a liquid crystal display region by a simple method of only devising the electrode structure without performing a complicated process, such as mask rubbing or mask radiation, on an alignment film.

This method can perform alignment division of a liquid crystal display region by a simple method of only devising the electrode structure without performing a complicated process, such as mask rubbing or mask radiation using a photo-alignment film, on an alignment film.

Figure 9:
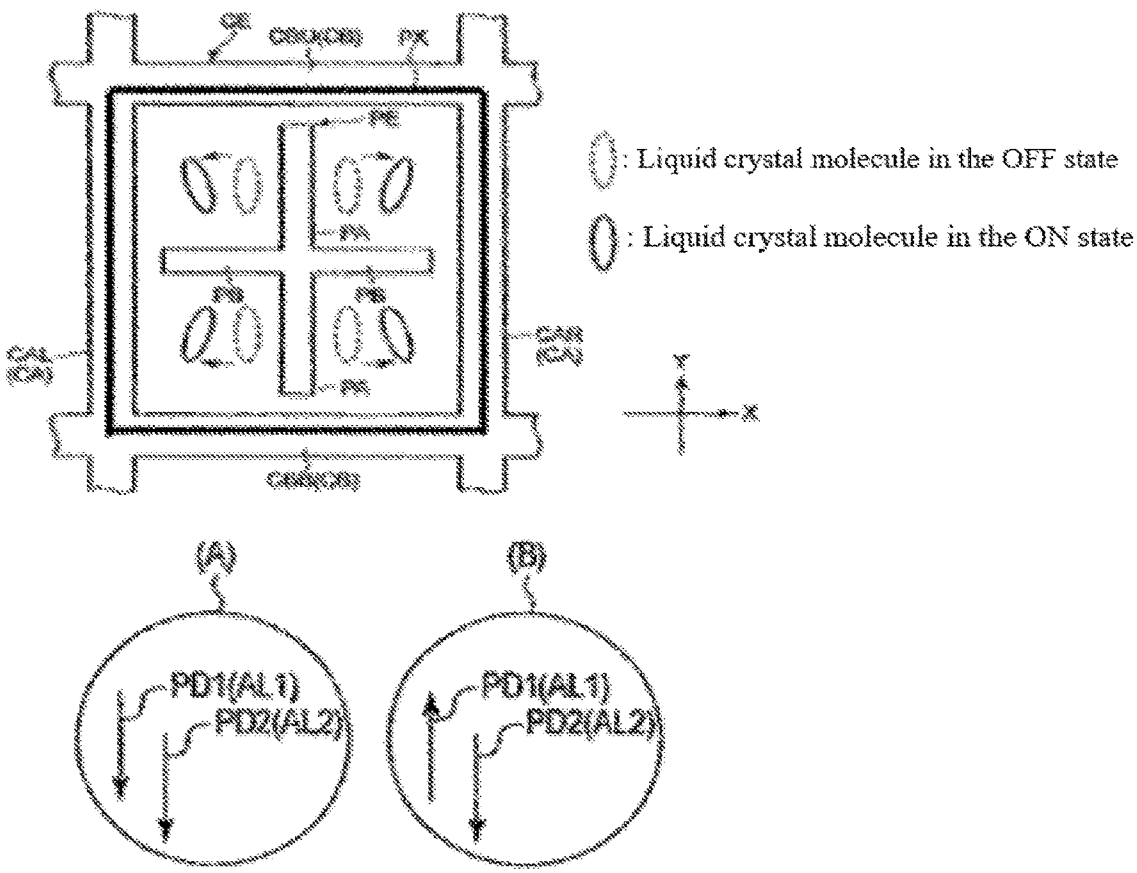
FIG. 9 is a schematic view of the electrode structure and liquid crystal molecular alignment of an oblique electric field liquid crystal display in the present invention.

FIG. 9 is a schematic plan view of the smallest constituent unit of a pixel PX in a TFT liquid crystal display device. The structure and operation of a transverse oblique electric field mode liquid crystal display are simply described below.

A pixel electrode PE includes a main pixel electrode PA and a secondary pixel electrode PB. The main pixel electrode PA and the secondary pixel electrode PB are electrically connected to each other. The main pixel electrode PA and the secondary pixel electrode PB are disposed on an array substrate AR. The main pixel electrode PA extends in a second direction Y, and the secondary pixel electrode PB extends in a first direction X, which is different from the second direction Y.

In the example illustrated in FIG. 9, the pixel electrode PE is formed in an approximately cross shape. The secondary pixel electrode PB is bonded to substantially the center of the main pixel electrode PA and extends from the main pixel electrode PA to both sides, that is, to the left side and the right side of the pixel PX. The main pixel electrode PA and the secondary pixel electrode PB intersect at almost right angles. The pixel electrode PE is electrically connected to a switching device (not shown) at the pixel electrode PB.

A common electrode CE includes a main common electrode CA and a secondary common electrode CB. The main common electrode CA and the secondary common electrode CB are electrically connected to each other. The common electrode CE is electrically insulated from the pixel electrode PE. In the common electrode CE, at least part of the main common electrode CA and the secondary common electrode CB is disposed on a counter substrate CT. The main common electrode CA extends in the second direction Y. The main common electrode CA is disposed on both sides of the main pixel electrode PA. In the X-Y plane, the main common electrodes CA do not overlap the main pixel electrodes PA, and almost the same space is disposed between the main common electrodes CA and the main pixel electrodes PA. Thus, the main pixel electrode PA is located almost midway between adjacent main common electrodes CA. The secondary common electrode CB extends in the first direction X. The secondary common electrode CB is disposed on both sides of the secondary pixel electrode PB. In the X-Y plane, the secondary common electrodes CB do not overlap the secondary pixel electrodes PB, and almost the same space is disposed between the secondary common electrodes CB and the secondary pixel electrodes PB. Thus, the secondary pixel electrode PB is located almost midway between adjacent secondary common electrodes CB.

In the example illustrated in FIG. 9, the main common electrode CA has a band shape extending linearly in the second direction Y. The secondary common electrode CB has a band shape extending linearly in the first direction X. Two parallel main common electrodes CA extend in the first direction X. To distinguish them, the main common electrode on the left side in the figure is hereinafter referred to as CAL, and the main common electrode on the right side in the figure is hereinafter referred to as CAR. Two parallel secondary common electrodes CB extend in the second direction Y. To distinguish them, the secondary common electrode on the upper side in the figure is hereinafter referred to as CBU, and the secondary common electrode on the lower side in the figure is hereinafter referred to as CBB. The main common electrode CAL and the main common electrode CAR have the same electric potential as the secondary common electrode CBU and the secondary common electrode CBB. In the example illustrated in FIG. 9, the main common electrode CAL and the main common electrode CAR are connected to the secondary common electrode CBU and the secondary common electrode CBB.

The main common electrode CAL and the main common electrode CAR are disposed between the pixel PX and the adjacent left pixel and between the pixel PX and the adjacent right pixel, respectively. More specifically, the main common electrode CAL is disposed over the boundary between the pixel PX and the adjacent left pixel (not shown), and the main common electrode CAR is disposed over the boundary between the pixel PX and the adjacent right pixel (not shown). The secondary common electrode CBU and the secondary common electrode CBB are disposed between the pixel PX and the adjacent upper pixel and between the pixel PX and the adjacent lower pixel, respectively. More specifically, the secondary common electrode CBU is disposed over the boundary between the pixel PX and the adjacent upper pixel (not shown), and the secondary common electrode CBB is disposed over the boundary between the pixel PX and the adjacent lower pixel (not shown).

In the example illustrated in FIG. 9, in one pixel PX, four domains divided by the pixel electrode PE and the common electrode CE are formed as openings or transmission portions mainly contributing to display. In this example, the initial alignment direction of a liquid crystal molecule LM is approximately parallel to the second direction Y. A first alignment film $A^{L1}$ is disposed on a surface of the array substrate AR facing the counter substrate CT and extends over almost the entire active area ACT. The first alignment film $A^{L1}$ covers the pixel electrode PE and is also disposed on a second interlayer insulating film 13. The first alignment film $A^{L1}$ is formed of a horizontal alignment material. On the other hand, a second alignment film $A^{L2}$ is disposed on a surface of the counter substrate CT facing the array substrate AR and extends over almost the entire active area ACT. The array substrate AR may further include a first main common electrode and a first secondary common electrode as parts of common electrodes.

Figure 10:
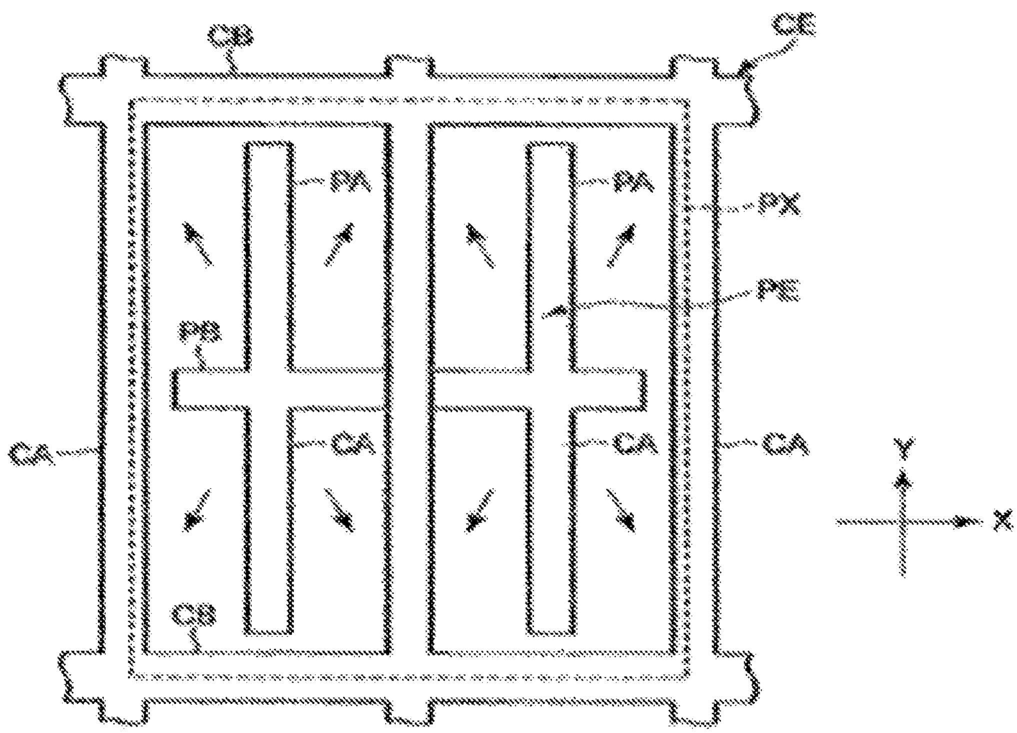
FIG. 10 is a schematic view of the electrode structure of an 8-section oblique electric field liquid crystal display in the present invention.

FIG. 10 is a schematic view of the electrode structure of an 8-section oblique electric field mode liquid crystal cell. Such 8 sections in 1 pixel can further increase the viewing angle.

The operation of a liquid crystal display panel with such a structure is described below. In the state in which no voltage is applied to a liquid crystal layer, that is, in the field-free (OFF) state in which no electric field is formed between the pixel electrode PE and the common electrode CE, as indicated by the broken line in FIG. 9, liquid crystal molecules LM in a liquid crystal layer LQ are aligned such that the long axes of the liquid crystal molecules LM are parallel to a first alignment treatment direction PD1 of the first alignment film $A^{L1}$ and a second alignment treatment direction PD2 of the second alignment film $A^{L2}$. The OFF state corresponds to the initial alignment state, and the alignment direction of the liquid crystal molecules LM in the OFF state corresponds to the initial alignment direction.

In the strict sense, the liquid crystal molecules LM are not necessarily aligned parallel to the X-Y plane and are often pretilted. Thus, the precise initial alignment direction of the liquid crystal molecules LM is the alignment direction of the liquid crystal molecules LM in the OFF state orthogonally projected to the X-Y plane.

The first alignment treatment direction PD1 and the second alignment treatment direction PD2 are approximately parallel to the second direction Y. In the OFF state, as indicated by the broken line in FIG. 9, the liquid crystal molecules LM are initially aligned such that the long axes of the liquid crystal molecules LM are approximately parallel to the second direction Y. Thus, the initial alignment direction of the liquid crystal molecules LM is parallel to the second direction Y (or makes 0 degrees with the second direction Y).

As in the illustrated example, when the first alignment treatment direction PD1 is parallel to and the same as the second alignment treatment direction PD2, the liquid crystal molecules LM in a cross section of the liquid crystal layer LQ are almost horizontally aligned (with a pretilt angle of approximately zero) near an intermediate portion of the liquid crystal layer LQ and are aligned with a pretilt angle such that the liquid crystal molecules LM are symmetrically aligned near the first alignment film $A^{L1}$ and near the second alignment film $A^{L2}$ with the intermediate portion being a boundary (splay alignment). In the splay alignment state of the liquid crystal molecules LM, the liquid crystal molecules LM near the first alignment film $A^{L1}$ and the liquid crystal molecules LM near the second alignment film $A^{L2}$ provide optical compensation also in the direction oblique to the direction normal to the substrate.

Thus, when the first alignment treatment direction PD1 is parallel to and the same as the second alignment treatment direction PD2 in black display, this results in less light leakage, a high contrast ratio, and improved display quality. When the first alignment treatment direction PD1 is parallel to and opposite to the second alignment treatment direction PD2, the liquid crystal molecules LM in a cross section of the liquid crystal layer LQ are aligned with an almost uniform pretilt angle near the first alignment film $A^{L1}$, near the second alignment film $A^{L2}$, and at an intermediate portion of the liquid crystal layer LQ (homogeneous alignment). Part of backlight from a backlight passes through a first polarizer $P^{L1}$ and is incident on a liquid crystal display panel LPN. Light incident on the liquid crystal display panel LPN is linearly polarized light perpendicular to a first polarization axis AX1 of the first polarizer $P^{L1}$. The polarization state of such linearly polarized light changes little when passing through the liquid crystal display panel LPN in the OFF state. Thus, linearly polarized light passing through the liquid crystal display panel LPN is absorbed by a second polarizer $P^{L2}$, which has the positional relationship of crossed nicols with respect to the first polarizer $P^{L1}$ (black display).

In the state in which a voltage is applied to the liquid crystal layer LQ, that is, in the state in which a potential difference exists between the pixel electrode PE and the common electrode CE (in the ON state), a transverse electric field (or an oblique electric field) approximately parallel to the substrate is formed between the pixel electrode PE and the common electrode CE. The liquid crystal molecules LM are influenced by the electric field, and the long axes of the liquid crystal molecules LM rotate in a plane approximately parallel to the X-Y plane, as indicated by the solid line in the figure.

In the example illustrated in FIG. 9, the liquid crystal molecules LM in the lower half of the region between the pixel electrode PE and the main common electrode CAL rotate clockwise about the second direction Y and are aligned toward the lower left in the figure, and the liquid crystal molecules LM in the upper half of the region rotate counterclockwise about the second direction Y and are aligned toward the upper left in the figure. The liquid crystal molecules LM in the lower half of the region between the pixel electrode PE and the main common electrode CAR rotate counterclockwise about the second direction Y and are aligned toward the lower right in the figure, and the liquid crystal molecules LM in the upper half of the region rotate clockwise about the second direction Y and are aligned toward the upper right in the figure. Thus, in each pixel PX, in the state in which an electric field is formed between the pixel electrode PE and the common electrode CE, the alignment direction of the liquid crystal molecules LM is divided into a plurality of directions with the position overlapping the pixel electrode PE being a boundary, and a domain is formed in each alignment direction. Thus, a plurality of domains are formed in one pixel PX.

In the ON state, linearly polarized light perpendicular to the first polarization axis AX1 of the first polarizer $P^{L1}$ is incident on the liquid crystal display panel LPN. The polarization state of the linearly polarized light changes with the alignment state of the liquid crystal molecules LM when the linearly polarized light passes through the liquid crystal layer LQ. In the ON state, at least part of light passing through the liquid crystal layer LQ passes through the second polarizer $P^{L2}$ (white display). With such a structure, four domains can be formed in one pixel, and the viewing angle can be optically compensated in the four directions. This can increase the viewing angle. Thus, a liquid crystal display can be provided that can achieve high transmittance display without grayscale inversion and that has high display quality. In one pixel, almost the same opening area of each of the four domains divided by the pixel electrode PE and the common electrode CE results in almost the same transmittance in each domain. Light passing through each opening provides optical compensation each other and can achieve uniform display in a wide viewing angle range.

A liquid crystal display device according to the present invention described above in detail can be applied to the mode of operation, such as TN, STN, ECB, VA, VA-TN, IPS, FFS, π cell, OCB, or cholesteric liquid crystals. Among these, VA, IPS, FFS, VA-TN, TN, and ECB are particularly preferred. Due to the formation of a polymer network in a liquid crystal layer, a liquid crystal display device according to the present invention can be distinguished from a polymer-sustained alignment (PSA) liquid crystal display device, which has a polymer or copolymer on an alignment film.

EXAMPLES

Although the present invention will be further described in the following examples, the present invention is not limited to these examples. The unit "%" with respect to compositions in the following examples and comparative examples refers to "% by mass".

The evaluation of the low-temperature solubility of a liquid crystal composition in reference examples was performed by preparing a liquid crystal composition, weighing 1 g of the liquid crystal composition in a 2-mL sample bottle, storing the liquid crystal composition at −20° C., visually inspecting the liquid crystal composition for a precipitate, and performing the evaluation according to the following four-three grades.

○: No precipitate was observed even after 240 hours.

Δ: A precipitate was observed within 120 hours.

X: A precipitate was observed within 60 hours.

The following characteristics were measured in the examples.

$T_{NI}$: nematic phase-isotropic liquid phase transition temperature (° C.)

Δn: refractive index anisotropy at 20° C.

no: ordinary refractive index at 20° C.

Δε: dielectric constant anisotropy at 20° C.

ε⊥: dielectric constant at 20° C. in the short axis direction of liquid crystals η): viscosity (mPa·s) at 20° C.

$\gamma_1$: rotational viscosity (mPa·s) at 20° C.

VHR: voltage holding ratio (%) at a frequency of 60 Hz, at an applied voltage of 1 V, and at 60° C.

Image-Sticking:

Image-sticking in a liquid crystal display device was evaluated according to the following four grades by displaying a predetermined fixed pattern in a display area for 1000 hours and then visually determining the after-image level of the fixed pattern in full-screen uniform display.

⊙: no after-image

○: slight acceptable after-image

Δ: unacceptable after-image

X: very bad after-image

Drop Marks:

In the evaluation of drop marks in a liquid crystal display, black display on the entire surface was visually inspected for white drop marks according to the following four grades.

⊙: no drop marks

○: slight acceptable drop marks

Δ: unacceptable drop marks

X: very bad drop marks

Process Compatibility:

In the ODF process, 50 pL/time of liquid crystals were dropped 100000 times with a constant delivery pump. Process compatibility was evaluated according to the following four grades with respect to the change in the amount of liquid crystals in each 100 times of “0 to 100 times, 101 to 200 times, 201 to 300 times, . . . , 99901 to 100000 times” of droppings.

⊙: very small change (a liquid crystal display device can be consistently produced)

○: slight acceptable change

A: unacceptable change (the yield declined due to the change)

X: significant change (with leakage of liquid crystals or with vacuum bubbles)

The following abbreviations are used to describe compounds in the examples.

(Side Chain)

-n —$C_nH_{2n+1}$ linear alkyl group having n carbon atoms

-On —$OC_nH_{2n+1}$ linear alkoxy group having n carbon atoms

-V —C≡$CH_2$ vinyl group

-V1 —CH═CH—$CH_3$

-2V —$CH_2$—$CH_2$—CH═$CH_2$

-2V1 —$CH_2$—$CH_2$—CH═CH—$CH_3$ (Linking Group)

—CFFO— —$CF_2$—O—

-1O— —$CH_2$—O

—COO— —COO—

(Ring Structure)

[Chem. 181]

Cy

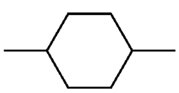

Ph

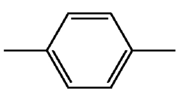

Ph5

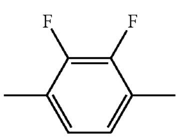

Nd4

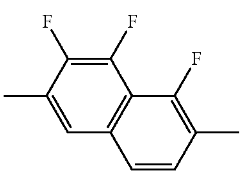

Ch3

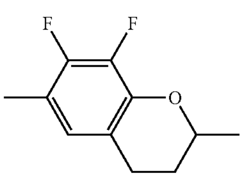

Cb

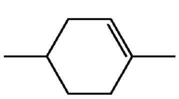

-continued

Cb1

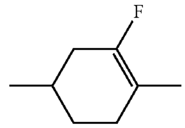

Oc

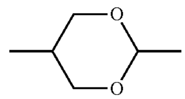

Ph15

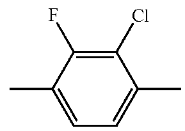

Ph4

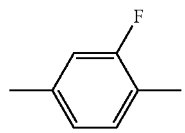

Df

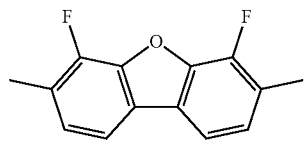

[Chem. 182]

Ph1

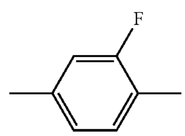

Ph2

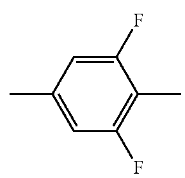

Py

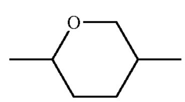

Oc

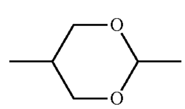

Np

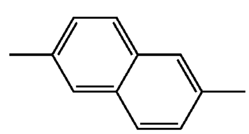

Np1

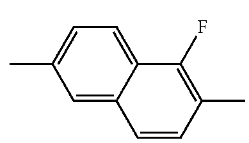

-continued

Np2

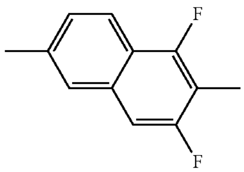

Np3

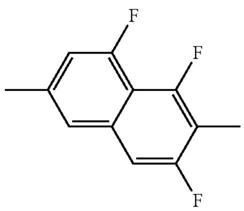

Reference Example 1

The following liquid crystal host (LCN-1) was prepared as an N-type liquid crystal composition.

[Chem. 183]

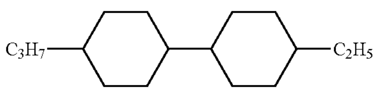

3-Cy-Cy-2
22%

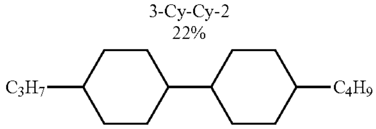

3-Cy-Cy-4
10%

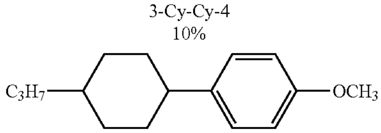

3-Cy-Ph-O1
7%

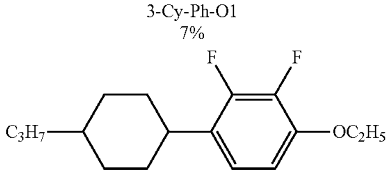

3-Cy-Ph5-O2
13%

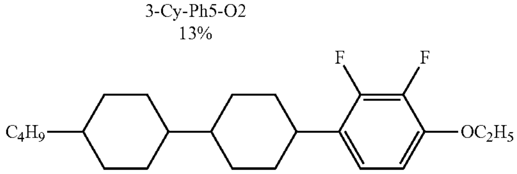

3-Cy-Cy-Ph5-O2
10%

-continued

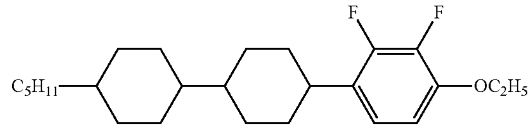

5-Cy-Cy-Ph5-O2
5%

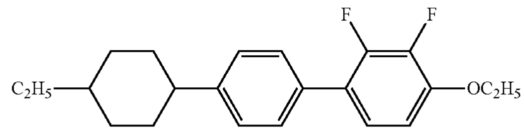

2-Cy-Ph-Ph5-O2
9%

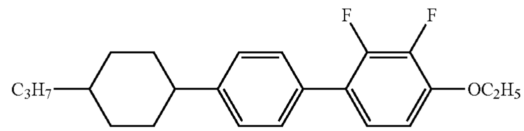

3-Cy-Ph-Ph5-O2
9%

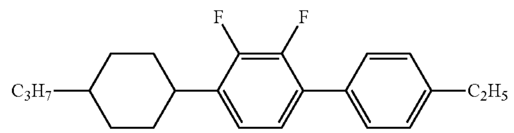

3-Ph-Ph5-Ph-2
7%

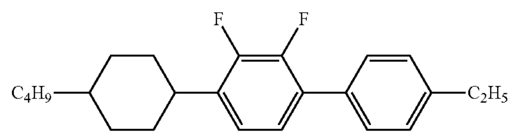

4-Ph-Ph5-Ph-2
8%

The nematic phase-isotropic liquid phase transition temperature ($T_{NI}$) was 75.6 (° C.), the refractive index anisotropy at 25° C. ($\Delta n$) was 0.108, the ordinary refractive index at 25° C. ($n_o$) was 1.485, the dielectric constant anisotropy at 25° C. ($\Delta\varepsilon$) was −2.8, the dielectric constant in the short axis direction of liquid crystals at 25° C. ($\varepsilon\perp$) was 6.2, and the rotational viscosity at 25° C. ($\gamma_1$) was 113 (mPa·s)

Reference Examples 2 to 17

As listed in Tables 1 and 2, liquid crystal hosts (LCN-2 to LCN-17) were prepared.

TABLE 1

| | Reference example 1 | Reference example 2 | Reference example 3 | Reference example 4 | Reference example 5 | Reference example 6 | Reference example 7 |
|---|---|---|---|---|---|---|---|
| Liquid crystal host name | LCN-1 | LCN-2 | LCN-3 | LCN-4 | LCN-5 | LCN-6 | LCN-7 |
| 3-Cy-Cy-2 | 22 | 16 | 18 | 18 | | 18 | |
| 3-Cy-Cy-4 | 10 | 8 | 3 | 7 | 8 | 3 | 20 |

TABLE 1-continued

| | Reference example 1 | Reference example 2 | Reference example 3 | Reference example 4 | Reference example 5 | Reference example 6 | Reference example 7 |
|---|---|---|---|---|---|---|---|
| 3-Cy-Cy-5 | | 11 | 7 | | 8 | 2 | 5 |
| 3-Cy-Cy-O1 | | 11 | | | 2 | | |
| 1V-Cy-Cy-3 | | | 9 | 8 | 10 | | |
| 3-Cy-Ph—O1 | 7 | | | 4 | 17.5 | | |
| 3-Cy-Ph—O2 | | | | | | | 4 |
| 3-Ph—Ph-1 | | | | | | 4 | 4 |
| 5-Ph—Ph-1 | | | | | | 8 | 11 |
| 1-Ph—Ph—2V1 | | | | 5 | | | |
| 3-Cy-Cy-Ph-1 | | | 6 | | | 5 | 2 |
| V2-Cy-Cy-Ph-1 | | | | | 6 | | |
| 3-Cy-Ph—Ph-2 | | | | 6 | 3 | 12 | 8 |
| 5O-Df-O2 | | | | | 3 | | |
| 3-Cy-Ph5—O2 | 13 | 13 | 15 | 15 | 6 | | |
| 3-Ph—Ph5—O1 | | | | | | 7 | |
| 3-Ph—Ph5—O2 | | | 11 | 5 | 9 | 8 | 9 |
| 5-Ph—Ph5—O2 | | | | | | | 5 |
| 3-Cy-Cy-Ph5—O1 | | | | 3 | | | |
| 3-Cy-Cy-Ph5—O2 | | | 12 | 12 | 1.5 | | |
| 4-Cy-Cy-Ph5—O2 | 10 | | | | | | |
| 5-Cy-Cy-Ph5—O2 | 5 | | | | | | |
| 2-Cy-Cy-1O—Ph5—O2 | | | | | | 20 | 13 |
| 3-Cy-Cy-1O—Ph5—O2 | | | | | | 13 | 19 |
| 3-Cy-Ph—Ph5—O2 | | 7 | | | 10 | | |
| 2-Cy-Ph—Ph5—O2 | 9 | 6 | 8 | 7 | 8 | | |
| 3-Cy-Ph—Ph5—O2 | 9 | 8 | 11 | 10 | 8 | | |
| 3-Ph—Ph5—Ph-2 | 7 | 17 | | | | | |
| 4-Ph—Ph5—Ph-2 | 8 | 3 | | | | | |
| $T_{NI}$/° C. | 75.6 | 70.2 | 74.5 | 74.4 | 75.3 | 75.3 | 74.6 |
| $n_o$ | 1.485 | 1.484 | 1.48 | 1.484 | 1.487 | 1.493 | 1.492 |
| Δn | 0.108 | 0.108 | 0.099 | 0.104 | 0.111 | 0.112 | 0.109 |
| $\varepsilon_\perp$ | 6.2 | 5.6 | 6.5 | 6.1 | 6.4 | 6.4 | 6.2 |
| Δε | −2.8 | −2.3 | −3.1 | −2.8 | −2.9 | −3.1 | −3 |
| $\gamma_1$/mPa · S | 113 | 94 | 106 | 104 | 110 | 117 | 121 |

TABLE 2

| | Reference example 8 | Reference example 9 | Reference example 10 | Reference example 11 | Reference example 12 | Reference example 13 | Reference example 14 |
|---|---|---|---|---|---|---|---|
| Liquid crystal host name | LCN-8 | LCN-9 | LCN-10 | LCN-11 | LCN-12 | LCN-13 | LCN-14 |
| 3-Cy-Cy-2 | 21 | 19 | 21 | 18 | 20 | 17 | 19.5 |
| 3-Cy-Cy-4 | 8 | 8 | 8 | 7.5 | 8 | 6 | 6 |
| 3-Cy-Cy-5 | 4 | 4 | 5 | | 5 | 3 | |
| 3-Cy-Ph—O1 | | 4 | | | | | |
| 3-Ph—Ph-1 | | 6.5 | | 12.7 | | 14 | |
| 5-Ph—Ph-1 | 9 | | 13 | | 11 | | 14.5 |
| 3-Cy-Cy-Ph-1 | 7 | | 4 | | | | |
| 3-Cy-Cy-Ph-3 | 2 | | | | | | |
| 3-Cy-Ph—Ph-2 | | 6 | | 6 | 4 | 4 | 4 |
| 3-Cy-Ph—Ph-2 | | | | 4.5 | | 6 | 4 |
| 2-Cy-Cy-1O—Ph5—O2 | 9 | 4 | 9 | 15 | 11 | 8 | 11 |
| 3-Cy-Cy-1O—Ph5—O2 | 9 | 11 | 9 | 1.8 | 11 | 7 | 11 |
| 2-Cy-Ph—Ph5—O2 | | 7 | | 6 | | | |
| 3-Cy-Ph—Ph5—O2 | | 8 | | | | | |
| 3-Cy-Ph—Ph5—O3 | 7 | | 7 | 7 | 6 | 6 | 6 |
| 3-Cy-Ph—Ph5—O4 | 9 | 8 | 9 | 9 | 6 | 6 | 6 |
| 4-Cy-Ph—Ph5—O3 | | | 6 | | | | |
| 3-Cy-1O—Ph5—O1 | 7 | 3.5 | | 6 | | | |
| 3-Cy-1O—Ph5—O2 | 8 | 11 | 9 | 6.5 | 10 | 8 | 10 |
| 2-Ph-2-Ph—Ph5—O2 | | | | | | 5 | |
| 3-Ph-2-Ph—Ph5—O2 | | | | | 8 | 10 | 8 |
| $T_{NI}$/° C. | 75.4 | 77.7 | 76.8 | 75.7 | 75.3 | 75.6 | 75.4 |
| $n_o$ | 1.482 | 1.485 | 1.484 | 1.49 | 1.485 | 1.493 | 1.489 |
| Δn | 0.091 | 0.101 | 0.098 | 0.112 | 0.103 | 0.124 | 0.114 |
| $\varepsilon_\perp$ | 6.48 | 6.56 | 6.14 | 6.45 | 6.4 | 5.81 | 6.43 |
| Δε | −3.1 | −3.26 | −2.89 | −3.01 | −3.12 | −2.6 | −3.07 |
| $\gamma_1$/mPa · S | 106 | 116 | 114 | 110 | 122 | 116 | 125 |

TABLE 3

| | Reference example 15 | Reference example 16 | Reference example 17 |
|---|---|---|---|
| Liquid crystal host name | LCN-15 | LCN-16 | LCN-17 |
| 5-Cy-Cy-3 | 15 | | |
| 3-Cy-Cy-4 | 15 | | |
| 3-Cy-Cy-5 | | | 10 |
| 3-Cy-Cy-1 | | | 10 |
| 3-Cy-Cy-2 | | | 10 |
| 1V-Cy-Cy-3 | | 15 | |
| 5-Ph—Ph-1 | | 20 | 10 |
| 3-Cy-Cy-Ph—O1 | 4 | | |
| 3-Cy-Cy-Ph-3 | 4 | | |
| 3-Cy-Ph—Ph-2 | | 7 | 7 |
| 5-Cy-Ph—Ph-2 | | 6 | 7 |
| 3-Ph—Ph5—O1 | 10 | | |
| 3-Cy-Cy-Ph5—O1 | 15 | | |
| 3-Cy-Cy-Ph5—O2 | 15 | | |
| 2-Cy-Cy-1O—Ph5—O2 | | 10 | 10 |
| 3-Cy-Cy-1O—Ph5—O2 | | 10 | 11 |
| 3-Cy-Cy-2-Ph5—O2 | 5 | | |
| 5-Cy-Cy-2-Ph5—O2 | 5 | | |
| 3-Cy-Ph—Ph5—O4 | | | 5 |
| 3-Cy-Ph—Ph5—O3 | | | 5 |
| 3-Cy-Ph—Ph5—O3 | | 6 | |
| 3-Cy-Ph—Ph5—O4 | | 6 | |
| 5-Cy-Ph—Ph5—O3 | 12 | | |
| 3-Cy-1O—Ph5—O1 | | 5 | 5 |
| 3-Ph-2-Ph—Ph5—O2 | | 10 | 10 |
| Δn | 0.102 | 0.12 | 0.11 |
| Δε | −3.8 | −3.3 | −3.2 |
| η/mPa · s | 16.8 | 19 | 17 |

Reference Examples 18 to 34

As listed in Tables 4 to 6, liquid crystal compositions (LCN-1-1) to (LCN-17-1) containing a liquid crystal host, a monomer, and a photopolymerization initiator were prepared.

TABLE 4

| | Reference example 18 | Reference example 19 | Reference example 20 | Reference example 21 | Reference example 22 | Reference example 23 | Reference example 24 |
|---|---|---|---|---|---|---|---|
| Polymerizable liquid crystal composition name | LCN-1-1 | LCN-2-1 | LCN-3-1 | LCN-4-1 | LCN-5-1 | LCN-6-1 | LCN-7-1 |
| Liquid crystal host | LCN-1 | LCN-2 | LCN-3 | LCN-4 | LCN-5 | LCN-6 | LCN-7 |
| Liquid crystal host concentration (mass %) | 98 | 98 | 98 | 98 | 98 | 98 | 98 |
| Monomer 1 | P1-1 | P1-1 | P1-1 | P1-1 | P1-1 | P1-1 | P1-1 |
| Monomer 1 concentration (mass %) | 1.96 | 1.96 | 1.96 | 0.98 | 0.98 | 0.98 | 0.98 |
| Monomer 2 | | | | P1-2 | P1-2 | P1-2 | P1-2 |
| Monomer 2 concentration (mass %) | 0 | 0 | 0 | 0.98 | 0.98 | 0.98 | 0.98 |
| Initiator | 651 | 651 | 651 | 651 | 651 | 651 | 651 |
| Initiator concentration (mass %) | 0.04 | 0.04 | 0.04 | 0.04 | 0.04 | 0.04 | 0.04 |
| Solubility at low temperatures | ○ | ○ | ○ | ○ | ○ | ○ | ○ |

TABLE 5

| | Reference example 25 | Reference example 26 | Reference example 27 | Reference example 28 | Reference example 29 | Reference example 30 | Reference example 31 |
|---|---|---|---|---|---|---|---|
| Polymerizable composition name | LCN-8-1 | LCN-9-1 | LCN-10-1 | LCN-11-1 | LCN-12-1 | LCN-13-1 | LCN-14-1 |
| Liquid crystal host | LCN-8 | LCN-9 | LCN-10 | LCN-11 | LCN-12 | LCN-13 | LCN-14 |
| Liquid crystal host concentration (mass %) | 98 | 98 | 98 | 98 | 98 | 98 | 98 |
| Monomer 1 | P1-3 | P1-3 | P1-1 | P1-4 | P1-1 | P1-4 | P1-4 |
| Monomer 1 concentration (mass %) | 1.96 | 1.96 | 1.96 | 1.96 | 1.96 | 0.98 | 0.98 |
| Monomer 2 | | | | | | P1-3 | P1-3 |
| Monomer 2 concentration (mass %) | 0 | 0 | 0 | 0 | 0 | 0.98 | 0.98 |
| Initiator | 651 | 651 | 651 | 651 | 651 | 651 | 651 |
| Initiator concentration (mass %) | 0.04 | 0.04 | 0.04 | 0.04 | 0.04 | 0.04 | 0.04 |
| Solubility at low temperatures | ○ | ○ | ○ | ○ | ○ | ○ | ○ |

TABLE 6

| | Reference example 32 | Reference example 33 | Reference example 34 |
|---|---|---|---|
| Composition name | LCN-15-1 | LCN-16-1 | LCN-17-1 |
| Liquid crystal host | LCN-15 | LCN-16 | LCN-17 |
| Liquid crystal host concentration (mass %) | 98 | 98 | 98 |
| Monomer 1 | P1-1 | P1-1 | P1-1 |
| Monomer 1 concentration (mass %) | 1.96 | 1.96 | 1.96 |
| Monomer 2 | | | |
| Monomer 2 concentration (mass %) | 0 | 0 | 0 |
| Initiator | 651 | 651 | 651 |
| Initiator concentration (mass %) | 0.04 | 0.04 | 0.04 |
| Storage stability | Δ | Δ | Δ |

The monomers (P1-1) to (P1-4) have the following structures.

In the present invention, "651" in the initiator column refers to Irgacure-651 (manufactured by BASF).

[Chem. 184]

(P1-1)

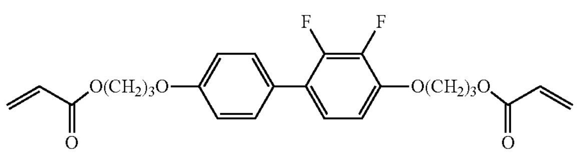

(P1-2)

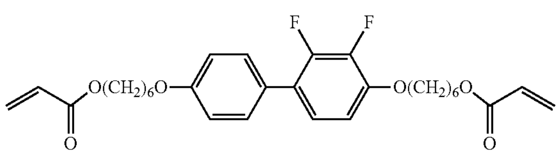

(P1-3)

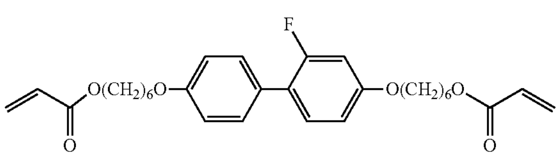

(P1-4)

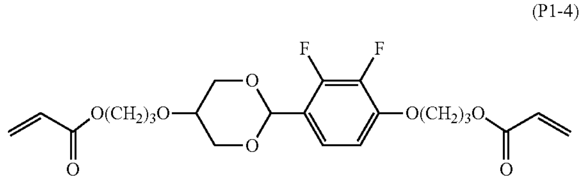

Example 1

A fishbone patterned electrode vertical alignment (PVA) cell on which a polyimide vertical alignment film with a cell gap of 3.5 μm was formed was used to inject the polymerizable liquid crystal composition (LCN-1-1) into the cell by a vacuum injection method.

The cell has many slits for the tilt alignment of liquid crystals in the slit direction caused by voltage application. The fishbone patterned electrode had a line electrode width and a slit width of 3.5 μm, and the line electrode had a length of 100 μm.

While a rectangular wave voltage of 2.43 V was applied at a frequency of 1 kHz, an ultraviolet LED source with a wavelength 365 nm was used to emit ultraviolet light with a radiation intensity of 15 $mW/cm^2$ for 12 seconds. While the ultraviolet radiation was continued, the voltage was set to 0 V for a return to vertical alignment. A fishbone PVA cell was produced by ultraviolet radiation for 68 seconds from the point in time when the voltage was returned to 0 V.

To make the bright field brightest, a voltage was applied to the resulting liquid crystal display device according to the present invention to set the slit direction 45 degrees with one of two polarization axes of a crossed nicols polarizer. The liquid-crystal alignment state of the cell was observed with a polarizing microscope. It was confirmed that no voltage state was completely an approximately vertical alignment state in the dark field. It was confirmed that a gradual increase in voltage changed the slit portion from vertical alignment to tilt alignment and resulted in increased brightness.

The voltage-transmittance characteristics were measured with 60-Hz rectangular waves. The maximum transmittance was 71.3%, the transmittance in parallel nicols being 100%. The drive voltage at a transmittance of 90% (V90) was 8.6 V. The response time at a V90 of 0 V (off-response) was 4.6 ms.

(Viscoelastic Measurement)

The polymerizable liquid crystal composition before polymerization was placed between two glass plates (the distance between the glass plates was 100 μm) and was subjected to viscoelastic measurement with a rheometer.

The polymerizable liquid crystal composition between the glass plates was then irradiated for 80 seconds with ultraviolet light at a radiation intensity of 15 $mW/cm^2$ from an ultraviolet LED source with a wavelength of 365 nm and was subjected to viscoelastic measurement with a rheometer.

The viscoelastic measurement conditions are described below.

Viscoelastometer: "MCR301" manufactured by Anton Paar

Temperature: 25° C.

Strain: 0.4 μm at the maximum (sine wave)

Before curing, the loss tangent at a frequency of 1 Hz was 2.0, and the loss tangent (tan δ) at a frequency of 4.6 Hz was 5.0.

After curing, the loss tangent at a frequency of 1 Hz was 0.4, and the loss tangent at a frequency of 4.6 Hz was 0.5.

The ultraviolet radiation time was 30 seconds before the loss tangent (tan δ) at a frequency of 1 Hz reached 1.

Examples 2 to 17

A liquid crystal display device according to the present invention was produced in the same manner as in Example 1. Tables 7, 8, and 9 summarize the liquid crystal compositions used, production conditions, viscoelastic properties, and liquid crystal display characteristics.

TABLE 7

| | Example 1 | Example 2 | Example 3 | Example 4 | Example 5 | Example 6 | Example 7 |
|---|---|---|---|---|---|---|---|
| Polymerizable liquid crystal composition | LCN-1-1 | LCN-2-1 | LCN-3-1 | LCN-4-1 | LCN-5-1 | LCN-6-1 | LCN-7-1 |
| Cell gap | 3.5 | 3.5 | 3.5 | 3.5 | 3.5 | 3.5 | 3.5 |
| Applied voltage during curing (V) | 2.43 | 2.62 | 2.55 | 2.65 | 2.64 | 2.43 | 2.55 |
| Voltage application time (s) | 12 | 20 | 20 | 25 | 50 | 12 | 12 |
| UV intensity (mW/cm2) | 15 | 15 | 15 | 20 | 20 | 15 | 15 |
| UV radiation time after completion of voltage application (s) | 68 | 60 | 60 | 55 | 30 | 68 | 68 |
| Off-response time (ms) | 4.6 | 4.2 | 3.7 | 3.4 | 3.6 | 4.1 | 4 |
| V90 (V) | 8.6 | 9.7 | 10.5 | 10.7 | 10.5 | 9.2 | 9.4 |
| T100 (%) | 71.3 | 68.8 | 67 | 66.4 | 63.5 | 71.9 | 71.2 |
| tanδ before curing (1 Hz) | 2 | 2 | 2.6 | 2.4 | 2.2 | 2.5 | 2 |
| tanδ before curing (4.6 Hz) | 5 | 5.1 | 4 | 4 | 4.3 | 4.6 | 4.4 |
| tanδ after curing (1 Hz) | 0.4 | 0.5 | 0.5 | 0.5 | 0.6 | 0.5 | 0.4 |
| tanδ after curing (4.6 Hz) | 0.5 | 0.7 | 0.7 | 0.7 | 0.8 | 0.7 | 0.6 |

TABLE 8

| | Example 8 | Example 9 | Example 10 | Example 11 | Example 12 | Example 13 | Example 14 |
|---|---|---|---|---|---|---|---|
| Polymerizable liquid crystal composition | LCN-8-1 | LCN-9-1 | LCN-10-1 | LCN-11-1 | LCN-12-1 | LCN-13-1 | LCN-14-1 |
| Cell gap | 3.5 | 3.5 | 3.5 | 3.5 | 3.5 | 3.5 | 3.5 |
| Applied voltage during curing (V) | 2.45 | 2.4 | 2.46 | 2.38 | 2.45 | 2.67 | 2.43 |
| Voltage application time (s) | 12 | 12 | 12 | 12 | 12 | 12 | 12 |
| UV intensity (mW/cm2) | 15 | 15 | 15 | 15 | 15 | 15 | 15 |
| UV radiation time after completion of voltage application (s) | 68 | 68 | 68 | 68 | 68 | 68 | 68 |
| Off-response time (ms) | 3.7 | 4.1 | 4.3 | 4.4 | 4.1 | 4 | 4.5 |
| V90 (V) | 10 | 9.5 | 8.8 | 9.2 | 9 | 9.7 | 8.5 |
| T100 (%) | 67.5 | 70.1 | 72.6 | 70.8 | 71.5 | 70.9 | 73.4 |
| tanδ before curing (1 Hz) | 2 | 2 | 2.6 | 2.5 | 2.1 | 2.5 | 2.2 |
| tanδ before curing (4.6 Hz) | 4.1 | 5 | 4.4 | 4.6 | 4.6 | 4.3 | 4.1 |
| tanδ after curing (1 Hz) | 0.4 | 0.5 | 0.3 | 0.2 | 0.3 | 0.3 | 0.3 |
| tanδ after curing (4.6 Hz) | 0.5 | 0.6 | 0.4 | 0.2 | 0.4 | 0.4 | 0.5 |

TABLE 9

| | Example 15 | Example 16 | Example 17 |
|---|---|---|---|
| Polymerizable liquid crystal composition | LCN-15-1 | LCN-16-1 | LCN-17-1 |
| Cell gap | 3.5 | 3.5 | 3.5 |
| Applied voltage during curing (V) | 2.2 | 2.3 | 2.4 |
| Voltage application time (s) | 12 | 25 | 12 |
| UV intensity (mW/cm2) | 15 | 15 | 15 |
| UV radiation time after completion of voltage application (s) | 68 | 55 | 68 |
| Off-response time (ms) | 4.2 | 3.7 | 4.5 |
| V90 (V) | 9.2 | 9.9 | 8.4 |
| T100 (%) | 71 | 67 | 74 |

TABLE 9-continued

| | Example 15 | Example 16 | Example 17 |
|---|---|---|---|
| tanδ before curing (1 Hz) | 2.1 | 2 | 2.3 |
| tanδ before curing (4.6 Hz) | 5 | 4.6 | 4.2 |
| tanδ after curing (1 Hz) | 0.4 | 0.5 | 0.4 |
| tanδ after curing (4.6 Hz) | 0.5 | 0.7 | 0.6 |

Reference Examples 35 to 41

As listed in Table 10, liquid crystal compositions (LCN-1-2) to (LCN-7-2) containing a liquid crystal host, a monomer, and a photopolymerization initiator were prepared.

TABLE 10

| | Reference example 35 | Reference example 36 | Reference example 37 | Reference example 38 | Reference example 39 | Reference example 40 | Reference example 41 |
|---|---|---|---|---|---|---|---|
| Polymerizable liquid crystal composition name | LCN-1-2 | LCN-2-2 | LCN-3-2 | LCN-4-2 | LCN-5-2 | LCN-6-2 | LCN-7-2 |
| Liquid crystal host | LCN-1 | LCN-2 | LCN-3 | LCN-4 | LCN-5 | LCN-6 | LCN-7 |
| Liquid crystal host concentration (mass %) | 98 | 98 | 98 | 98 | 98 | 98 | 98 |

TABLE 10-continued

| | Reference example 35 | Reference example 36 | Reference example 37 | Reference example 38 | Reference example 39 | Reference example 40 | Reference example 41 |
|---|---|---|---|---|---|---|---|
| Monomer 1 | P1-1 | P1-1 | P1-1 | P1-1 | P1-1 | P1-1 | P1-1 |
| Monomer 1 concentration (mass %) | 1.99 | 1.99 | 1.99 | 1 | 1 | 1 | 1 |
| Monomer 2 | | | | P1-2 | P1-2 | P1-2 | P1-2 |
| Monomer 2 concentration (mass %) | 0 | 0 | 0 | 0.99 | 0.99 | 0.99 | 0.99 |
| Initiator | 651 | 651 | 651 | 651 | 651 | 651 | 651 |
| Initiator concentration (mass %) | 0.01 | 0.01 | 0.01 | 0.01 | 0.01 | 0.01 | 0.01 |

Comparative Examples 1 to 7

A liquid crystal display device according to the present invention was produced in the same manner as in Example 1. Table 11 summarizes the liquid crystal compositions used, production conditions, viscoelastic properties, and liquid crystal display characteristics.

TABLE 11

| | Comparative example 1 | Comparative example 2 | Comparative example 3 | Comparative example 4 | Comparative example 5 | Comparative example 6 | Comparative example 7 |
|---|---|---|---|---|---|---|---|
| Polymerizable liquid crystal composition | LCN-1-2 | LCN-2-2 | LCN-3-2 | LCN-4-2 | LCN-5-2 | LCN-6-2 | LCN-7-2 |
| Cell gap | 3.5 | 3.5 | 3.5 | 3.5 | 3.5 | 3.5 | 3.5 |
| Applied voltage during curing (V) | 2.43 | 2.62 | 2.55 | 2.65 | 2.64 | 2.43 | 2.55 |
| Voltage application time (s) | 12 | 20 | 20 | 25 | 50 | 12 | 12 |
| UV intensity (mW/cm2) | 15 | 15 | 15 | 20 | 20 | 15 | 15 |
| UV radiation time after completion of voltage application (s) | 68 | 60 | 60 | 55 | 30 | 68 | 68 |
| Off-response time (ms) | 5.6 | 5.8 | 5.6 | 5.7 | 5.7 | 5.6 | 5.6 |
| V90 (V) | 7.4 | 9 | 6.7 | 7.4 | 7.2 | 6.7 | 6.9 |
| T100 (%) | 75.3 | 75.2 | 75.4 | 75 | 75.2 | 75.2 | 75.1 |
| tanδ before curing (1 Hz) | 2 | 2 | 2.6 | 2.4 | 2.2 | 2.5 | 2 |
| tanδ before curing (4.6 Hz) | 5 | 5.1 | 4 | 4 | 4.3 | 4.6 | 4.4 |
| tanδ after curing (1 Hz) | 2 | 1.8 | 2.6 | 2.5 | 2.2 | 2.5 | 2 |
| tanδ after curing (4.6 Hz) | 5 | 5.1 | 4 | 4 | 4.3 | 4.5 | 4.4 |

A comparison with Examples 1 to 7 shows that an inappropriate concentration of photopolymnerization initiator results in an inappropriate range of viscoelasticity data and off-response as slow as 5 ms or more.

Comparative Examples 8 to 14

A liquid crystal display device according to the present invention was produced in the same manner as in Example 1. Table 12 summarizes the liquid crystal compositions used, production conditions, viscoelastic properties, and liquid crystal display characteristics.

TABLE 12

| | Reference example 8 | Reference example 9 | Reference example 10 | Reference example 11 | Reference example 12 | Reference example 13 | Reference example 14 |
|---|---|---|---|---|---|---|---|
| Liquid crystal composition | LCN-8-1 | LCN-9-1 | LCN-10-1 | LCN-11-1 | LCN-12-1 | LCN-13-1 | LCN-14-1 |
| Cell gap | 3.5 | 3.5 | 3.5 | 3.5 | 3.5 | 3.5 | 3.5 |
| Applied voltage during curing (V) | 2.45 | 2.4 | 2.46 | 2.38 | 2.45 | 2.67 | 2.43 |
| Voltage application time (s) | 12 | 12 | 12 | 12 | 12 | 12 | 12 |
| UV intensity (mW/cm2) | 15 | 15 | 15 | 15 | 15 | 15 | 15 |

TABLE 12-continued

| | Reference example 8 | Reference example 9 | Reference example 10 | Reference example 11 | Reference example 12 | Reference example 13 | Reference example 14 |
|---|---|---|---|---|---|---|---|
| UV radiation time after completion of voltage application (s) | 10 | 10 | 10 | 10 | 10 | 10 | 10 |
| Off-response time (ms) | 5.7 | 5.6 | 5.5 | 5.7 | 5.8 | 5.6 | 5.8 |
| V90 (V) | 6.7 | 6.4 | 7.2 | 6.9 | 6.7 | 8 | 6.8 |
| T100 (%) | 75.4 | 75.5 | 75.4 | 75.1 | 75.6 | 75 | 75.2 |
| tanδ before curing (1 Hz) | 2 | 2 | 2.6 | 2.5 | 2.1 | 2.5 | 2.2 |
| tanδ before curing (4.6 Hz) | 4.1 | 5 | 4.4 | 4.6 | 4.6 | 4.3 | 4.1 |
| tanδ after curing (1 Hz) | 2 | 2 | 2.5 | 2.3 | 2.2 | 2.5 | 2.2 |
| tanδ aftercuring (4.6 Hz) | 4 | 5 | 4.4 | 4.6 | 4.5 | 4.4 | 4.1 |

A comparison with Examples 8 to 14 shows that an inappropriate UV radiation time results in an inappropriate range of viscoelasticity data and off-response as slow as 5 ms or more.

Reference Examples 42 to 49

As listed in Table 13, liquid crystal compositions (LCN-10-2) to (LCN-10-9) containing a liquid crystal host, a monomer, and a photopolymerization initiator were prepared.

TABLE 13

| | Reference example 42 | Reference example 43 | Reference example 44 | Reference example 45 | Reference example 46 | Reference example 47 | Reference example 48 | Reference example 49 |
|---|---|---|---|---|---|---|---|---|
| Liquid crystal composition name | LCN-10-2 | LCN-10-3 | LCN-10-4 | LCN-10-5 | LCN-10-6 | LCN-10-7 | LCN-10-8 | LCN-10-9 |
| Liquid crystal host | LCN-10 | LCN-10 | LCN-10 | LCN-10 | LCN-10 | LCN-10 | LCN-10 | LCN-10 |
| Liquid crystal host concentration (%) | 99.6 | 99.3 | 99.2 | 96.0 | 94.0 | 93.0 | 92.0 | 91.0 |
| Monomer 1 | P1-1 | P1-1 | P1-1 | P1-1 | P1-1 | P1-1 | P1-1 | P1-1 |
| Monomer 1 concentration (%) | 0.392 | 0.686 | 0.784 | 3.920 | 5.880 | 6.860 | 7.840 | 8.820 |
| Initiator | 651 | 651 | 651 | 651 | 651 | 651 | 651 | 651 |
| Initiator concentration (%) | 0.008 | 0.014 | 0.016 | 0.080 | 0.120 | 0.140 | 0.160 | 0.180 |

Examples 18 to 22

A liquid crystal display device according to the present invention was produced in the same manner as in Example 1. Table 14 summarizes the liquid crystal compositions used, production conditions, viscoelastic properties, and liquid crystal display characteristics.

TABLE 14

| | Example 18 | Example 19 | Example 20 | Example 21 | Example 22 |
|---|---|---|---|---|---|
| Liquid crystal composition | LCN-10-4 | LCN-10-5 | LCN-10-6 | LCN-10-7 | LCN-10-8 |
| Cell gap | 3.5 | 3.5 | 3.5 | 3.5 | 3.5 |
| Applied voltage during curing (V) | 2.46 | 2.49 | 2.5 | 2.7 | 2.8 |
| Voltage application time (s) | 12 | 12 | 12 | 12 | 12 |
| UV intensity (mW/cm2) | 15 | 15 | 15 | 15 | 15 |
| UV radiation time after completion of voltage application (s) | 68 | 68 | 68 | 68 | 68 |
| Off-response time (ms) | 4.9 | 3 | 1.8 | 1 | 0.6 |
| V90 (V) | 7.9 | 12.1 | 19.4 | 27.9 | 36 |
| T100 (%) | 75.4 | 60.3 | 47.4 | 36.9 | 30.5 |
| tanδ before curing (1 Hz) | 2.5 | 2.6 | 2.5 | 2.7 | 2.6 |
| tanδ before curing (4.6 Hz) | 4.3 | 4.4 | 4.7 | 4.6 | 4.3 |
| tanδ after curing (1 Hz) | 0.8 | 0.3 | 0.2 | 0.2 | 0.1 |
| tanδ after curing (4.6 Hz) | 0.9 | 0.4 | 0.3 | 0.3 | 0.2 |

Comparative Examples 15 to 17

A liquid crystal display device according to the present invention was produced in the same manner as in Example 1. Table 15 summarizes the liquid crystal compositions used, production conditions, viscoelastic properties, and liquid crystal display characteristics.

TABLE 15

| | Comparative example 15 | Comparative example 16 | Comparative example 17 |
|---|---|---|---|
| Polymerizable liquid crystal composition | LCN-10-2 | LCN-10-3 | LCN-10-9 |
| Cell gap | 3.5 | 3.5 | 3.5 |
| Applied voltage during curing (V) | 2.46 | 2.46 | 2.9 |
| Voltage application time (s) | 12 | 12 | 12 |
| UV intensity (mW/cm2) | 15 | 15 | 15 |
| UV radiation time after completion of voltage application (s) | 68 | 68 | 68 |
| Off-response time (ms) | 5.4 | 5.4 | 0.1 |
| V90 (V) | 7.2 | 7.8 | 120 |
| T100 (%) | 75.4 | 75.3 | 8 |
| tanδ before curing (1 Hz) | 2.6 | 2.6 | 2.5 |
| tanδ before curing (4.6 Hz) | 4.4 | 4.6 | 4.5 |
| tanδ after curing (1 Hz) | 2.6 | 2.6 | 0.05 |
| tanδ after curing (4.6 Hz) | 4.4 | 4.6 | 0.07 |

the plastic substrates was 3.5 μm. The rubbing directions of the upper and lower substrates were antiparallel to each other. The liquid crystal cell was irradiated for 120 seconds with ultraviolet light with a radiation intensity of 15 mW/cm$^2$ from an ultraviolet LED source with a wavelength of 365 nm to prepare a liquid crystal cell.

The liquid crystals had a response time of 4.3 ms at a V90 of 0 V (off-response).

The liquid crystal cell was bent at a radius of curvature of 15 cm. No variation was observed.

Examples 24 to 28

A liquid crystal display device according to the present invention was produced in the same manner as in Example 23. Table 15 summarizes the liquid crystal compositions used, production conditions, response time, evaluation of variations, and the results of alignment variation by pressing. For pressing, a circular surface of a polycarbonate rod 5 mm in radius and 2 cm in length was brought into contact with the device surface to apply a force of 30 gf. Alignment variation was determined from the observation of a change in transmittance on the periphery of a pressed portion of a liquid crystal device between orthogonal polarizers.

TABLE 16

| | Example 23 | Example 24 | Example 25 | Example 26 | Example 27 | Example 28 |
|---|---|---|---|---|---|---|
| Liquid crystal composition | LCN-10-1 | LCN-10-4 | LCN-10-5 | LCN-10-6 | LCN-10-7 | LCN-10-8 |
| Cell gap | 3.5 | 3.5 | 3.5 | 3.5 | 3.5 | 3.5 |
| UV intensity (mW/cm2) | 15 | 15 | 15 | 15 | 15 | 15 |
| UV radiation time (s) | 120 | 120 | 120 | 120 | 120 | 120 |
| Off-response time (ms) | 4.3 | 4.9 | 3.1 | 1.9 | 1.1 | 0.5 |
| Variations by bending (radius of curvature: 15 cm) | None | Slight | None | None | None | None |
| Alignment variation by pressing | None | Slight | None | None | None | None |

Figure 14:
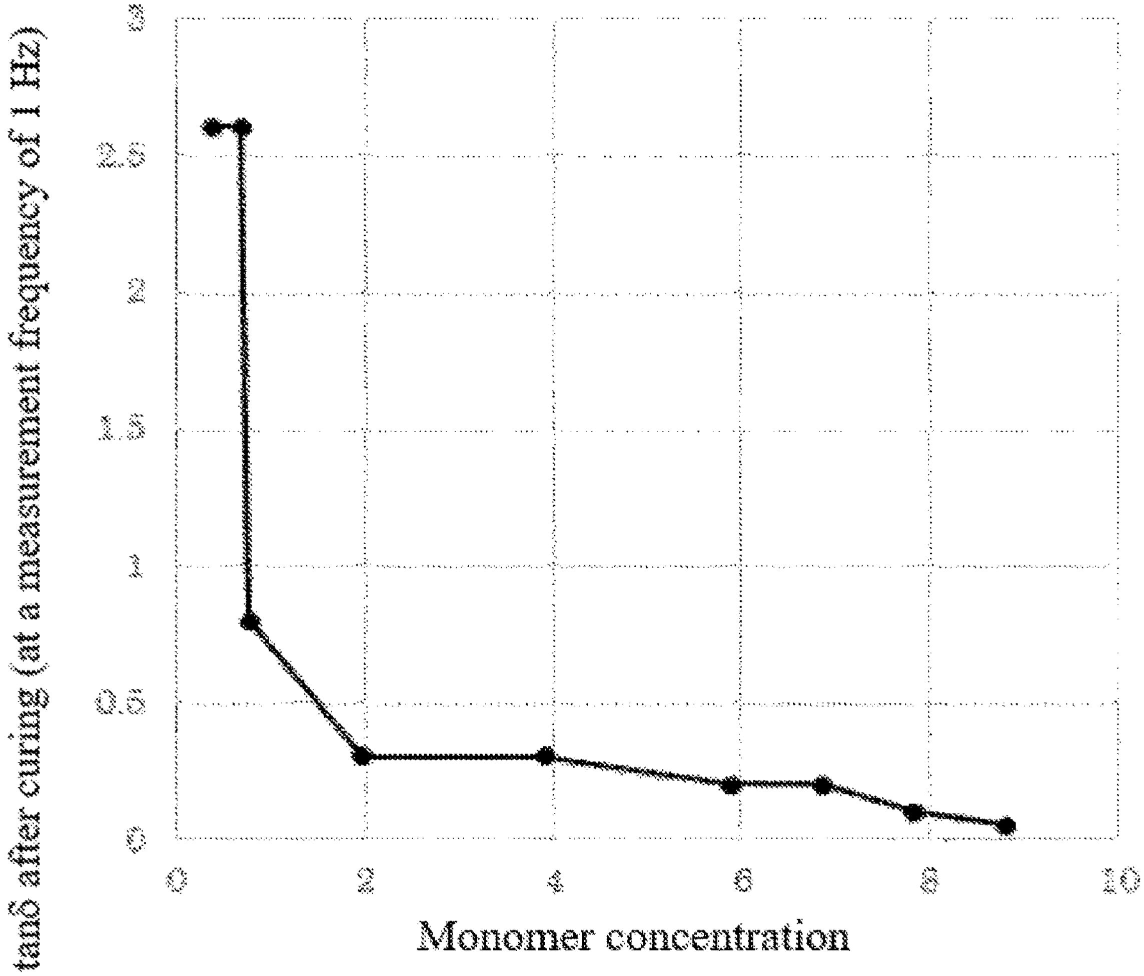
FIG. 14 is a graph showing the relationship between the amount of monomer to be added to a liquid crystal host LCN-10 and the tangent loss after curing (at a measurement frequency of 1 Hz).

Changes in off-response (FIG. 14), V90 (FIG. 15), and tangent loss after curing (at a measurement frequency of 1 Hz) (FIG. 16) with the monomer concentration were summarized on the basis of the experimental results for the liquid crystal host LCN-10 (Examples 18, 10, 19, 20, 21, and 22, and Comparative Examples 15, 16, and 17). A monomer concentration of 0.686% or less results in no effects of increasing the off-response speed, and a monomer concentration of 7.84% or more results in a rapid increase in V90. Thus, the liquid crystal display device has a poor balance and loses usefulness. The liquid crystal display device has a good characteristic balance when the tangent loss after curing (at a measurement frequency of 1 Hz) ranges from 0.1 to 1.

Example 23

A plastic substrate with a plain electrode was used. A rubbed polyimide vertical alignment film (with a tilt angle of 88 degrees) was formed on the plastic substrate. The liquid crystal composition (LCN-10-1) was placed between the plastic substrates to prepare a 4-cm square liquid crystal cell by the one drop filling (ODF) process. The distance between Comparative Examples 18 to 20

A liquid crystal display device according to the present invention was produced in the same manner as in Example 1. Table 16 summarizes the liquid crystal compositions used, production conditions, response time, evaluation of variations, and the results of alignment variation by pressing. For pressing, a circular surface of a polycarbonate rod 5 mm in radius and 2 cm in length was brought into contact with the device surface to apply a force of 30 gf. Alignment variation was determined from the observation of a change in transmittance on the periphery of a pressed portion of a liquid crystal device between orthogonal polarizers.

TABLE 17

| | Comparative example 18 | Comparative example 19 | Comparative example 20 |
|---|---|---|---|
| Liquid crystal composition | LCN-10-2 | LCN-10-3 | LCN-10-9 |
| Cell gap | 3.5 | 3.5 | 3.5 |
| UV intensity (mW/cm2) | 15 | 15 | 15 |
| UV radiation time (s) | 68 | 68 | 68 |
| Off-response time (ms) | 5.4 | 5.6 | 0.2 |

TABLE 17-continued

| | Comparative example 18 | Comparative example 19 | Comparative example 20 |
|---|---|---|---|
| Variations by bending (radius of curvature: 15 cm) | Yes | Yes | Yes |
| Alignment variation by pressing | Yes | Yes | Yes |

The experimental results for the liquid crystal host LCN-10 (Examples 23 to 28 and Comparative Examples 18 to 20) show that the occurrence of variations by bending can be reduced by appropriately setting the monomer concentration (by appropriately setting the tangent loss). The experimental results also show that the occurrence of alignment variation by pressing can also be reduced. Thus, a liquid crystal display device according to the present invention is suitable for a curved display with a bent screen. In smartphones and tablets, a liquid crystal display device is used in combination with a touch panel. A liquid crystal display device according to the present invention can be suitably used because pressing a touch panel rarely causes an alignment change.

Reference Examples 50 and 51

As listed in Table 18, liquid crystal compositions (LCN-1-3) and (LCN-1-4) containing a liquid crystal host, a monomer, and a photopolymerization initiator were prepared.

TABLE 18

| | Reference example 50 | Reference example 51 |
|---|---|---|
| Liquid crystal composition name | LCN-1-3 | LCN-1-4 |
| Liquid crystal host | LCN-1 | LCN-1 |
| Liquid crystal host concentration (%) | 98 | 98 |
| Monomer 1 | P1-1 | P1-1 |
| Monomer 1 concentration (%) | 1.98 | 1.94 |
| Monomer 2 | | |
| Monomer 2 concentration | 0 | 0 |
| Initiator | 651 | 651 |
| Initiator concentration (%) | 0.02 | 0.08 |

Examples 29 and 30

A liquid crystal display device according to the present invention was produced in the same manner as in Example 1. Table 19 summarizes the liquid crystal compositions used, production conditions, viscoelastic properties, and liquid crystal display characteristics.

TABLE 19

| | example 29 | example 30 |
|---|---|---|
| Liquid crystal composition | LC-1-3 | LC-1-4 |
| Cell gap | 3.5 | 3.5 |
| Applied voltage during curing (V) | 2.43 | 2.43 |
| Voltage application time (s) | 12 | 12 |
| UV intensity (mW/cm2) | 15 | 15 |
| UV radiation time after completion of voltage application (s) | 68 | 68 |
| Off-response time (ms) | 5.1 | 4.5 |
| V90 (V) | 8.5 | 8.6 |
| T100 (%) | 71.5 | 67.7 |

TABLE 19-continued

| | example 29 | example 30 |
|---|---|---|
| tanδ before curing (1 Hz) | 2 | 2 |
| tanδ after curing (1 Hz) | 0.8 | 0.4 |
| Ultraviolet radiation time before tanδ (1 Hz) reaches 1 (s) | 50 | 20 |

In Example 28 in which liquid crystal host and its concentration is the same with Example 1 and the amount of initiator was decreased, the time to tan δ=1 was 50 seconds, and the response speed was low, though the transmittance and drive voltage were almost the same as in Example 1. In Example 29 in which the amount of initiator was increased, the time to tan δ=1 was 50 seconds, and the transmittance was low due to poor liquid crystal alignment, though the drive voltage and response speed were almost the same as in Example 1. The time to tan δ=1 is considered to be the ultraviolet radiation time required to form a polymer network to some extent, and this speed in a certain range results in a device with a good characteristic balance.

Examples 31 and 32

A liquid crystal display device according to the present invention was produced in the same manner as in Example 1. Table 20 summarizes the liquid crystal compositions used, production conditions, viscoelastic properties, and liquid crystal display characteristics.

TABLE 20

| | example 31 | example 32 |
|---|---|---|
| Liquid crystal composition | LC-1-1 | LC-1-1 |
| Cell gap | 3.5 | 3.5 |
| Applied voltage during curing (V) | 2.43 | 2.43 |
| Voltage application time (s) | 24 | 6 |
| UV intensity (mW/cm$^2$) | 7.5 | 30 |
| UV radiation time after completion of voltage application (s) | 136 | 32 |
| Off-response time (ms) | 5.0 | 4.5 |
| V90 (V) | 8.4 | 8.6 |
| T100 (%) | 72.2 | 65.7 |
| tanδ before curing (1 Hz) | 2 | 2 |
| tanδ after curing (1 Hz) | 0.9 | 0.3 |
| Ultraviolet radiation time before tanδ (1 Hz) reaches 1 (s) | 80 | 19 |

A change from Example 1 is a change in ultraviolet radiation intensity without a change in the amount of ultraviolet radiation. The time to tan δ=1 in Example 1 was 30 seconds. In Example 31 in which the ultraviolet light intensity was decreased, the time to tan δ=1 was 80 seconds, and the response speed was low, though the transmittance and drive voltage were almost the same as in Example 1. In Example 32 in which the ultraviolet light intensity was increased, the time to tan δ=1 was 19 seconds, and the transmittance was low due to poor liquid crystal alignment, though the drive voltage and response speed were almost the same as in Example 1. The time to tan δ=1 in a certain range results in a device with a good characteristic balance.

Reference Example 52

The composition LCP-1 in the following table was prepared.

TABLE 21

| Compound | Concentration (%) |
|---|---|
| 3-Cy-Cy-V0 | 43 |
| 3-Cy-Cy-V1 | 12 |
| 1V2—Ph—Ph-1 | 7 |
| 0V-Cy-Cy-Ph-1 | 11.5 |
| V2-Cy-Cy-Ph-1 | 9.5 |
| 3-Ph—Ph1—Ph-2 | 6 |
| 3-Pr—Ph—Ph3—CFFO—Ph3—F | 4.5 |
| 3-Ph—Ph1—Ph3—CFFO—Ph3—F | 6 |
| 3-Ph—Ph—Ph1—Ph3—F | 0.5 |
| $T_{NI}$/° C. | 81 |
| Δn | 0.098 |
| Δε | 2.4 |
| γ1/mPa · s | 35 |

Reference Example 53

The composition LCP-2 in the following table was prepared.

TABLE 22

| Compound | Concentration (%) |
|---|---|
| 3-Cy-Cy-V0 | 32.5 |
| 3-Cy-Cy-V1 | 2.5 |
| 0V-Cy-Cy-Ph-1 | 10 |
| 5-Cy-Cy-Ph—O1 | 2.5 |
| 3-Cy-Ph—Ph-Cy-3 | 3.5 |
| 3-Cy-Cy-Ph3—F | 8 |
| 3-Ph—Ph3—CFFO—Ph3—F | 9 |
| 3-Cy-Cy-CFFO—Ph3—F | 9.5 |
| 3-Cy-Cy-Ph1—Ph3—F | 4 |
| 3-Pr—Ph—Ph3—CFFO—Ph3—F | 8.5 |
| 3-Ph—Ph1—Ph3—CFFO—Ph3—F | 4 |
| 3-Cy-Ph—Ph3—Ph1—OCF3 | 6 |
| $T_{NI}$/° C. | 100 |
| Δn | 0.100 |
| Δε | 8.1 |
| γ1/mPa · s | 72 |

Reference Example 54

The composition LCP-3 in the following table was prepared.

TABLE 23

| Compound | Concentration (%) |
|---|---|
| 3-Cy-Cy-V0 | 44 |
| 3-Cy-Cy-V1 | 16 |
| 5-Ph—Ph-1 | 3.5 |
| 3-Cy-Cy-Ph-1 | 6 |
| 3-Cy-Cy-Ph-3 | 1.5 |
| 3-Cy-Ph—Ph-2 | 7 |
| 2-Ph—Ph1—Ph—2V | 5 |
| 3-Ph1—Np2—F | 4 |
| 3-Cy-Ph1—Np2—F | 6 |
| 2-Ph—Ph1—Np2—F | 5 |
| 2-Cy-Cy-Ph—Ph1—F | 2 |

TABLE 23-continued

| Compound | Concentration (%) |
|---|---|
| TNI/° C. | 78 |
| Δn | 0.102 |
| Δε | 2.3 |
| γ1/mPa · s | 38 |

Reference Example 55

The composition LCP-4 in the following table was prepared.

TABLE 24

| Compound | Concentration (%) |
|---|---|
| 3-Cy-Cy-V0 | 40 |
| 3-Cy-Cy-2 | 4 |
| 5-Ph—Ph-1 | 1.5 |
| 0V-Cy-Cy-Ph-1 | 5.5 |
| 3-Cy-Ph—Ph-2 | 2 |
| 3-Cy-Cy-Ph3—F | 8 |
| 2-Ph3—O1-Cy-Ph3—Ph3—F | 5.5 |
| 3-Ph3—O1-Cy-Ph3—Ph3—F | 4.5 |
| 3-Ph3—O1—Ph—Np2—F | 10 |
| 3-Ph—Ph3—CFFO—Np2—F | 10 |
| 3-Ph—Ph1—Ph3—CFFO—Np2—F | 4 |
| 4-Ph—Ph1—Ph3—CFFO—Np2—F | 5 |
| TNI/° C. | 73 |
| Δn | 0.107 |
| Δε | 11.7 |
| γ1/mPa · s | 78 |

Reference Example 56

The composition LCP-5 in the following table was prepared.

TABLE 25

| Compound | concentration (%) |
|---|---|
| 3-Cy-Cy-V0 | 41 |
| 3-Cy-Cy-V1 | 11 |
| 5-Ph—Ph-1 | 2 |
| 3-Cy-Ph—Ph-2 | 6 |
| V-Cy-Ph—Ph-3 | 4 |
| 3-Ph—Ph1—Ph3—O1—V | 15 |
| 3-Cy-Ph—Ph3—O1—Ph3—F | 5 |
| 3-Ph3—O1-Oc-Ph—Ph3—F | 4 |
| 4-Ph3—O1-Oc-Ph—Ph3—F | 4 |
| 3-Ph3—O1-Oc-Ph1—Ph3—F | 5 |
| 5-Ph3—O1-Oc-Ph1—Ph3—F | 3 |
| TNI/° C. | 87 |
| Δn | 0.117 |
| Δε | 6.3 |
| γ1/mPa · s | 54 |

Reference Examples 57 to 61

As listed in Table 26, liquid crystal compositions (LCP-1-1) to (LCP-5-1) containing a liquid crystal host, a monomer, and a photopolymerization initiator were prepared.

TABLE 26

| | Reference example 57 | Reference example 58 | Reference example 59 | Reference example 60 | Reference example 61 |
|---|---|---|---|---|---|
| Liquid crystal composition name | LCP-1-1 | LCP-2-1 | LCP-3-1 | LCP-4-1 | LCN-5-1 |
| Liquid crystal host | LCP-1 | LCP-2 | LCP-3 | LCP-4 | LCP-5 |
| Liquid crystal host concentration (%) | 98 | 98 | 98 | 98 | 98 |
| Monomer 1 | P1-1 | P1-1 | P1-1 | P1-1 | P1-1 |
| Monomer 1 concentration (%) | 1.96 | 1.96 | 1.96 | 0.98 | 0.98 |
| Monomer 2 | | | | P1-2 | P1-2 |
| Monomer 2 concentration | 0 | 0 | 0 | 0.98 | 0.98 |
| Initiator | Irgacure-651 | Irgacure-651 | Irgacure-651 | Irgacure-651 | Irgacure-651 |
| Initiator concentration (%) | 0.04 | 0.04 | 0.04 | 0.04 | 0.04 |

Example 33

An FFS cell (L/S between interdigitated electrodes=¾ μm, the thickness of a SiNx insulating layer between an interdigitated electrode and a common electrode was 0.4 microns) on which a polyimide horizontal alignment film with a cell gap of 3.5 μm was formed was used to inject the polymerizable liquid crystal composition (LCP-1-1) into the cell by the vacuum injection method. The cell was irradiated for 80 seconds with ultraviolet light at a radiation intensity of 15 mW/cm$^2$ from an ultraviolet LED source with a wavelength of 365 nm to produce a liquid crystal display device according to the present invention.

The voltage-transmittance characteristics were measured with 60-Hz rectangular waves. The maximum transmittance was 50.1%, the transmittance in parallel nicols being 100%. The drive voltage at a transmittance of 90% (V90) was 5.6 V. The response time at a V90 of 0 V (off-response) was 3.7 ms.

(Viscoelastic Measurement)

The polymerizable liquid crystal composition before polymerization was placed between two glass plates (the distance between the glass plates was 100 m) and was subjected to viscoelastic measurement with a rheometer.

The polymerizable liquid crystal composition between the glass plates was then irradiated for 80 seconds with ultraviolet light at a radiation intensity of 15 mW/cm$^2$ from an ultraviolet LED source with a wavelength of 365 nm and was subjected to viscoelastic measurement with a rheometer.

The viscoelastic measurement conditions are described below.

Viscoelastometer: "MCR301" manufactured by Anton Paar

Temperature: 25° C.

Strain: 0.4 μm at the maximum (sine wave)

Before curing, the loss tangent at a frequency of 1 Hz was 2.3, and the loss tangent (tan δ) at a frequency of 4.6 Hz was 4.2. After curing, the loss tangent at a frequency of 1 Hz was 0.5, and the loss tangent at a frequency of 4.6 Hz was 0.7.

Examples 34 to 36

A liquid crystal display device according to the present invention was produced in the same manner as in Example 33. Table 27 summarizes the liquid crystal compositions used, production conditions, viscoelastic properties, and liquid crystal display characteristics.

TABLE 27

| | example 33 | example 34 | example 35 | example 36 |
|---|---|---|---|---|
| Liquid crystal composition | LCP-1-1 | LCP-2-1 | LCP-3-1 | LCP-5-1 |
| Cell gap (μm) | 3.5 | 3.5 | 3.5 | 2.8 |
| Electrode width (L: μm) | 3 | 3 | 3 | 3 |
| Electrode distance (S: μm) | 4 | 4 | 4 | 4 |
| Insulating layer thickness (μm) | 0.4 | 0.4 | 0.4 | 0.4 |
| UV intensity (mW/cm$^2$) | 15 | 15 | 15 | 15 |
| UV radiation time (s) | 80 | 80 | 80 | 80 |
| Off-response time (ms) | 3.7 | 7.8 | 4.0 | 5.7 |
| V90 (V) | 5.6 | 4.8 | 6.7 | 5.1 |
| T100 (%) | 50.1 | 52.2 | 55.8 | 47.6 |
| tanδ before curing (1 Hz) | 2.3 | 2.3 | 2.2 | 2.2 |
| tanδ before curing (4.6 Hz) | 4.2 | 5.0 | 4.1 | 4.4 |
| tanδ after curing (1 Hz) | 0.5 | 0.5 | 0.5 | 0.5 |
| tanδ after curing (4.6 Hz) | 0.7 | 0.7 | 0.7 | 0.7 |

Comparative Examples 21 to 24

A liquid crystal display device was produced in the same manner as in Example 33. Table 28 summarizes the liquid crystal compositions used, production conditions, viscoelastic properties, and liquid crystal display characteristics.

TABLE 28

| | Comparative example 21 | Comparative example 22 | Comparative example 23 | Comparative example 24 |
|---|---|---|---|---|
| Liquid crystal composition | LCP-1-1 | LCP-2-1 | LCP-3-1 | LCP-5-1 |
| Cell gap (μm) | 3.5 | 3.5 | 3.5 | 2.8 |
| Electrode width (L: μm) | 3 | 3 | 3 | 3 |
| Electrode distance (S: μm) | 4 | 4 | 4 | 4 |
| Insulating layer thickness (μm) | 0.4 | 0.4 | 0.4 | 0.4 |
| UV intensity (mW/cm$^2$) | 15 | 15 | 15 | 15 |
| UV radiation time (s) | 15 | 15 | 15 | 15 |
| Off-response time (ms) | 4.6 | 9.8 | 5.0 | 7.0 |
| V90 (V) | 5.5 | 3.8 | 5.8 | 4.2 |
| T100 (%) | 52.7 | 55.5 | 58.1 | 50.6 |
| tanδ before curing (1 Hz) | 2.3 | 2.3 | 2.2 | 2.2 |
| tanδ before curing (4.6 Hz) | 4.2 | 5.0 | 4.1 | 4.4 |
| tanδ after curing (1 Hz) | 2.3 | 2.3 | 2.2 | 2.2 |
| tanδ after curing (4.6 Hz) | 4.2 | 5.0 | 4.1 | 4.4 |

A comparison with Examples 33 to 36 shows that an inappropriate UV radiation time results in an inappropriate range of viscoelasticity data and a slow off-response.

Example 37

The FFS cell in Example 33 was substituted with an IPS cell (L/S between interdigitated electrodes=4/12 μm) on which a polyimide horizontal alignment film with a cell gap of 3.0 μm was formed. A polymerizable liquid crystal composition (LCP-4-1) was injected into the cell by the vacuum injection method. The cell was irradiated for 80 seconds with ultraviolet light at a radiation intensity of 15 mW/cm$^2$ from an ultraviolet LED source with a wavelength of 365 nm to produce a liquid crystal display device according to the present invention.

The voltage-transmittance characteristics were measured with 60-Hz rectangular waves. The maximum transmittance was 41.5%, the transmittance in parallel nicols being 100%. The drive voltage at a transmittance of 90% (V90) was 9.2 V. The response time at a V90 of 0 V (off-response) was 5.5 ms.

(Viscoelastic Measurement)

The polymerizable liquid crystal composition before polymerization was placed between two glass plates (the distance between the glass plates was 100 μm) and was subjected to viscoelastic measurement with a rheometer.

The polymerizable liquid crystal composition between the glass plates was then irradiated for 80 seconds with ultraviolet light at a radiation intensity of 15 mW/cm$^2$ from an ultraviolet LED source with a wavelength of 365 nm and was subjected to viscoelastic measurement with a rheometer.

The viscoelastic measurement conditions are described below.

Viscoelastometer: "MCR301" manufactured by Anton Paar

Temperature: 25° C.

Strain: 0.4 μm at the maximum (sine wave)

Before curing, the loss tangent at a frequency of 1 Hz was 2.3, and the loss tangent (tan δ) at a frequency of 4.6 Hz was 4.2. After curing, the loss tangent at a frequency of 1 Hz was 0.6, and the loss tangent at a frequency of 4.6 Hz was 0.7.

TABLE 29

| | Example 37 |
|---|---|
| Liquid crystal composition | LCP-4-1 |
| Cell gap (μm) | 3 |
| Electrode width (L: μm) | 4 |
| Electrode distance (S: μm) | 12 |
| UV intensity (mW/cm2) | 15 |
| UV radiation time (s) | 80 |
| Off-response time (ms) | 5.5 |
| V90 (V) | 9.2 |
| T100 (%) | 41.5 |
| tanδ before curing (1 Hz) | 2.3 |
| tanδ before curing (4.6 Hz) | 4.2 |
| tanδ after curing (1 Hz) | 0.6 |
| tanδ after curing (4.6 Hz) | 0.7 |

Comparative Example 25

A liquid crystal display device was produced in the same manner as in Example 37. Table 30 summarizes the liquid crystal compositions used, production conditions, viscoelastic properties, and liquid crystal display characteristics.

TABLE 30

| | Comparative example 25 |
|---|---|
| Liquid crystal composition | LCP-4-1 |
| Cell gap (μm) | 3 |
| Electrode width (L: μm) | 4 |
| Electrode distance (S: μm) | 12 |
| UV intensity (mW/cm$^2$) | 15 |
| UV radiation time (s) | 15 |
| Off-response time (ms) | 7.5 |
| V90 (V) | 8.0 |
| T100 (%) | 46.0 |
| tanδ before curing (1 Hz) | 2.3 |
| tanδ before curing (4.6 Hz) | 4.2 |
| tanδ after curing (1 Hz) | 2.3 |
| tanδ after curing (4.6 Hz) | 4.2 |

A comparison with Example 37 shows that an inappropriate UV radiation time results in an inappropriate range of viscoelasticity data and a slow off-response.

REFERENCE SIGNS LIST

1 polarizer, 2 first transparent insulating substrate, 3 electrode layer, 4 alignment film, **4*a* alignment direction, 5** liquid crystal layer, 5*a* liquid crystal molecules when no voltage is applied, 5*b* liquid crystal molecules when a voltage is applied, 6 color filter, 7 second transparent insulating substrate, 8 polarizer, 9 continuous or discontinuous polymer network, 10 liquid crystal display device, 11 gate electrode, 12 gate-insulating layer, 13 semiconductor layer, 14 protective layer, 15 ohmic contact layer, 16 drain electrode, 17 source electrode, 18 insulating protective layer, 21 pixel electrode, 22 common electrode, 23 storage capacitor, 24 gate line, 25 data line, 26 drain electrode, 27 source electrode, 28 gate electrode, 29 common line, 100 polarizer, 110 gate electrode, 120 gate-insulating layer, 130 semiconductor layer, 140 protective layer, 160 drain electrode, 190*b* organic insulating film, 200 first substrate, 210 pixel electrode, 220 storage capacitor, 230 drain electrode, 240 data line, 250 gate line, 260 source electrode, 270 gate electrode, 300 thin-film transistor layer, 400 alignment film, 500 liquid crystal layer, 510 liquid crystal display, 512 pixel electrode, 512*a* pixel trunk electrode, 512*b* pixel branch electrode, 512*c* pixel slit, 516 scanning line, 517 signal line, 600 common electrode, 700 color filter, 800 second substrate, 900 polarizer, 1000 liquid crystal display device, 1400 transparent electrode (layer), PX pixel, PE pixel electrode, PA main pixel electrode, PB subpixel electrode, CE common electrode, CA main common electrode, CAL left-side main common electrode, CAR right-side main common electrode, CB secondary common electrode, CBU upper-side secondary common electrode, CBB lower-side secondary common electrode

The invention claimed is:

1. A liquid crystal display device, wherein a liquid crystal layer containing a polymer network (A) and a liquid crystal composition (B) is disposed between two substrates having an electrode on at least one side thereof and having transparent properties on at least one side thereof, and a loss factor (tan δ) (loss modulus/storage modulus) of the liquid crystal layer calculated from storage modulus (Pa) and loss modulus (Pa) in a sinusoidal vibration measured with a rheometer at 25° C. and at a measurement frequency of 1 Hz ranges from 0.1 to 1.

2. The liquid crystal display device according to claim 1, wherein the liquid crystal layer has a loss tangent in the range of 0.11 to 1 at a measurement frequency of 4.6 Hz.

3. The liquid crystal display device according to claim 1, wherein the liquid crystal layer has an absolute difference of 0.2 or less between the loss tangent at a measurement frequency of 1 Hz and the loss tangent at a measurement frequency of 4.6 Hz.

4. The liquid crystal display device according to claim 1, wherein an optical axis direction or an easy alignment axis direction of the polymer network (A) is the same direction as an easy alignment axis direction of the liquid crystal composition (B) in the liquid crystal layer.

5. The liquid crystal display device according to claim 1, wherein the liquid crystal layer is formed by polymerizing a polymerizable liquid crystal composition containing a polymerizable monomer component (a) and the liquid crystal composition (B) as essential components.

6. The liquid crystal display device according to claim 5, wherein the polymerizable monomer component (a) is represented by the following general formula (P1), (wherein $Z^{P11}$ denotes a fluorine atom, a cyano group, a hydrogen atom, an alkyl group having 1 to 15 carbon atoms in which a hydrogen atom is optionally substituted with a halogen atom, an alkoxy group having 1 to 15 carbon atoms in which a hydrogen atom is optionally substituted with a halogen atom, an alkenyl group having 1 to 15 carbon atoms in which a hydrogen atom is optionally substituted with a halogen atom, an alkenyloxy group having 1 to 15 carbon atoms in which a hydrogen atom is optionally substituted with a halogen atom, or $-Sp^{P12}-R^{P12}$, $R^{P11}$ and $R^{P12}$ independently denote one of the following formulae (RP11-1) to (RP11-8) (wherein * denotes a bonding site), (RP11-1)

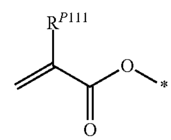

(RP11-2)

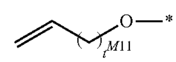

(RP11-3)

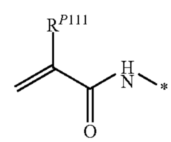

(RP11-4)

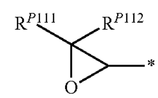

(RP11-5)

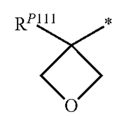

(RP11-6)

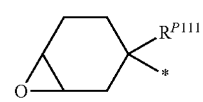

(RP11-7)

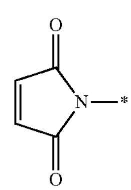

(RP11-8)

HS—* in the formulae (RP11-1) to (RP11-8), $R^{P111}$ and $R^{P112}$ independently denote a hydrogen atom or an alkyl group having 1 to 5 carbon atoms, $t^{M11}$ denotes 0, 1, or 2, $Sp^{P11}$ and $Sp^{P12}$ independently denote a single bond, a linear or branched alkylene group having 1 to 12 carbon atoms, or a structural moiety with a chemical (P1)

$$(R^{P11}-Sp^{P11})_{mp11}-(M^{P11})_{mp12}-(L^{P11}-M^{P12})_{mp13}-(L^{P12}-M^{P13})_{mp14}-(Z^{P11})_{mp15}$$

structure in which a carbon atom in the linear or branched alkylene structure is substituted with an oxygen atom or a carbonyl group provided that the carbon atom is not adjacent to an oxygen atom, $L^{P11}$ and $L^{P12}$ independently denote a single bond, —O—, —S—, —$CH_2$—, —$OCH_2$—, —$CH_2O$—, —CO—, —$C_2H_4$—, —COO—, —OCO—, —$OCOOCH_2$—, —$CH_2OCOO$—, —$OCH_2CH_2O$—, —CO—$NR^{P113}$—, —$NR^{P113}$—CO—, —$SCH_2$—, —$CH_2S$—, —CH═$CR^{P113}$—OCO—, —CH═$CR^{P113}$—OCO—, —COO—$CR^{P113}$═CH—, —OCO—$CR^{P113}$═CH—, —COO—$CR^{P113}$ ═CH—COO—, —COO—$CR^{P113}$═CH—OCO—, —OCO—$CR^{P113}$ ═CH—OCO—, —OCO—$CR^{P113}$ ═CH—OCO—, —$(CH_2)_{tm12}$—C(═O)—O—, —$(CH_2)_{tm12}$—O—(C═O)—, —O—(C═O)—$(CH_2)_{tm12}$—, —(C═O)—O—$(CH_2)_{tm12}$—, —CH═CH—, —CF═CF—, —CF═CH—, —CH═CF—, —$CF_2$—, —$CF_2O$—, —$OCF_2$—, —$CF_2CH_2$—, —$CH_2CF_2$—, —$CF_2CF_2$—, —C≡C—, —N═N—, —CH═N—, or —C═N—N═C— (wherein $R^{P113}$ independently denote a hydrogen atom or an alkyl group having 1 to 4 carbon atoms, and tm12 denotes an integer in the range of 1 to 4), $M^{P11}$, $M^{P12}$, and $M^{P13}$ independently denote a 1,4-phenylene group, a 1,3-phenylene group, a 1,2-phenylene group, a 1,4-cyclohexylene group, a 1,3-cyclohexylene group, a 1,2-cyclohexylene group, a 1,4-cyclohexenylene group, a 1,3-cyclohexenylene group, a 1,2-cyclohexenylene group, an anthracene-2,6-diyl group, a phenanthrene-2,7-diyl group, a pyridine-2,5-diyl group, a pyrimidine-2,5-diyl group, a naphthalene-2,6-diyl group, a naphthalene-1,4-diyl group, an indan-2,5-diyl group, a fluorene-2,6-diyl group, a fluorene-1,4-diyl group, a phenanthrene-2,7-diyl group, an anthracene-2,6-diyl group, an anthracene-1,4-diyl group, a 1,2,3,4-tetrahydronaphthalene-2,6-diyl group, or a 1,3-dioxane-2,5-diyl group, and $M^{P11}$, $M^{P12}$, $M^{P13}$ are independently unsubstituted or optionally substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, a nitro group, or a group of the same meaning as -$Sp^{P11}$-$R^{P11}$, mp12 denotes 1 or 2, mp13 and mp14 independently denote 0, 1, 2, or 3, mp11 and mp15 independently denote 1, 2, or 3, if there are a plurality of $Z^{P11}$s, they may be the same or different, if there are a plurality of $R^{P11}$s, they may be the same or different, if there are a plurality of $R^{P12}$s, they may be the same or different, if there are a plurality of $Sp^{P11}$s, they may be the same or different, if there are a plurality of $Sp^{P12}$s, they may be the same or different, if there are a plurality of $L^{P11}$s, they may be the same or different, if there are a plurality of $L^{P12}$s, they may be the same or different, if there are a plurality of $M^{P12}$s, they may be the same or different, and if there are a plurality of $M^{P13}$s, they may be the same or different).

7. The liquid crystal display device according to claim 1, wherein the liquid crystal composition (B) is selected from compounds represented by the following general formulae (N-1), (N-2), (N-3), and (N-4) and contains one or more compounds with negative dielectric constant anisotropy, (N-1)

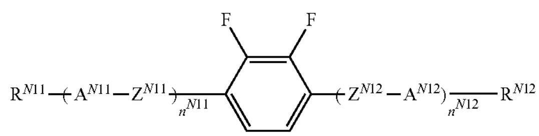

(N-2)

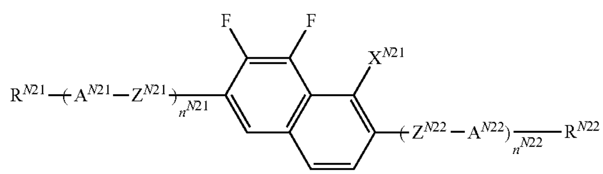

(N-3)

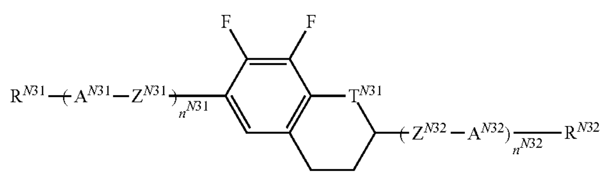

(N-4)

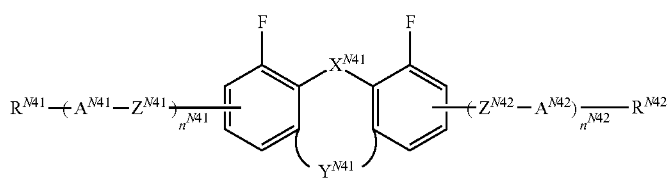

(wherein $R^{N11}$, $R^{N12}$, $R^{N21}$, $R^{N22}$, $R^{N31}$, $R^{N32}$, $R^{N41}$, and $R^{N42}$ independently denote an alkyl group having 1 to 8 carbon atoms, or a structural moiety with a chemical structure in which one —$CH_2$— or two or more non-adjacent —$CH_2$— groups in an alkyl chain having 2 to 8 carbon atoms are independently substituted with —CH═CH—, —C≡C—, —O—, —CO—, —COO—, or —OCO—, $A^{N11}$, $A^{N12}$, $A^{N21}$, $A^{N22}$, $A^{N31}$, $A^{N32}$, $A^{N41}$, and $A^{N42}$ independently denote a group selected from the group consisting of (a) a 1,4-cyclohexylene group, (b) a divalent organic group with a structure in which one —$CH_2$— or two or more nonadjacent —$CH_2$— groups in a 1,4-cyclohexylene structure are substituted with —O—, and (c) a 1,4-phenylene group, (d) a divalent organic group with a structure in which one —CH═ or two or more nonadjacent —CH═ groups in a 1,4-phenylene structure are substituted with —N═, (e) a naphthalene-2,6-diyl group, a 1,2,3,4-tetrahydronaphthalene-2,6-diyl group, or a decahydronaphthalene-2,6-diyl group, (f) a divalent organic group with a structure in which one —CH═ or two or more nonadjacent —CH═ groups in a naphthalene-2,6-diyl structure or in a 1,2,3,4-tetrahydronaphthalene-2,6-diyl structure are substituted with —N═, and (g) a 1,4-cyclohexenylene group, the groups (a), (b), (c), (d), (e), (f), and (g) are independently optionally substituted with a cyano group, a fluorine atom, or a chlorine atom, $Z^{N11}$, $Z^{N12}$, $Z^{N21}$, $Z^{N22}$, $Z^{N31}$, $Z^{N32}$, $Z^{N41}$, and $Z^{N42}$ independently denote a single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF—, or —C≡C—, $X^{N21}$ denotes a hydrogen atom or a fluorine atom, $T^{N31}$ denotes —$CH_2$— or an oxygen atom, $X^{N41}$ denotes an oxygen atom, a nitrogen atom, or —$CH_2$—, $Y^{N41}$ denotes a single bond or —$CH_2$—, $n^{N11}$, $n^{N12}$, $n^{N21}$, $n^{N22}$, $n^{N31}$, $n^{N32}$, $n^{N41}$, and $n^{N42}$ independently denote an integer in the range of 0 to 3, $n^{N11}+n^{N12}$, $n^{N21}+n^{N22}$, and $n^{N31}+n^{N32}$ independently denote 1, 2, or 3, and if there are a plurality of $A^{N11}$s, $A^{N12}$s, $A^{N21}$s, $A^{N22}$s, $A^{N31}$s, $A^{N32}$s, $Z^{N11}$s, $Z^{N12}$s, $Z^{N21}$s, $Z^{N22}$s, $Z^{N31}$s, and $Z^{N32}$s, they may be the same or different, and $n^{N41}+n^{N42}$ denotes an integer in the range of 0 to 3, and if there are a plurality of $A^{N4}$s, $A^{N42}$s, $Z^{N41}$s, and $Z^{N42}$s, they may be the same or different).

8. The liquid crystal display device according to claim 7, wherein the liquid crystal composition (B) is represented by the general formula (L) and further contains at least one compound with a dielectric constant anisotropy Δε in the range of −2 to 2, $$R^{L1}-A^{L1}-Z^{L1}\left(A^{L2}-Z^{L2}\right)_{n^{L1}}A^{L3}-R^{L2} \quad (L)$$

(wherein $R^{L1}$ and $R^{L2}$ independently denote an alkyl group having 1 to 8 carbon atoms, or an organic group with a chemical structure in which one —$CH_2$— or two or more nonadjacent —$CH_2$— groups in an alkyl chain having 2 to 8 carbon atoms are independently substituted with —CH═CH—, —C≡C—, —O—, —CO—, —COO—, or —OCO—, $n^{L1}$ denotes 0, 1, 2, or 3, $A^{L1}$, $A^{L2}$, and $A^{L3}$ independently denote a group selected from the group consisting of (a) a 1,4-cyclohexylene group, (b) a divalent organic group with a chemical structure in which one —$CH_2$— or two or more nonadjacent —$CH_2$— groups in a 1,4-cyclohexylene structure are substituted with —O—, (c) a 1,4-phenylene group, (d) a divalent organic group with a chemical structure in which one —CH═ or two or more nonadjacent —CH═ groups in a 1,4-phenylene structure are substituted with —N═, (e) a naphthalene-2,6-diyl group, a 1,2,3,4-tetrahydronaphthalene-2,6-diyl group, or a decahydronaphthalene-2,6-diyl group, and (f) a divalent organic group with a structure in which one —CH═ or two or more nonadjacent —CH═ groups in a naphthalene-2,6-diyl structure or in a 1,2,3,4-tetrahydronaphthalene-2,6-diyl structure are substituted with —N═, the groups (a), (b), (c), (d), (e), and (f) are independently optionally substituted with a cyano group, a fluorine atom, or a chlorine atom, $Z^{L1}$ and $Z^{L2}$ independently denote a single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF—, or —C≡C—, and if $n^{L1}$ denotes 2 or 3, a plurality of $A^{L2}$s may be the same or different, and if $n^{L1}$ denotes 2 or 3, a plurality of $Z^{L2}$s may be the same or different).

9. The liquid crystal display device according to claim 1, wherein the liquid crystal composition (B) comprises a liquid crystal material with positive dielectric constant anisotropy, at least one compound represented by the general formula (J), and at least one compound represented by the general formula (L), $$R^{J1}-A^{J1}\left(Z^{J1}-A^{J2}\right)_{n^{J1}}Z^{J2}-A^{J3}-X^{J1} \quad (J)$$

(wherein $R^{J1}$ denotes an alkyl group having 1 to 8 carbon atoms, and one —$CH_2$— or two or more nonadjacent —$CH_2$— groups in the alkyl group are independently optionally substituted with —CH═CH—, —C≡C—, —O—, —CO—, —COO—, or —OCO—, $n^{J1}$ denotes 0, 1, 2, 3, or 4, $A^{J1}$, $A^{J2}$, and $A^{J3}$ independently denote a group selected from the group consisting of (a) a 1,4-cyclohexylene group (in which one —$CH_2$— or two or more nonadjacent —$CH_2$— groups are optionally substituted with —O—), (b) a 1,4-phenylene group (in which one —CH═ or two or more nonadjacent —CH═ groups are optionally substituted with —N═), and (c) a naphthalene-2,6-diyl group, a 1,2,3,4-tetrahydronaphthalene-2,6-diyl group, or a decahydronaphthalene-2,6-diyl group (one —CH═ or two or more nonadjacent —CH═ groups in the naphthalene-2,6-diyl group or in the 1,2,3,4-tetrahydronaphthalene-2,6-diyl group are optionally substituted with —N═), the groups (a), (b), and (c) are independently optionally substituted with a cyano group, a fluorine atom, a chlorine atom, a methyl group, a trifluoromethyl group, or a trifluoromethoxy group, $Z^{J1}$ and $Z^{J2}$ independently denote a single bond, $—CH_2CH_2—$, $—(CH_2)_4—$, $—OCH_2—$, $—CH_2O—$, $—OCF_2—$, $—CF_2O—$, —COO—, —OCO—, or —C≡C—, if $n^{J1}$ denotes 2, 3, or 4, a plurality of $A^{J2}$s may be the same or different, and if $n^{J1}$ denotes 2, 3, or 4, a plurality of $Z^{J1}$s may be the same or different, and $X^{J1}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group)

$$R^{L1}-A^{L1}-Z^{L1}\left(A^{L2}-Z^{L2}\right)_{n^{L1}}A^{L3}-R^{L2} \qquad \text{(L)}$$

($R^{L1}$ and $R^{L2}$ independently denote an alkyl group having 1 to 8 carbon atoms, and one $—CH_2—$ or two or more nonadjacent $—CH_2—$ groups in the alkyl group are independently optionally substituted with —CH═CH—, —C≡C—, —O—, —CO—, —COO—, or —OCO—, $n^{L1}$ denotes 0, 1, 2, or 3, $A^{L1}$, $A^{L2}$, and $A^{L3}$ independently denote a group selected from the group consisting of (a) a 1,4-cyclohexylene group (in which one $—CH_2—$ or two or more nonadjacent $—CH_2—$ groups are optionally substituted with —O—), (b) a 1,4-phenylene group (in which one —CH═ or two or more nonadjacent —CH═ groups are optionally substituted with —N═), and (c) a naphthalene-2,6-diyl group, a 1,2,3,4-tetrahydronaphthalene-2,6-diyl group, or a decahydronaphthalene-2,6-diyl group (one —CH═ or two or more nonadjacent —CH═ groups in the naphthalene-2,6-diyl group or in the 1,2,3,4-tetrahydronaphthalene-2,6-diyl group are optionally substituted with —N═), the groups (a), (b), and (c) are independently optionally substituted with a cyano group, a fluorine atom, or a chlorine atom, $Z^{L1}$ and $Z^{L2}$ independently denote a single bond, $—CH_2CH_2—$, $—(CH_2)_4—$, $—OCH_2—$, $—CH_2O—$, —COO—, —OCO—, $—OCF_2—$, $—CF_2O—$, —CH═N—N═CH—, —CH═CH—, —CF═CF—, or —C≡C—, and if $n^{L1}$ denotes 2 or 3, a plurality of $A^{L2}$s may be the same or different, and if $n^{L1}$ denotes 2 or 3, a plurality of $Z^{L2}$s may be the same or different, but compounds represented by the general formulae (N-1), (N-2), (N-3), (N-4), and (J) are excluded).

10. The liquid crystal display device according to claim 9, comprising at least one compound with a dielectric constant anisotropy Δε in the range of −2 to 2 as a compound represented by the general formula (L) in the liquid crystal composition (B).

11. The liquid crystal display device according to claim 1, wherein the liquid crystal display device has a cell structure in a VA mode, IPS mode, FFS mode, VA-TN mode, TN mode, or ECB mode.

12. A method for producing the liquid crystal display device according to claim 1, wherein an ultraviolet radiation time to form the polymer network (A) ranges from 25 to 45 seconds before a loss factor (tan δ) (loss modulus/storage modulus) of the liquid crystal layer calculated from storage modulus (Pa) and loss modulus (Pa) in a sinusoidal vibration measured with a rheometer at 25° C. and at a measurement frequency of 1 Hz reaches 1 or less.

13. The liquid crystal display device according to claim 1, wherein the polymer network (A) content of the liquid crystal layer ranges from 0.5% to 20% by mass.

14. The liquid crystal display device according to claim 1, wherein a polymer network layer with a thickness equal to at least 0.5% or more of a cell thickness in a direction of a cross-section of a cell is formed.

15. The liquid crystal display device according to claim 13, wherein the polymer network (A) has uniaxial refractive index anisotropy or an uniaxial easy alignment axis and has two or more different alignment states.

* * * * *